United States Patent [19]

Schuller et al.

[11] 4,231,105
[45] Oct. 28, 1980

[54] VENDOR CONTROL CIRCUIT

[75] Inventors: James T. Schuller, St. Louis County; Paul N. Albrecht, Ballwin; Hugo M. Canizares, Bridgeton, all of Mo.

[73] Assignee: UMC Industries, Inc., Stamford, Conn.

[21] Appl. No.: 921,960

[22] Filed: Jul. 5, 1978

[51] Int. Cl.[3] .................. G07F 11/62; G06F 15/21
[52] U.S. Cl. .................. 364/900; 194/10; 364/479
[58] Field of Search ........... 364/900 MS File, 404, 364/405, 479; 235/92 AC; 340/149 R; 194/1 N, 2, 10

[56] References Cited

U.S. PATENT DOCUMENTS

| | | | |
|---|---|---|---|
| 3,269,505 | 8/1966 | Abe et al. | 364/479 X |
| 3,330,947 | 7/1967 | Alpert et al. | 364/405 |
| 3,894,220 | 7/1975 | Levasseur | 364/479 |
| 4,056,181 | 11/1977 | Ikeguchi et al. | 194/10 |
| 4,096,933 | 6/1978 | Massa | 364/479 X |
| 4,107,777 | 8/1978 | Pearson et al. | 364/479 X |

*Primary Examiner*—Jerry Smith
*Attorney, Agent, or Firm*—Senniger, Powers, Leavitt and Roedel

[57] ABSTRACT

A control circuit for a vendor for vending a plurality of items comprising a microprocessor, an electrically alterable memory, a display circuit and an interrogation circuit. Values of parameters, typically prices, associated with the items to be vended are stored in the memory. The interrogation circuit can be activated to retrieve from memory the value of the parameter (e.g., price) associated with any given item. The parameter value is thereupon displayed by the display circuit. The display circuit displays the parameter value retrieved from memory independently of whether the microprocessor has another input equal in value to the value of that parameter. The parameter value stored in the memory for any given item can be altered by the microprocessor.

38 Claims, 42 Drawing Figures

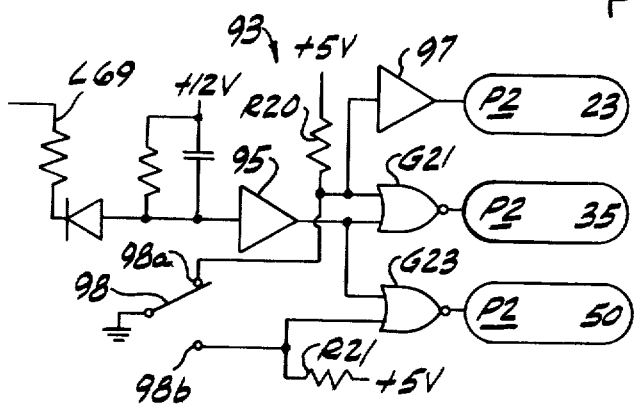
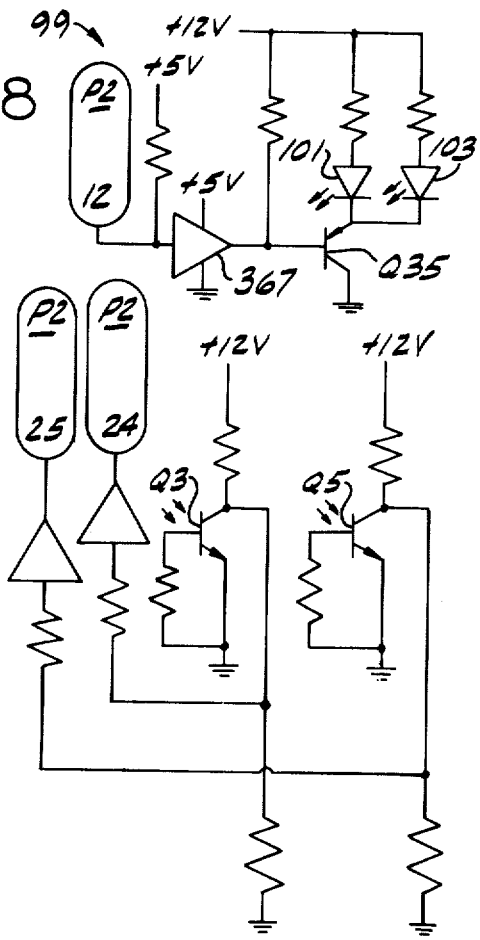
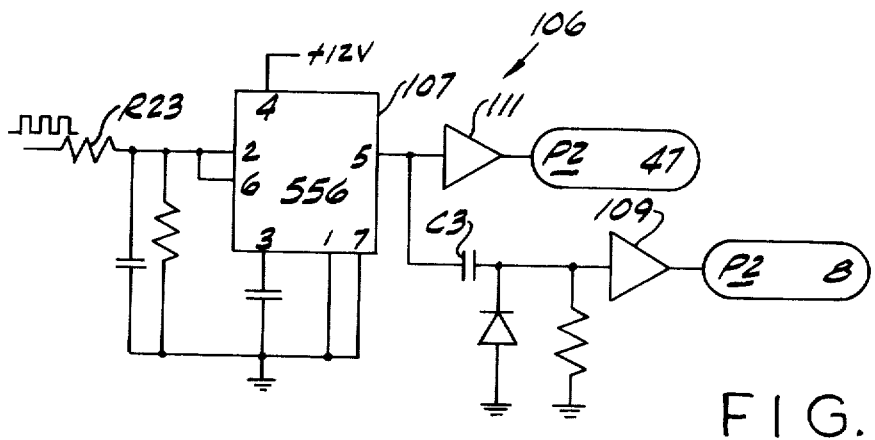
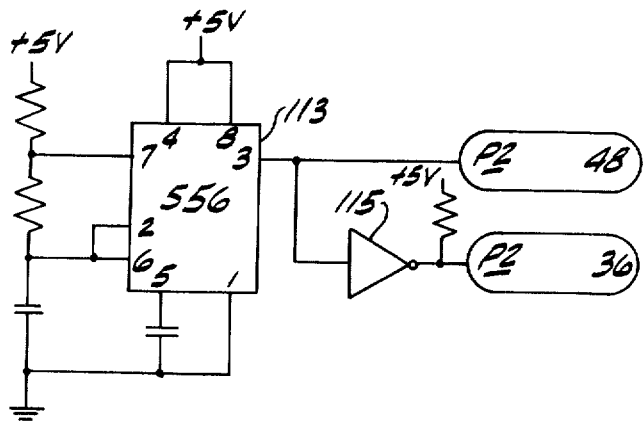
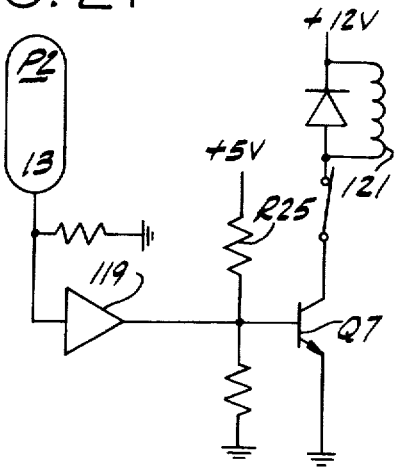

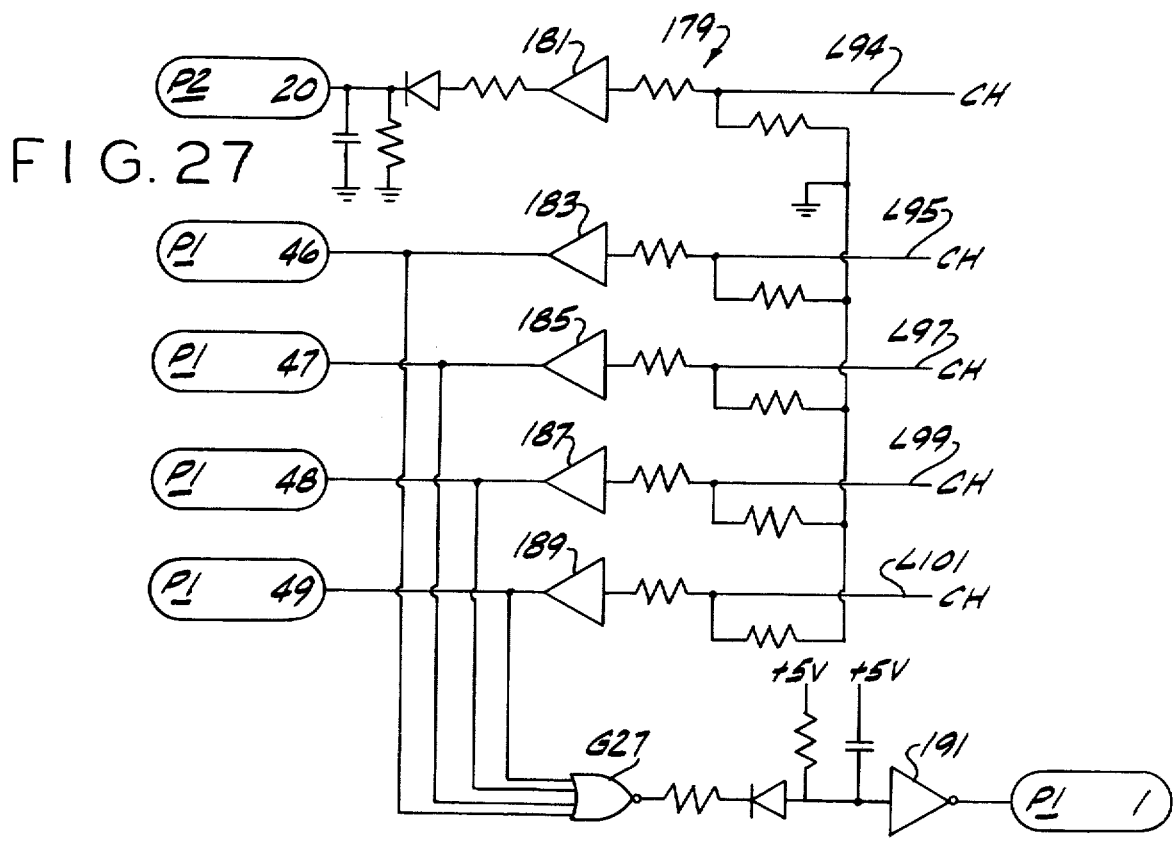
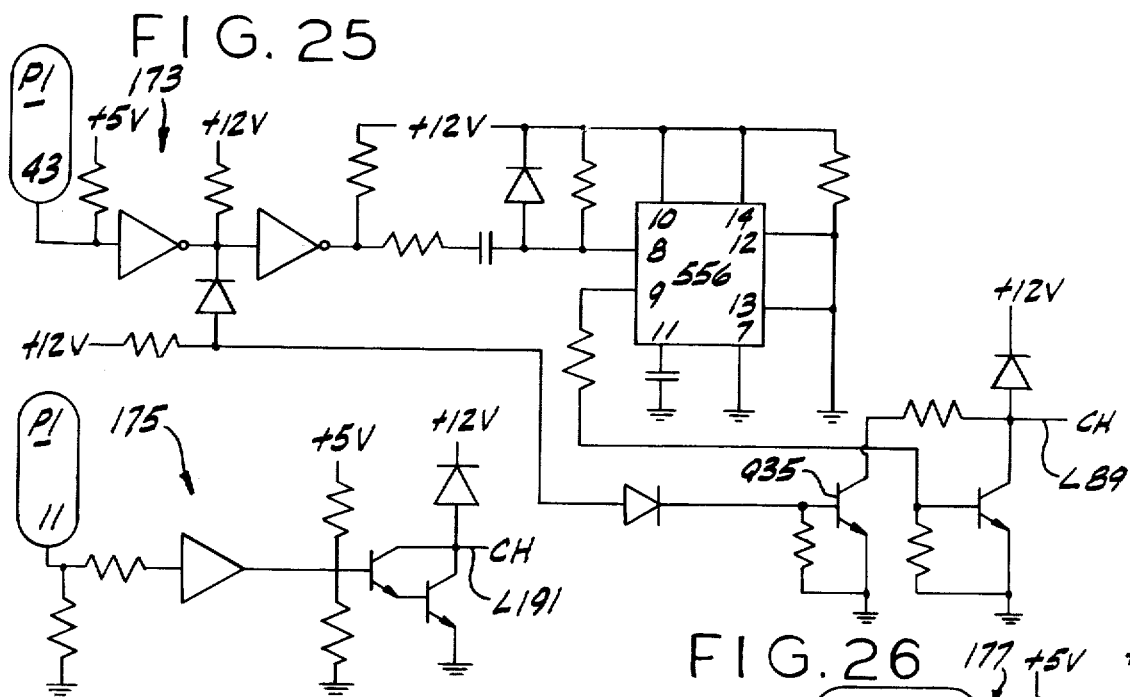
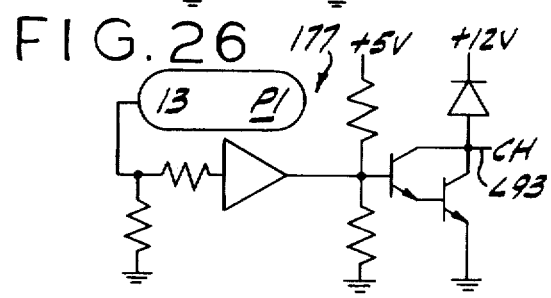

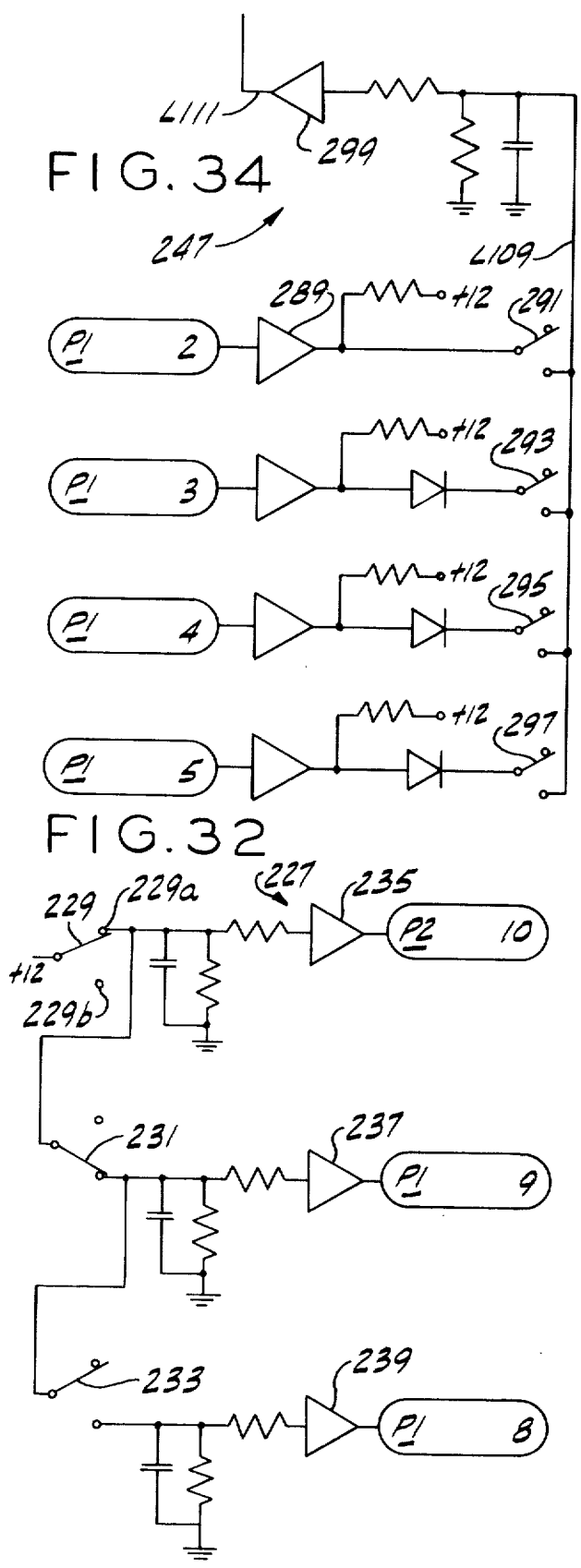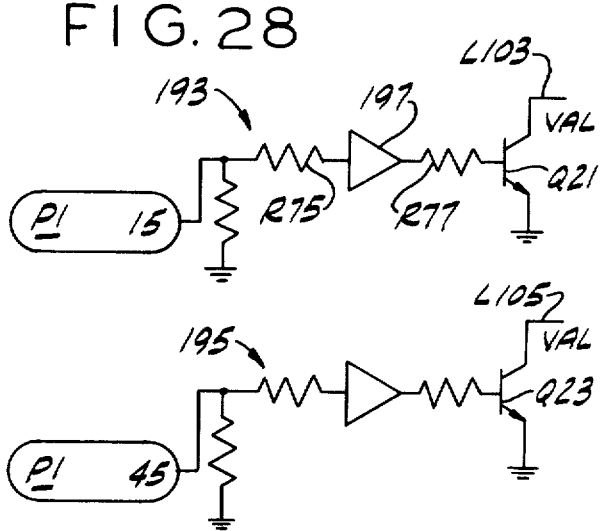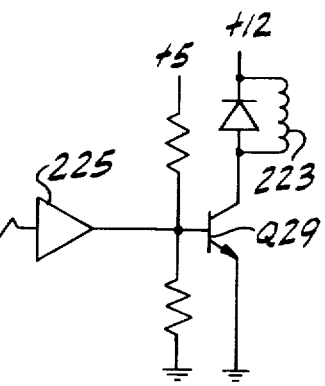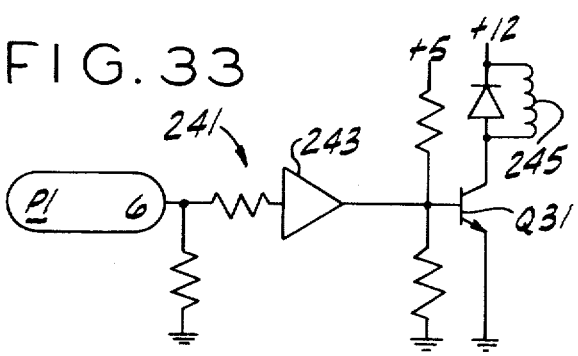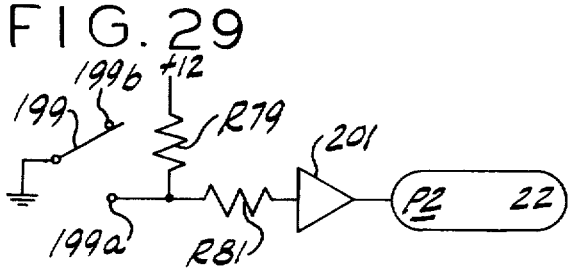

FIG. 37
FIG. 38
FIG. 41
FIG. 42
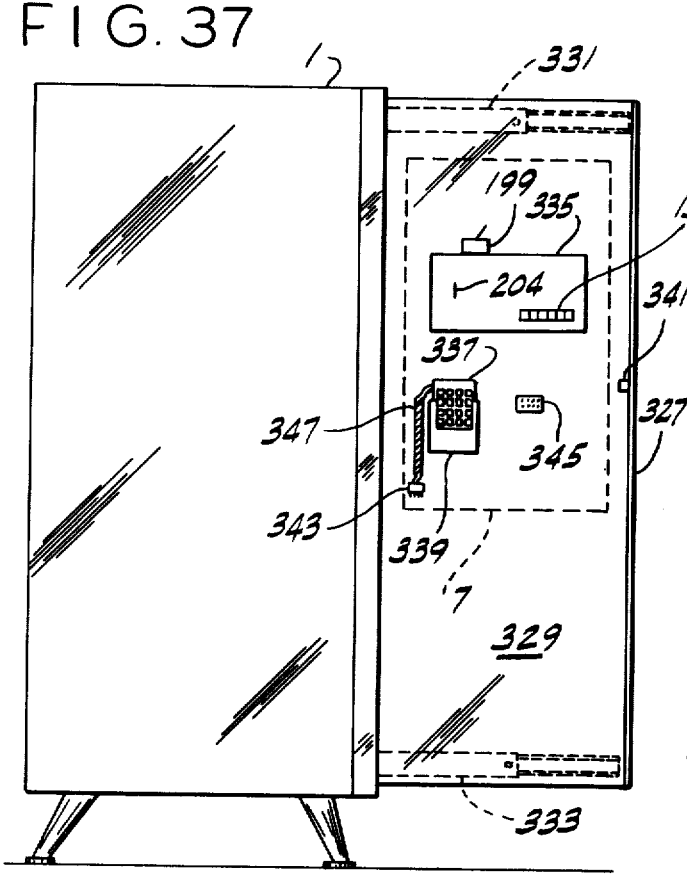
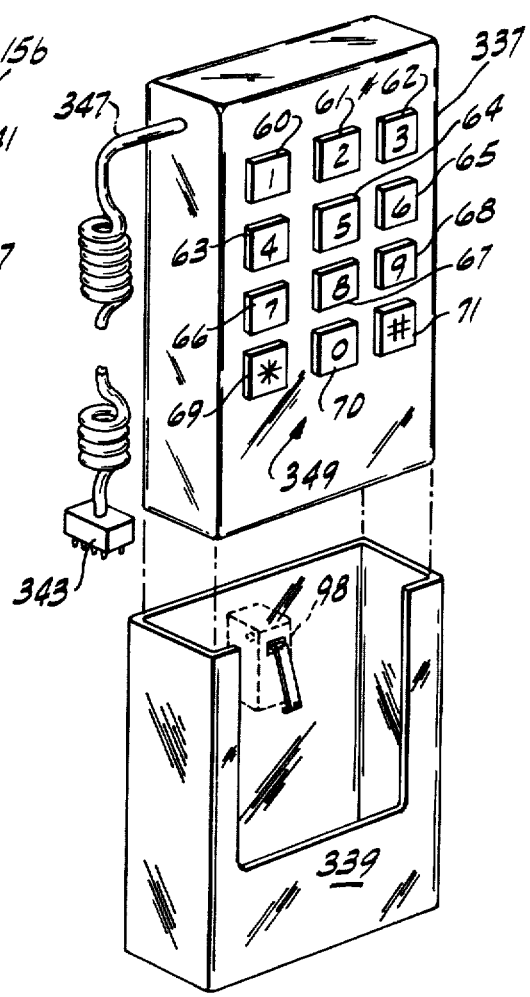
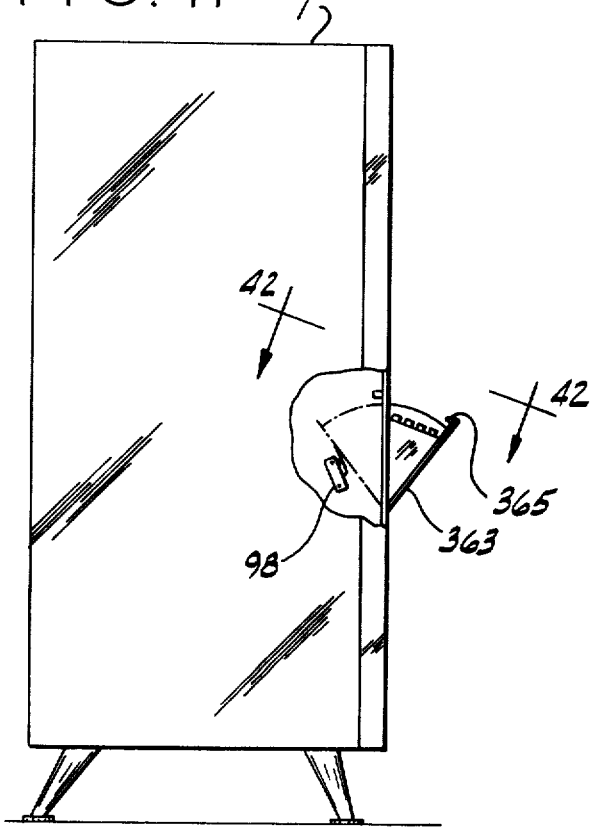
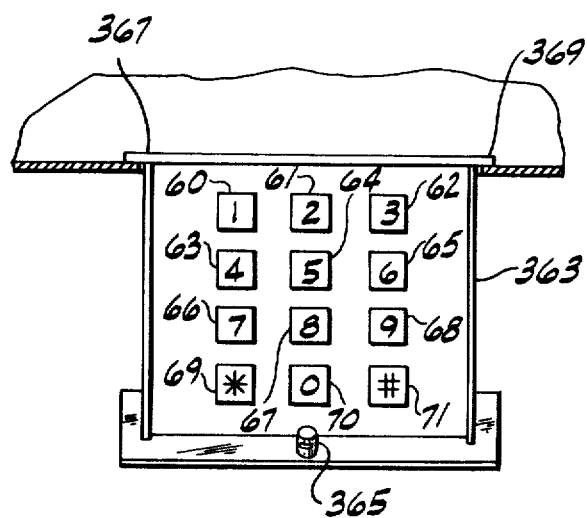

FIG. 39
FIG. 40
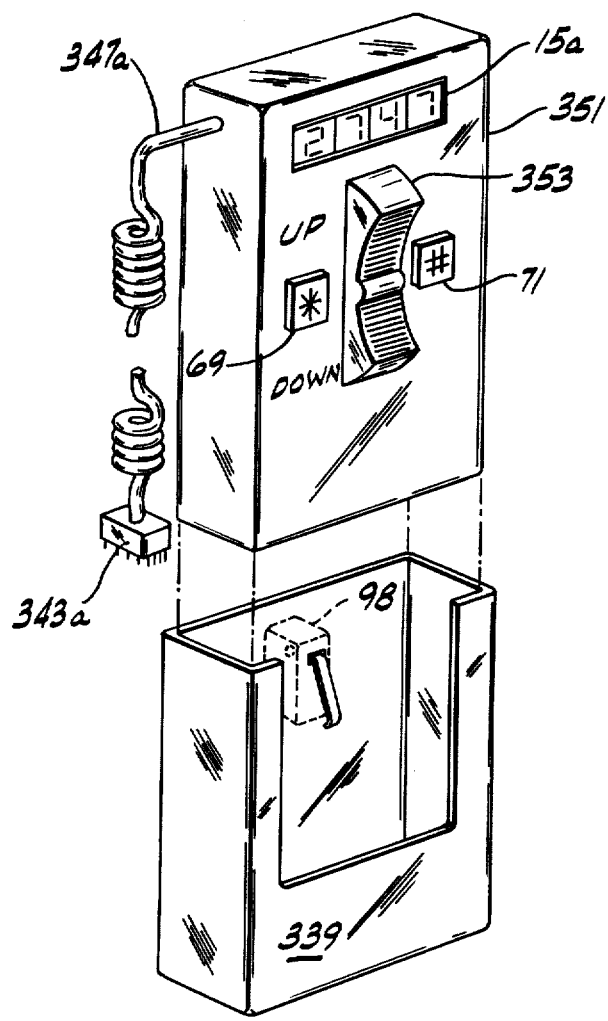
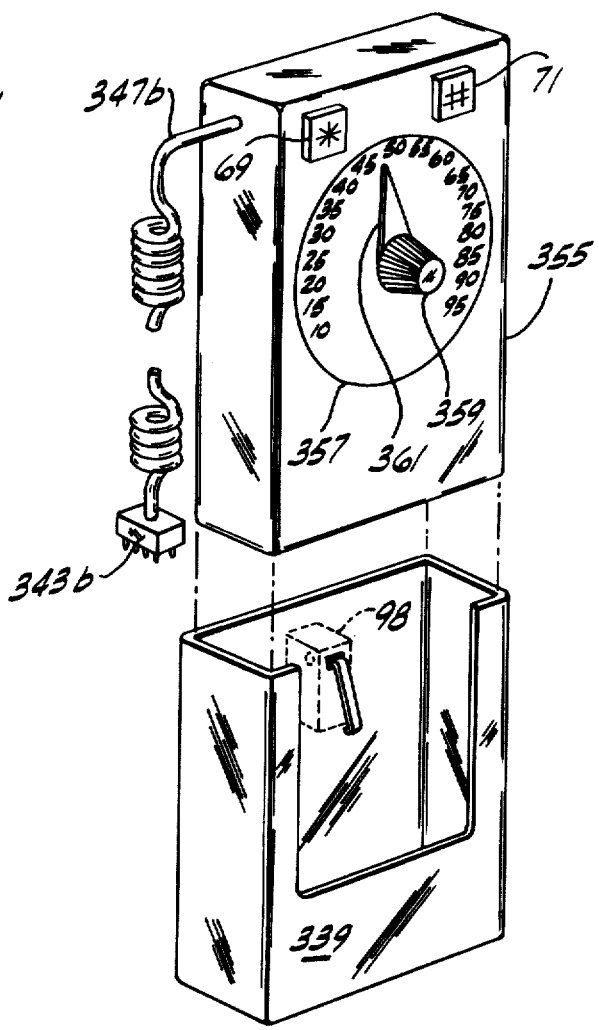

VENDOR CONTROL CIRCUIT

BACKGROUND OF THE INVENTION

This invention relates to control apparatus and more particularly to a circuit for controlling the functioning of a vendor.

The functions that a vendor is required to perform are becoming so complex that present control circuits, using electro-mechanical means, are unduly limited. The typical electro-mechanical control circuit, for example, is severely limited in the number and kind of functions it can perform in response to customer commands. Also, typical electromechanical control circuits are dedicated to a particular method of operation of the vendor, i.e., they cannot easily be modified to control new vendor functions or to accept different input signals from the vendor. As a result, when a new vendor function is added to a vendor, it is sometimes necessary to make a new control circuit rather than update the existing control circuit already in the vendor. And updating such control circuits usually requires additional circuit components and interconnections. In any event, the cost in updating existing control circuits, especially to accommodate increasingly complex vendor functions, can be prohibitive.

Present control circuits also lack means for easily setting prices and for checking that the proper prices have been set. Particularly where the items' prices change often, this is a real disadvantage; the serviceman or other authorized personnel must laboriously change those prices which are to be changed and just as laboriously check all those prices. Likewise, in beverage vendors (for example), other parameters, such as throws of ingredients, are also not easily checked or reset. In addition, prior circuits lack effective means for keeping track of the total accumulated sales of a vendor. The total accumulated sales figure, of course, would be very helpful in improving product inventory and cash control.

At least one prototype control circuit using a microprocessor has been developed to address some of the above problems. But it also has its disadvantages. The prototype unit, for example, used a volatile memory with a battery backup for storing prices. During an extended power failure, therefore, the prototype circuit lost the prices. The method of setting prices with the prototype circuit, although an improvement over prior control circuits, has problems of its own. And the prototype circuit has no provision for keeping track of total accumulated sales.

SUMMARY OF THE INVENTION

Among the several objects of this invention may be noted the provision of vendor control apparatus which will economically, efficiently and reliably control complex vendor functions; the provision of such apparatus which can be easily modified to control new vendor functions; the provision of such apparatus which can be modified to control new vendor functions without substantially increasing the parts count; the provision of such apparatus which can facilitate the setting of an item parameter such as price or ingredient throw; the provision of such apparatus which can facilitate the checking of an item parameter such as price or ingredient throw; the provision of such apparatus which maintains a record of the total accumulated sales of the vendor, and the provision of such apparatus which stores prices and other parameters nonvolatilely.

Briefly, apparatus of this invention comprises a memory having a plurality of addresses for storing values of at least some of the parameters associated with the items to be vended by the vendor, each item having at least one parameter associated therewith. The parameter values are stored in predetermined memory addresses and are electrically alterable. The apparatus also includes a processor, an interrogation circuit and a display circuit. The processor in response to a plurality of vendor status inputs, memory inputs and control inputs performs arithmetic and logic operations with those inputs and with the values of the parameters associated with the items in a sequence controlled by a preselected set of instructions which constitute a program. The processor supplies output signals based upon the results obtained from the operations to control functioning of the vendor. The processor can access the predetermined memory addresses and can alter the parameter values stored therein. The interrogation circuit, which is operable by authorized personnel, can retrieve from memory the values of at least some of the parameters stored therein. A parameter value retrieved from memory by the interrogation circuit is visually displayed by the display circuit independently of any other input of the processor being equal in value to the parameter value retrieved. As a result, authorized personnel may utilize the interrogation means to retrieve the value of a desired parameter from the memory.

Generally, apparatus of the invention also includes means operable by authorized personnel for setting the values of at least some of the parameters stored in the memory. Other objects and features will be in part apparent and in part pointed out hereinafter.

BRIEF DESCRIPTION OF THE DRAWINGS

FIG. 17 is a circuit diagram of an operation mode-setting circuit of this invention;

FIG. 18 is a circuit diagram of a product sensor used in this invention;

FIG. 19 is a circuit diagram showing a wave shaper used in this invention;

FIG. 20 is a circuit diagram of a clock used as a real time reference in this invention;

FIG. 21 is a circuit diagram of a delivery door opening circuit used in this invention;

FIG. 25 is a circuit diagram of two circuits used in this invention for controlling the dollar escrow function of a coin handler;

FIG. 26 is a circuit diagram of a CREM energization circuit used in this invention;

FIG. 27 is a circuit diagram of further change control circuitry used in this invention;

FIG. 28 is a circuit diagram of two circuits used in this invention to control the functioning of a bill validator;

FIG. 29 is a circuit diagram of a free vend circuit of this invention;

FIG. 31 is a circuit diagram of a door lock relay circuit used in this invention;

FIG. 32 is a circuit diagram of an interlocking and sensing circuit of this invention;

FIG. 33 is a circuit diagram of a run relay circuit used in this invention;

FIG. 34 is a circuit diagram of an elevator level sensing circuit of this invention;

FIG. 37 is a left-side elevation of the vendor of FIG. 1 with a right-side panel thereof in an open position to reveal a semi-diagrammatic representation of the control circuitry of this invention;

FIG. 38 is a perspective exploded view, on an enlarged scale of a part of FIG. 37;

FIG. 39 is a perspective exploded view of an alternative embodiment of the part shown in FIG. 38;

FIG. 40 is a perspective exploded view of another alternative embodiment of the part shown in FIG. 38;

FIG. 41 (sheet 24) is a left-side elevation of the vendor shown in FIG. 1 with parts broken away showing an alternative to the parts shown in FIGS. 38-40;

FIG. 42 (sheet 24) is an enlarged view of a part of FIG. 41 along line 42—42.

Corresponding reference characters indicate corresponding parts throughout the several views of the drawings.

DESCRIPTION OF THE PREFERRED EMBODIMENT

Figure 1:
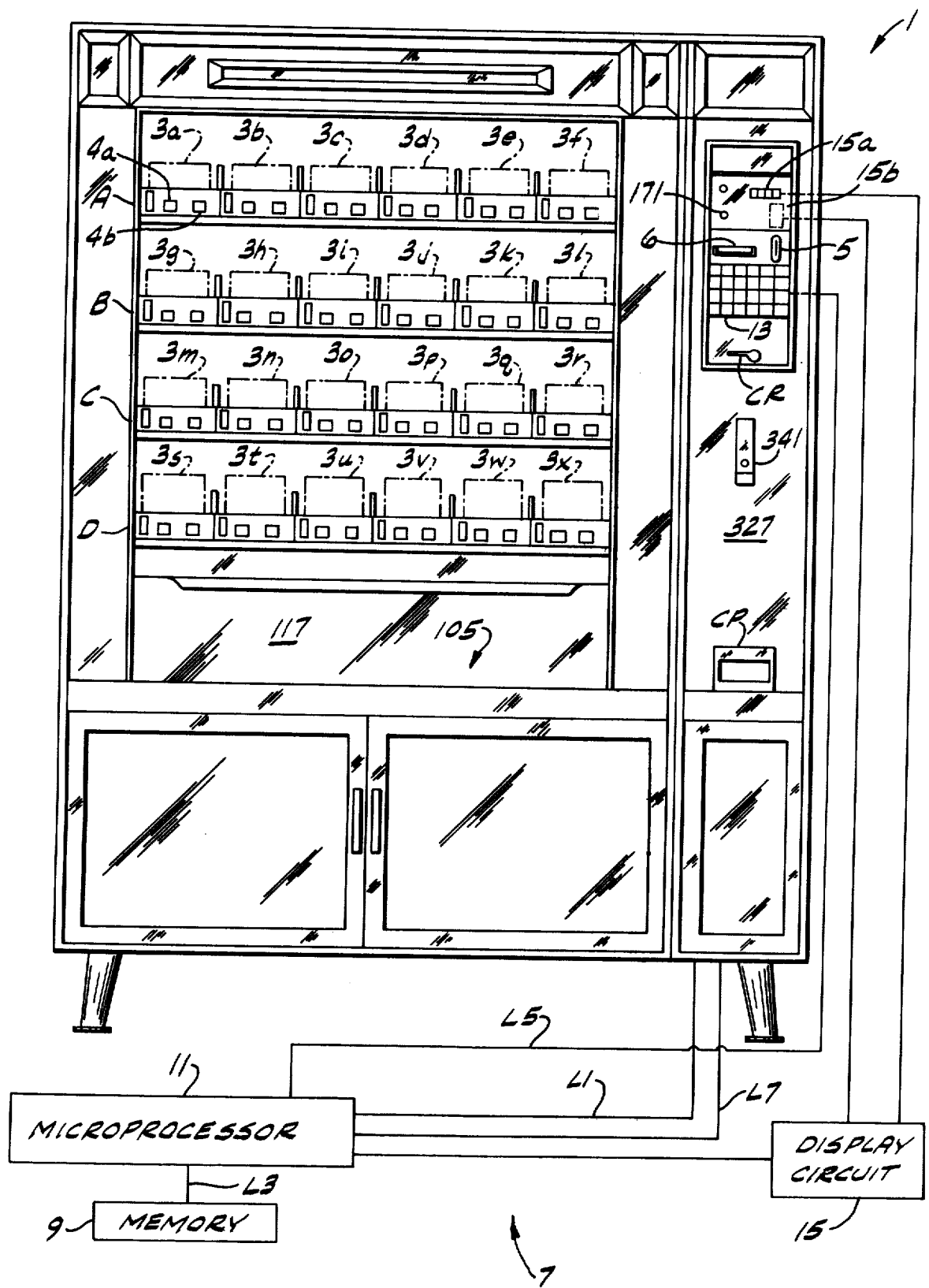
FIG. 1 is a front elevation of a vendor with the control circuit of this invention shown connected thereto in block-diagrammatic form.

Referring now to the drawings, first more particularly to FIG. 1, there is shown the front of a vendor 1, such as that of the second embodiment of the vendor disclosed in the coassigned U.S. Pat. No. 4,108,333, which issued on Aug. 22, 1978, for vending a plurality of items, indicated collectively by the reference numeral 3 and individually by the reference characters 3a-3x. The vendor 1, as herein illustrated, is an article dispensing vendor, items 3a-3x being items such as food products. It will be understood, however, that the control apparatus of this invention may be applicable to vendors for services, as well as vendors for products. Each item has at least one parameter, e.g., price, associated therewith, the value of which can be varied to vary the functioning of vendor 1. For example, the price parameter of item 3a can be changed from 25¢ to 30¢ to vary the amount of money that must be inserted into a coin slot 5 before vendor 1 will vend item 3a. Vendor 1 also has a dollar bill slot 6 for insertion of bills into the vendor.

Vendor 1 includes a control circuit, indicated generally at 7, which is the subject of this invention. Control circuit 7 includes a memory 9, a microprocessor (MPU) or processing means 11, a plurality of selection switches 13, designated individually by the reference characters 13a-13x, corresponding to items 3a-3x in vendor 1, and a display circuit 15 which includes two displays 15a and 15b. The keys of switches 13a-13x are shown on FIG. 1. The switches are shown schematically and individually labeled on FIG. 16. Switches 13 are not individually labeled on FIG. 1 because of the scale of the figure. However, it can be seen on FIG. 1 that switches 13 are arranged in exactly the same configuration as items 3a-3x, i.e., in a 6×4 matrix. Pressing the switch in the upper left-hand corner of the switch 13 matrix selects the upper left-hand corner item 3, i.e., item 3a. For the customer's convenience, each item 3 has two tags below it which have printed thereon a switch key reference character or characters for that item and the price. These tags for item 3a are indicated by the reference characters 4a and 4b. These switch key reference characters and the prices are not shown on FIG. 1 because of the scale of the figure. But, as an example, tag 4a might have printed thereon the reference characters A1 and tag 4b might have printed thereon the price $0.30. Of course, the upper left-hand corner switch key would in this example have imprinted thereon the reference character A1.

Memory 9, as is explained in detail below, contains RAM, ROM and EAROM memory sections, and has a plurality of addresses, e.g., in EAROM, for storing values of at least some of the parameters, e.g., the prices of items 3a-3x, in predetermined memory addresses. The parameter values are stored in EAROM so that they are electrically alterable, i.e., the values can be changed electrically by microprocessor 11. Of course they could also be stored in another type of electrically alterable memory, such as RAM.

MPU (i.e., processing means) 11 is responsive to a plurality of vendor status inputs, indicated in simplified form by a line L1 from vendor 1 to MPU 11, a plurality of inputs from memory 9, indicated in simplified form by a line L3 from memory 9 to MPU 11, and a plurality of control inputs, indicated in simplified form by a line L5 from switches 13 to MPU 11 and by line L1. The precise nature of these various inputs is explained infra in the description of the detailed circuit diagram of control circuit 7. Microprocessor 11 performs arithmetic and logic operations with the above-mentioned inputs and with the values of the parameters associated with items 3 in a sequence controlled by a preselected set of instructions which constitute a program, a copy of which is attached to this application as Appendix A. MPU 11 supplies output signals, represented in simplified form by a line L7, to vendor 1 based upon the results obtained from the above-mentioned operations to control the functioning of vendor 1. MPU 11 can also access the predetermined memory locations in memory 9 and alter the parameter values stored therein. In will be understood that the inputs and outputs of MPU 11 are represented by single lines on FIG. 1 for the convenience of the reader and that actually, as will become clear below, microprocessor 11 has a plurality of input lines which accept a variety of input signals from vendor 1 and the rest of control circuit 7. Also not shown on FIG. 1 are a plurality of peripheral interface adapters (PIAs) which interface MPU 11 with vendor 1 and the rest of control circuit 7.

Switches 13a-13x constitute interrogation means, operable by authorized personnel such as a serviceman, for retrieving from memory 9 the values of at least some of the parameters stored therein, as is explained in detail infra. Once a parameter value is retrieved from memory 9 it is displayed by display circuit 15 and display 15a. Specifically, display circuit 15 constitutes means for visually displaying a parameter value retrieved from memory 9 independently of any other input of microprocessor 11 being equal in value to the parameter value retrieved. For example, if item 3b costs 30¢ and the interrogation means (i.e., switch 13b) retrieves the price of item 3b from memory 9, display circuit 15 displays 30¢ in display 15a whether or not thirty cents has actually been deposited in vendor 1, i.e., whether or not MPU 11 has a vendor status input representing the deposit of thirty cents in vendor 1.

Figure 2:
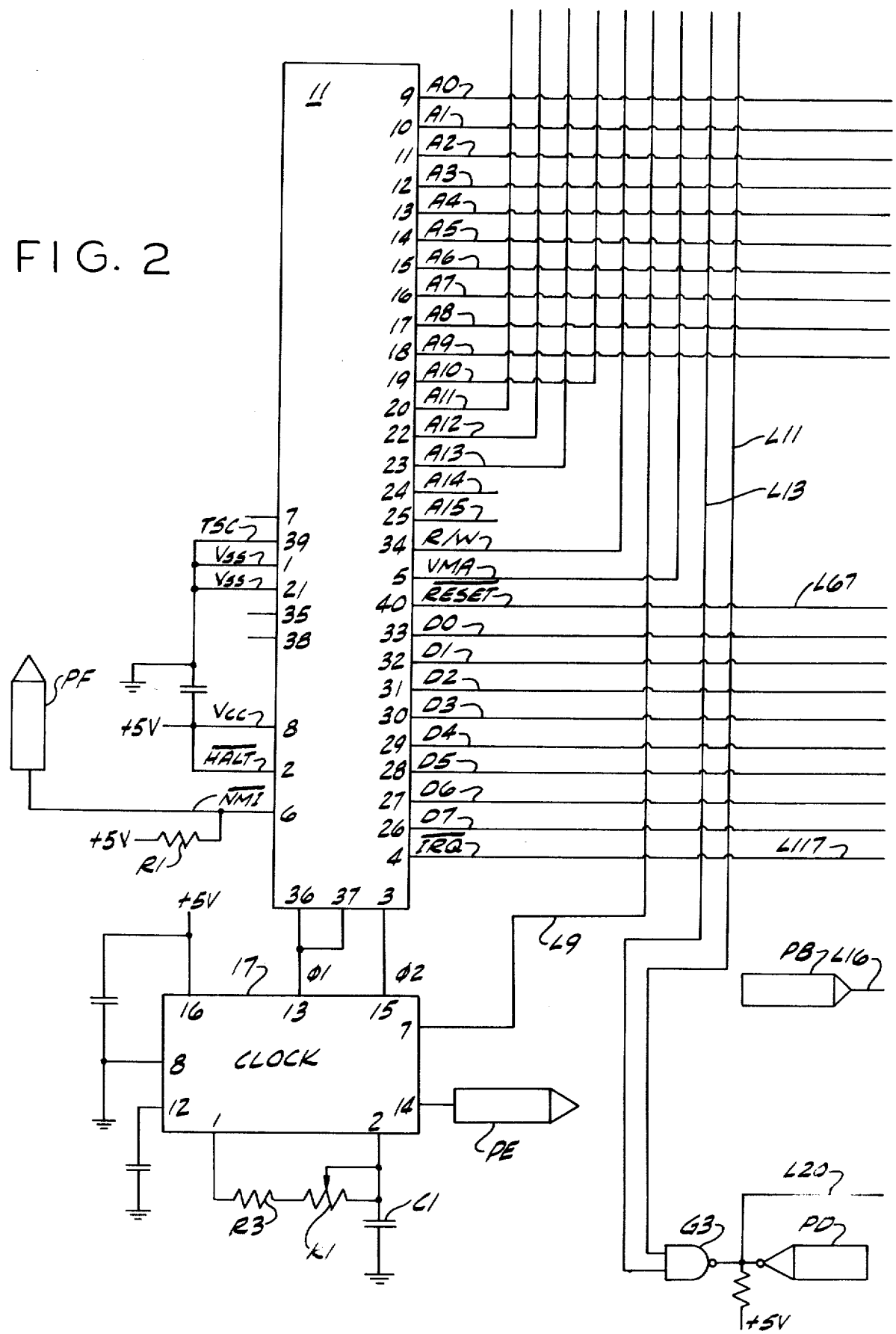
FIG. 2 is a circuit diagram of a microprocessor and master clock used in this invention.

Referring now to FIG. 2, there is shown microprocessor 11 having a plurality of address lines A0-A15, a plurality of data lines D0-D7, a read/write line R/W, a valid memory address line VMA, a reset line $\overline{RESET}$, and an interrupt request line $\overline{IRQ}$. MPU 11 is a MC6800 type 8-bit microprocessor sold by Motorola, Inc. of Phoenix, Arizona. The pin numbers of microprocessor 11 are shown on FIG. 2 on the body of the microprocessor. Pins 7, 35 and 38 and address lines A14 and A15 are not used in the present embodiment of the invention. Pins 1 and 21, the source supply voltage ($V_{ss}$) inputs, and pin 39, which is a three-state control input TSC, are directly connected to dc circuit ground.

A non-maskable interrupt input of microprocessor 11, designated $\overline{NMI}$, is connected to a connector PF and through a 3.3 K resistor R1 to a +5 V power supply. The $\overline{NMI}$ input can be used to initiate a program sequence to store relevant data in case of a power failure. Many circuits could be implemented to perform this function, but no specific one is shown in the Figs. Rather, FIG. 8 simply shows two blocks X1 and X2 for performing this function. Such a power failure circuit is not part of the present invention.

It will be understood that connector PF can equivalently be replaced by a wire connecting the two parts thereof. The purpose in using connector PF, and other connectors described below, is solely to simplify the schematic of control circuit 7 for the convenience of the reader. A connector having two parts is thus another representation of a wire running between the two points in control circuit 7 where the connector is attached. Likewise a three-part connector is just another representation of a wire or wires directly connecting the indicated three parts of control circuit 7.

Also to simplify the schematic, the chip-select inputs of the various integrated circuit chips which are described below are specifically labeled but the other inputs and outputs of those chips are not generally labeled except by pin number. Pin assignment charts for the various chips used in control circuit 7 can be found immediately preceding the claims.

Pins 2 and 8 of MPU 11 are connected to a + V power supply. Pin 2 is a halt input $\overline{HALT}$ which would influence operation of microprocessor 11 only if it were Low. (The MC6800 microprocessor operates at TTL voltage levels. Accordingly, hereinafter unless otherwise stated, High means a voltage level of around 5 Volts and Low means a voltage level of around 0 Volts.) The collector supply voltage $V_{cc}$ is supplied to microprocessor 11 by pin 8.

Pins 3, 36 and 37 of microprocessor 11 are supplied with $\phi 1$ and $\phi 2$ nonoverlapping clock signals as required from a Motorola MC6875 type clock 17. The pin numbers of clock 17 are shown on its body. Pins 1 and 2 are connected to a timing circuit consisting of a 150Ω resistor R3, a 1 K potentiometer K1 and a 68 pF capacitor C1 which determine the frequency of clock outputs $\phi 1$ and $\phi 2$. Pin 7 is the Bus $\phi 2$ output of clock 17. It provides a drive output nominally in phase with clock output $\phi 2$ on a line L9 to a chip-select circuit indicated generally at 19 (FIG. 3) and more specifically to a NAND gate G1 in chip-select circuit 19.

Pin 14 of clock 17 supplies a power-on reset signal through a connector PE to a circuit, described infra, which initiates a power-on reset cycle of control circuit 7. The other pins of clock 17 are attached as shown in FIG. 2 to ensure proper operation of the clock.

Figure 4:
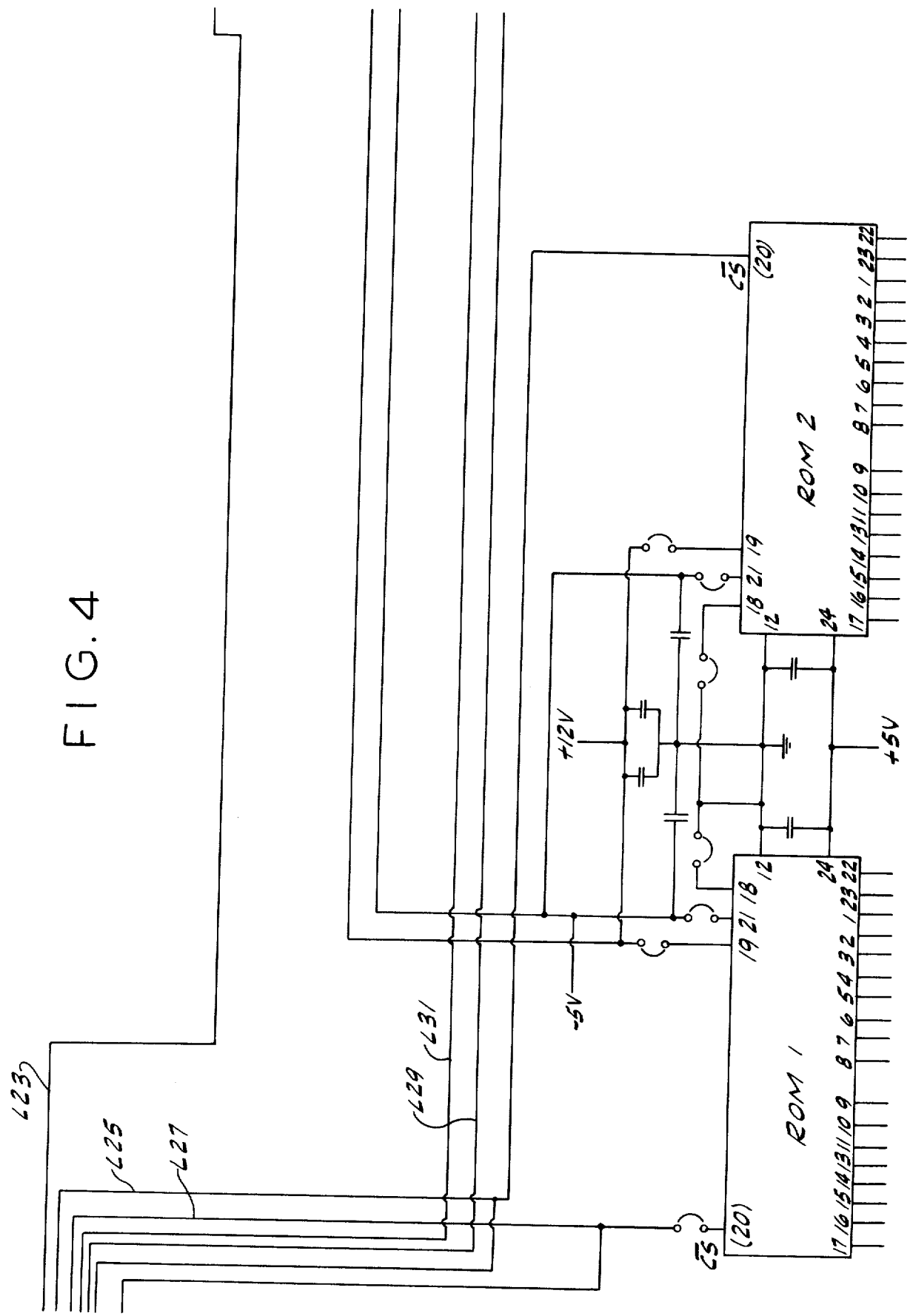
FIG. 4 is a circuit diagram showing part of the memory used in this invention.
Figure 5:
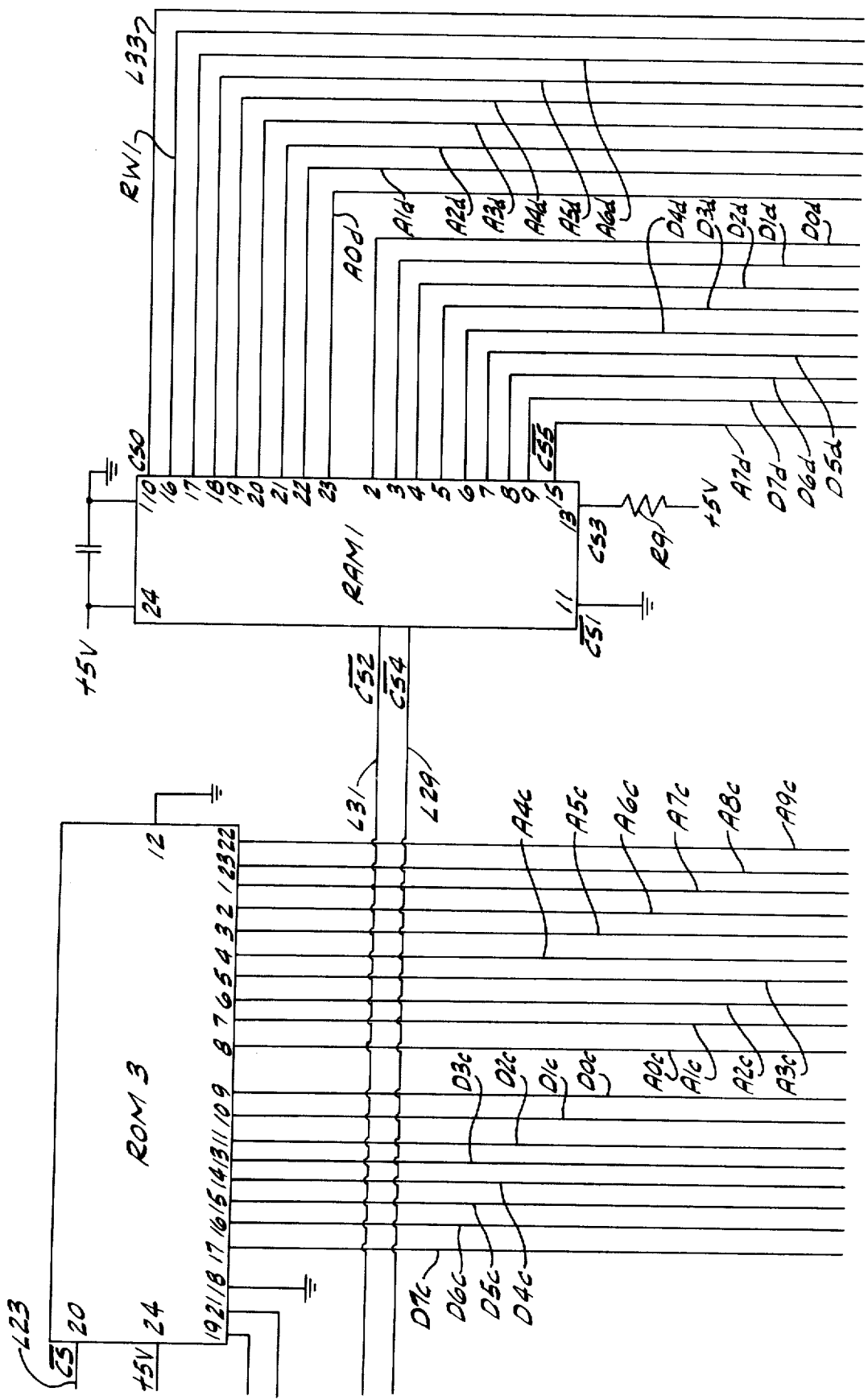
FIG. 5 is a circuit diagram showing more of the memory used in this invention.

Memory 9 includes three Motorola MC68708L type read-only memory chips designated by the reference characters ROM1 (FIG. 4), ROM2 (FIG. 4) and ROM3 (FIG. 5). Also shown on FIG. 5 is a Motorola MC6810A type random-access memory chip RAM1, which is also part of memory 9. Memory chips ROM-1-ROM3 and RAM1 are directly addressable by microprocessor 11. Memory 9 also includes two electrically alterable read-only memory chips, General Instruments type ER2050, designated by the reference characters EAROM1 and EAROM2 (FIG. 7) which are not directly addressable by microprocessor 11.

Figure 6:
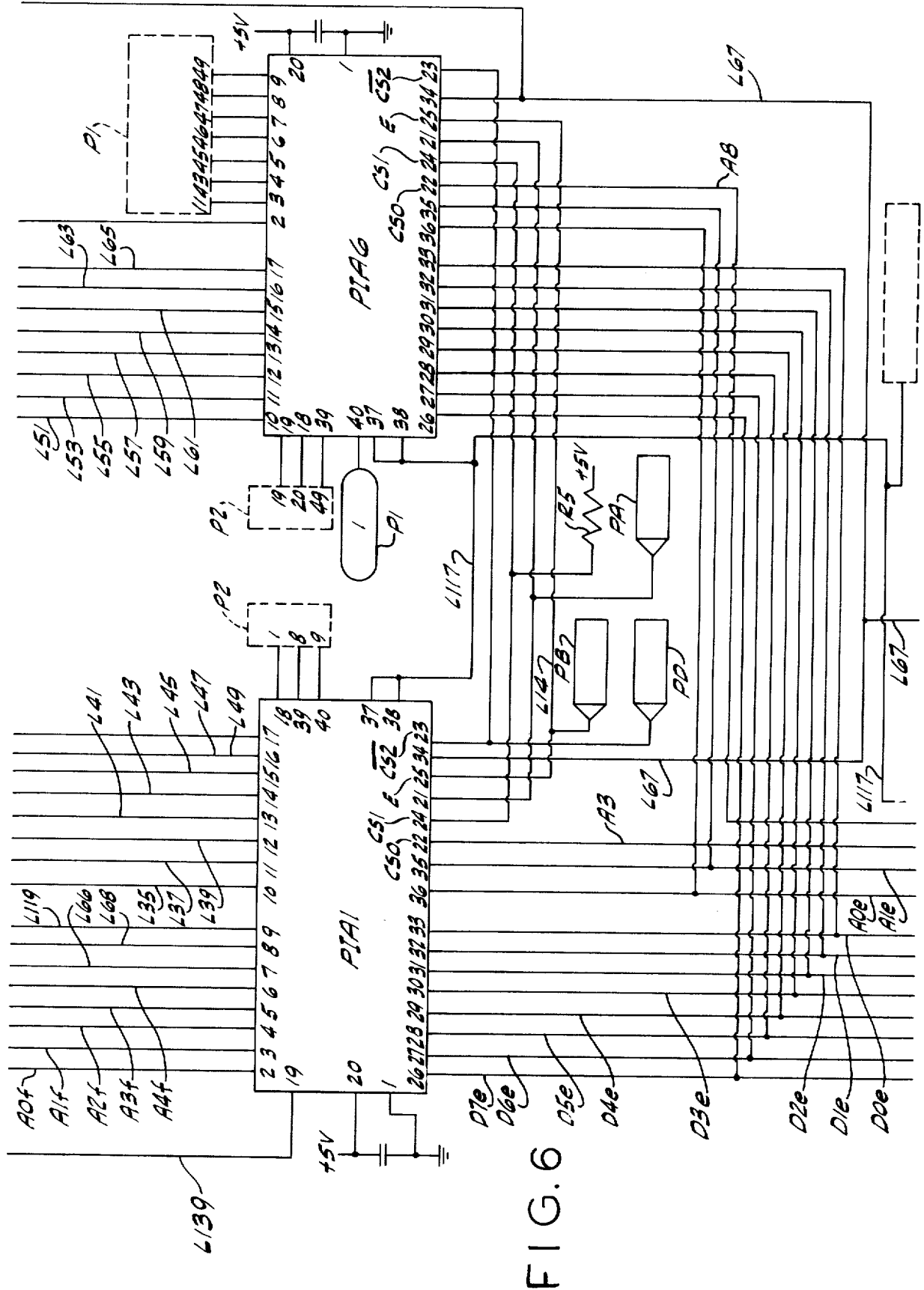
FIG. 6 is a circuit diagram showing two of the peripheral interface adapters used in this invention.

Control circuit 7 includes six PIAs designated by the reference characters PIA1 (FIG. 6), PIA2 (FIG. 12), PIA3 (FIG. 12), PIA4 (FIG. 13), PIA5 (FIG. 14), and PIA6 (FIG. 6). All six PIAs and Motorola type MC6820 peripheral interface adapter integrated circuit chips. PIAs PIA1 and PIA6 interface memory chips EAROM1 and EAROM2 with MPU 11. It will be understood that the number of PIAs and memory chips used will vary depending upon the desired capabilities of control circuit 7 and the architecture used in designing control circuit 7. Chip EAROM2, for example, need not be present unless chip EAROM1 has insufficient memory capacity for the design at hand.

In addition to being the interface between microprocessor 11 and EAROM1, the PIAs also interface the microprocessor with the vendor status inputs, described in detail infra, and the control inputs such as those from selection switches 13. All inputs to and outputs from microprocessor 11, except those to and from the aforementioned directly addressable memory chips, go through one of the PIAs. Thus, each PIA constitutes peripheral interface adapter means for interfacing microprocessor 11 and the inputs thereto.

Each PIA has eight data pins (pins 33–26) connected to the corresponding data lines of MPU 11. Data is transferred between the microprocessor and the PIAs in both directions by means of these pins. Similarly, the ROMs have eight data pins (pins 9–11, 13–17) connected to the corresponding data lines of MPU 11 by means of which MPU 11 reads data from the ROMs. The data pins of chips ROM1 and PIA2 are connected to the corresponding MPU 11 data lines by eight lines D0$a$, D1$a$, D2$a$, D3$a$, D4$a$, D5$a$, D6$a$ and D7$a$. Chip ROM1 is also connected to MPU 11 address lines A0–A9 by ten lines A0$a$–A9$a$ which are connected to the address pins of chip ROM1, i.e., pins 1–8, 22–23. By means of address lines A0–A9 and lines A0$a$–A9$a$, MPU11 can address all 1024 bytes in chip ROM1. Lines A0$a$ and A1$a$ are also connected to pins 35 and 36 of chip PIA2.

The data pins of chips ROM2 and PIA3 are connected to data lines D0–D7 of MPU 11 by eight lines D0$b$–D7$b$, and the address pins of chips ROM2 are connected to address lines A0–A9 by ten lines A0$b$–A9$b$. Pins 35 and 36 of chip PIA3 are also connected to lines A0$b$ and A1$b$. Chip ROM3 is connected to the MPU data lines by eight lines D0$c$–D7$c$ and to address lines A0–A9 by ten lines A0$c$–A9$c$.

Chip RAM1 has only 128 bytes of memory, so only seven address pins are required. Address lines A0–A6 are connected to the address pins (pins 17–23) of chip RAM1 by seven lines A0$d$–A6$d$. Pin 15 of chip RAM1, a chip select pin, is connected to address line A7 by a line A7$d$. Lines A0$d$ and A1$d$ are also connected to pins 36 and 35 of chip PIA4. The data pins of chips PIA4 and RAM1 (pins 2–9) are connected to data lines D0–D7 by eight lines D0$d$–D7$d$.

Data lines D0–D7 are connected to the data pins of PIAs PIA1, PIA5 and PIA6 by eight lines D0$e$–D7$e$. Pins 35 and 36 of these PIAs are connected to address lines A0 and A1 by two lines A0$e$ and A1$e$.

Figure 3:
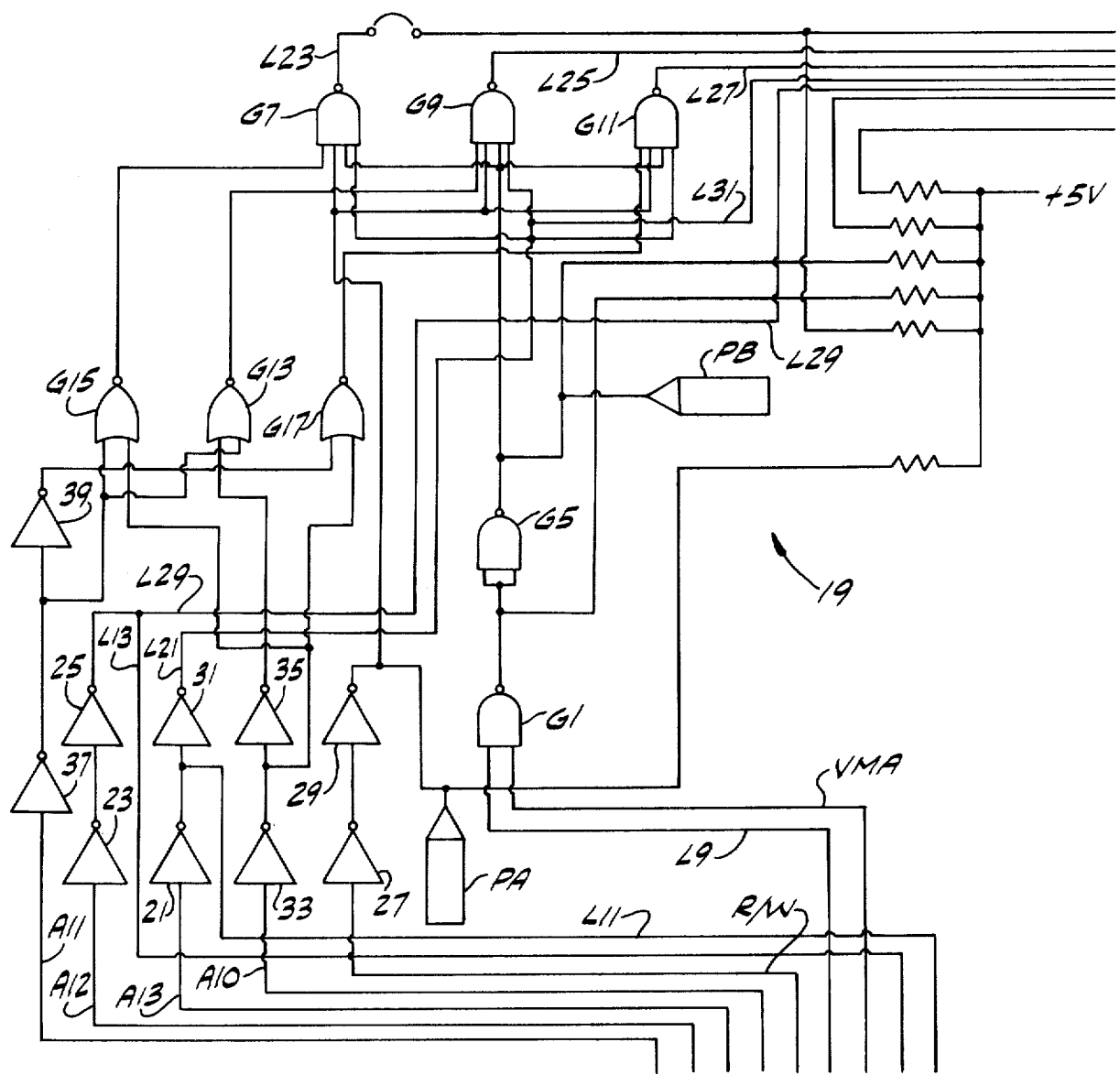
FIG. 3 is a circuit diagram of a chip-selecting logic circuit of this invention.

Microprocessor 11 has only a limited number of address lines for addressing all the PIAs and memory chips. It can uniquely address each chip, however, since each chip has one or more chip-select inputs. For esample, each PIA has three chip-select inputs, designated CS0, CS1 and $\overline{CS2}$, which are used to select that PIA. For a PIA to be selected, the voltages of its CS0 and CS1 inputs must be High and the voltage at its $\overline{CS2}$ input must be Low. In accordance with convention, a chip-select input designation has no bar if the voltage at that input must be High for its chip to be selected, and it has a bar if the voltage at that input must be Low for its chip to be selected. For example, designating two chip-select inputs as $\overline{CS1}$ and CS2 means that for that chip to be selected the voltage at the $\overline{CS1}$ input must be Low and the voltage at the CS2 input must be High. Likewise the various memory chips have their own chip-select inputs. Memory chips ROM1–ROM3 each have a chip-select input, designated generically by the reference character $\overline{CS}$, at pin 20. A Low on pin 20 of one of these chips, therefore, selects that particular chip. Memory chip RAM1 has six chip-select inputs, CS0, $\overline{CS1}$, $\overline{CS2}$, CS3, $\overline{CS4}$, and $\overline{CS5}$. And pin 27 of memory chips EAROM 1 and EAROM 2 is a chip-select input CS. MPU 11 does not directly address all the chip-select inputs of the various chips. Instead, it supplies signals on address lines A10–A13 to chip-select circuit 19 (FIG. 3) which constitutes means for supplying activating signals, i.e., Highs and Lows as required, to at least some of the chip-select inputs, including some of the chip-select inputs of the PIAs. For example, if the microprocessor wishes to select chip PIA1, it causes address lines A3 and A12 to be High and line A13 to be Low. The Low on line A13 is supplied to an inverter 21 in chip-select circuit 19 (FIG. 3). The resulting High output of inverter 21 is supplied on a line L11 to a NAND gate G3 (FIG. 2). Likewise the High on line A12 is supplied to an inverter 23 in chip-select circuit 19, which supplies the resulting Low to another inverter 25. The resulting High output of inverter 25 is supplied on a line L13 to the other input of gate G3 causing its output to be Low. This Low output of gate G3 is supplied through a connector PD to pin 23, the $\overline{CS2}$ input, of chip PIA1 (FIG. 6). The High on line A3 is supplied directly to pin 22, the CS0 input, of chip PIA1. Since the CS1 input, pin 24, is connected through a 3.3 K resistor R5 to a +5 V source, it is also High and chip PIA1 is selected.

Of course, the PIAs also need a timing signal supplied to their enable (E) inputs (pin 25). This timing signal is supplied from the VMA output line of microprocessor 11 and the Bus $\phi 2$ output of clock 17 (FIG. 2). Specifically these two outputs are supplied, on line VMA and line L9, to gate G1 (FIG. 3) which in turn supplies a composite output (i.e., a Low output if and only if both inputs are High at the same time, otherwise a High output) to a NAND gate G5 wired as an inverter. Gate G5 has a High output, therefore, when the signals on lines VMA and L9 are both High. The output of gate G5, which is the desired timing signal, is supplied through a connector PB to the enable (E) inputs (pin 25) of all the PIAs (FIGS. 6, 12, 13 and 14) by way of two lines L14 and L16.

Microprocessor 11 not only determines which PIA is selected but also controls the direction of data transfer between itself and the selected PIA by means of its read/write line R/W. The signal on line R/W is supplied to an inverter 27 (FIG. 3) which supplies its output to a second inverter 29. The output of inverter 29, which corresponds in voltage to the signal on line R/W, is supplied through a connector PA (FIGS. 3, 6 and 14) to pin 21 of PIAs PIA1 and PIA6 and to pin 21 of PIAs PIA2–PIA5 by way of a line L15. The read/write signal is also supplied from line L15 to a line R/W1 connected to pin 16 of chip RAM1, its read/write pin.

Figure 9:
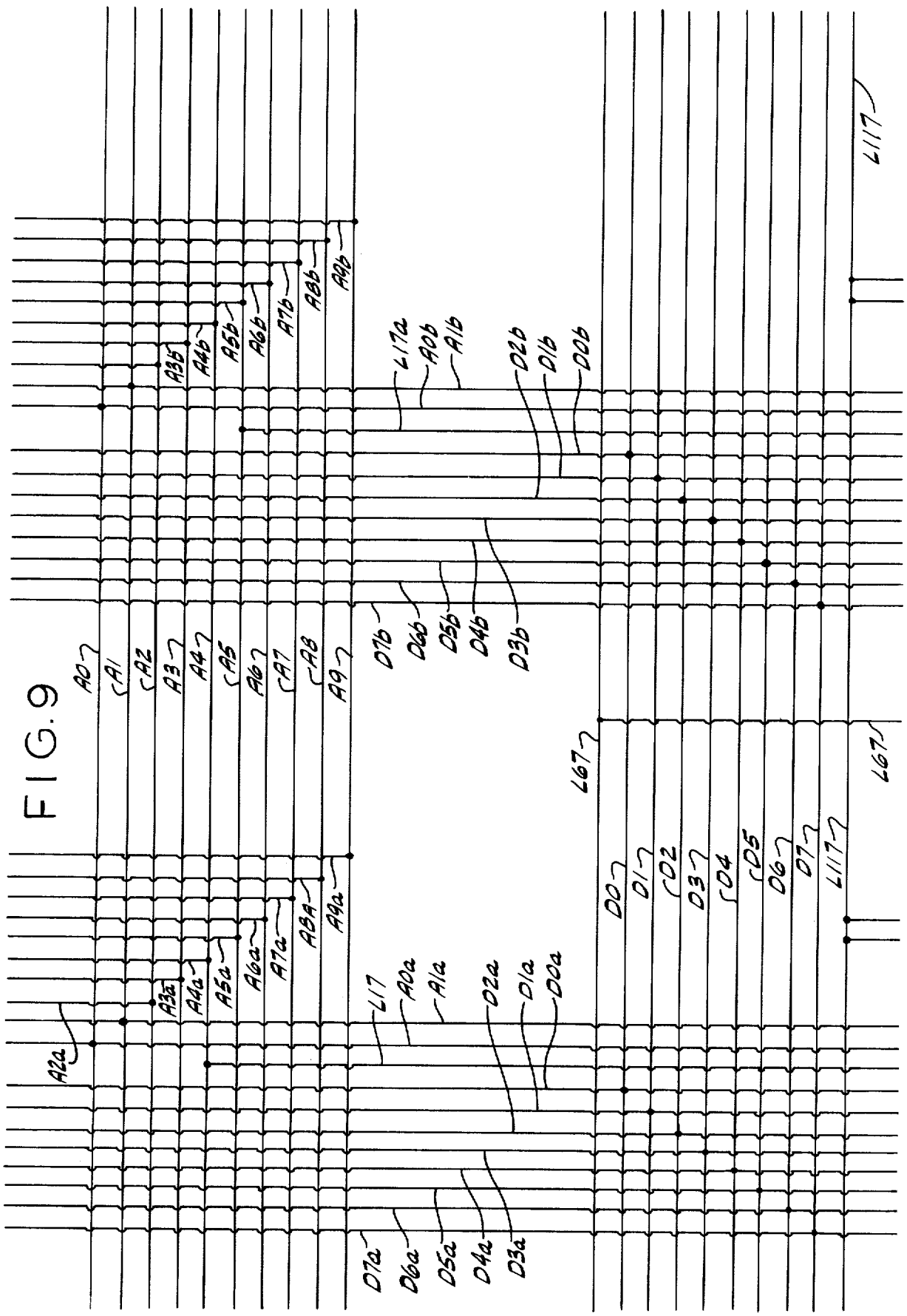
FIG. 9 is a circuit diagram showing the connections among FIGS. 2, 4, 10 and 12.
Figure 10:
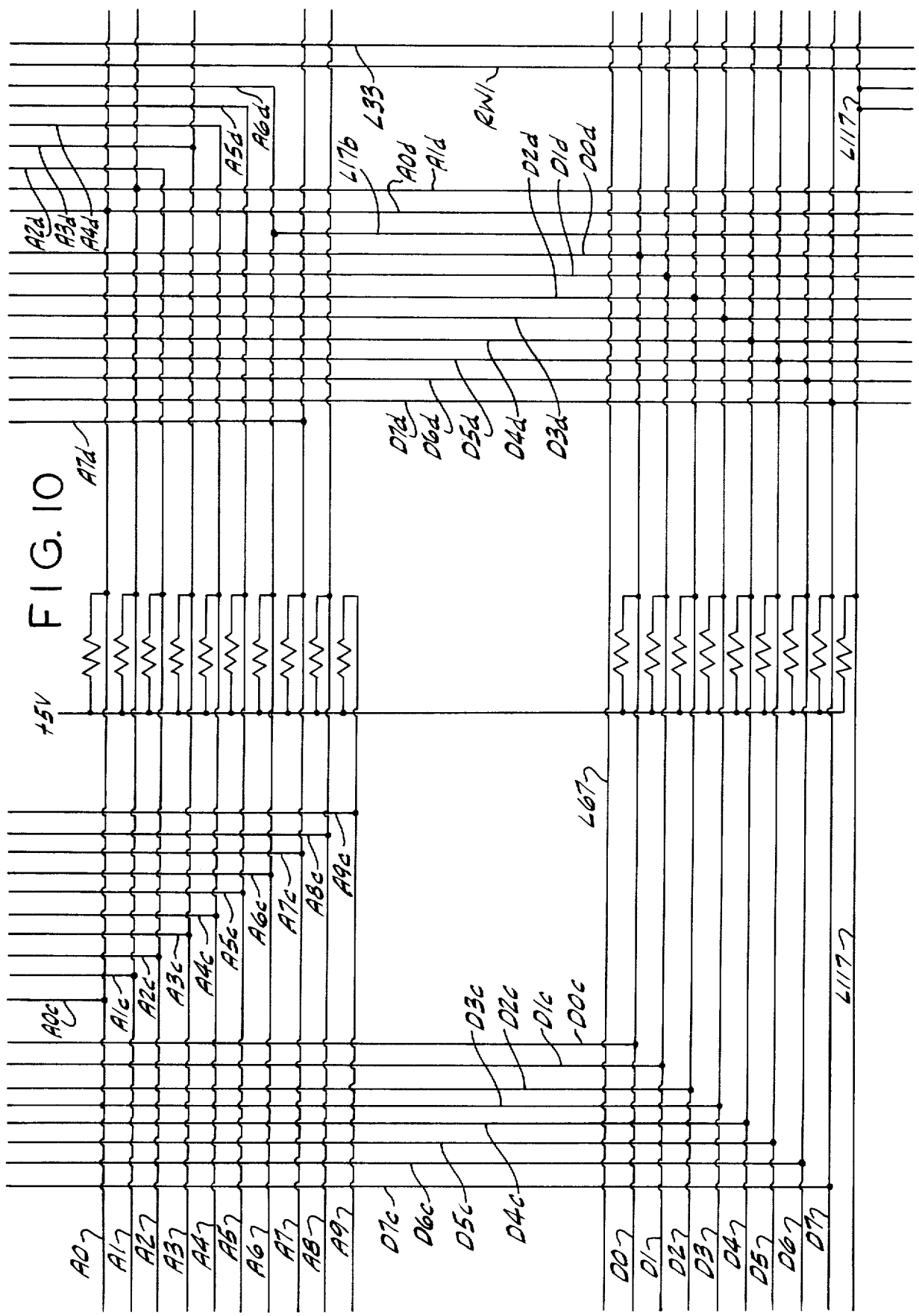
FIG. 10 is a circuit diagram showing the connections among FIGS. 5, 9, 11 and 13.

Microprocessor 11 selects chip PIA2 by supplying a High on address lines A12 and A4 and a Low on address line A13. The High on line A4 is supplied on a line L17 (FIGS. 9 and 12) to the CS0 input (pin 22) of chip PIA2. For convenience, the corresponding lines connected to the CS0 inputs of chips PIA3 and PIA4 are labeled L17$a$ and L17$b$. The CS1 input of chip PIA2 is also High because it is connected by a line L19 through a 3.3 K resistor R7 to a +5 V source. It should be noted that the CS1 inputs for PIAs PIA3–PIA5 are also connected to line L19. The High on line A12 and the Low on Line A13, as described above, cause the output of gate G3 (FIG. 2) to be Low. This Low is supplied on a line L20 to the $\overline{CS2}$ inut (pin 23) of chip PIA2, thereby selecting chip PIA2. The Low on line L20 is also supplied to the $\overline{CS2}$ inputs of chips PIA3–PIA5 but it does not cause those chips to be selected in the absence of other address lines being High as described infra.

It should be noted that certain outputs, e.g., the output of gate G3, are connected through a resistor to a +5 V source. These resistors and voltage sources shape the outputs of the components to which they are attached. In the absence of these wave shaping devices, the waveforms generated by the various components of control circuit 7 could become misshapen due to capacitive effects, which could result in erroneous operation of the control circuit. Typically the resistors in such combinations have a value of around 3.3 K, but that value will depend upon the actual wiring of the circuit.

It is convenient to use hexadecimal notation in writing the addresses of the components of control circuit 7. For example, using binary notation the address of chip PIA2 is 0001 0000 0001 0000, where the value of each bit corresponds to the signal level present on the corresponding address line of microprocessor 11. The hexadecimal address, on the other hand, is 1010. Hereinafter hexadecimal notation is used to describe the signal levels present on address lines A0–A13 unless otherwise noted.

The address of chip PIA3 is 1020. That of chip PIA4 is 1040, that of chip PIA5 is 1080, and that of chip PIA6 is 1100. Of course, the addresses of the PIAs can be changed by simply changing the hard-wired connections between them and microprocessor 11. Appendix A, however, has been written for this particular hard-wired circuit and must be modified in order to function properly with a different hard-wired scheme.

The memory chips are addressed in a similar fashion to the PIAs. For example, the beginning address of ROM1 is 2400. That is, the voltage level on address lines A13 and A10 is High and that on lines A11 and A12 is Low. Since line A13 is High, the output of inverter 21 (FIG. 3) is Low. This Low causes the output of gate G3 (FIG. 2) to be High, which ensures that none of the PIAs are selected. The output of inverter 21 is also supplied to an inverter 31, the High output of which is supplied on a line L21 to three NAND gates G7, G9 and G11. NAND gates G7, G9 and G11 are connected by three lines L23, L25 and L27 to the $\overline{CS}$ inputs of chips ROM3 (FIG. 5), ROM2 (FIG. 4), and ROM1, respectively. The output of only one of these gates will be Low at any one time, thereby selecting its respective chip. Which output is Low is determined by the signal levels on lines A10 and A11. The signals on lines A10 and A11 are supplied to a number of inverters, described below, which together with three NOR gates G13, G15 and G17 decode the signals and supply them to NAND gates G7, G9 and G11.

The High voltage on line A10 is supplied to an inverter 33 (FIG. 3), and its resulting Low output is supplied to NOR gates G15 and G17 and to an inverter 35, causing the latter's output to be High. This High is supplied to NOR gate G13 and its resulting Low output is supplied to gate G9. This causes its output to be High, thereby preventing selection of memory chip RON2. The Low signal on line A11 is inverted by an inverter 37 and this High signal is then supplied to gates G13 and G15 and to an inverter 39. The High supplied to gate G15 causes its output to be Low. This Low in turn causes the output of gate G7 to be High, thereby preventing selection of memory chip ROM3. The Low output of inverter 39 is supplied to gate G17 causing its output to be High, which output is supplied to gate G11. Since all inputs to gate G11 are High, its output is Low, which selects chip ROM1. The selection of chips ROM2 and ROM3 is similar to that of chip ROM1 except for the addresses. The beginning address of chip ROM2 is 2800, while that of chip ROM3 is 2C00. ROMs ROM1–ROM3 are used to store the program for MPU 11.

Memory chip RAM1 can be addressed by Lows on address lines A1, A12 and A13. The Low on line A7 is supplied directly to the $\overline{CS5}$ input of chip RAM1 (FIG. 5) by way of line A7d. The Low on line A12 is inverted twice (by inverters 23 and 25) and supplied on a line L29 to the $\overline{CS4}$ input of chip RAM1. Likewise, the Low on line A13 is inverted twice (by inverters 21 and 31) and supplied on line L21 and a line L31 to the $\overline{CS2}$ input of chip RAM1. The CS0 input of chip RAM1 is connected by way of a line L33 to line L16 (FIG. 13) which carries the enable output from connector PB (FIGS. 2 and 3) described above. The $\overline{CS1}$ input is tied to ground and the CS3 input is connected through a 3.3K resistor R9 to a +5 V source. Memory chip RAM1 is basically used as a scratchpad for MPU 11.

Figure 7:
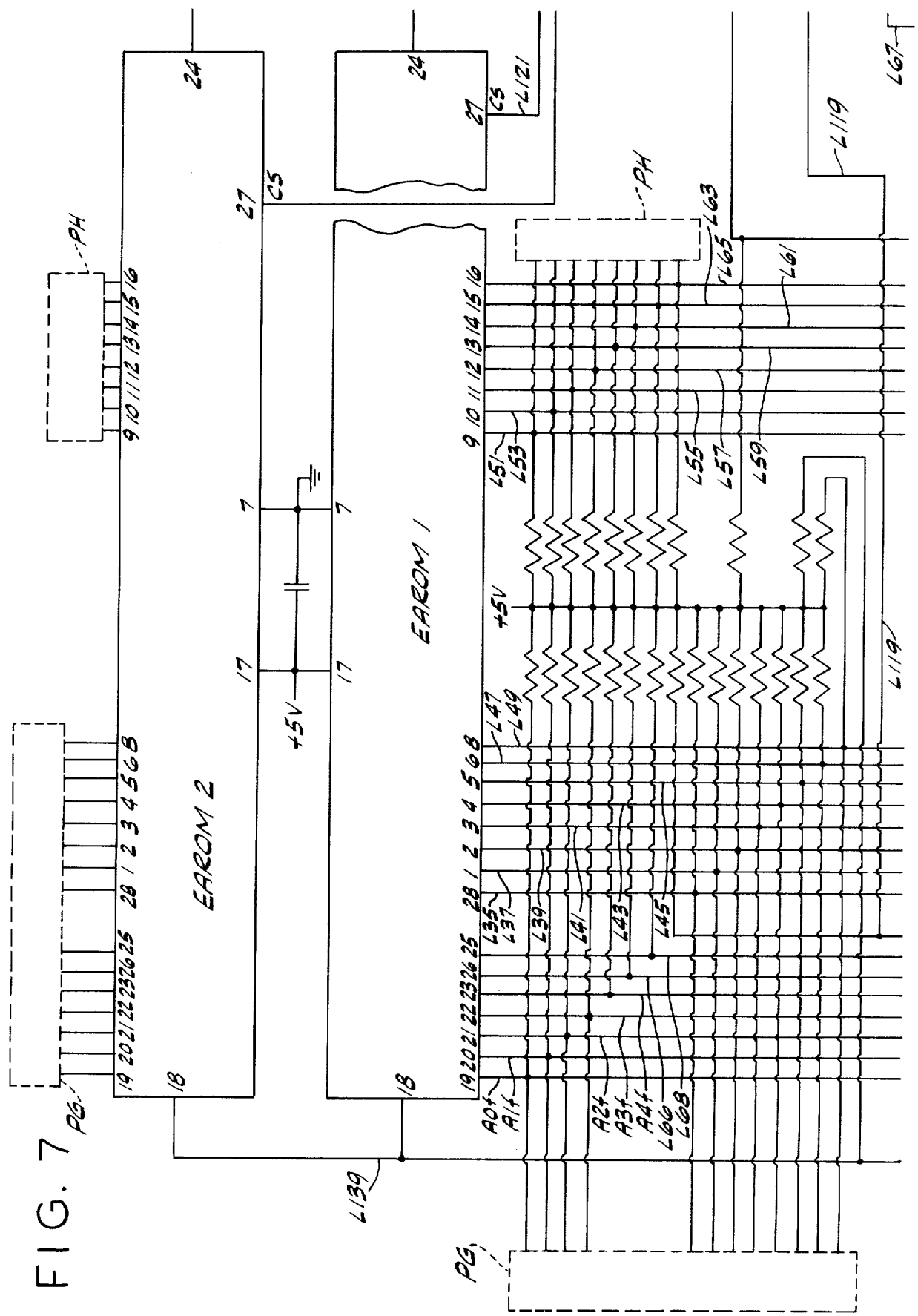
FIG. 7 is a circuit diagram showing the remainder of the memory used in this invention.
Figure 11:
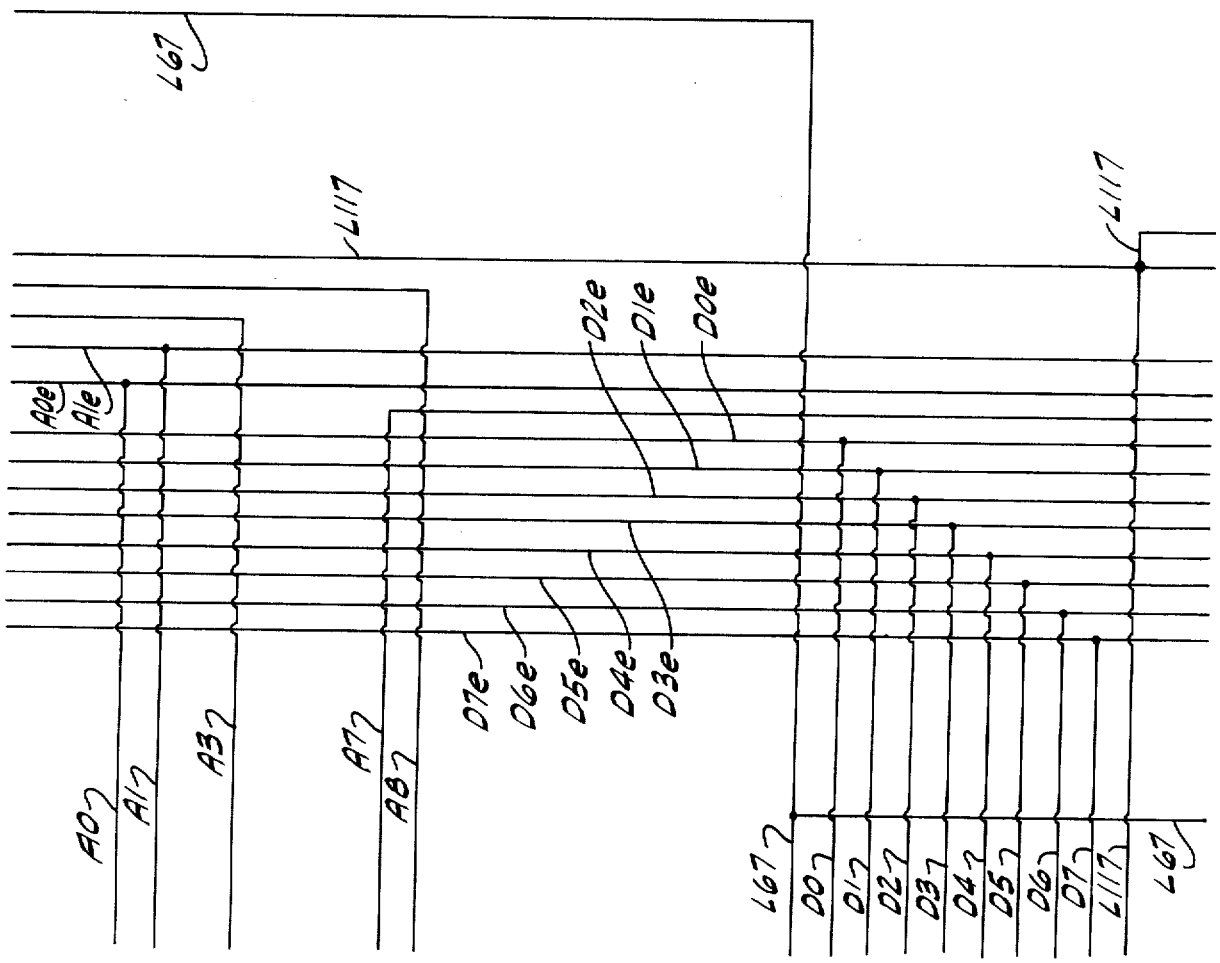
FIG. 11 is a circuit diagram showing the connections among FIGS. 6, 10 and 14.

The prices of items 3a–3x are stored in chip EAROM1 and, if necessary, in chip EAROM2 (FIG. 7). The EAROMs are not directly addressable by microprocessor 11. Rather MPU 11 addresses the EAROMs and transfers data, e.g., prices, to and from them by means of chips PIA1 and PIA6 (FIG. 6). For example, to store some data in chip EAROM1, MPU 11 supplies that data on data lines D0–D7 to data lines D0e–D7e (FIGS. 6, 11). Data lines D0e–D7e are directly connected to the data pins (pins 26–33) of chips PIA1 and PIA6, and so supply the data to those pins. The PIAs in turn supply the data to chip EAROM1 over a plurality of lines L35, L37, L39, . . . , L65. The address pins of chip EAROM1 (pins 19–23) are connected by five lines A0f–A4f to pins 2–6 of chip PIA1. Pins 25 and 26 of chip EAROM1 mode control pins, are connected to pins 7 and 8 of chip PIA1 by two lines L66 and L68. The data can be supplied to chip EAROM2 by means of two connectors PG and PH (FIG. 7) connected to lines L35–L65.

Figure 8:
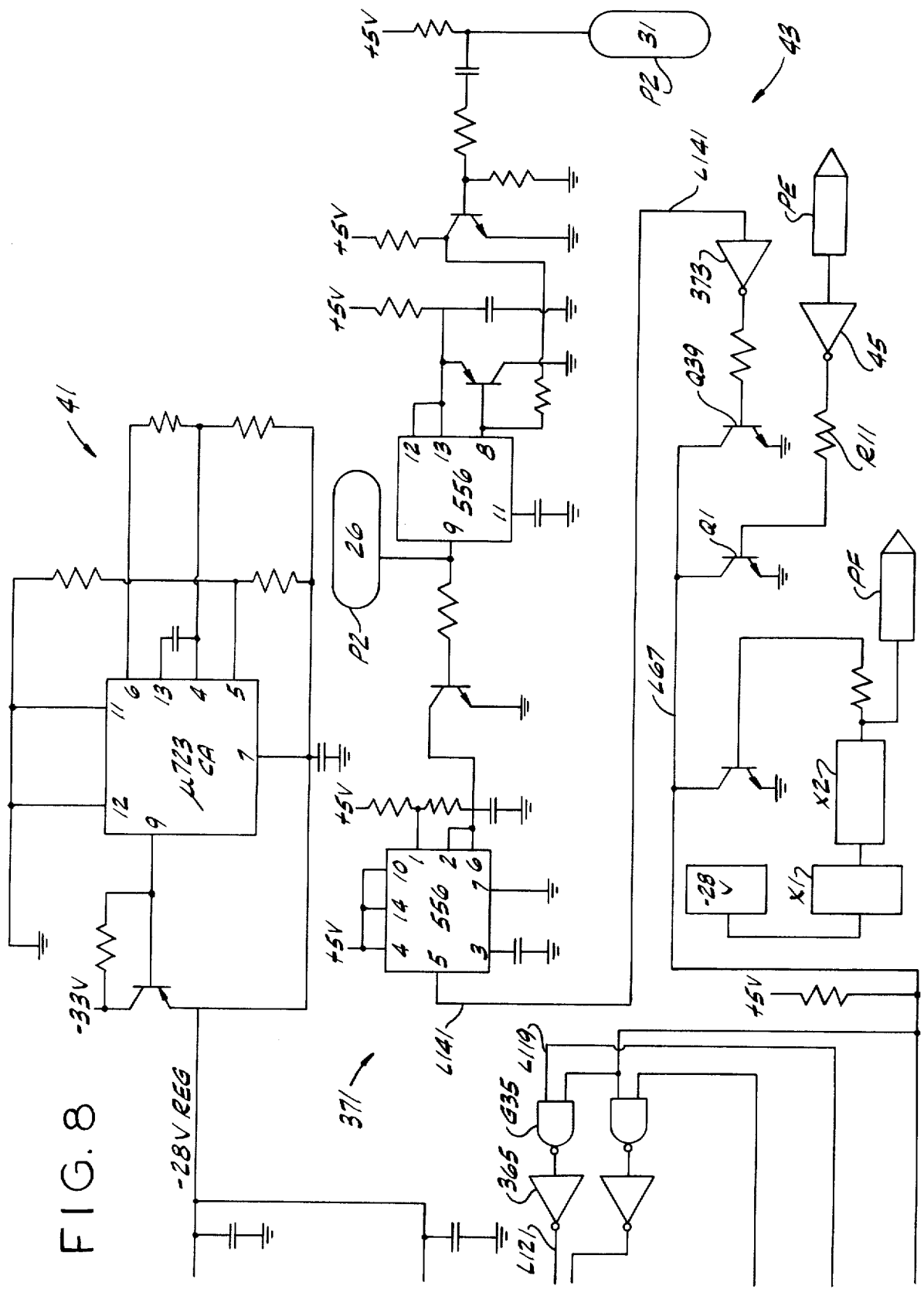
FIG. 8 is a circuit diagram showing a power supply for the memory shown on FIG. 7 and reset circuitry used in this invention.

The EAROMs require a −28 V regulated power supply which is indicated generally at 41 (FIG. 8) and includes a 723 voltage regulator chip from Signetics Corp. of Sunnyvale, California. Also shown on FIG. 8 is reset circuitry, indicated generally at 43, which causes control circuit 7 to reset under power-on or malfunction conditions. Under power-on conditions, for example, clock 17 (FIG. 2) supplies a Low through connector PE (FIGS. 2, 8) to an inverter 45. Inverter 45 supplies a High through a 10K resistor R11 to the base of a type 2N2222A transistor Q1, causing it to conduct. A line L67, connected to the collector of transistor Q1, is thereupon brought Low. Line L67 (FIGS. 2, 6, 7, 8, 9, 10, 11, 12, 13, 14) is connected to the reset inputs (pin 34) of all the PIAs and to the $\overline{RESET}$ input of MPU 11. The Low on line L67, therefore, prepares the PIAs and the microprocessor for operation of control circuit 7.

The circuitry shown on FIGS. 2–7, 9–14 is contained on one circuit board, not shown, which must be connected to the remaining circuitry of control circuit 7 shown on FIGS. 15–36. This connection is made by means of two plugs, designated by the reference characters P1 and P2 (FIGS. 6, 8, 12, 13, 14). Referring specifically to FIG. 8, it should be noted that two portions of plug P2 are shown as oblongs while the rest of plug P2 on these FIGS. is shown as a rectangle whose outline is made up of dashes. The oblong symbol is used, particularly in the remaining FIGS., to indicate a single pin connection of a plug. The rectangle is used, on the other hand, to indicate a plurality of such connections. The number inside the oblong indicates the plug pin number, identical pin numbers, of course, indicating a connection between the two pins. For example, one plug P2 oblong on FIG. 8 contains the number 31. This indicates a direct connection between that point on FIG. 8 and pin 31 of plug P2 on FIG. 14, which is connected to pin 6 of chip PIA5.

Figure 15:
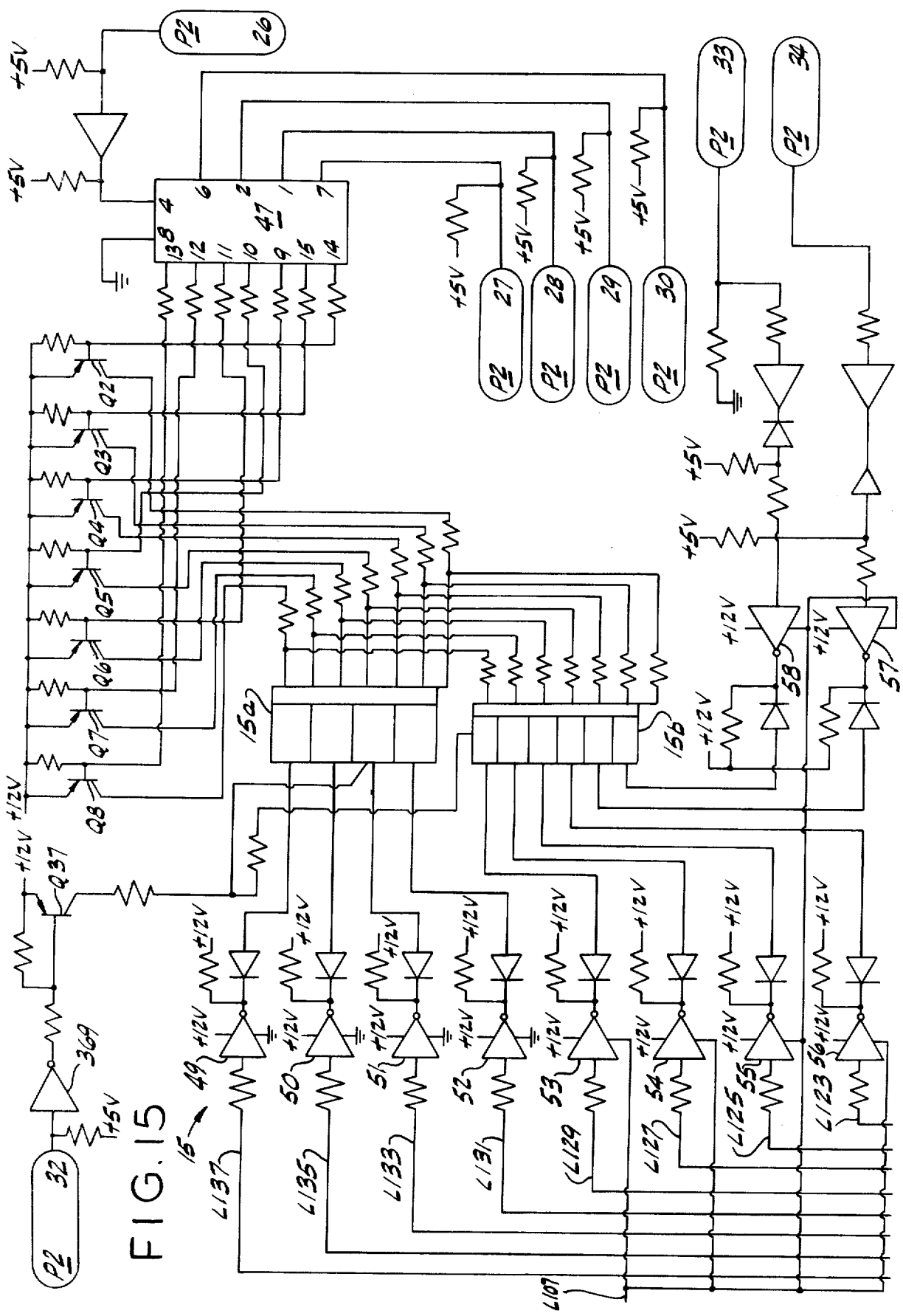
FIG. 15 is a circuit diagram showing part of the display circuit of this invention.

Display circuit 15, including displays 15a and 15b, is shown in its entirety on FIG. 15. Briefly, display circuit 15 includes a 7447 type BCD-to-seven segment decoder 47, seven PNP transistors Q2–Q8, four-digit seven-segment display 15a, six-digit seven-segment display 15b, and ten inverters 49–58, such as are supplied in an MC1413 type inverter package. The digits of displays 15a and 15b, as is described in detail below, are multiplexed by inverters 49–58. That is, only one digit of the two displays is activated at a given instant, the particular digit activated being determined by the outputs of inverters 49–58.

Figure 16:
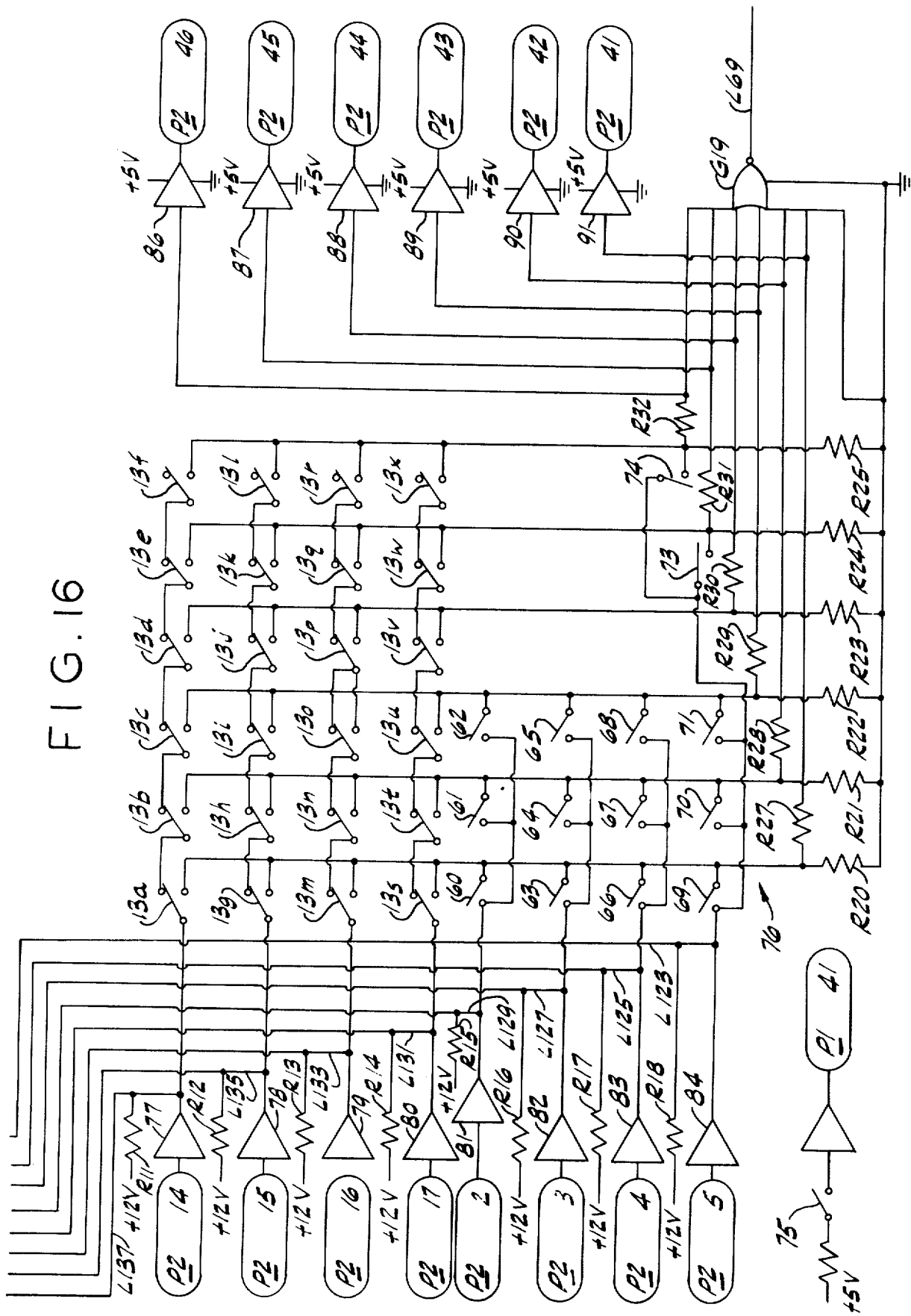
FIG. 16 is a circuit diagram showing a matrix of switches used in setting items and setting prices in this invention.

FIG. 16 shows selection switches 13a–13x as well as a set of twelve price-setting switches 60–71. Switches 60–71, also shown on FIGS. 37–38, 41 and 42, are associated with the numerals 1–9, the character "*", the numeral "0", and the character "#", respectively. The numeral switches, i.e., switches 60–68 and 70, are used to enter prices into memory 9. Switch 69, the "*" switch, is a price-loading switch, and switch 71, the "#" switch, is a display-clearing switch. Also shown on FIG. 16 are two price-rolling switches 73 and 74, which can also be used to enter prices, and a fast-slow switch 75, which is used in conjunction with switches 73 and 74. Except for switch 75, the switches shown on FIG. 16 are arranged in a matrix 76 of eight rows and six columns. Of course, other arrangements of switches could be used, but the program appearing as Appendix A was written for this particular switch matrix. Each row of the switch matrix shown on FIG. 16 is connected through one of a series of 1K resistors, designated by the reference characters R11–R18, to a +12 V source and directly to the output of one of a series of 7407 type open-collector output drivers, designated by the reference numerals 77–84. Each column is connected through one of a series of 10I resistors, designated by the reference characters R20–R25, to ground and through one of a series of 220K resistors, designated by the reference characters R27–R32, to a NOR gate G19 and to one of a series of noninverting gates or buffer amplifiers, designated by the reference characters 86–91.

NOR gate G19 (FIG. 16) is connected by a line L69 to a mode setting circuit, indicated generally at 93 (FIG. 17). Control circuit 7 has two mutually exclusive operation modes, viz., a price-setting mode and a vending mode. Mode-setting circuit 93 constitutes means for setting the mode of operation of control circuit 7. Included in mode-setting circuit 93 are two noninverting gates 95 and 97, two NOR gates G21 and G23 and a mode-setting switch 98. Switch 98 has two contacts 98a and 98b which make up one side thereof. The other side of switch 98 is connected to ground.

Contact 98a is connected through a 1K resistor R20 to a +5 V source and directly to gate 97 and NOR gate G21. Contact 98b is connected through a 1K resistor R21 to a +5 V source and directly to gate G23. Contact 98a is shown as grounded in FIG. 17, which causes Lows to be present at the input to gate 97 and at one input of gate G21. Contact 98b, being open, does not ground its input to gate G23, so that input is High and its output Low. This is the vending mode position of switch 98. In the price-setting mode, the blade of switch 98 contacts contact 98b rather than contact 98a, thereby reversing the above voltage levels.

FIG. 18 shows a product sensing circuit 99 which is part of control circuit 7. Circuit 99 includes two light-emitting diodes (LEDs) 101 and 103 and two phototransistors Q3 and Q5. When circuit 99 is installed in a vendor such as vendor 1, LED 101 and phototransistor Q3 are disposed on one side of a delivery station, said station being indicated generally at 105 (FIG. 1) and LED 103 and phototransistor Q5 are disposed on the opposite side of delivery station 105. A product present at the delivery station will interrupt the passage of light from the LEDs to at least one of phototransistors Q3 and Q5 causing at least one and often both of them to cease conducting. This causes the collector(s) of the nonconducting transistor(s) to go High, signalling the presence of an item at delivery station 105.

Vendor 1 includes an elevator, not shown, which moves from delivery station 105 to four levels, designated by the reference characters A, B, C and D, on which the items 3 to be dispensed are located. Once the elevator reaches the desired level, the desired item is conveyed onto the elevator and the elevator descends to delivery station 105 to complete the vend. The elevator and the apparatus which conveys the desired article onto the elevator are not part of the present invention but are of the type disclosed in coassigned U.S. Pat. No. 4,108,333. In that application, the elevator is caused to move up to the desired level by an elevator motor, connected to a motion sensor. Such a motion sensor supplies a series of pulses indicative of the speed of the elevator motor, the pulses being closer together the faster the motor is turning. When the elevator reaches the proper level, it engages a stop, not shown, which prevents further movement of the elevator. At this point, the elevator motor stops and the pulses from the motion sensor cease.

Control circuit 7 includes sensing means, indicated generally at 106 (FIG. 19), for supplying a vendor status input comprising a series of pulses indicating the speed of rotation of the elevator motor in the vendor to MPU 11. The output of the motion sensor is a train of pulses which is supplied through a 47Ω resistor R23 to pins 2 and 6 of a 556-type timer 107 connected to function as a wave-shaper. Timer 107 is also called a speed-sensor clock. Timer 107 shapes these pulses and supplies them through a 0.001 μF capacitor C3 to a noninverting gate 109 and directly to a noninverting gate 111. The outputs of gates 109 and 111 are supplied to MPU 11 through pins 8 and 47 of plug P2.

Control circuit 7 also includes a clock 113 (FIG. 20), called a time-base clock, which constitutes clock means for supplying interrupts to MPU 11 at a constant rate which the microprocessor uses to determine if the number of the pulses from sensing circuit 107 fall within a predetermined range. Clock 113 is a 556-type timer with a period of 10 milliseconds. The output of clock 113 (pin 3) is supplied directly to plug P2, pin 48 and through an inverter 115 to plug P2, pin 36.

Vendor 1 includes a delivery door 117 (FIG. 1) in front of delivery station 105 which automatically opens when an item is sensed at delivery station 105 by phototransistors Q3 and Q5 (FIG. 18). A circuit for causing door 117 to automatically open when an item is sensed at the delivery station is shown on FIG. 21. Briefly, MPU 11 causes a High to appear at plug P2, pin 13 when an item is sensed at delivery station 105. This High is supplied to a noninverting gate 119 which is connected to the base of a NPN transistor Q7. The base of transistor Q7 is also connected through a 1.8K resistor R25 to +5 V source. When the output of amplifier 119 goes High, therefore, transistor Q7 conducts causing current to flow through a relay coil 121 from a +12 V source. This closes the contacts of a relay, not shown, which closure is known manner is used to power a motor, remove a latch, etc., to open door 117.

Control circuit 7 controls the coin-handling functions of vendor 1 such as credit accumulation and coin return. Specifically, it controls the functioning of a coin handling unit, not shown, and a dollar bill validator, also not shown. Connections to the coin handler and validator are indicated by the reference characters CH and VAL respectively. Of course, standard coin handling units and validators must be adapted to be electrically compatible with the voltage levels of the control circuit, but this adaptation can easily be performed by one of ordinary skill in the art and is not part of this invention. When the coin handler or validator detects a valid coin or bill, it generates a signal corresponding to the type of coin or bill detected; the signal for each type coin or bill being a positive pulse. For example, the positive pulse corresponding to a dime is supplied from an optoelectronic source and sensor assembly disposed at the entrance of the dime coins tube in the coin handler.

The pulse signaling the detection of a valid dollar bill is supplied to an indicator circuit 123 (FIG. 22) comprising two 1K resistors R27 and R29, two 100K resistors R31 and R33, two noninverting gates 125 and 127, a 0.01 μF capacitor C5, and a diode D3. The pulse is sensed by gate 125 and then supplied to plug P1, pin 30. The pulse is also supplied to capacitor C5 which, together with diode D3 and resistor R29, shapes it into a spike which is sensed by gate 127 and supplied to plug P1, pin 22. These signals supplied to plug P1 are thereafter supplied to MPU 11.

Figure 23:
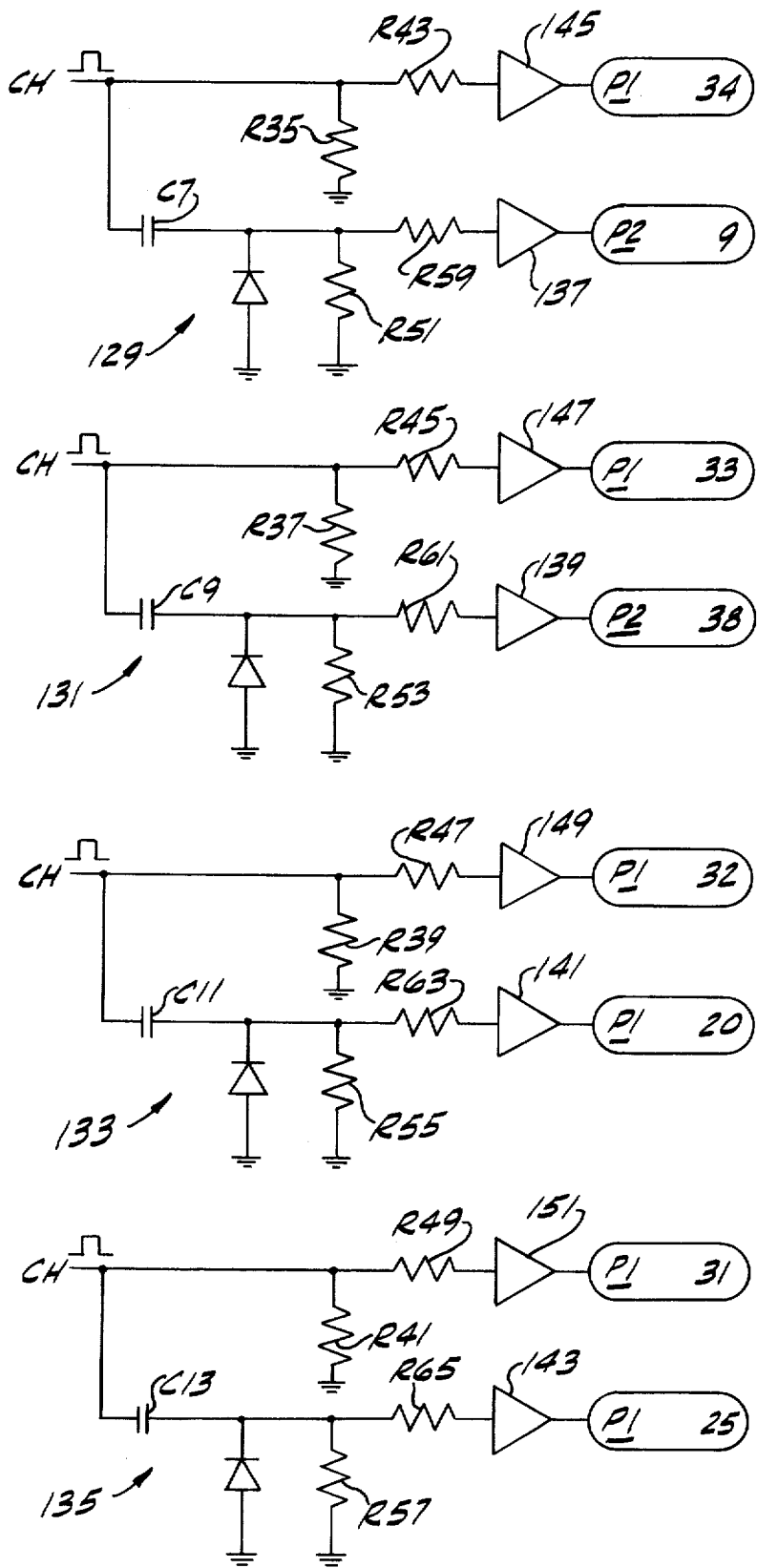
FIG. 23 is a circuit diagram of four coin indicator circuits of this invention.

In a similar manner, pulses indicating the detection of nickels, dimes, quarters and dollar coins are supplied to four identical coin indicator circuits 129, 131, 133 and 135 (FIG. 23). Indicator circuits 129, 131, 133 and 135 each have a 4.7K resistor (designated by the reference characters R35, R37, R39 and R41), a 220K resistor (R43, R45, R47 and R49), a 0.01 μF capacitor (C7, C9, C11 and C13), a first 100K resistor (R51, R53, R55, and R57), a second 100K resistor (R59, R61, R63, and R65), a first noninverting gate (137, 139, 141 and 143) and a second noninverting gate (145, 147, 149 and 151).

The nickel indicator circuit, circuit 129, supplies its pulse (i.e., vendor status input) representative of a deposit of a nickel in vendor 1 to plug P1, pin 34 and the spike input derived therefrom to plug P2, pin 9, and thereby supplies it to microprocessor 11. The dime indicator circuit, circuit 131, supplies its pulse and spike outputs indicating the deposit of a dime to plug P1, pin 33 and plug P2, pin 38. Circuit 133, the quarter indicator circuit, supplies its two outputs to plug P1, pins 32 and 20. And the dollar coin indicator circuit, circuit 135, supplies its output to pins 31 and 25 of plug P1. In summary, indicator circuits 123, 129, 131, 133 and 135 constitute means for supplying vendor status inputs representative of a deposit of money in vendor 1 to MPU 11.

Figure 24:
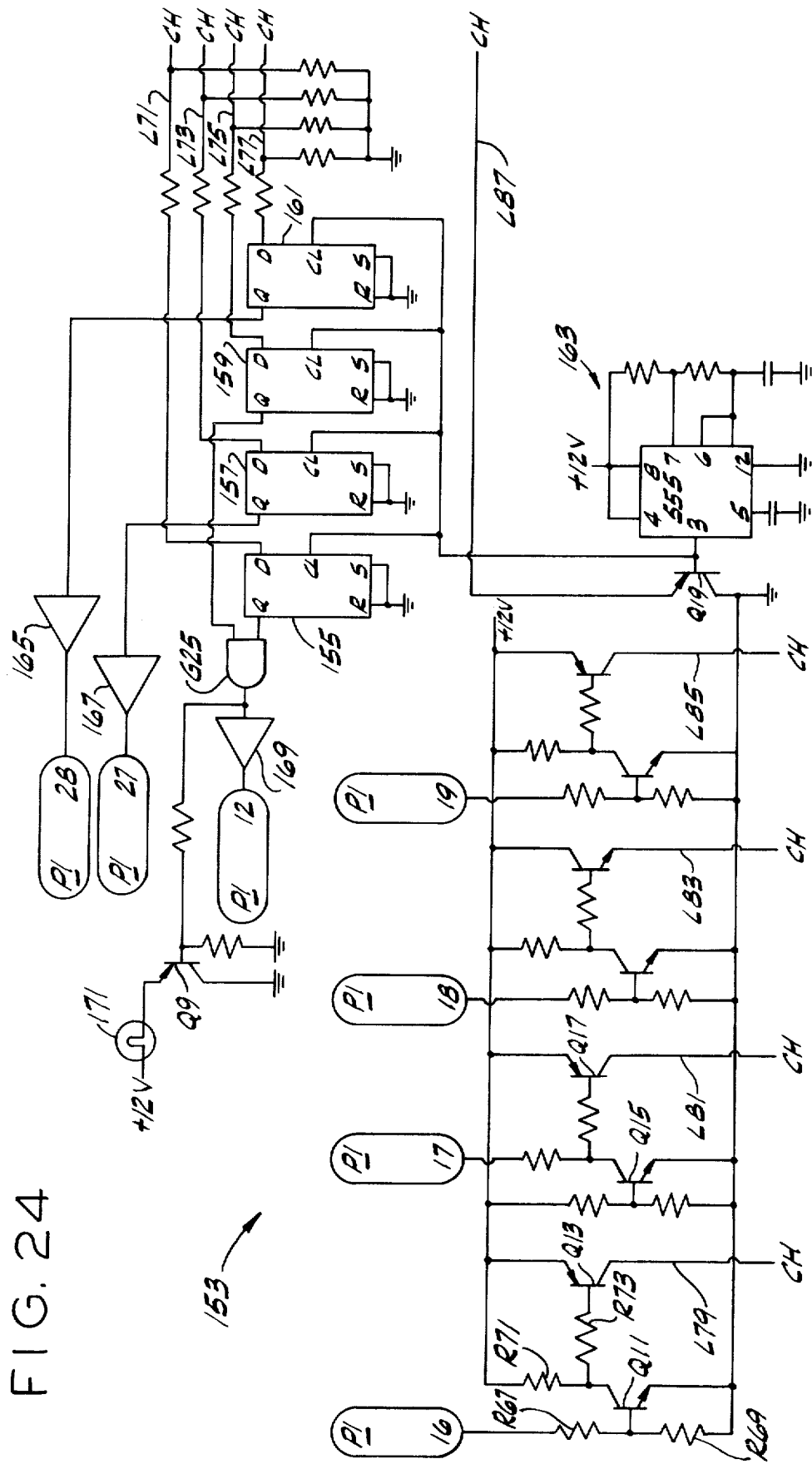
FIG. 24 is a circuit diagram of change control circuitry used in this invention.

FIG. 24 shows additional circuitry, indicated generally at 153, for controlling the functioning of the coin handler. Signals from the coin handler indicating empty change tubes are supplied to circuit 153 over four lines labeled L71, L73, L75 and L77. If the nickel change tube in the coin handler is empty, for example, there will be a Low on line L71. Lows on lines L73, L75 and L77 indicate empty dime, quarter and dollar coin change tubes respectively. The nickel change tube empty signal is supplied to a D-type latch 155. Empty signals for the dime, quarter and dollar coin tubes are supplied to additional D-type latches 157, 159 and 161. The clock inputs of the latches are connected to a clock 163 comprising a 555-type timer.

A Low on line L77, signifying that the dollar coin tube is empty, causes the Q output of latch 161 to go Low. This Low output is supplied to a noninverting gate 165 connected to plug P1, pin 28. Similarly, if the dime tube is empty, the Low on line L73 causes the Q output of latch 157 to go Low. This Low output is sensed by noninverting gate 167 and supplied to plug P1, pin 27. In response to the signal levels on pins 27 and 28 of plug P1 being Low, MPU 11 stops using dollar coins and dimes to make change and instead uses nickels and quarters.

The Q outputs of latches 155 and 159 go Low whenever the nickel and quarter change tubes, respectively, are empty. These outputs are supplied to an AND gate G25 causing its output to go Low, whenever either or both of these tubes are empty. This Low output is supplied via a noninverting gate 169 to plug P1, pin 12. It is also supplied to the base of a PNP transistor Q9, causing it to conduct, thereby lighting an out-of-change indicator lamp 171 connected between the collector of transistor Q9 and a +12 V source.

MPU 11 causes the coin handler to make change from its coin tubes by causing Highs to appear on pins 16-19 of plug P1. To cause a dollar coin to be returned in change, the MPU puts a High on plug P1, pin 16. Pin 16 of plug P1 is connected to a voltage divider consisting of a 4.7K resistor R67 connected through a 10K resistor R69 to ground. The base of an NPN transistor Q11 is connected to the voltage divider between the two resistors. The emitter of transistor Q11 is also connected to ground, while its collector is connected through a 4.7K resistor R71 to a +12 V source. A High at pin 16 of plug P1, therefore, causes transistor Q11 to conduct, which causes the voltage measured at its collector to go Low. The collector of transistor Q11 is connected through a 91Ω resistor R73 to the base of a PNP transistor Q13, the emitter of which is connected to the +12 V source and the collector of which is connected by a line L79 to a solenoid, not shown, on the dollar coin tube in the coin handler. A Low on the collector of transistor Q11 causes transistor Q13 to conduct, energizing the dollar coin relay solenoid, which causes a dollar coin to be ejected from its coin tube.

A High on pin 17 of plug P1 causes an NPN transistor Q15 to conduct, which in turn causes a PNP transistor Q17 to conduct. Transistor Q17 is connected by a line L81 to the corresponding solenoid on the quarter change tube. When it conducts, that solenoid is energized, causing a quarter to be ejected from its change tube. In the same way, Highs on pins 18 and 19 of plug P1 cause current to flow in lines L83 and L85 to energize the solenoids associated with the dime and nickel tubes respectively.

Circuit 153 also includes a PNP transistor Q19, the collector of which is connected to ground, the base of which is connected to the output of clock 163 and the emitter of which is connected via a line L87 to a sensor LED circuit, not shown, in the coin handler. Coin handlers use a plurality of standard LED sensors to check coin levels. The clock signal on line L87 is used to pulse the LEDs in those sensors so that they will not remain "on" continuously, overheat and fail. These LEDs are pulsed with relatively high current to decrease the possibility of false "Tubes Full" signals being sent to MPU 11 because of dust accumulation on the sensors or the like.

It is desirable in coin handlers to have an escrow position for dollar coins so that if the customer chooses not to complete a vend, he can receive back the very dollar coins he inserted into vendor 1. Control circuit 7 has circuits 173 and 175 (FIG. 25) for controlling such escrow.

Briefly, in response to an input signal at pin 43 of plug P1, circuit 173 provides a ground connection on a line L89 to a dollar coin escrow solenoid, not shown, in the coin handler. The other end of said solenoid is connected to a source of power, so when line L89 provides a path to ground the solenoid is activated causing dollar coins to be trapped in the escrow chute. The coin handler also has a dollar coin return solenoid which deflects the dollar coins stored in the escrow position to the customer when it is activated. Activation of the return solenoid is accomplished by supplying a signal from MPU 11 to pin 11 of plug 1. This causes a line L91 of circuit 175 to go Low, activating the return solenoid to which it is connected.

A circuit 177 (FIG. 26), identical to circuit 175 in structure and operation, is used to activate the CREM, not shown, in the coin handler. Briefly, a High on pin 13 of plug P1 causes a line L93 to go Low, providing a ground path for the CREM.

FIG. 27 shows a circuit 179 used to signal the microprocessor that the customer wants his money back. If the customer has pressed the coin return switch to abort the vend, the coin handler supplies a High on a line L94 to circuit 179. This High is sensed by a buffer or noninverting gate 181 and supplied to pin 20 of plug P2. As explained in detail infra, MPU 11 in response to this High on pin 20 of plug P2 returns the customer's money if a vend is not in progress.

The serviceman uses circuit 179 to empty the coin tubes. For this purpose the coin handler includes four switches, not shown, one for each tube. Pressing the nickel tube switch causes a High to be supplied on a line L95 from the coin handler to a buffer gate 183 in circuit 179. The output of gate 183 is connected to pin 46 of plug P1. The pressing of the dime tube switch causes a High to appear on a line L97, which is sensed by a buffer gate 185 and supplied to pin 47 of plug P1. Likewise, the High resulting from the pressing of the quarter tube switch is supplied on a line L99 to a buffer gate 187 and from there to pin 48 of plug P1. Pressing the dollar coin tube switch causes a High to be supplied on a line L101 to a buffer gate 189 and from there to pin 49 of plug P1. The signals from gates 183, 185, 187 and 189 are also supplied to a NOR gate G27. Whenever the outputs of one of these amplifiers is High, the output of gate G27 is Low. This causes the input of an inverter 191 to become Low, so its output goes High. This High output is supplied to pin 1 of plug P1. Briefly, the High on pin 1 of plug P1, called a payout request interrupt, causes MPU 11 to payout coins from the coin tube whose switch has been actuated until that switch is released.

The dollar bill validator moves a bill into an escrow position after it has been validated and then either accepts the bill by moving it to a storage location, or returns the bill to the customer depending upon whether or not the vend has been completed or aborted. Control circuit 7 controls the movement of the valid bill from the escrow position by means of two identical circuits, designated by the reference numerals 193 and 195 (FIG. 28). To return the dollar bill to the customer, MPU 11 causes pin 15 of plug P1 to go High. This High is supplied through a 100K resistor R75 to a noninverting gate 197. The output of gate 197 is supplied through a 1K resistor R77 to the base of an NPN transistor Q21, the emitter of which is connected to ground and the collector of which is connected by a line L103 to the validator. The High on the base of transistor Q21 causes line L103 to be Low, thereby signaling the validator to return the bill. Likewise, to accept the bill, MPU 11 causes pin 45 of plug P1 to go High. This results in a line L105 connected to the validator and to the collector of an NPN transistor Q23 to go Low, thereby signaling the validator to move the bill to the storage position.

On occasion the operator of vendor 1 may desire to vend items 3 simply in response to the actuation of selection switches 13, i.e., a "free vend". This is easily accomplished by means of a free vend switch 199 (FIGS. 29 and 37) having first and second positions. Free vend switch 199 has contacts 199a and 199b corresponding respectively to the first and second positions of the switch. Contact 199a is connected through a 1K resistor R79 to a +12 V source and through a 220K resistor R81 to a buffer gate 201. The output of gate 201 is connected to pin 22 of plug P2. When free vend switch 199 is in its second position, as shown in FIG. 29, the output of gate 201 is High. When switch 199 is switched to its first position, however, the +12 V source is grounded through the switch, so the output of gate 201 and the voltage on plug P2, pin 22 are Low. This Low is subsequently detected by microprocessor 11.

Control circuit 7 keeps track of the total accumulated sales figure for vendor 1. This figure is stored in chip RAM1 at address 0037-003A, and is updated after every vend by MPU 11. The total sales figure is also stored in chip EAROM1 at address "1D" and "1E" therein. Six-digit seven-segment display 15b constitutes means for displaying the total accumulated sales figure. Of course the customer has no need to know the total sales figure, so display 15b is normally inactivated and is preferably disposed inside the cabinet of the vendor as shown in FIG. 37. The serviceman has a key 203 (FIG. 30) which constitutes servicemanoperable means for activating display 15b. The serviceman merely inserts key 203 in a slot 204 of a sensor 205 in an activating circuit 207 to activate display 15b.

Figure 30:
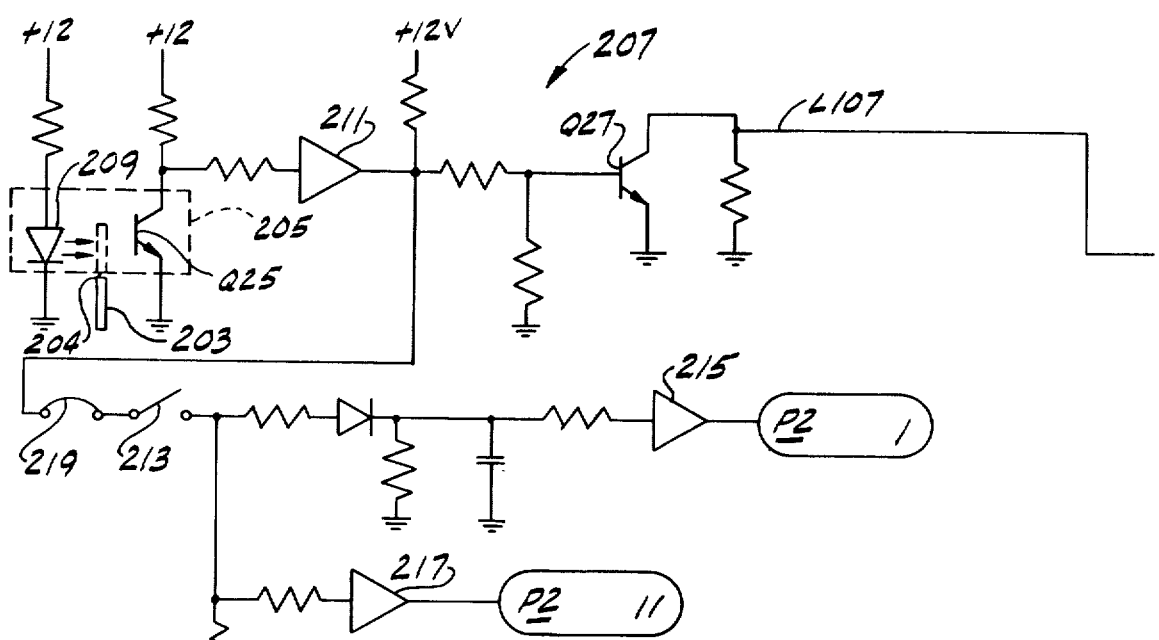
FIG. 30 (sheet 18) is a circuit diagram of a display activating circuit of this invention.
Figure 22:
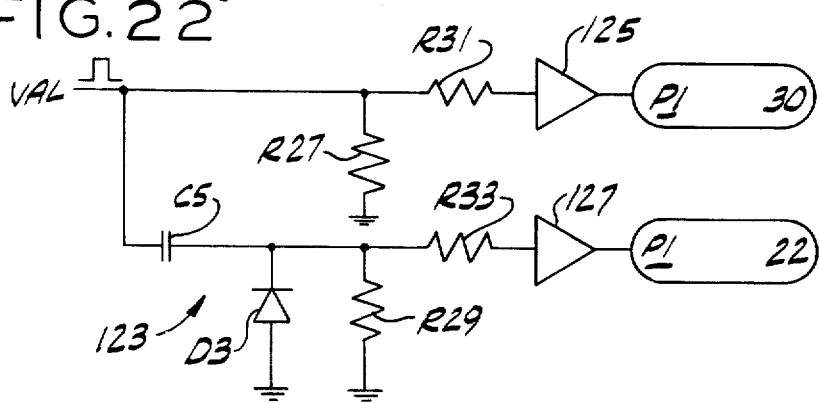
FIG. 22 is a circuit diagram of a dollar bill indicator circuit used in this invention.

Display 15b is normally inactivated because inverters 53-58 (FIG. 15) have no way to sink the current from display 15b. Inverters 53-58, being part of an MC1413 type inverter package, require a ground connection in order to sink that current. This ground connection is provided on a line L107 when key 203 is inserted into sensor 205 (FIG. 30). Specifically when the serviceman places key 203 in the position in sensor 205 shown in phantom, it breaks the light path between an LED 209 and a phototransistor Q25 contained therein. This stops conduction of the phototransistor, causing the voltage measured at its collector to become positive. This positive voltage is sensed by a buffer gate 211 and supplied to the base of an NPN transistor Q27 in the common-emitter configuration. Transistor Q27 conducts, and as a result line L107 goes Low, grounding inverters 53-58 and thereby activating display 15b.

The total accumulated sales figure is reset to zero by a switch 213 which constitutes means for supplying a reset control input signal to MPU 11. When switch 213 is closed by the serviceman or other person with access thereto, it causes the outputs of two buffer gates, designated 215 and 217, to go High. These outputs are supplied to pins 1 and 11 of plug P2 and from there through the PIAs to MPU 11. Circuit 207 also includes a jumper 219 which can be removed to prevent inadvertent or non-authorized resetting of the total sales figure.

When the elevator is not at delivery station 105, door 117 is locked closed by a solenoid-operated latch, not shown. This is a safety feature which prevents a customer from opening door 117 while the elevator is moving. It also prevents a customer from surreptitiously removing items from the lower levels while the elevator is at the higher levels, e.g., level A. If, however, the elevator is at delivery station 105, door 117 is unlocked if there is a product present. This is accomplished by a door lock solenoid circuit 221 (FIG. 31) which energizes solenoid 223 to unlatch door 117 when the elevator is at delivery station 105 and a product is sensed by circuit 99. When MPU 11 has determined that the elevator is at the delivery station, and a product is present, it supplies a High to pin 7 of plug P1 which is connected to a buffer gate 225. The resulting High output of gate 225 causes an NPN transistor Q29 to conduct, energizing solenoid 223 and unlatching and opening door 117.

Control circuit 7 includes an interlocking circuit 227 (FIG. 32) which constitutes means for supplying vendor status inputs to MPU 11 which indicate that vendor 1 is not ready to vend an item 3. Interlocking circuit 227 includes a switch 229 for indicating whether the elevator is at delivery station 105, a switch 231 for indicating whether door 117 is closed, and a switch 233 for indicating whether door 117 is locked. Switch 229 has two contacts 229a and 229b. Its blade is connected to a +12 V source. Contact 229a is connected through a buffer gate 235 to pin 10 of plug P2. Contact 229a is also connected to switch 231. When the elevator is at delivery station 105, switch 229 is closed through contact 229a and thus supplies +12 V power to switch 231 and to gate 235 causing its output to be High. When the elevator leaves delivery station 105, however, switch 229 closes through contact 229b and the output of gate 235 goes Low, thereby removing power from switches 231 and 233.

Switch 231 is closed when door 105 is closed and open when it is not. When closed, switch 231 connects contact 229a through a buffer gate 237 to pin 9 of plug P1. If the elevator is at the delivery station and door 117 is closed, the output of gate 237 is High. If either or both of these conditions is not met, the output of gate 237 is Low.

Switch 233 is connected to switch 231 and is open when door 117 is unlocked. Locking of door 117 closes switch 233, which connects switch 231 through a buffer gate 239 to pin 8 of plug P1. If the elevator is at delivery station 105 and door 117 is closed and locked, the output of gate 239 is High. Otherwise, it is Low.

Normally, when not in the vend cycle, the elevator is at delivery station 105 and door 117 is closed but unlocked. As a result, the normal positions of switches 229, 231 and 233 are as shown in FIG. 32.

If all three switches are closed and conditions are proper for a vend, MPU 11 supplies a vend signal on pin 6 of plug P1 to a run relay circuit 241 (FIG. 33) which constitutes means for initiating vending of the selected item 3. In response to the vend signal from MPU 11, the output of a noninverting gate 243 in circuit 241 goes High which causes an NPN transistor Q31 to conduct. This energizes a relay coil 245 which in the known manner closes a switch, not shown, to supply power to the elevator.

Figure 36:
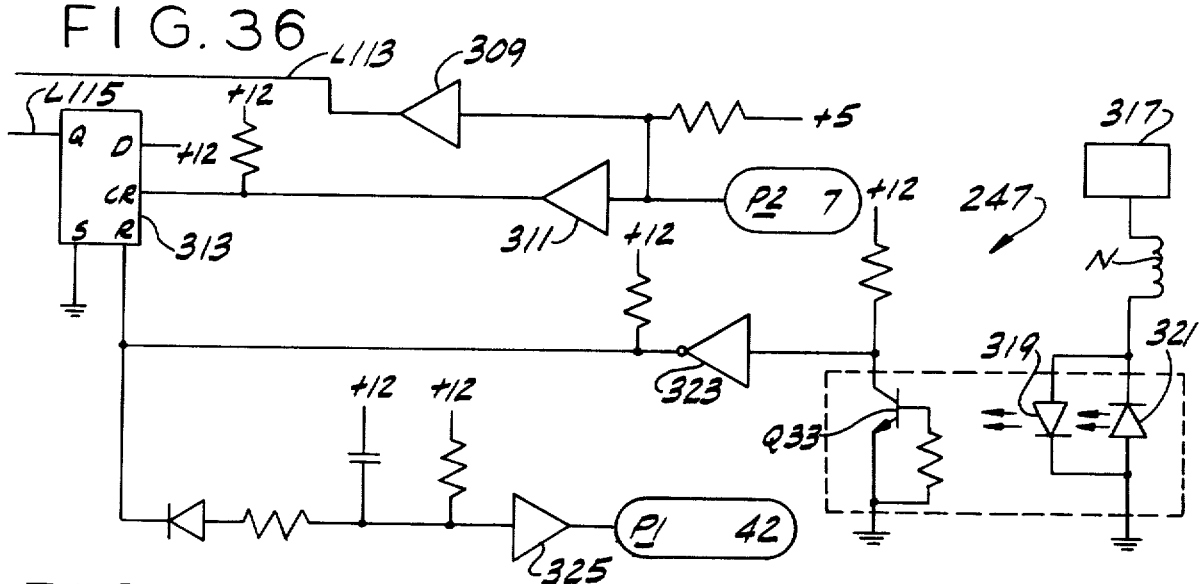
FIG. 36 (sheet 18) is a circuit diagram of additional elevator control circuitry of this invention.
Figure 35:
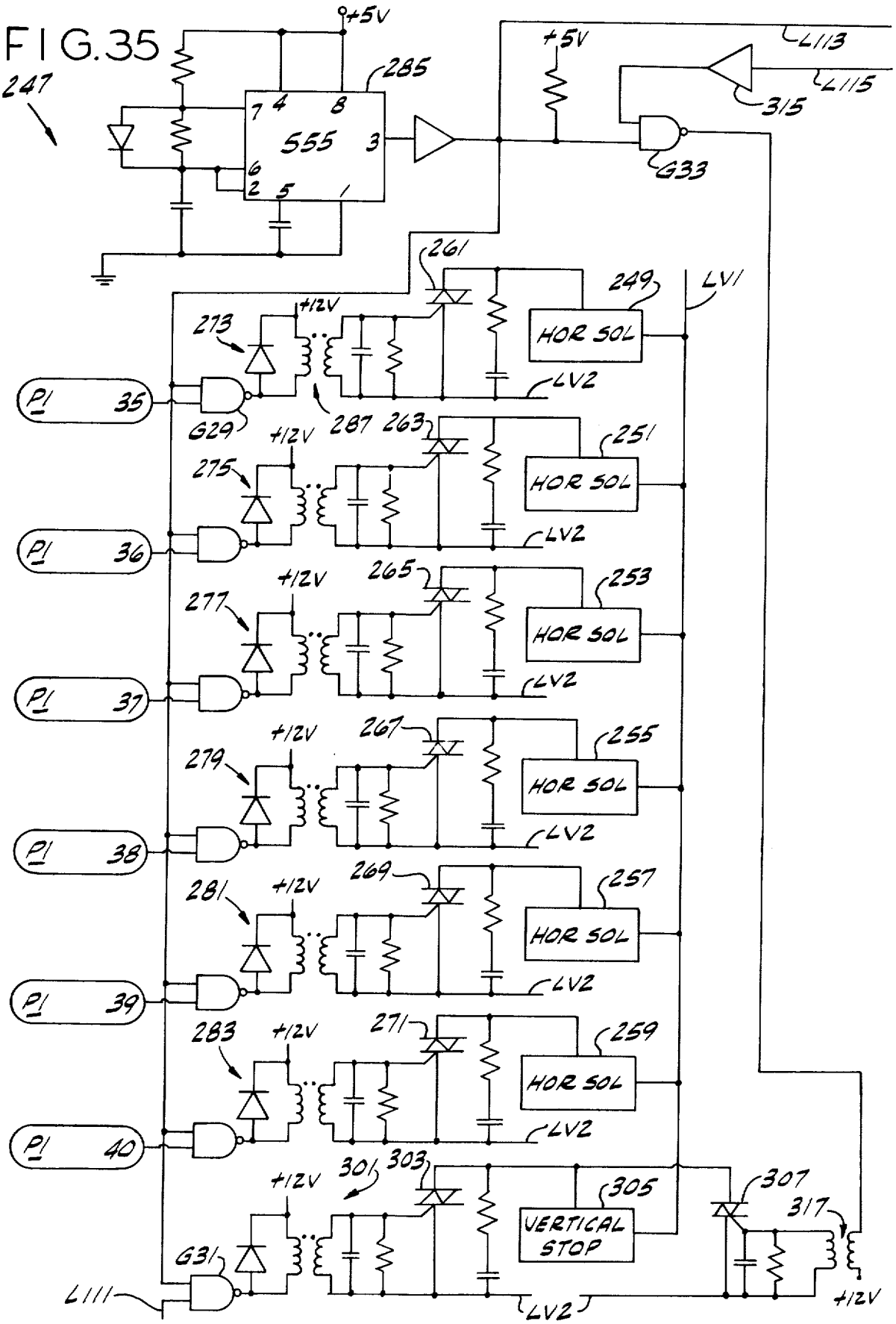
FIG. 35 is a circuit diagram of elevator control circuitry of this invention for vending a selected item.

Control circuit 7 controls the operation of the elevator and dispensing of items 3 by means of a circuit 247 (FIGS. 34-36). Circuit 247 includes six horizontal solenoids (HORSOLs) designated by the reference numerals 249, 251, 253, 255, 257 and 259, each of which is associated with one column of items 3. A particular item 3 is moved onto the elevator in response to the elevator being at that item's level and the HORSOL associated with that item's column having been energized before the elevator moves from the delivery station. Control circuit 7 deals only with energizing the proper HORSOL and stopping the elevator at the proper level. The particular means used to then convey the selected item onto the elevator is not part of this invention.

The HORSOLs are connected on one side to one side of a 24 VAC power line, designated LV1, and on the other side through one of a set of six triacs, designated by the reference characters 261, 263, 265, 267, 269 and 271, to the other side, designated LV2, of the power line. Each triac has its own gating circuit, indicated by the reference numerals 273, 275, 277, 279, 281 and 283, all of which are identical. When a triac is gated by its gating circuit, its corresponding HORSOL is energized. Since all the gating circuits are identical, only circuit 273 is described in detail.

To energize HORSOL 249, as is required when the item selected is in the leftmost column as shown in FIG. 1, MPU 11 causes pin 35 of plug P1 to be High. This High is supplied to a NAND gate G29 in gating circuit 273. The other input of gate G29 is clock pulses from a clock 285, so the output of gate G29 is periodically Low. This causes current to flow from a +12 V source through one side of a transformer 287 into gate G29, which in turn causes current to flow through the other side of transformer 287 into the gate terminal of triac 261. Current then flows through the main terminals of triac 261 and HORSOL 249 is energized. To vend an item in the second column from the left, MPU 11 energizes HORSOL 251 by causing pin 36 of plug P1 to be High. Likewise Highs on pins 37, 38, 39 and 40 of plug P1 result in HORSOLs 253, 255, 257 and 259 respectively being energized.

The purpose of clock 285 is to prevent the transformers in gating circuits 273, etc., from burning out as a result of being on for relatively long periods.

Microprocessor 11 controls the level at which the elevator stops by means of pins 2-5 of plug P1 (FIG. 34). Pin 2 of plug P1, which is associated with level A, is connected through a noninverting gate 289 to a switch 291, the other side of which is connected to a line L109. Pins 3-5 are connected in exactly the same way through their own gates to switches 293, 295 and 297, respectively, whose other sides are connected to line L109. Pin 3 is associated with level B; pin 4, with level C; and pin 5, with level D. To stop the elevator on level A, for example, MPU 11 causes pin 2 of plug P1 to go High and pins 3-5 to remain Low. As the elevator approaches level D it closes switch 297, connecting pin 5 of plug P1 and line L109 but nothing occurs since pin 5 is Low. That is, the closure of switch 297 causes no change in the potential measured on line L109. Likewise, as the elevator approaches level C it closes switch 295, again with not result. But as switch 291 finally closes it brings line L109 High since pin 2 of plug P1 is High. This High on line L109 is sensed by a buffer gate 299 and supplied on a line L111 to a NAND gate G31 (FIG. 35). Gate G31 is part of a triac gating circuit 301 identical to gating circuits 273, etc. The High on line L111 causes the output of gate G31 to go Low, providing in the same manner described above a gating signal for a triac 303. Triac 303 is connected at one main terminal to side LV2 of the power line and at the other main terminal to a vertical stop solenoid 305 which when energized stops the elevator by, for example, causing a mechanical stop to be held in its path as shown in coassigned U.S. Pat. No. 4,108,333. One side of vertical stop solenoid 305 is connected to side LV1 of the power line.

Solenoid 305 is also connected to side LV2 of the power line through a second triac 307 which is used to stop the elevator during reset of control circuit 7. During a system reset the microprocessor causes pin 7 of plug P2 (FIG. 36) to be High. This High is sensed by a non-inverting gate 309 and supplied on a line L113 to a first input of a NAND gate G33. The High on pin 7 of plug P2 is also sensed by a noninverting gate 311 and supplied to the clock input of a number 4013, D-type latch 313. The Q output of latch 313 therethrough goes High. This High is supplied on a line L115 through a buffer gate 315 (FIG. 35) to the second input of gate G33. The output of gate G33 is connected to one side of a transformer 317, the other side of which is connected to the gate terminal of triac 307. When the output of gate G33 goes Low, triac 307 is gated by current from transformer 317 and vertical stop solenoid 305 is energized.

When the elevator stops at the desired level, vending proceeds substantially as described in the coassigned U.S. Pat. No. 4,108,333. Specifically a tray or vend motor, not shown, goes through approximately one-half of a cycle to convey the selected item 3 onto the elevator and then stops (this is called the 180° position of the tray motor). When the tray motor reaches the 180° position, it energizes a relay, designated N herein and in the U.S. Pat. No. 4,108,333, which causes the elevator motor to reverse and move the elevator back down to delivery station 105. After relay N is energized the operation of the present elevator control circuit is somewhat different from that disclosed in the U.S. Pat. No. 4,108,333.

In order for the elevator to freely return to delivery station 105 after the item has been conveyed onto it, it is necessary that vertical stop solenoid 305 not be energized. It will not be energized by triac 303 because MPU 11 causes pins 2-5 of plug P1 (FIG. 34) to go Low when the elevator stops. The energization of relay N (FIG. 36) by the means disclosed in the U.S. Pat. No. 4,108,333, indicated by a box 317, when the tray motor reaches its 180° position causes two LEDs designated by the reference numerals 319 and 321 to light. The light from the LEDs causes a photo-transistor Q33 to conduct. Phototransistor Q33 is an NPN type transistor connected in the common-emitter configuration so its collector voltage goes Low upon the lighting of LEDs 319 and 321. This Low is inverted by an inverter 323 and the resulting High is supplied to the reset input of D-type latch 313. The output of latch 313 goes Low, therefore, causing the output of NAND gate G33 (FIG. 35) to be High. As a result no gating current can flow through transformer 317, so triac 307 cannot energize solenoid 305 either. The High from inverter 323 is also supplied through a noninverting gate 325 to pin 42 of plug P1. This high is a vendor status input signal to MPU 11 that the tray motor is in its 180° position.

It should be noted that although microprocessor 11, memory 9 and display circuit 15 are shown in block diagram form outside vendor 1 in FIG. 1 in actual fact all three are contained inside vendor 1 and in particular behind a front panel 327. Front panel 327 is secured to a right-side panel 329 (FIG. 37) on which control circuit 7 is mounted. Side panel 329 can be rolled forwardly part of the way out of vendor 1 to the position shown in FIG. 37, on two guideways 331 and 333, shown in phantom.

Most of control circuit 7 is enclosed in a case 335. But the parts of circuit 7 which the serviceman needs to be able to manipulate are located outside case 335. Free vend switch 199, for example, is mounted on top of case 335. And display 15b is mounted on the outside of case 335. Switches 60-71, which constitute serviceman-operable means for setting the values of at least some of the parameters stored in memory 9, are mounted in a price-setting module 337 detachably mounted in a holder 339. Specifically price-setting module 337 constitutes customer-inaccessible price-setting means for setting the prices of items $3a$-$3x$ stored in memory 9. Module 337 is customer-inaccessible because only the serviceman can roll panels 327 and 329 out from their closed position with panel 329 inside vendor 1 and panel 327 substantially flush with the front of the vendor to their open position shown in FIG. 37. Normally side panel 329 is locked in place by means of a lock and handle combination 341 mounted in panel 327. Clearly panels 327 and 329 constitute serviceman-operable means for providing access to price-setting module 337 when they are in their open position and for preventing access thereto when they are in their closed position.

Price-setting module 337 is normally connected to control circuit 7 by means of a plug 343 attached thereto and a socket 345 connected to the rest of circuit 7 by wires not shown. Plug 343 is shown unplugged from socket 345 in FIG. 37 to emphasize the fact that price-setting module 337 is serviceman removable. That is, the serviceman can have a single price-setting module 337 which he takes from vendor to vendor. Typically, however, price-setting module 337 is left in vendor 1 and plug 343 is left plugged into its socket 345.

A more detailed view of price-setting module 337 and holder 339 is had in FIG. 38. Special note should be taken of mode-setting switch 98 mounted behind holder 339 with its actuator protruding into the interior of the holder. When price-setting module 337 is in holder 339, it engages the actuator of mode-setting switch 98, which causes the blade of switch 98 to contact contact $98a$ (FIG. 17), which puts circuit 7 in the vending mode. That is, mode-setting circuit 93 is responsive to price-setting module 337 being in holder 339 to set control circuit 7 in its vending mode. When module 337 is removed from the holder, it no longer engages the actuator of switch 98, so the blade of switch 98 switches to contact $98b$, which sets control circuit 7 in the price-setting mode. Since holder 339, module 337 and switch 98 are accessible only when panels 327 and 329 have been moved to their open position, mode-setting circuit 93 is operable to set control circuit 7 in the price-setting mode only when the serviceman access means, i.e., panels 327 and 329, is open.

Price-setting module is about 2½"×4"×1" in size and is therefore of such a size that the serviceman can hold it in one hand, leaving this other hand free to operate the module by pressing the desired keys. Module 337 has a flexible cord 347 secured at one end to its body and at the other end to plug 343, this cord being of sufficient length, when extended, to allow the serviceman to stand in front of panel 327 while changing prices.

The only parts of switches 60–68 and 70 showing on module 337 are their respective actuator keys arrayed to form a numeric keyboard, indicated generally at 349. Switch keys 69 and 71 are not part of keyboard 349.

An alternative embodiment of price-setting module 337 is shown in FIG. 39 and designated by the reference numeral 351. Price-setting module 351 has a five-position rocker switch 353 in place of numeric keyboard 349. Rocker switch 353 is shown in its middle, i.e., off, position in FIG. 39. Moving switch 353 one position toward the word "UP" written on the module closes switch 73 (FIG. 16), while moving it to the second position in that direction also closes switch 75. Moving switch 353 one position toward the word "DOWN" closes switch 74 (FIG. 16), while moving it to the second DOWN position also closes switch 75 again.

For the convenience of the serviceman, display 15a is included in price-setting module 351 rather than on the front of vendor 1. Connection between module 351 and socket 345 is by a flexible cord 347a and a plug 343a, the plug having eleven additional pins to accommodate the display.

Another alternative embodiment of price-setting module 337 is a price-setting module 355 (FIG. 40) which has a dial 357 with prices indicated thereon. Module 355 includes a control knob 359 having a pointer 361 for indicating any one of the prices on the dial. A serviceman using module 355 selects prices by simply turning control knob 359 until pointer 361 points to the desired price. Module 355 is connected to socket 345 by a flexible cord 347b and a plug 343b. Each price printed on dial 357 has an associated switch, not shown, the closure of which indicates to MPU 11 the corresponding price. Appendix A must be modified slightly to allow MPU 11 to decode such switch closures.

An alternative to the embodiment of this invention shown in FIGS. 37–40 is shown in FIGS. 41 and 42. Switches 60–71 in this embodiment are mounted in a drawer 363 which, when a lock 365 is unlocked by the serviceman, pivots outwardly and downwardly about the bottom of the drawer until stopped by two stops 367 and 369 which are part of the rear of drawer 363. Drawer 363, therefore, also constitutes serviceman access means for access to price-setting switches 60–71. Switch 98 in this embodiment is mounted directly behind drawer 363, positioned so that when the drawer is closed control circuit 7 is in the vending mode and when drawer 363 is open circuit 7 is in the price-setting mode. Switch 98, therefore, also constitutes means for ensuring that control circuit 7 is in its vending mode when the serviceman access means is closed.

The operation of control circuit 7 is as follows: Microprocessor 11 performs its logic and arithmetic operations in the order determined by its program (App. A). It will, however, when a Low-to-High transition occurs at the $\overline{\text{RESET}}$ input (pin 40) read the data at a predetermined address, namely 2FFE and 2FFF, and start step-by-step operation of the program from the location specified in that predetermined address, no matter where it had previously been in the program. Microprocessor 11 also stops, or interrupts, its performing of the program when a Low appears at its $\overline{\text{IRQ}}$ input (pin 4). Upon a Low on the $\overline{\text{IRQ}}$ input, MPU 11 automatically reads the address stored at 2FF8, 2FF9 and begins performing the program from that stored address. (Motorola 6800 microprocessors read the data at FFFE, FFFF upon a Low-to-High transition at the $\overline{\text{RESET}}$ input and read the data at FFF8 and FFF9 upon a Low at the $\overline{\text{IRQ}}$ input. These addresses correspond to the above addresses in the current system.

A Low-to-High transition appears on the $\overline{\text{RESET}}$ input of MPU 11 during power on. It is supplied from clock 17 through connector PE and line L67 to the $\overline{\text{RESET}}$ input. MPU 11 then looks to address 83FE, 83FF and reads the address, 2000, stored there, which is the address of the power-on subroutine BOOT in the program. The first action MPU 11 takes in sub-routine BOOT is to set the noninterrupt mask of MPU 11 to avoid interrupts on the uninitialized system. Then it clears memory locations 0030–0076 in chip RAM1. These locations are used as a temporary storage, i.e., a scratchpad, for the values of several variables which MPU 11 uses in executing the program. The most important of these variables and their functions are explained below.

FLG5 is an eight bit status flag, each bit of which signifies a particular status when High. If FLG5=01, i.e., $b_0$ is High, it means that the CREM has been disabled. FLG5=02 means that the number to be displayed in displays 15a or 15b have a leading zero. FLG5=04 signifies a full escrow payback. FLG-08 indicates long delay needed. FLG5=10 tells the MPU to display the next digit on displays 15a and 15b. FLG5=20 tells MPU 11 to make change using the least number of coins. FLG5=40 signals the MPU to display two most significant digits, and FLG5=80 tells microprocessor 11 to load a price. Any number of bits may be set at any given instant. For instance, if leading zeroes are present and the CREM has been disabled, the value of FLG5 is 03.

FLG6 and FLG7 are status flags used to control the elevator and the payback operation of vendor 1.

TBC is a buffer for time-base-clock 113. SPEED 1 is a buffer for timer or speed-sensor clock 107, which senses the speed of the elevator motor.

COIREG is a buffer for storing information concerning the detection of a coin or bill upon deposit thereof in vendor 1 by the customer. INV04 is where the total accumulated sales figure is stored in chip RAM1. CREDH is where the customer's total credit is stored. The number of coins and bills of a particular kind deposited by the customer are stored in FENIC (nickels), FEDI (dimes), FEQUAR (quarters), FEONEC (dollar coins), FEONEB (dollar bills), and FETWO (two-dollar bills) for use in returning to the customer the exact kinds and number of coins and currency he deposited, i.e., a full-escrow payback.

COSTH is where the cost of the selected item is stored. CONTYP is used as a buffer in determining the type of coin/currency deposited and to be returned.

The column information of a selection is stored in the buffer HORSOL while the row information is stored in the buffer SELECT. Price information from switches 60-71 is stored in KEYBD1 and KEYBD2. The PRICE variable, which starts at address 0084, is not used in this embodiment of the invention.

The first forty-eight bytes of chip RAM1, 0000-002F, are used for the stack of MPU 11. Of course, the relative positions of the stack and the scratchpad could be reversed, but it would have the disadvantage that under abnormal conditions the stack could push data down into the scratchpad, thereby altering information stored there. With the present circuit on the other hand, abnormal conditions lead the vendor into a reset condition and restore normal operation for the next vend.

Next, the input/output (I/O) of the system is configured by MPU 11. That is, PIAs PIA1-PIA6 are configured to act as inputs and outputs as required. As is explained in "M6800 Microcomputer System Design Data" (Motorola, 1976) each PIA has two Output Interface Registers (or Peripheral Registers) normally called the A and B registers, two Data Direction Registers (one for each Output Interface Register) and two Control Registers (one for each Output Interface Register). In the program the Data Direction Register for the "A" Output Interface Register and that Interface Register itself are indicated by the PIA number with the suffix AD, while the "B" Data Direction Register and the "B" Output Interface Register are indicated by the PIA number and the suffix BD. For example, the Data Direction Register for the A side of chip PIA2 is indicated by the symbol PIA2AD and the symbol for the B side Data Direction Register is PIA2BD. The Control Registers are identified similarly, except the suffixes are AC and BC. Hereinafter in the specification the Data Direction Register will be distinguished from the Output Interface Register by designating the latter by its PIA number and the suffix A or B only.

The Output Interface Registers each have eight peripheral data lines associated with them. The peripheral data lines associated with the "A" Output Interface Registers have the standard designation PA0-PA7 while those for the "B" Registers have the standard designation PB0-PB7.

The Data Direction Registers determine whether the corresponding peripheral data line of the Output Interface Registers are inputs or outputs. For example, in configuring the I/O of the system, MPU 11 stores 3F, i.e., 0011 1111, in PIA2AD and PIA2BD. This makes peripheral data lines PA0-PA5 and PB0-PB5 of PIA2A and PIA2B outputs and peripheral data lines PA6-PA7 inputs. In terms of pin members of plug P1 (FIG. 12), pins 2-7 and 35-40 are outputs of pins 8-9 and 41-42 are inputs. A quick examination of the pins and their connections reveal that this is the proper configuration Pins 2-5 (FIG. 34), pin 6 (FIG. 33) pin 7 (FIG. 31), and pins 35-40 (FIG. 35) of plug P1 are indeed outputs, and pins 8 and 9 (FIG. 32), pin 41 (FIG. 16) and pin 42 (FIG. 36) are inputs.

MPU 11 addresses the "A" side of each PIA by supplying a Low on address line A1, which is connected to pin 35 of all the PIAs. A High on line A1, on the other hand, addresses the "B" side of the particular PIA selected.

When a peripheral data line is programmed as an output, the signal supplied on the corresponding data line from MPU 11 to the PIA appears directly on that peripheral data line. Conversely, if a peripheral data line is programmed as an input, the signal level present on that peripheral data line appears directly on the corresponding data line of MPU 11 during a read operation. Using the above example, peripheral data line PA2 of PIA2A has been programmed as an output. If MPU 11 then supplies a High on data line D2 to PIA2A, specifically to the D2 pin (pin 31) of chip PIA2, peripheral data line D2 of PIA2A goes High. Peripheral data line PA7 of PIA2A is an input. If the signal level present at PA7 is a Low, for example, during the time MPU 11 reads PIA2A, the Low will appear on data line D7 of the MPU, by way of pin 26 (the D7 pin) of chip PIA2 and line D7a.

After initializing the Data Direction Registers, the microprocessor initializes the Control Registers to enable some interrupts. Each PIA has two interrupt input lines for its "A" register, indicated by the reference characters CA1 (pin 40 of the PIA) and CA2 (pin 39), as well as two such lines for its "B" side, viz., CB1 (pin 18) and CB2 (pin 19). Inputs on the CA1 and CA2 input lines can cause an "A" register interrupt output, indicated $\overline{IRQA}$ (pin 38) to go Low. Likewise inputs on the CB1 and CB2 interrupt input lines can cause an $\overline{IRQB}$ (pin 37 of that PIA) interrupt output to go Low. The specific voltage levels necessary to cause these $\overline{IRQ}$ outputs to go Low are determined by the contents of the Control Registers associated with the particular PIA and are explained in the above-mentioned Motorola publication. The $\overline{IRQA}$ and $\overline{IRQB}$ outputs of all the PIAs are directly connected to the $\overline{IRQ}$ input (pin 4) of MPU 11 by a line L117. A Low on line L117 caused by any one of the PIAs will appear at the $\overline{IRQ}$ input of MPU 11 and cause it to commence its interrupt sequence.

As an example of enabling interrupts, in subroutine BOOT 72 the microprocessor loads the value 07 into PIA2BC, PIA3BC, PIA5BC and PIA1AC. As a result the $\overline{IRQB}$ output (pin 37) of chip PIA2 will go Low whenever its CB1 input (pin 18) goes High. Using the "A" register of chip PIA1 as another example, its $\overline{IRQA}$ output (pin 38) will go Low whenever its CA1 input (pin 40) goes High.

The CA1 input of chip PIA1 is connected through pin 9 of plug P2 to the output of nickel indicator circuit 129 (FIG. 23). When a nickel is deposited in vendor 1, the output of circuit 129, and therefore the CA1 input of PIA1A (FIG. 6), goes High generating an interrupt signal on line L117. Likewise the CB1 input of chip PIA5 (FIG. 14) is connected through pin 38 of plug P2 to the output of dime indicator circuit 131 (FIG. 23), the CB1 input of chip PIA 3 (FIG. 12) is connected through pin 20 of plug P1 to the output of quarter indicator circuit 133 (FIG. 23), and the CB1 input of chip PIA2 (FIG. 12) is connected through pin 25 of plug P1 to the output of dollar coin indicator circuit 135 (FIG. 23). Whenever a coin is deposited into vendor 1, one of these PIAs will generate an interrupt signal.

Figure 12:
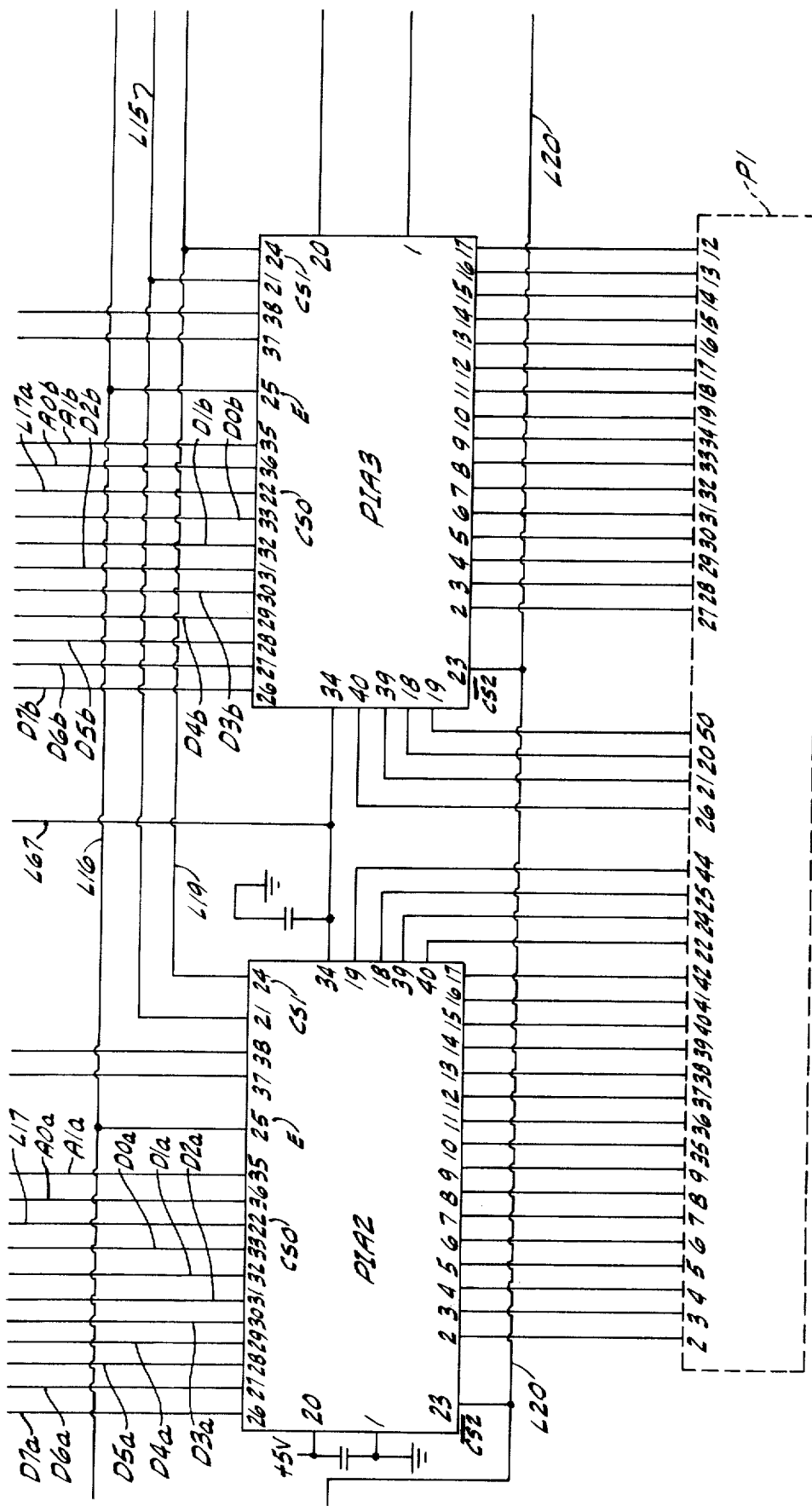
FIG. 12 is a circuit diagram showing two more of the peripheral interface adapters used in this invention.

After initializing the coin interrupts, MPU 11 checks the status of vendor 1. Specifically, in subroutine MAC-STA MPU 11 determines if the elevator is at delivery station 105. It does this by testing line PB4 of chip PIA5 (pin 14) which is connected through pin 10 of plug P2 to the output of gate 235 of interlocking circuit 227 (FIG. 32). Line PB4 will be High if the elevator is in fact at delivery station 105, since only then is the blade of elevator location switch 229 (FIG. 32) in contact with contact 229a. If the elevator is not at the delivery station, MPU 11 tests line PB7 chip PIA2 (in subroutine TM180D) to determine if the tray motor is at the 180° off home position. Line PB7 (FIG. 12) is connected through pin 42 of plug P1 to the output of gate 325 (FIG. 36). This output, as explained above, is High when down relay N is energized, which occurs while the tray motor is in its 180° position and the elevator is up at one of the levels or headed back down to the delivery station. If the tray motor is in fact at the 180° position, MPU 11 supplies a High to line PA4 of chip PIA2 (FIG. 12). This High is supplied through pin 6 of plug P1 to run relay circuit 241 (FIG. 33) where it causes relay solenoid 245 to be energized, thereby causing the elevator to move down to delivery station 105.

Once the elevator reaches the delivery station, MPU 11 jumps to subroutine RDTOSL where it retrieves accumulated total sales information from chip EAROM1. The microprocessor supplies the address of the total accumulated sales figure, i.e., 1D, to PIA1A (FIG. 6). This causes pins 2 and 4-6 of chip PIA1 to go High and pin 3 to go Low. Pins 2-6 of chip PIA1 are connected to the address lines (pins 19-23) of chip EAROM1 (FIG. 7) by lines A0f-A4f, so these signals from chip PIA1 address word 1D in chip EAROM1. MPU 11 also causes pins 8 and 9 of chip PIA1 to go High and pin 7 to be Low. The High on pin 9 is supplied on a line L119 to a NAND gate G35 (FIG. 8), the other input of which is normally High. The resulting Low output of gate G35 is inverted by an inverter 365 and supplied on a line L121 to pin 27, the chip select input, of chip EAROM1, thereby selecting it. The High on pin 8 and the Low on pin 7 of chip PIA1 (FIG. 6) are supplied to pins 25 and 26 respectively of chip EAROM1 (FIG. 7). Pins 25 and 26 of chip EAROM1 are mode control inputs. A High on pin 25 and a Low on pin 26 put chip EAROM1 in the read mode.

Before MPU 11 can read the information stored at address 1D in chip EAROM1, however, it must clock the EAROM. This is done through PIA1B (FIG. 6). Pin 19 of chip PIA1, the CB2 pin, is connected to the clock input (pin 18) of chip EAROM1 (FIG. 7). MPU 11 programs the CB2 pin to be an output and causes its signal level to go High and then back Low. This clocks chip EAROM1 and, after a required access time, MPU 11 reads the data stored in chip EAROM1 at address 1D.

MPU 11 reads the eight most significant bits of the data stored at 1D in chip EAROM1 through chip PIA6 (FIG. 6). These eight most significant bits are supplied from data pins D8-D15 (pins 9-16) of chip EAROM1 via lines L51, L53 . . . , L65 to the PB0-PB7 peripheral data lines (pins 10-17) of chip PIA6 (FIG. 6) where they can be read by MPU 11. MPU 11 stores these bits in the buffer COSTH. The eight least significant bits of the data are supplied from data pins D0-D7 (pins 28, 1-6, and 8) of chip EAROM1 via line L35, L37, . . . , L49 to the PB0-PB7 peripheral data lines (pins 10-17) of chip PIA1 (FIG. 6). The MPU stores these bits in buffer COSTH+1, and stores the contents of COSTH+1 and COSTH in INVO4+1 and INVO4. In the same way, MPU 11 then reads the data stored at address 1E in chip EAROM1 and stores this in locations INVO4+2 and INVO4+3. Of course, it is not absolutely necessary that the total sales figure be stored in chip RAM1 and be updated there. It is also directly updated in chip EAROM1. It could be preferable to update the total accumulated sales figure in chip RAM1, however, and to store it in chip EAROM1 only upon the occurrence of a power loss or the like because the EAROMs have a relatively small upper limit on the number of times that data may be written in each address. Updating the total accumulated sales figure in the EAROMs after every sale might in some applications fatigue the EAROM.

After obtaining the total sales figure from chip EAROM1, MPU 11 energizes solenoid 223 (FIG. 31) to unlatch door 117. Solenoid 223 is energized by MPU 11 supplying a High on data line D5 to pin 28 of chip PIA2 while selecting the "A" side of the PIA, which causes the corresponding peripheral data line, P5A, to go High (FIG. 12). P5A (pin 7 of chip PIA2) is connected through pin 7 of plug P1 to door lock relay circuit 221 (FIG. 31). The High on plug P1, pin 7 turns on transistor Q29, thereby energizing relay 223 which through its contacts energize the lock solenoid.

Next, MPU 11 initializes a credit recall interrupt by loading the data 07 into PIA6BC (FIG. 6). This ensures that if the CB1 input of chip PIA6 goes High, chip PIA6 will cause its $\overline{IRQB}$ pin to go Low, which Low will be supplied on line L117 to MPU 11 to cause it to commence an interrupt sequence. The CB1 input (pin 18) of chip PIA6 is connected through pin 20 of plug P2 to the output of gate 181 in credit recall circuit 179 (FIG. 27), which output will be High if the customer presses the coin return switch.

MPU 11 also initializes payout request and clear total sales interrupts at this time by loading 07 into PIA6AC and PIA1BC. The CA1 input of chip PIA6 (FIG. 6) is connected through pin 1 of plug P1 to the output of inverter 191 in circuit 179 (FIG. 27). This output goes High, thereby generating an interrupt, if the serviceman presses one of the four switches for emptying the coin tubes. The CB1 input of chip PIA1 (FIG. 6) is connected through pin 1 of plug P2 to the output of gate 215 (FIG. 30). As explained above, the output of gate 215 goes High when the serviceman closes switch 213 to reset the total accumulated sales figure. This High output, because of the initialization of PIA1B, generates an interrupt.

Figure 13:
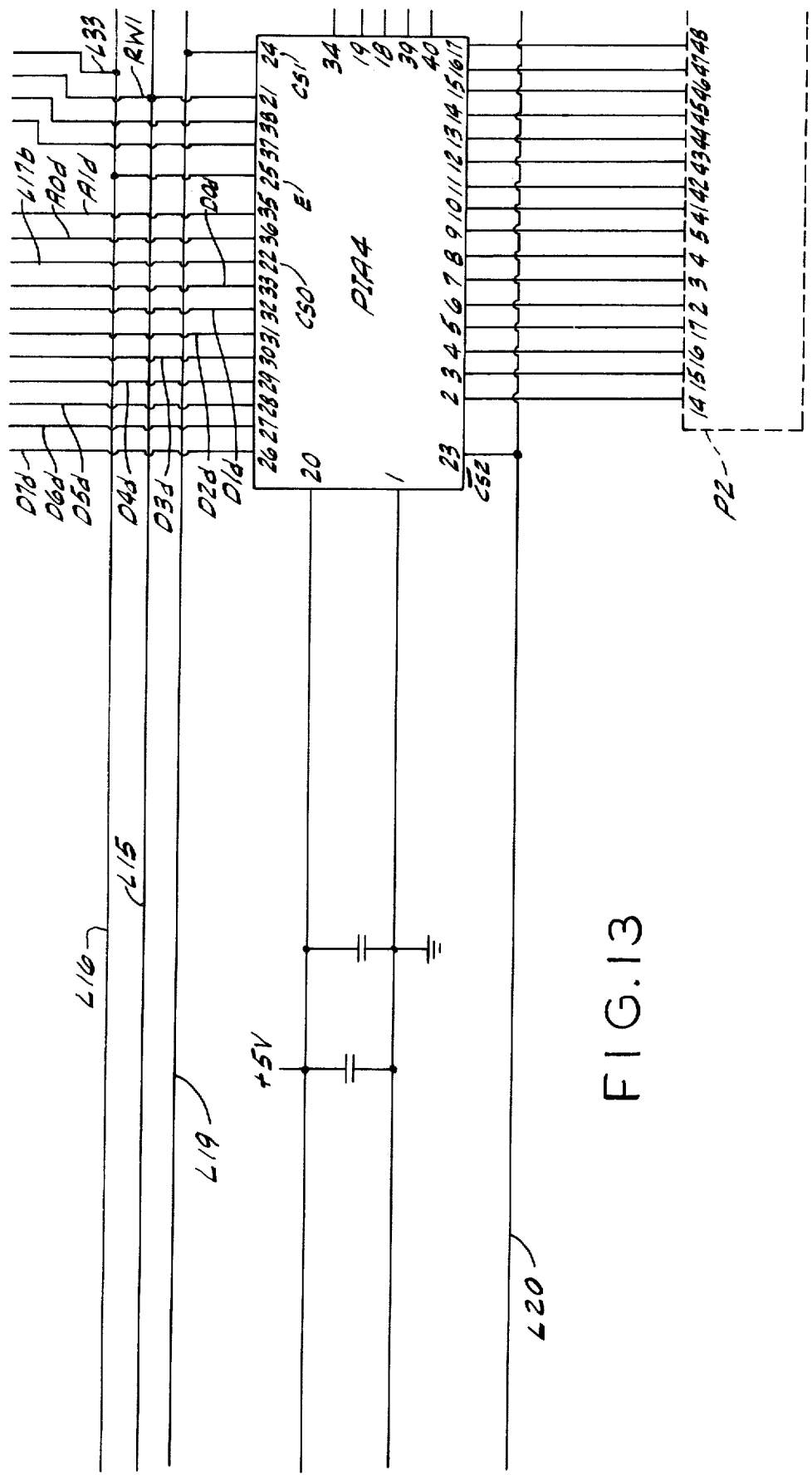
FIG. 13 is a circuit diagram showing an additional peripheral interface adapter used in this invention.
Figure 14:
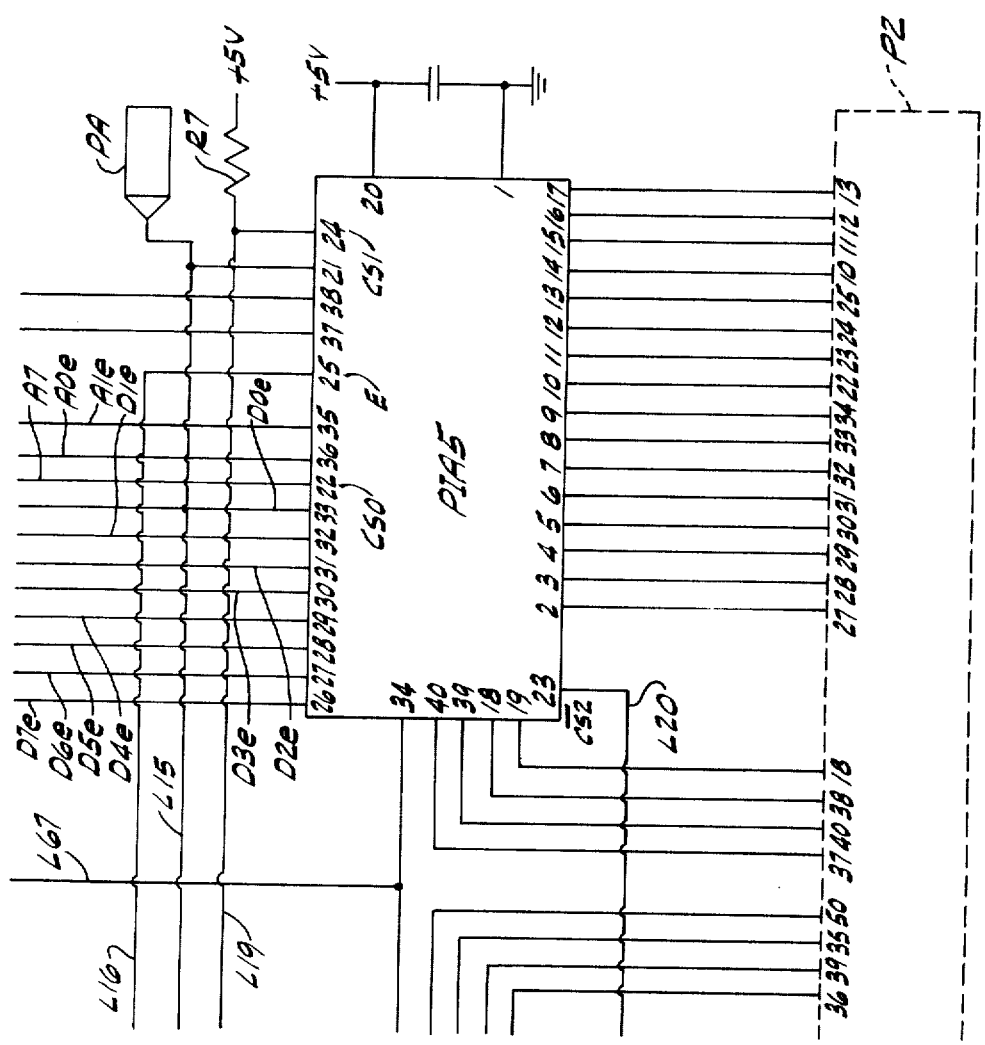
FIG. 14 is a circuit diagram showing the remaining peripheral interface adapter used in this invention.

Selection and price interrupts are next initialized by MPU 11 loading 1F into PIA4BC (FIG. 13). If either the CB1 or CB2 input of chip PIA4 goes High after this initialization, chip PIA4 will make its $\overline{IRQB}$ pin go Low, which will initiate an interrupt sequence in MPU 11. The CB1 input of chip PIA4 is connected through pin 35 of plug P2 to the output of gate G21 in mode setting circuit 93 (FIG. 17). The CB2 input is connected through pin 50 of plut P2 to the output of gate G23 in mode-setting circuit 93.

After initializing these interrupts, MPU 11 initializes dollar coin escrow circuit 173 (FIG. 25). The dollar coin escrow solenoid is not normally energized, and the initialization of circuit 173 ensures that this is the case. MPU 11 supplies the data 04 to PIA6A (FIG. 6) which makes peripheral data line PA2 (pin 4) of that PIA High. Data line PA2 of chip PIA6 is connected through pin 43 of plug P1 to escrow circuit 173 (FIG. 25). The High on plug P1, pin 43 ensures that line L89 is also High, which prevents energization of the dollar coin escrow solenoid. A Low on that pin, however, will result in energization of the escrow relay and the escrowing of dollar coins.

After initializing the dollar coin escrow circuit, MPU 11 sets product sensing circuit (product sensor) 99 (FIG. 18) for operation. Specifically, MPU 11 supplies the data 40 to PIA5BD. This causes data line PB6 of chip PIA5 (FIG. 14) to be High. Line PB6 (pin 16) is connected through pin 12 of plug P2 to a noninverting gate 367, the output of which is connected to the base of PNP transistor Q35 (FIG. 18), connected in the common collector configuration. LEDs 101 and 103 are connected on one side to the emitter of transistor Q35 and on the other to a +12 V source. The High on pin 12 of plug P2 removes bias from the base-emitter junction of transistor Q35. As a result LEDs 101 and 103 do not light. That is, the normal state of LEDs 101 and 103 is off. They will be turned on as required to sense items 3 at delivery station 105.

Next, MPU 11 reads the data from all the PIA Output Interface Registers in subrouting CLRINT. This clears any interrupts which may be present. During power-up, undesired interrupts are sometimes generated. Clearing these interrupts during the power-on sequence prevents these erroneous interrupts from causing a malfunction of control circuit 7.

The next step of the power-up subroutine is to pulse validator bill acceptor circuit 195 (FIG. 28) to ensure that the validator is in a known condition after power-up. MPU 11 accomplishes this by supplying 08 to PIA6A, causing peripheral data line PA3 of chip PIA6 (FIG. 6) to go High. This line (pin 5 of the PIA) is connected through pin 45 of plug P1 to circuit 195. The High output on line PA3 causes transistor Q23 to conduct, drawing line L105 Low, as is required to cause the validator to accept a bill. After a delay, MPU 11 causes line PA3 of chip PIA6 to go Low, which removes the Low from line L105.

Finally MPU 11 clears its non-interrupt mask and exits to standby routine or loop (FIRTS1) where it awaits interrupts. Control circuit 7 is now operational, ready to perform its various functions.

One function of control circuit 7 is to control a vend operation. Suppose a customer approaches vendor 1 and decides to purchase item 3i which costs $1.55, i.e., the price stored in chip EAROM1 for item 3i is $1.55. The customer first deposits a dollar coin in coin slot 5. The coin changer immediately sends a pulse to dollar coin indicator circuit 135 (FIG. 23). This pulse appears as a spike on pin 25 of plug P1 which is connected to the CB1 input (pin 18) of chip PIA2 (FIG. 12). As the CB1 input goes High, the $\overline{IRQB}$ output of chip PIA2 goes Low, supplying an interrupt signal on line L117 to the $\overline{IRQ}$ input (pin 4) of MPU 11. In response, the microprocessor jumps to location 83F8 and reads the address stored there, which is 27AD. MPU 11 then proceeds to execute the program from step 27AD, which is subroutine INTERP.

When MPU 11 receives an interrupt on line L117, it does not know which PIA generated it. Consequently, it must check, or poll, the various PIAs to determine which interrupt has been generated before it knows what action to take. First MPU 11 clears the carry bit, then it checks to see if time-base clock 113 (FIG. 20) caused the interrupt. MPU 11 then determines whether elevator speed sensor circuit 106 (FIG. 19), i.e., speed-sensor-clock 107, caused it. These steps are described in detail below in the discussion of the function of elevator control.

Next, microprocessor 11 checks for coin or currency interrupts. MPU 11 reads PIA3A (FIG. 12) whose PA3-PA7 peripheral data lines are connected through pins 30-34 of plug P1 to the outputs of dollar bill indicator circuit 123 (FIG. 22), dollar coin indicator circuit 135 (FIG. 23), quarter indicator circuit 133, dime indicator circuit 131 and nickel indicator circuit 129 respectively. Because it is a dollar coin that has been deposited, line PA4 will be High and MPU 11 will read 0001 0000 (binary). This information is temporarily stored in one of MPU 11's two accumulators.

MPU 11 then checks, in subroutine COI05, to see if a dollar coin has been deposited by examining bit 7 of PIA2BC (FIG. 12). When the dollar coin was detected, the output of gate 143 in dollar coin indicator circuit 135 (FIG. 23) went High. This High was supplied through pin 25 of plug P1 to the CB1 input of chip PIA2, setting bit 7 of control register PIA2BC High. Since this bit is High, a dollar coin caused the interrupt. Once this has been determined, MPU 11 disables the dollar coin interrupt by storing the data 04 in PIA2BC. It then clears the interrupt by reading PIA2B.

The output of PIA3A, i.e., 0001 0000 (binary) is then temporarily stored in the buffer COIREG. Note that since different coins or bills will cause different bits of PIA3A to be High, the contents of COIREG will uniquely represent the type coin/currency deposited in vendor 1. After the coin information is stored in COIREG, MPU 11 initializes an anti-jackpot delay (AJD) corresponding to a dollar coin. Each type coin has its own AJD which is used to keep the interrupt for that coin disabled during its passage through the coin sensor in the coin handler. This prevents coins with the center drilled out, i.e., washer-shaped coins, from interrupting twice and thus being credited twice. Of course, the transit time through the sensor will depend upon the sensor's beam width, the diameter of the coin, the inclination of the coin channel, the coefficient of friction between the coin and the channel and other similar factors. As a result the anti-jackpot delay for each coin is likely to differ depending upon the particular make or model of coin handler in vendor 1. For this particular coin handler the AJD for dollar coins is 70 milliseconds; for quarters, 40 ms; for dimes 70 ms; and for nickels 30 ms. Of course, new values should be obtained for the AJDs, in light of the above factors, when using control circuit 7 with any other coin handler.

MPU 11, after setting the AJD for the dollar coin, enables interrupts from time-base-clock 113, in subroutine VEND0B, by loading the data 07 into PIA4AC (FIG. 13). This ensures what when input CA1 of PIA4A goes High, an interrupt will be generated. The CA1 input of PIA4A is connected through pin 36 of plug P2 to time-base-clock 113 (FIG. 20). Whenever clock 113 generates a pulse, which is every ten ms., MPU 11 will be interrupted. MPU 11 uses these time-base-clock interrupts to measure the anti-jackpot delay of the coins.

After enabling the time-base-clock interrupt, MPU 11 clears all present interrupts, in subroutine CLRINT as described above, and jumps to subroutine CONTSK where the customer's credit is developed. In CONTSK, MPU 11, after identifying the coin as a dollar, erases COIREG, and energizes the $1-coin escrow relay by storing the data "00" in PIA6A (FIG. 6). This causes peripheral data line PA2 of chip PIA6, which is connected through pin 43 of plug P1 to $1-escrow relay circuit 173 (FIG. 25) to go Low. As a result line L89 of circuit 173 provides a ground path for the dollar coin escrow relay, causing it to be energized and thereby trapping the dollar coin in the escrow position in the coin handler.

The customer's credit, stored in buffers CREDH+2 and CREDH+3, is updated by MPU 11 to reflect the deposit of the dollar coin. Specifically MPU 11 stores 01 in CREDH+2 and 00 in CREDH+3. This is a binary-coded decimal (BCD) representation of the customer's credit. In other words, MPU 11 is responsive to the interrupt signal from PIA2B, which is an input thereto indicating the deposit of money, i.e., a dollar coin, to determine the amount of credit accumulated as a result of that deposit.

Microprocessor 11 next tests whether the number of dollar coins deposited by the customer is greater than twenty. MPU 11 does this for all types of coins to limit scavenging. Control circuit 7 returns exactly the same number of each type of coin that the customer has deposited upon the closing of a coin return switch CR. A customer wishing to take advantage of this feature could insert, e.g., fifty dimes into vendor 1, and receive the bottom fifty coins in the dime change tube upon pressing coin return switch CR. Clearly such a customer could readily empty the coin change tubes. To prohibit this, control circuit 7, as mentioned above, tests the contents of the specific number-of-coin buffers, e.g., FEDI, everytime a coin of that type is inserted into vendor 1. If the number of coins of that type exceeds twenty, MPU 11 disables the CREM and returns the customer's credit in the sane coin types as was entered. The CREM is disabled by MPU 11 supplying a signal through PIA3B to CREM control circuit 177 (FIG. 26). As the program is written, MPU 11 also disables the CREM whenever the customer's accumulated credit is over $4.95. The return of the customer's credit is discussed below.

In our example where the customer has deposited only one dollar coin, the CREM is not disabled and MPU 11 stores the fact that a dollar coin has been inserted by storing the data 01 in dollar-coin buffer FEONEC.

As mentioned above, during the anti-jackpot delay for the dollar coin, the time-base-clock 113 (FIG. 20) interrupts every 10 ms. After seven of these interrupts, MPU 11 determines through subroutine TCB01 that the AJD for the dollar coin has expired, so it reenables the dollar coin interrupt. Enabling of the dollar coin interrupt is accomplished by storing the data 07 in PIA2BC (FIG. 12). By thus setting the first two bits of PIA2BC High, MPU 11 ensures that a High on input CB1 of chip PIA2 will generate an interrupt. As explained above, this input will go High only when dollar coin indicator circuit 135 (FIG. 23) indicates the deposit of another dollar coin.

It should be noted that the customer's credit is stored in the number of coin buffers, e.g., FEONEC, and in credit buffers CREDH+2 and CREDH+3. The number of coin buffers and the credit buffers have different functions, however. The number of coin buffers are used to return coins in full-escrow while the credit buffers are used to allow purchase of an item 3. These buffers are independent, and incorrect data contained in one does not prevent the other from functioning correctly.

After enabling the dollar coin interrupt and storing the customer's credit as outlined above, MPU 11 returns to standby loop FIRTSI, which includes the display subroutine DISPLY. In subroutine DISPLY, MPU 11 determines if control circuit 7 is in the vending mode or the price-setting mode by testing PIA5B. Peripheral data line PB1 of chip PIA5 (FIG. 14) is connected through pin 23 of plug P2 to the output of gate 97 in mode-setting circuit 93 (FIG. 17). When control circuit 7 is in the vending mode the output of gate 97 is Low.

MPU 11 is responsive to the resulting Low on line PB1 of chip PIA5 to branch to DISP72 which starts a credit/total sales display subroutine.

In the credit/total sales subroutine, MPU 11 sequentially displays the digits of the total accumulated sales figure and then the digits of accumulated credit as follows: Display 156 has six seven-segment display digits or units arranged in a linear array which are used to display the total accumulated sales figure. (The most significant digit, i.e., MSD, of that display is shown at the bottom of display 15b on FIG. 15 while the least significant digit, i.e., LSD, of that display is shown at the top.) Therefore, display 15b can display six digits of a total accumulated sales figure. These six digits are stored in BCD form in total sales inventory buffers INV04+1, INV04+2 and INV04+3, the two MSDs being stored in INV04+1. Suppose that the total accumulated sales figure before our hypothetical customer approached vendor 1 was $10.95. In that case the contents of INV04+1=0000 0000 (binary), the contents of INV04+2=0001 0000 (binary), and the contents of INV04+3=1001 0101 (binary). MPU 11 reads the contents of INV04+1 and stores this in one accumulator. It then tests the highest four bits, corresponding to the value that should appear in the MSD of display 15b, to determine if that value is a zero. It is, so it masks the MSD of display 15b. Masking of any digit of displays 15a and 15b is accomplished by supplying 1s to pins 27-30 of plug P2, while selecting the digit for display. Pins 27-30 of plug P2 are directly connected to the BCD input pins of decoder 47. The output of decoder 47 is supplied to driving transistors Q2-Q8 which drive the segments of whichever digit in the displays is selected at that time. Selection of a digit is accomplished by causing the output of one of inverters 49-58 to go Low. Each inverter is connected to a single digit of the displays, so the Low output of that inverter, while the outputs of the others are High, causes its digit to be energized, displaying the numeral corresponding to the signals supplied from decoder 47 at that time. When the signals at all the BDC inputs of decoder 47 are High, however, the output of the decoder is such that none of the segments in the selected digit are lit. For example, to mask the MSD of display 15b as required, MPU 11 stores the data "4F" in PIA5A. This causes peripheral data lines PA0-PA3 of chip PIA5 (FIG. 14) to be High. These Highs are supplied over pins 27-30 of plug P2 to decoder 47 (FIG. 15), resulting in a masking output thereof. Line PA6 of chip PIA5 is also High. This High is supplied through pin 33 of plug P2 to inverter 58. The resulting Low selects the MSD of display 15b but since the BCD inputs to decoder 47 are all 1s no numeral is displayed.

MPU 11 then tests the lowest four digits of buffer INV04+1 which contain the value of the second MSD of displays 15b. These are also zero, so MPU 11 masks that digit by supplying the data 8F to PIA5A. This again causes lines PA0-PA3 of chip PIA5 to go High, masking any selected digit. Line PA7 is also High at this time. Line PA7 is connected through pin 34 of plug P2 to inverter 57 (FIG. 15), whose output is connected to the second MSD, i.e., the second digit from the bottom, of display 15b. The second MSD is, therefore, selected and masked by MPU 11.

Next, MPU 11 tests the contents of the highest four bits of buffer INV04+2. Since the value of these bits is not zero, but rather 1, MPU 11 does not mask the next digit. Nor, once it has detected a non-zero digit on a display will it mask lower zero digits. MPU 11 then causes display 15b to display the numeral "1" in its third MSD, i.e., that digit third from the bottom of the display, by storing the data 01 in PIA5A and the data 80 in PIA4A. This causes peripheral data line PA0 to be High and lines PA1-PA3 to be Low. Decoder 47 is responsive to this particular set of signal levels to send out signals to light the numeral "1" on the selected digit. Supplying the data 80 to chip PIA4 causes its PA0-PA6 lines to be Low and its PA7 line to be High. The PA7 line of chip PIA4 is connected through pin 5 of plug P2 to gate 84 (FIG. 16), which is connected by a line L123 to inverter 56. Inverter 56 is connected to the third MSD of display 15b, so when its output goes Low, that digit will display the numeral "1", which is the most significant non-zero digit of the total accumulated sales figure. However, as mentioned above, inverter 56, along with inverters 53-55 and 57-58, is normally disabled, so although MPU 11 continuously supplies the total accumulated sales data to display 15b, this display is not activated until the serviceman uses his key 203 (FIG. 30).

MPU 11 then supplies the data 00 to PIA5A and the data 40 to PIA4A. Peripheral data line PA6 of chip PIA4 is therefore the only High line of PIA4A, while the output of decoder 47, controlled as above by the output of lines PA0-PA3 of chip PIA5, corresponds to the displaying of the numeral "0". Line PA6 of chip PIA4 is connected through pin 4 of plug P2 to gate 83 which is in turn connected by a line L125 to inverter 55. If inverter 55 were enabled, therefore, display 15b would at this time display the numeral "0" in the third digit from the top.

In exactly the same manner, MPU 11 then supplies display 15b with the numeral "9" in the second digit from the top of the display. This digit is selected by the data 20 being stored in PIA4AD, causing line PA5 of chip PIA4 to be High while the other peripheral data lines are Low. Line PA5 is connected through pin 3 of plug P2 to gate 82 (FIG. 16), which is connected through a line L127 to inverter 54. MPU 11 then supplies the numeral "5" to the top digit in display 15b. That digit is selected by storing the data 10 in PIA4A. Line PA4 of chip PIA4 goes High and through pin 2 of plug P2 supplies that High to gate 81 (FIG. 16). Gate 81 is connected through a line L129 to inverter 53, which is connected to the top digit, i.e., the LSD of display 15b. When enabled by key 203, display 15b displays 10.95, the total accumulated sales figure. Of course, because MPU 11 performs this step very rapidly, it appears to the naked eye that all the digits are lit at the same time.

After displaying, or attempting to display, the total accumulated sales figure, MPU 11 causes the customer's credit to be displayed. Display 15a, like display 15b, has its MSD at the bottom on FIG. 15. The two LSDs of display 15a are at the top of the display. The digits of display 15a are selected by MPU 11 causing peripheral data lines PA0-PA3 of chip PIA4 to be High. A High on line PA3 is supplied through pin 17 of plug P2 to gate 80, a High on line PA2 is supplied through pin 16 of plug P2 to gate 79, a High on line PA1 is supplied through pin 15 of plug P2 to gate 78, and a High on line PA0 is supplied through pin 14 of plug P2 to gate 77. Gates 77-80 are connected by four lines L137, L135, L133 and L131 to inverters 49-52.

Display of the customer's credit, therefore, proceeds as follows: MPU 11 first examines the four highest bits if the contents of buffer CREDH+2. As the reader will recall, the contents of buffer CREDH+2=0000 0001 (binary) and the contents of CREDH+3=0000 0000 (binary). MPU 11 thus detects a leading zero, which it masks by storing the data 0F in PIA5A. The most significant digit of display 15a is selected by MPU 11 storing the data 08 in PIA4AD. This causes line PA3 of chip PIA4 to be High and therefore the output of inverter 52 to be Low. Because of the masking of leading zeros, however, no digit is displayed.

Next, MPU 11 examines the next four bits of buffer CREDH+2, finds their value is non-zero and displays their value by supplying the data 01 to PIA5AD and the data 04 to PIA4AD. The signal to chip PIA4 causes line PA2 thereof to be High, which selects the second MSD of display 15a. The numeral "1" is therefore displayed in the second MSD of display 15a. MPU 11 then determines the value of the contents of the highest four bits of buffer CREDH+3 and causes it to be displayed by supplying the data 00 to PIA5D and the data 02 to PIA4D, the first to cause the numeral "0" to be displayed, the second through gate 78 and inverter 50 to select the second LSD of the display. Finally, MPU 11 determines the value of the least four bits of buffer CREDH+3 and causes it to be displayed in the LSD of display 15a by supplying the data 00 to PIA5AD and the data 01 to PIA4AD.

Line PA2 of chip PIA4, in addition to being used to select the second MSD of display 15a, is also used to refresh the decimal point of display 15a. To refresh the decimal point MPU 11 causes line PA2 to be High and also caused line PA5 of chip PIA5 to be High. The High on line PA5 of chip PIA5 is supplied through pin 32 of plug P2 to an inverter 369 (FIG. 15), the output of which is connected to the base of PNP transistor Q37, the collector of which is connected to the decimal point of display 15a. When line PA5 goes High, the output of inverter 369 goes Low and Transistor Q37 conducts. If line PA2 of chip PIA4 is High at the same time, a circuit is completed from transistor Q37 through the decimal point of display 15a to inverter 51, which refreshes the decimal point.

Consequently, shortly after the customer deposits his dollar coin in vendor 1, display 15a displays "1.00", i.e., his credit. This display, with the decimal point, is continuously refreshed. Thus, MPU 11 is responsive to control circuit 7 being in the vending mode and to the deposit of money in vendor 1 to determine the amount of credit accumulated as a result of the deposit and to supply to display means 15 a signal corresponding to the accumulated credit, which credit display circuit 15 thereupon displays. Also, it is clear that display 15 comprises a plurality of display units, each of which is adapted to display one digit of the customer's accumulated credit.

After the customer deposits the dollar coin into vendor 1, suppose he also deposits a quarter. Quarter indicator circuit 133 (FIG. 23) will then supply a High through pin 32 of plug P1 to peripheral data line PA5 of chip PIA3 (FIG. 12) and a spike through pin 20 of plug P1 to the $\overline{CB1}$ input of chip PIA3. The High input causes the $\overline{IRQB}$ pin of chip PIA3 to go Low. This $\overline{IRQB}$ pin, like all those of control circuit 7, is connected by line L117 to the $\overline{IRQ}$ input of MPU 11. Therefore, the deposit of a quarter generates an interrupt. MPU 11 goes through the same sequence of program steps described before but, instead of finding a dollar coin interrupt, it continues executing the program and finds a quarter interrupt by reading PIA3BC. MPU 11 updates the customer's credit by storing 25 in buffer CREDH+3 and updates the number of quarters buffer by one, making FEQUAR=01. In exactly the same manner as in the case of the dollar coin, MPU 11 updates the display of the customer's credit on display 15a. This time, however, the contents of CREDH+3 are no longer zero, but are rather "25" so the next to the last numeral displayed will be "2" and the numeral displayed in the LSD of the display will be "5". At this point, the customer has accumulated $1.25 credit.

He inserts another quarter. MPU 11 responds exactly as in the case of the first quarter, except that it updates the contents of buffer CREDH+3 to 50 and the contents of number of quarters buffer FEQUAR to 02. Note that prior to the deposit of this second quarter, the contents of buffer CREDH+3 was 0010 0101 (binary). MPU 11 adds 0010 0101 (binary) to this figure to obtain 0100 1010 (binary), which is 4A in hexadecimal notation, and then converts this binary figure to 0101 0000, the BCD representation of 50 (decimal). It is this representation of the customer's credit that is stored in buffer CREDH+3. MPU 11 then updates display 15a to reflect the customer's new total credit.

The customer then deposits a third quarter. In response MPU 11 updates credit buffer CREDH+3 to 75 and the number of quarters buffer to 03. The customer's total credit is now $1.75, which is sufficient to buy item 3i, which costs only $1.55. The customer looks at display 15a, having forgotten how much money he has put in, sees he has enough money to buy item 3i and presses selection switch 13i (FIGS. 1 and 15).

Before discussing item selection, it should be pointed out that, although the above example of credit handling and coin indentification concerned only dollar coins and quarters, MPU 11 handles these functions for dollar bills, dimes and nickels in substantially the same way. The only real differences are in the particular peripheral data lines of chip PIA3 that go High upon the detection of a specific coin and in the specific PIA interrupt inputs (CA1 and CB1) that generate the interrupt. When a nickel is detected, peripheral data line PA7, connected through pin 34 of plug P1 to nickel indicator circuit 129 (FIG. 23) goes High, as does the CA1 input of chip PIA1, which is connected to circuit 129 through pin 9 of plug P2. When a dime is detected, the peripheral data line that goes High is line PA6. Line PA6 of chip PIA3 is connected through pin 33 of plug P1 to dime indicator circuit 131. The detection of a dime also causes the CB1 input of chip PIA5, which is connected through pin 38 of plug P2 to circuit 131, to go High. Finally, the detection of a valid dollar bill causes line PA3 of chip PIA3 and the CA1 interrupt input of chip PIA2 to go High. Line PA3 is connected to dollar bill indicator circuit 123 through pin 30 of plug P1 while the CA1 pin of chip PIA2 is connected thereto through pin 22 of plug P1.

From the above description of the standby subroutine FIRTS1 and the subroutine DISPLY contained therein, it should be clear that when MPU 11 is not servicing an interrupt it is continuously sequentially activating, or attempting to activate, the digits of displays 15b and 15a. As a result, every few microseconds pin 5 of plug P2 goes High. Shortly thereafter pin 4 of plug P2 goes High, and shortly after that pin 3 of plug P2 goes High. Pins 2, 17, 16, 15 and 14 in their turn also go High, and after MPU 11 causes pins 33 and 34 of plug P2 to go High the cycle repeats. Pins 2-5 and 14-17 of plug P2 are connected to gates 77-84 (FIG. 16) which are in turn connected to selection switches 13. When the customer presses selection switch 13, therefore, the momentary High output of gate 78 is supplied through switch 13i and resistor R22 to ground and through that switch and resistor R29 to NOR gate G19. The resulting Low output of gate G19 is supplied on line L69 to gate 95 (FIG. 17) and from there to NOR gate G21. The other input to gate G21 is also Low since mode-setting switch 98 is in the vend position, so the output of gate G21 is a High. This High is supplied through pin 35 of plug P2 to the CB1 input of chip PIA4 (FIG. 13), which causes the $\overline{\text{IRQB}}$ output of chip PIA4 to go Low. This Low, as explained above, is supplied on line L117 to the $\overline{\text{IRQ}}$ input of MPU 11 and in response thereto MPU 11 initiates an interrupt sequence by jumping to subroutine INTERP.

As in the case of the coin generated interrupts, MPU 11 first checks for a time-base-clock 113 interrupt, next for a speed-sensor-clock 107 interrupt, and then for coin/currency interrupts. This time the search for a coin/ interrupt is also unseccessful, so MPU 11 performs the next step in subroutine INTERP, which is to determine if the interrupt was a selection interrupt. To identify a selection interrupt, MPU 11 reads PIA4BC and tests bit 7 thereof to see if it is High. Bit 7 was set High when the CB1 input of chip PIA4 went High, so MPU 11 branches to the selection subroutine SEL1. In subroutine SEL1 MPU 11 first disables several interrupts, including the selection interrupt from chip PIA4, by loading the data O4 into PIA4BC (disabling the selection interrupt), PIA6BC (disabling the credit recall interrupt), PIALBC (disabling the clear total sales interrupt), and PIA6AC (disabling the coin tube payout request interrupt).

Next MPU 11 determines which selection switch has been closed by strobing the peripheral data lines of PIA4A and reading the peripheral data lines of PIA4B. Together with selection switches 13a-13x, PIA4A and PIA4B constitute means for supplying a vendor status input indicating the selection of an item 3 to MPU 11. Data lines PA0-PA7 of chip PIA4 are connected through pins 14-17 and 2-5 of plug P2 gates 77-84 to the rows of switch matrix 76, which consists of selection switches 13a-13x and switches 60-71, 73 and 74. Data lines PB0-PB5 of chip PIA4 are connected through gates 86-91 and resistors R27-R32 to the columns of that matrix. MPU 11 can thus detect which selection switch, or other switch in matrix 76 for that matter, has been closed simply by determining the pair of lines, one from lines PA0-PA7 and the other from lines PB0-PB5 that have a circuit completed through them. For example, MPU 11 first causes linePA0 of chip PIA4 to go High. This High is supplied through pin 14 of plug P2 and gate 77 to switches 13a-13f. MPU 11 then reads lines PB0-PB5 of chip PIA4. But since none of switches 13a-13f are closed, the outputs of gates 86-91 are all Low, so lines PB0-PB5 are also all Low. MPU 11 then causes line PA1 to go High, by storing the data 02 in PIA4A. This High is supplied through pin 15 of plug P2 and gate 78 to switches 13g-13l. Since switch 13a is closed the High is further supplied through resistor R29, gate 89 and pin 43 of plug P2 to data line PB2 of chip PIA4. MPU 11 reads PIA4B and thereby detects the High on line PB2, indicating a switch closure in the third column. It stores this information in the selection buffer SELINF+1 by loading the data 04 therein and stores the row information by storing the data 02 in buffer SELINF. Having found the closed switch and stored this information in the appropriate buffers, MPU 11 does not continue testing for switch closures but instead jumps to subroutine SEL06.

In subroutine SEL06, MPU 11 determines the position number of the item selected. The position number of item 3a is "01", that of item 3b is "02", that of item 3g is "07" and so forth. The position number of item 3i, the selected item, is "09". The address in chip EAROM1 where the prices are stored corresponds to the particular position numbers of the items. For example, the price of item 3i is stored in address "09" in chip EAROM1. In determining the position number of the selected item, MPU 11 stores the selection's column information in buffer HORSOL, i.e., HORSOL=04, and the row information in buffer SELECT, i.e., SELECT=02. MPU 11 stores the position number of the selected item in one of its accumulators. MPU 11 then jumps to subroutine READ02 to find the price of item 3i.

In general, MPU 11 reads the price of item 3i, or any item for that matter, by suppling the address of that item to chip EAROM1, setting the EAROM in the read mode and selecting it, clocking the EAROM, and then reading the price of the item from PIA1B and PIA6B. Specifically, in subroutine READ02, MPU 11 first clears control registers PIA1BC and PIA6BC which allows it to set PIA1B and PIA6B as inputs by storing the data 00 into data direction registers PIA1BD and PIA6BD. Next, the microprocessor programs the CB2 pin of chip PIA1 to be an output by storing the data 34 in PIA1BC. This CB2 pin is used to clock chip EAROM1. The data 04 is stored in control register PIA6BC. As a result of this and the storing of the data 34 in PIA1BC, MPU 11 subsequently addresses the peripheral registers PIA1B and PIA6B when it reads those chips rather than their data direction registers. Chip EAROM1 is put into the read mode by having a High on pin 25 and a Low on pin 26. These pins are connected by lines L68 and L66 to pins 8 and 7, the PA6 and PA5 peripheral data lines, of chip PIA1. To select chip EAROM1 and put it in the read mode, MPU 11 supplies 110X XXXX (binary, where "X" means the signal level can be High or Low) to PIA1A. This causes peripheral data line PA7 (pin 9) of chip PIA1 (FIG. 6) to be High, which High is supplied on line L110 to NAND gate G35 (FIG. 8) causing its output to go Low, which causes the output of inverter 365 to go High, thereby putting a High on pin 27 of chip EAROM1 (FIG. 7), which selects that chip. It also causes line PA6 of chip PIA1 to be High and line PA5 to be Low. These voltages levels are supplied over lines L68 and L66 to pins 25 and 26 of chip EAROM1, thereby putting it in the read mode. MPU 11 also stores the address of item 3a, i.e., 09, in PIA1A, which causes that address to be supplied to the address pins (pins 19-23) of chip EAROM1 over lines A0f-A4f. Having supplied the proper address to chip EAROM1, MPU 11 then clocks it by supplying the data 3C to PIA1BC. This causes the CB2 pin (pin 19) of chip PIA1 (FIG. 6) to go High. That High is supplied on a line L139 to the clock input (pin 18) of chip EAROML(FIG. 7). The clock pulse is removed by MPU 11 supplying the data 34 to PIA1BC. Shortly after being clocked, chip EAROM1 supplies the eight LSBs (least significant bits) of the price of item 3i to its pins 28, 1-6 and 8 and the eight MSBs (most significant bits) to its pins 9-16. MPU 11 then reads the eight MSBs by reading PIA6B, whose peripheral data lines are connected to pins 9-16 of chip EAROM1 through lines L51, L53 . . . L65, and stores this value, i.e., 0000 0001 (binary), in the buffer COSTH. MPU 11 reads the eight LSBs by reading PIA1B and stores this value, i.e., 0101 0101 (binary), in the buffer COSTH+1. Thus MPU 11 is responsive to a signal indicating a selection to recall the prices of that item from memory 9.

After obtaining the price information for item 3i, MPU 11 jumps to the negotiate subroutine, NEGTSK, where it determines if the customer has sufficient credit to buy the item selected. MPU 11's first step in subroutine NEGTSK is to check free vend switch 199 (FIG. 29) to see if it is closed. It does this by reading PIA5B and determining if line PB0 thereof is Low or High. Assuming a serviceman has not closed free vend switch 199, line PB0 of chip PIA5 will be High because the output of gate 201 (FIG. 29) to which line PB0 is connected through pin 22 of plug P2, is High whenever the free vend switch is open. Since line PB0 of chip PIA5 is High, MPU 11 proceeds with the NEGTSK subroutine. If it had been Low, MPU 11 would have cleared buffers COSTH and COSTH+1, ensured that the customer would receive all his credit back, and jumped to the vending subroutine VENTSK.

Since free vend switch 199 was not closed, MPU 11 next checks to see if the price for item 3a stored in chip EAROM1 is 00. This is an anti-jackpot feature of control circuit 7 which protects against the vending of items if the price for those items stored in chip EAROM1 is zero. If the price stored in chip EAROM1 for item 3i were zero, MPU 11 would exit the interrupt sequence through a subroutine NEGT03 in which it would reestablish the customer's credit and go to standby, i.e., subroutine FIRTS1, to await the customer's next command. Since cost buffers COSTH and COSTH+1 contain a non-zero price for item 3i, MPU 22 proceeds to the next task of subroutine NEGTSK, which is to determine the difference between the customer's credit, contained in buffers CREDH+2 and CREDH+3, and the item's price, which is contained in buffers COSTH and COSTH+1. This is accomplished in subroutine SUBTSK. If the customer's credit equals the cost of the item selected, which it does not in out hypothetical case, MPU 11 then updates the credit buffers to storing 00 in them, i.e., CREDH+2=00 and CREDH+=00, and jumps to the vend subroutine VENTSK. Of the customer's credit is less than the cost of the item selected, MPU 11 reestablishes the customer's credit in buffers CREDH+2 and CREDH+3 and exits to the standby subroutine FIRTS1 to await another command. This would be the case, for instance, if the customer had deposited only $1.50 before pressing selection switch 13i.

If the customer's credit is greater than the price of the item, which is the present case, MPU 11 stores the difference, i.e., 20¢, in buffers CREDH+2 and CREDH+3 as the customer's remaining credit. This, of course, is stored as CREDH+2=00, CREDH+3=20. Before proceeding to vend item 3i, MPU 11 checks the nickel and quarter change tubes to see if they are empty by reading PIA3B. As explained above, if both these tubes are empty, the output of AND gate G25 in circuit 153 (FIG. 24) is Low. This LOW is supplied through gate 169 and High. This High is supplied through amplifier 169 and pin 12 of plug P1 to peripheral data line PB7 of chip PIA3. If this line is Low, MPU 11 does not allow vending of item 3i because payback of change could not normally be made, and it returns the customer's credit in the full-escrow mode to a coin return cup CP.

Assuming the nickel and quarter change tubes are not empty, MPU 11 checks line PA1 of chip PIA3 (FIG. 12) to see if the collar change tube is empty. As explained above, if the dollar change tube is empty, the output of gage 165 (FIG. 24) is Low. This Low is supplied through pin 28 of plug P1 to line PA1 of chip PIA3. If the tube is empty, MPU 11 detects this low on line PA1 and in response checks to see if the change that would have to be returned to the customer after vending exceeds $2.00. If so, MPU 11 returns the customer's credit and exits to standby as above. If line PA1 of chip PIA3 is High, on the other hand, indicating that the dollar coin tube is not empty, MPU 11 checks to see if the customer would receive over $5.00 in change after a vend. If so, the customer's credit is again returned to coin cup CP. The purpose of these $2.00 and $5.00 limitations is to keep the change tubes from being emptied by some unscrupulous customer. Clearly, the present example falls within all the limits set forth above. MPU 11 in this case sets status flap FLG5=20, which indicates that when change is made it should be with the least possible number of coins, and jumps to the vend subroutine VENTSK.

The first thing MPU 11 does in subroutine VENTSK is to set its interrupt flap so that no other interrupts can cause an interrupt sequence while vending is taking place. Then it checks the status of vendor 1 by jumping to subroutine MACSTA described above. To recapitulate, in subroutine MASCTA MPU 11 determines if the elevator is at delivery station 105. Assuming for the moment that the elevator is not at the delivery station, MPU 11 exits through a subroutine NEGT03 to standby to await further customer commands, such as credit recall. The credit recall interrupt is described in full infra.

If the elevator is at delivery station 105, the status of vendor 1 is "go" so MPU 11 proceeds with the subroutine VENTSK. MPU 11 checks status flag FLG7 to see if the anti-jackpot delays (AJDs) for the coins have expired to ensure that no item is delivered until the AJDs for the coins have elapsed. If the AJDs have not elapsed, MPU 11 exits subroutine VENTSK through NEGT03 to standby. If this were the case, out customer would have to press selection switch 13Li i again for vending of item 3i to occur. And this action would re-initiate the above sequence.

Assuming that the AJDs have all expired, MPU 11 then checks the buffers SELECT and HORSOL for zero contents. If the contents of either are zero, an error has occurred, and MPU 11 would exit through NEGT03 to standby. However, in our example, SELECT=02 and HORSOL=04, so MPU 11 does not exit subroutine VENTSK but instead disables the CREM by causing line PB6 of chip PIA3 to go Low. Line PB6 is connected through pin 13 of plug P1 to CREM-energizing circuit 177 (FIG. 26). A Low at pin 13 of plug P1 causes line L93 to be High. As a result the CREM has no ground path and it is deenergized, which inhibits any new coins from entering the coin unit—they are deflected to coin cup CP. MPU 11 next, in subroutine DISINT, disables all the interrupts except the time-base-clock 113 interrupt by storing the data 04 in control registers PIA1AC, PIA1BC, PIA2AC, PIA2BC, PIA3AC, PIA3BC, PIA4BC, PIA5BC, PIA6AC and PIA6BC. Also, all present interrupts are cleared in subroutine CLRINT, explained above.

Up until this point any dollar coin or bill was being held in its escrow position pending the determination that a vend would occur, so that if the vend were aborted, the customer's own coins or bill could be returned to him. After disabling and clearing the interrupts, MPU 11 accepts any dollar coins or bills into their storage positions, sincef the vendor status is now "go" for a vend. If a dollar bill had been deposited by the customer, it would now be moved into its storage position from its escrow position by MPU 11 supplying the data 0C to PIA6A. This causes line PA2 and PA3 of chip PIA6 (FIG. 6) to go High. Line PA3 is connected through pin 45 of plug P1 to dollar-bill-accept circuit 195. As explained above, when pin 45 of plug P1 goes High, line L105 of circuit 195 goes Low and the validator moves the dollar bill to the storage position.

By supplying the data 0C to PIA6A, MPU 11 also accepts the dollar coin (or coins) deposited by the customer. The High on peripheral data line PA2 of chip PIA6 is supplied through pin 43 of plug P1 to dollar coin escrow circuit 173. This causes line L89 to go High, deenergizing the collar coin escrow solenoid in the coin changer. The dollar coin, upon the deenergization of the dollar coin escrow solenoid, falls from the escrow position to the coin box.

After a slight delay, to give the validator time to move the dollar bill, if present, to its storage location, MPU 11 removes the signal to the validator by storing the data F7 in PIA6A. This causes line PA3 of chip PIA6 to go Low.

MPU 11 now begins control of the elevator. First, it stores the contents of buffer SELECT, i.e., 02, in PIA2A, causing lines PA0, PA2 and PA3 of chip PIA2 to be Low and line PA1 to be High. Lines PA0–PA3 are connected to pins 2–5 of plug P1 respectively, so this causes a High to be supplied to one side of switch 293 (FIG. 34) while switches 291, 295 and 297 remain Low. Then it stores 04, the contents of the buffer HORSOL, in PIA2B causing lines PB0, PB1, PB3, PB4 and PB5 of chip PIA2 to be Low and line PB2 to be High. Lines PB0–PB5 are connected to pins 35–40 of plug P1, so the High on line PB2 causes pin 37 of plug P1 to be High also. As explained above, this energizes HORSO1 253, the horizontal solenoid associated with the third column from the left of items 3 in vendor 1. The microprocessor then sets the up-mode flag, i.e., it sets FLG6=40, and enables speed-sensor-clock 107 (FIG. 19) and time-base-clock 113 (FIG. 20) interrupts by storing the data 1C in PIA1AC and by storing the data 07 in PIA4AC. Storing 1C in PIA1AC ensures that when the CA2 interrupt input of chip PIA1 (FIG. 6) goes High the $\overline{IRQA}$ output of chip PIA1 will go Low, generating an interrupt sequence. The CA2 input is connected through pin 8 of plug P2 to circuit 106. Every time that the elevator motion sensor generates a pulse, the output of gate 109 in circuit 106 goes High. This High is supplied through pin 8 of plug P2 to the CA2 input of chip PIA1 and causes an interrupt. The enabling of the time-base-clock 113 interrupt has already been explained.

MPU 11 now enters a subroutine, VEND12, in which it refreshes displays 15a and 15b. It stays in this subroutine until the first time-base-clock interrupt, at which time it jumps to subroutine INTERP where it determines by reading bit 7 of PIA4AC that time-base-clock 113 caused the interrupt. MPU 11 then examines the status flag FLG6 to determine if it should perform its elevator control function. Since FLG6=40, MPU 11 is in an elevator control mode, and it jumps to elevator control subroutine TBC10. At this point in the vend cycle, MPU 11 checks whether the elevator is at delivery station 105 by using subroutine MACSTA, described above. Since the elevator is at the delivery station, MPU 11 then tests to see if door 117 is closed by reading PIA2A and testing line PA7 thereof. Line PA7 of chip PIA2 is connected through pin 9 of plug P1 to the output of gate 237. If the elevator is at the delivery station and door 117 is closed, this output will be High and line PA7 will be High. MPU 11 checks for this High and if it is not present, does not proceed with the vend. This check is made to ensure that the elevator does not move unless door 117 is closed. MPU 11 then locks door 117 by deenergizing door lock solenoid 223 (fig. 31). The door lock solenoid is deenergized by the data DF being stored in PIA2A, which, inter alia, makes line PA5 of chip PIA2 Low. Line PA5 is connected through pin 7 of plug P1 to door lock solenoid circuit 221 (FIG. 31). When line PA5 goes Low, solenoid 223 is deenergized. When this occurs, switch 233 (FIG. 32) switches from the open to the closed position, supplying a High through gate 239 to pin 8 of plug P1. Pin 8 of plug P1 is connected to peripheral data line PA6 of chip PIA2, so this line goes High also. MPU 11 reads PIA2A and checks line PA6 to see if door 117 has been locked. If not, it exits the vend cycle.

If door 117 has been locked, however, MPU 11 proceeds to generate a vend signal. That vend signal is the data 10 and it is supplied by MPU 11 to PIA2A, causing line PA4 of chip PIA2 to go High. Line PA4 is connected to pin 6 of plug P1 and so line PA4 supplies the vend signal to run relay circuit 241 (FIG. 33) energizing run relay 245. This causes power to be supplied to the elevator motor. As a result the elevator starts moving upwardly. Thus, MPU 11 in response to the selection of an item 3 generates a vend signal, provided, of course, that there is a non-zero price associated in memory 9 with that item and also provided that the customer's accumulated credit is sufficient to purchase the particular item 3 selected. It should also be apparent at this point that MPU 11 generates a vend signal even if the customer's accumulated credit is insufficient for purchase of the item selected if the free vend switch is closed in the "on" position .

Once it has energized run relay 245, MPU 11 initializes buffers TBC and SPEED1. These buffers are used to determine whether the elevator is moving or has stopped at a level. Buffer TBC is initialized with a value of 16 (decimal) and buffer SPEED1 is initialized with a value of 0. Buffer TBC is initially decremented by one and every time time-base-clock 113 (FIG. 20) interrupts, which is every 10 ms, it is again decremented by one. Buffer SPEED1 is incremented every time speed-sensor-clock 107 (FIG. 19) interrupts. When buffer TBC has been decremented to zero, i.e., after 150 ms, the value of the contents of buffer SPEED1 is checked to see if it falls between 77 (decimal) and 100 (decimal). A value within these limits indicates that the elevator is still moving. If the value is not within those limits MPU 11 removes power from the elevator.

After initializing buffers TBC and SPEED1, MPU 11 exits from the time-base-clock interrupt and returns to the loop in subroutine VEND12.

Every 1.5 to 2.0 ms while the elevator is moving, speed-sensor-clock 107 (FIG. 19) generates an interrupt by causing the output of gate 109 to go High. MPU 11 in response updates buffer SPEED1 by one and exits from the interrupt. Every 10 ms, time-base-clock 113 (FIG. 20) generates an interrupt in response to which MPU 11 decrements buffer TBC by one and exits that interrupt. These interrupts continue to occur until buffer TBC is incremented down, i.e., decremented, to zero, at which point MPU 11 tests to see if the value of the contents of buffer SPEED1 falls within the above-specified limits. If so, it resets buffer TBC to 16 (decimal) and buffer SPEED1 to zero.

The elevator is moving up continuously while the buffers SPEED1 and TBC are being updated. The speed of that movement is of course reflected in the frequency of interrupts from speed-sensor-clock 107 (FIG. 19). As the elevator approaches level D, it closes switch 297 (FIG. 34) but nothing happens as a result of that closure because pin 5 of plug P1 is not High. Likewise, as the elevator approaches level C it closes switch 295 but nothing happens. However, as it approaches level B, it closes switch 293 which provides the High on pin 3 of plug P1 to line L109 and gate 299. The output of gate 299 is therefore high and this High is supplied on line L111 to NAND gate G31 (FIG. 35). As described above, this causes vertical stop solenoid 305 to be energized which stops the elevator at level B. Because the elevator has now stopped, the speed of the elevator motor changes, i.e., stops, and the speed-sensor-clock interrupts now occur at a rate lower than 77 per 150 ms. MPU 11 detects this by comparing the value of the contents of buffer SPEED1 with the above-mentioned predetermined range of values and in response deenergizes run relay 245 (FIG. 33) by removing the vend signal. Specifically MPU 11 changes the voltage of line PA4 of chip PIA2 from High to Low by storing the data EF in PIA2A. Thus, MPU 11 is responsive to the number of pulses supplied from speed-sensor-clock 107 (FIG. 19) and circuit 106 during sixteen interrupts of time-base-clock 113 (FIG. 20) not falling within the predetermined range of 77 to 100 to remove the vend signal.

As shown in coassigned U.S. Pat. No. 4,108,333, the stopping of the elevator at a particular level causes the tray motor to dispense the item at that level whose horizontal solenoid has been energized. In the present example, HORSOL 253 was energized and the elevator stopped at level B, so item 3*i* is conveyed onto the elevator.

After MPU 11 deenergizes run relay 245, it exits from subroutine VEND 12 and enters a subroutine VEND 16 where it refreshes display 15a and 15b while waiting for the tray motor to reach its 180° position. When the tray motor reaches its 180° position it stops and pin 42 of plug P1 (FIG. 36) goes High, as discussed above. Pin 42 of plug P1 is connected to peripheral data line PB7 of chip PIA2, so this line also goes High when the tray motor reaches the 180° position. MPU 11 reads PIA2B and checks line PB7 every time it goes through subroutine VEND 16, so when the tray motor has conveyed item 3*i* onto the elevator MPU 11 detects that fact, i.e., that the tray motor has reached the 180° position, and sets status flag FLG6=08, indicating that control circuit 7 is now in the elevator down mode.

The energization of relay N (FIG. 36) in response to the tray motor reaching its 180° position switches the elevator motor to the down mode but that does not simultaneously cause the elevator to descend. First, MPU 11 must cause run relay 245 to be energized. Rather than go to that step immediately, however, MPU 11 first starts to give the customer his change.

Specifically, MPU 11 checks buffers CREDH+2 and CREDH+3 to see if the customer is due any change. If not, MPU 11 proceeds immediately to the elevator control section of the program. But in our example, the contents of CREDH+3=20, i.e., the customer should receive 20¢ change. MPU 11 then stores A0 in number-of-coins buffers FENIC, FEDI, FEQUAR, FEONEC, FEONEB, and FETWO, stores the data 08 in the buffer CONTYP, and jumps to subroutine MONTSK. Buffer CONTYP is used as a pointer for MPU 11 to use in subroutine MONTSK to keep track of what type coin is being paid to the customer. In subroutine MONTSK, MPU 11 first determines if the value of a dollar coin is less than or equal to the customer's credit, which is stored in buffers CREDH+2 and CREDH+3. Since the dollar is of greater value than the customer's credit, i.e., 20¢, MPU 11 updates the contents buffer CONTYP to point to quarters by making its contents 04. Then the same check is made with the quarter. Since this is also greater than the customer's credit, MPU 11 updates the pointer buffer to CONTYP=02 which indicates that dime coins are now to be tested. Since a dime is less than 20¢, MPU 11 can proceed with making change.

To make change in the least coins mode, MPU 11 reads PIA3A to see if the dime change tube is empty. Line PA0 of chip PIA3 is connected through pin 27 of plug P1 to the output of gate 167 (FIG. 24). As explained above, this output is Low when the dime change tube is empty. If MPU 11 detects a Low on line PA0 of chip PIA3, it switches to the nickel coin tube by updating the pointer buffer to CONTYP=01. Similarly, if the change due the customer exceeds $1.00, MPU 11 checks whether the dollar coin tube is empty by reading PIA3A. Line PA1 of chip PIA3 is connected through pin 28 of plug P1 to the output of gate 165 (FIG. 24) and this output is Low when the dollar tube is empty. In that case, MPU 11 would switch to the quarter change tube from the dollar change tube by updating the pointer buffer to CONTYP=04.

Returning to our example where the customer is to receive 20¢ in change, if the dime tube is not empty CONTYP=02. If it is, CONTYP=01. In any case MPU 11 stores the value of CONTYP in PIA3B which causes a coin to be ejected from one of the change tubes. Lines PB0-PB3 of chip PIA3 are connected through pins 19, 18, 17 and 16 of plug P1 to the coin return portion of circuit 153 (FIG. 24). As explained above, a High on pin 16 (and thus on line PB3) causes a dollar coin to be ejected from its coin tube, a High on pin 17 (and thus on line PB2) causes a quarter to be ejected, a High on pin 18 (i.e., on line PB1) causes a dime to be ejected, and a High on pin 19 (on PB0) causes a nickel to be ejected. When MPU 11 stores the contents of buffer CONTYP in PIA3B therefore, it causes line PB1 (or line PB0 if the dime tube is empty) to go High, thereby giving the customer one dime in change. MPU 11 also updates the customer's credit to 10¢ by updating buffer CREDH+3 to 10.

MPU 11 then stores the data 0F in buffer PAYBK1. Buffer PAYBK1 is used together with buffer TBC to keep the payback solenoids in the coin handler on for 150 ms. Of course, if those solenoids need to be energized for a different length of time than 150 ms, the initial contents of buffer PAYBK1 should be changed accordingly. After initializing buffer PAYBK1, MPU 11 enables interrupts from time-base-clock 113 and speed-sensor-clock 107 in subroutine VEND0A as described above and then refreshes displays 15a and 15b in subroutine VEND31.

At the first interrupt from time-base-clock 113 (FIG. 20), MPU 11 energizes run relay 245 (FIG. 33) and the elevator starts back down toward delivery station 105. After fifteen of these interrupts, the contents of buffer PAYBK1 are reduced to zero and the payback relay is deenergized by MPU 11 clearing PIA3B. After another short delay MPU 11 causes another dime to be given to the customer in change, following exactly the same steps as outlined above for the first time, and updates CREDH+3=00 since the customer has no remaining credit.

MPU 11 nosw continues refreshing displays 15a and 15b and checking the elevator motor speed until the elevator reaches delivery station 105. At that time, MPU 11 deenergizes run relay 245 (FIG. 33) and then tests, by reading line PB4 of chip PIA5, to see if the elevator is at delivery station 105. Line PB4 is high if the elevator is at the delivery station. This high on line PB4 of chip PIA5 at this point in the vending cycle is a control input signal indicating to MPU 11 the vending of item 3a, and switch 229 and chip PIA5 together constitute means for supplying MPU 11 that signal. In response to the signal that the selected item has been vended, MPU 11 clears and disables all interrupts (in subroutine DISINT) and updates the total sales figure in chip EAROM1 (in a subroutine SALINV).

In subroutine SALINV, MPU 11 first reads the accumulated total sales figure from addresses 1D and 1E in chip EAROM1 as before and stores this in buffers CREDH, CREDH+1, CREDH+2, and CREDH+3. Since the total accumulated sales figure before this last sale was $10.95, CREDH=00, CREDH+1=00, CREDH+2=10, AND CREDH+3=95. MPU 11 adds the cost of item 3i to this and updates CREDH+2 to 12 and CREDH+3 to 50. These figures are then stored in buffers INVO4, INVO4+1, INVO4+2 and INVO4+3, and are written into addresses 1D and 1E in chip EAROM1.

MPU 11 writes the new total accumulated sales figure in chip EAROM1 in subroutine LDPR07. The first step in writing the new total accumulated sales figure in chip EAROM1 is to erase the old figure stored there. MPU 11 does this by addressing location 1D as before through chip PIA1 and putting chip EAROM1 in the erase mode by causing line PA6 of chip PIA1 to be Low and line PA 5 thereof to be High. This causes chip EAROM1's mode control input C1 (pin 25) to be Low and its mode control input C2 (pin 26) to be High, which is the proper combination to put chip EAROM1 in the erase mode and the data at location 1D is erased. MPU 11 then initializes PIA1B of PIA6B as outputs by storing the data FF in their data direction registers, i.e., PIA1BD and PIA6BD, to write the four most significant digits of the new total accumulated sales figure in location 1D of chip EAROM1. Chip EAROM1 is then put in the write mode by causing its C1 and C2 inputs to both be Low. The first two most significant digits of the new total sales figure are supplied by MPU 11 to PIA6B and are thereby written in the highest eight bits of location 1D. The next two most significant digits, i.e., the contents of buffer CREDH+1, are supplied by MPU 11 to PIA1B and are thereby written in the lowest eight bits of location 1D. MPU 11 then proceeds in exactly the same way to erase the old figure at location 1E and to write the contents of buffer CREDH+2, i.e., 12, in the highest eight bits of location 1E and the contents of buffer CREDH+3, i.e.., 50, in the lowest eight bits.

After storing the new total accumulated sales figure in chip EAROM1, MPU 11 returns to the standby loop FIRTS1. Part of that loop is the instruction JSR PROSEN which causes MPU 11 to jump to subroutine PROSEN to check for an item on the elevator. In subroutine PROSEN, MPU 11 checks once again to see if the elevator is at delivery station 105 by checking line PB4 of chip PA5 which is connected to elevator position indicator switch 229. If the elevator is at delivery station 105, MPU 11 checks product sensing circuit 99 (FIG. 18) for circuit failure by testing lines PB2 and PB3 of chip PIA5. These lines are connected through pins 24 and 25 of plug P2 to the collectors of phototransistors Q3 and Q5 (FIG. 18). Since LEDs 101 and 103 are normally off, the collectors of phototransistors Q3 and Q5 are normally High. Therefore, if lines PB2 and PB3 of chip PIA5 are Low, MPU 11 knows that product sensor circuit 99 has failed. Once circuit 99 has passed its test, MPU 11 checks line PA6 to chip PIA2 to see if it is High. If it is, that indicates that switch 233 (FIG. 32) is closed and, therefore, door 105 is closed and locked.

Having determined that door 105 is locked, MPU senses whether item 3i is on the elevator by supplying the data XOXX XXXX (binary) to PIA5B. This causes line PB6 of chip PIA5, which line is connected through pin 12 of plug P2 to gate 367 (FIG. 18), to go Low. As a result, transistor Q35 (FIG. 18) conducts, causing LEDs 101 and 103 to light. If item 3i is present on the elevator, light from LEDs 101 or 103 will be obstructed and insufficient light will fall on the bases of phototransistors Q3 and Q5 to turn them on. Depending upon the placement of item 3i on the elevator, both phototransistors may be off, transistor Q3 may be on and transistor Q5 may be off, or vice versa, but only if item 3i is not on the elevator will both phototransistors be on and conducting. MPU 11 therefore tests lines PB2 and PB3 of chip PIA5 to see if either is High. If one of these lines is High, the associated transistor is off and item 3i is on the elevator at delivery station 105. If the product is not sensed on the tray, MPU 11 exits the subroutine. If item 3i is on the tray, however, MPU 11 supplies the data 1XXX XXX (binary) to PIA5B, causing the PB7 line of chip PIA5 to go High. This line is connected through pin 13 of plug P2 to gate 119 (FIG. 21). When line PB7 goes High, transistor Q7 conducts, energizing coil 121 which, as explained above, causes door 117 to open. After opening door 117, MPU 11 turns off the product sensor LEDs, LEDs 101 and 103, by causing PB6 of chip PIA5 to go High. MPU 11 then returns to its standby loop, subroutine FIRTS1.

Every time MPU 11 goes through the DISPLY subroutine, which is part of the standby loop, it triggers a missing pulse detector, indicated generally at 371 (FIG. 8), which is part of reset circuit 43. The purpose of missing pulse detector 371 is to cause control circuit 7 to reset if there has been a malfunction in the program. Specifically, MPU 11 supplies the data XXX1 XXXX (binary) to PIA5A causing its PA4 line to go High, which starts a pulse. This High is supplied through pin 31 of plug P2 to missing pulse detector 371. MPU 11 then removes the High by causing line PA4 to go Low, which ends the pulse. As long as this pulse is supplied to detector 371 within a certain time, e.g., 3 ms, from the last such pulse, the output of detector 371 on a line L141 remains High. The period 3 ms is chosen to slightly exceed the maximum time MPU 11 should be executing instructions outside the DISPLY subroutine in the absence of a malfunction. If a pulse is not detected within that maximum period, line L141 goes Low. This Low is inverted by an inverter 373 and the resulting High output is supplied to the base of an NPN transistor Q39 whose emitter is connected to ground and whose collector is connected to line L67. Transistor Q39 conducts, bringing line L67 Low. We have already seen that a Low on line L67 causes control circuit 7 to reset.

If the customer in the above example had deposited his $1.75 but then chosen not to select an item, he would press the coin return switch CR. This would cause a High to appear on line L94 of circuit 179 (FIG. 27), and pin 20 of plug P2 would go High as a result. Pin 20 of plug P2 is connected to the CB1 interrupt input (pin 18) of chip PIA6. Since chip PIA6 has been initiated to generate an interrupt signal whenever its CB1 input goes High, pressing of the change return switch supplies an interrupt signal to MPU 11. Upon receiving this signal, MPU 11 jumps to the interrupt routine INTERP to identify the source of the interrupt. It discovers that the interrupt is a credit recall interrupt by checking bit 7 of PIA6BC which is set High when the CB1 input of chip PIA6 goes High. Having identified the interrupt, MPU 11 branches to credit recall subroutine RECAL.

In subroutine RECAL MPU 11 first disables all the interrupts and clears any present interrupts. It then checks status flag FLG7 to make sure that all anti-jackpot delays have expired. This is to prevent the return of credit until all coins deposited by the customer have been identified and added to his credit. MPU 11 then checks the customer's credit, which is stored in buffers CREDH+2 and CREDH+3. If the credit is zero, MPU 11 exits the interrupt; the customer is not owed any money. If the customer has some credit, MPU 11 disables the CREM by causing line PB6 of chip PIA3 to go Low. MPU 11 returns the customer's credit in essentially the same manner as it made change. That is, buffer CONTYP is used as a pointer to indicate which bill or coin is to be returned and when a bill or coin is returned its number of coins buffer, e.g., FED1, is decremented by one. The major difference between returning the customer's credit in the full-escrow mode and making change is that in the former the contents of the number of coins buffers correspond initially to the numbers of coins or currency of each type that the customer has inserted into vendor 1 while in the latter the contents of those buffers are initialized with 160 (decimal).

In this example the contents of all the numbers of coins buffers except FEONEC and FEQUAR are zero, FEONEC=1 and FEQUAR=3. MPU 11 first checks buffer FETWO and initializes buffer CONTYP=20. Since buffer FETWO is empty, MPU 11 updates CONTYP to point to dollar bills, i.e., CONTYP=10. It then checks the contents of buffer FEONEB which is also empty.

If the customer had deposited a dollar bill into vendor 1, the contents of buffer FEONEB would equal 01 and MPU 11 would at this point return the bill by storing the contents of buffer CONTYP, i.e., 10. in PIA3B. Storing 10 in PIA3B causes line PB4 of chip PIA3 to go High. This High is supplied through pin 15 of plug P1 to circuit 193 (FIG. 28). As explained above, this high causes the validator to return the dollar bill from its escrow position to the customer.

If the buffer FEONEB is empty, MPU 11 then updates the pointer to CONTYP=08 and examines the contents of dollar coin buffer FEONEC. Since the customer deposited a dollar coin, the contents of this buffer are 01. MPU 11 stores the contents of pointer CONTYP in PIA3B and decrements the contents of buffer FEONEC by one. Storing the contents of the buffer CONTYP, i.e., 08, in PIA3B causes the PB3 line of chip PIA3 to go High. This line is connected through pin 16 of plug P1 to change circuit 153. As described above, a High on this pin causes transistors Q11 and Q13 to conduct, resulting in the return of a dollar coin to the customer. After returning the dollar coin and decrementing the contents of buffer FEONEC to zero, MPU 11 updates buffer CONTYP to point to quarters by changing its contents to 04. To see if any quarters need to be returned to the customer, MPU 11 examines the contents of buffer FEQUAR. Since the buffer FEQUAR has contents of 03, MPU 11 returns a quarter to the customer by again storing the contents of buffer CONTYP in PIA3B. This causes line PB2 of chip PIA3, which is connected through pin 17 of plug P1 to the quarter return circuitry of circuit 153 (FIG. 24), to go High and one quarter is returned to the customer. MPU 11 decrements buffer FEQUAR by one and again examines it for zero contents. Since buffer FEQUAR=02 at this point, MPU 11 returns a second quarter to the customer and again decrements buffer FEQUAR by one. This cycle is repeated one more time. MPU 11 returns the customer's third, and last, quarter and decrements buffer FEQUAR to zero. MPU 11 then updates pointer CONTYP to point to dimes, i.e., CONTYP=02 and examines the dimes number of coins buffer FEDI for non-zero contents. Since the customer deposited no dimes, buffer FEDI=00 and no dimes are returned to him. If he had put dimes in vendor 1, of course, they would at this point be returned exactly like the dollar coin and the quarters. Finally, MPU 11 updates pointer CONTYP to point to nickels and checks the contents of the nickel buffer FENIC. Since this is also zero, MPU 11 has completed the full-escrow payback of the customer's credit and it exits the interrupt to return to the standby loop.

It should be noted that control circuit 7 will return the customer's credit in the full-escrow mode not only when he presses the coin return switch but also when he deposits money in vendor 1 when free-vend switch 199 is in its "on" position, i.e., closed.

In its standby loop, MPU 11 continuously refreshes displays 15a and 15b. However, display 15b is normally not lit since its associated inverters lack a ground connection. And display 15a will not be lit if there is no customer credit in vendor 1, i.e., the accumulated customer credit is $0.00, since all leading zeros are blanked. When the serviceman approaches vendor 1 to, for example, record the total accumulated sales figure, both displays will typically be dark. To read the accumulated sales figure the serviceman inserts key 203 (FIG. 30) into slot 204. This results in line L107 going Low, as described above, to provide a ground for inverters 53–58 (FIG. 15) and display 15b lights up displaying the total accumulated sales figure, i.e., "12.50".

To reset the total accumulated sales figure to zero, the serviceman closes switch 213 (FIG. 30), causing the output of gate 215, which is connected through pin 1 of plug P2 to the CB1 interrupt input of chip PIA1, to go High. This causes the $\overline{\text{IRQB}}$ output pin of chip PIA1 to go Low, thereby supplying an interrupt signal to MPU 11, and causes bit 7 of PIA1BC to go High. MPU 11 identifies the interrupt as a clear total sales interrupt by checking bit 7 of PIA1BC to see if it is High. After determining that bit 7 is indeed High, MPU 11 jumps to subroutine CLRINV, the clearing total sales subroutine. In subroutine CLRINV, MPU 11 erases the data stored in addresses 1D and 1E of chip EAROM1 just as it did in updating the total accumulated sales figure and then writes the data 0000 into both locations, again just as it did in updating the figures. That is, MPU 11 is responsive to the closure of switch 213 and the resulting reset signal to change the total sales figure stored in memory 9 to zero. MPU 11 then jumps to subroutine RDTOSL, discussed above, to read the new data stored at locations 1D and 1E. If the total accumulated sales figure has been successfully cleared, display 15b will now be blank, since all of the digits of the total accumulated sales figure will be zero.

While servicing vendor 1, the serviceman may empty any one of the coin tubes by pressing and holding its associated switch, causing a High to appear on one of lines L95, L97, L99 or L101 (FIG. 27), which lines are associated with the nickel, dime, quarter and dollar change tubes respectively. A High on any of these lines causes the output of NOR gate G27 to go Low and, therefore, the output of inverter 191 to go High. This High is supplied through pin 1 of plug P1 to the CA1 interrupt input of chip PIA6, causing the $\overline{\text{IRQA}}$ output of chip PIA6 to go Low and bit 7 of PIA6AC to go High. In response to the Low IRQA output, MPU 11 initiates its interrupt sequence. It identifies the interrupt by testing bit 7 of PIA6AC and branches to the automatic coin tube emptying subroutine PAYOUT. There MPU 11 determines which coin tube to empty by reading PIA6A. Peripheral data lines PA4–PA7 of chip PIA6 are connected through pins 46–49 of plug P1 to lines L95, L97, L99 and L101 (FIG. 27), respectively. When one of these lines of circuit 179, line L95 for example, is High its associated peripheral data line, line PA4, will also be High.

Assuming the serviceman wants to empty the dime change tube, when he presses the switch to do that, line L97 and peripheral data line PA5 of chip PIA6 go High. Line PA5 will stay High as long as the serviceman keeps the switch closed. MPU 11 first checks line PA7 of chip PIA6 and then line PA6 but finds them both Low. Next MPU 11 checks line PA5 and upon detecting that it is High branches to the coin return subroutine described before. Briefly, MPU 11 ejects a coin from the change tubes, in this case a dime, by causing that tube's associated peripheral data line of chip PIA3, in this case line PB1, to go High. After ejecting one coin MPU 11 rechecks PIA6A to see if any peripheral data lines thereof are still High, which would indicate that the serviceman is still keeping one of the change tube switches closed. If so, it jumps back to subroutine PAYOUT and repeats the above steps. As a result, the coin changer keeps emptying the dime change tube until the serviceman releases the dime tube switch. Emptying the dollar, quarter and nickel tubes takes place in exactly the same way. After emptying the selected tube, MPU 11 returns to its standby loop.

To check or change the prices of items 3, the serviceman opens vendor 1 and switches switch 98 (FIGS. 17 and 38–40) to the price-setting position, by removing the price-setting module from holder 339, causing one input of NOR gate G23 to go Low while one input to gate G21 goes High. To check the price of any item, the serviceman then presses its selection switch 13. Closure of any one of switches 13a-13i (FIG. 16), as explained above, causes the output of NOR gate G19 to go Low. This Low is supplied on line L69 and through gate 95 to the other input of NOR gate G23, causing its output to go High. This High is supplied through pin 50 of plug P2 to the CB2 interrupt input of chip PIA4 causing the $\overline{IRQB}$ output of chip PIA4 to go Low and bit 6 of PIA4BC to go High. In response to the Low $\overline{IRQB}$ signal, MPU 11 starts the interrupt subroutine IN-TERP.

In subroutine INTERP, MPU 11 identifies the interrupt as a price interrupt by checking bit 6 of PIA4BC and branches to the price display subroutine PRIDIS. In PRIDIS MPU 11 determines which selection switch 13 was closed by strobing lines PA0-PA7 of chip PIA4 and reading lines PB0-PB5 thereof exactly as described above in connection with the selection of item 3i. When MPU 11 has found the closed selection switch 3, it stores the row information in buffer SELINF and the column information in buffer SELINF+1. For example, if the serviceman has pressed selection switch 13g, buffer SELINF will equal 02 and buffer SELINF+1 will equal 01. Having determined which switch was closed, MPU 11 jumps to subroutine LDPRI where it finds the position number of the closed switch in the same way as it did when item 3i was selected for vending. The position number of item 3g is 07. MPU 11 then reads the contents of location 07, i.e., the price of item 3g, in EAROM1 by using PIAs PIA1 and PIA6 as described above in connection with reading the price of item 3i. Thus, MPU 11 is responsive to the actuation of one selection switch 13 and to the apparatus being in the price-setting mode to retrieve from memory 9 the price of the item 3 corresponding to that selection switch. This price, e.g., $2.90, is stored by MPU 11 in buffers KEYBD1 and KEYB1+1. MPU 11 then returns from the interrupt to the standby loop.

Once in the DISPLY subroutine of the standby loop, MPU 11 checks line PB1 of chip PIA5 to see if mode-setting switch 98 (FIG. 17) is in the vend position or in the price-setting position. Line PB1 is connected through pin 23 of plug P2 to the output of gate 97. If switch 98 is in the price-setting position, the output of gate 97 is High. MPU 11 is responsive to this High, and thus to switch 98 being in the price-setting position, to supply the BCD coded signal corresponding to the price of item 3g to display 15a. Specifically MPU 11 stores the price of item 3g in BCD coded form in buffers DISP2 and DISP2+1. As MPU 11 executes the DISPLY subroutine, sequentially supplying the values of the digits of displays 15b and 15a to decoder 47 and activating, or attempting to activate, the corresponding units of the displays, it reaches the point where it supplies the data in buffers DISP2 and DISP2+1 while sequentially activating the units of display 15a. Since the price to be displayed is 02.90 the MSD will be blanked. Specifically it supplies the data "F" to decoder 47 while activating the MSD of display 15a. This, of course, blanks the MSD of that display. Then it supplies the next four bits of buffer DISP2, i.e., "2" to decoder 47, which decoder constitutes means for decoding the BCD coded price signal from MPU 11, while activating the next most significant digit of display 15a. As a result, the numeral "2" is displayed on the second digit from the bottom of display 15a. Next, MPU 11 displays the highest eight bits of buffer DISP2+1, i.e., "9", in the next to last digit of display 15a and finally it displays the last four bits, i.e., "0", of buffer DISP2+1 in the LSD of display 15a. Thus, display circuit 15 is responsive to the BCD coded price signal from MPU 11 to display the price of item 3g. It is apparent that except for the contents of buffers DISP2 and DISP2+1, the displaying of the digits of a price when mode-setting switch 98 is in its price-setting position is accomplished in basically the same way that the digits of the customer's credit are displayed when switch 98 is in its vending position. It is also apparent that the price of any item 3, not just item 3g, can be displayed by the serviceman simply putting switch 98 in the price-setting mode and pressing the corresponding selection switch.

If the serviceman wants to change the price of any item 3, he uses one of the three price-setting modules, 337, 351 or 355, which constitute means for supplying to MPU 11 a control input signal representing a potential new price. Using module 337 as an example, the switches 60-68 and 70 are used to enter a potential new price, switch 71 causes display 15a to be cleared, and switch 69 causes the potential new price to be loaded into memory 9. To clear display 15a of the price, i.e., $2.90, displayed thereon, the serviceman presses switch 71. This generates an interrupt since it causes the output of gate G19 (FIG. 16) to go Low and, therefore, the output of gate G23 to go High. Just as when the serviceman pushed selection switch 13g, MPU 11 identifies the interrupt as a price display interrupt and, after disabling interrupts from PIA4B, PIA1B, PIA6B and PIA6A, jumps to subroutine PRIDIS where it determines that switch 71 was the closed switch. This information is stored in buffers SELINF and SELINF+1 as SELINF=80 and SELINF+1=04 since switch 71 is in the eighth row from the top and third column from the left of switch matrix 76. MPU 11 then determines the position number of the closed switch in exactly the same way it determined the position numbers of the selection switches 13 and stores it in one of its accumulators. However, the position numbers of the price-setting switches, i.e., switches 60-71, are not the position numbers they would have if one simply counted the selection switches and then continued to count the price-setting switches. The position number of switch 60 is 1, not 25 (decimal) for example. The price-setting switches are given their own position numbers so that their position number can equal their value. For example, the position number of switch 60, the "1" key on module 337, is "1". This system fails for switches 69, 70 and 71 however. In subroutine SEL44, MPU 11 treats these switches separately. For example, the position number of switch 71, the display clearing switch, is 0C. When MPU 11 finds that its accumulator contains the position number 0C it loads the data 00 into buffers KEYBD1 and KEYBD1+1 and exits the interrupt. Back in subroutine DISPLY, the contents of these buffers, i.e., 00, are transferred to buffers DISP2 and DISP2+1, the buffers that contain the four digits which are displayed on display 15a. Since leading zeros are blanked display 15a is cleared. Thus, pressing switch 71 results in the clearing of display 15a.

The serviceman now uses switches 60-68 and 70 to supply a potential new price to MPU 11. To supply the new price $3.05 to MPU 11, the serviceman presses switches 62, 70 and 64 in that order. Each switch closure generates an interrupt in which MPU 11 finds the position number of the switch and stores its value in the buffers KEYBD1 and KEYBD1+1. When switch 62 is pressed, MPU 11 stores its position number, i.e., "3" in the lowest four bits of buffer KEYBD1+1. When switch 70 is pressed, MPU 11 finds that its position number is 0B and in response clears its accumulator where the position number is stored. The lowest four bits of that accumulator, which are not "0000" (binary) are stored in the lowest four bits of buffer KEYBD1+1 while "0011" (binary) the former value of the lowest four bits of that buffer are shifted to be the highest four bits. When switch 64 is pressed, MPU 11 stores the lowest four bits of its position number, which are "0101" as the lowest four bits of buffer KEYBD1+1, while shifting "0000" to the highest four bits of that buffer and shifting "0011" to the lowest four bits of buffer KEYBD1. After the closure of each switch and before the closure of the next one, MPU 11 has sufficient time to exit the interrupt, return to subroutine DISPLY and display the associated numeral. That is, MPU 11 is responsive to the actuation of the key for each switch (62, 70 and 64) to cause display 15a to display the numeral associated with that key. Thus, after switch 62 is closed, MPU 11 exits to subroutine DISPLY where it transfers the contents of buffer KEYBD1 ("00") and KEYBD1+1 ("03") to buffers DISP2 and DISP2+1. As MPU 11 executes the DISPLY subroutine, it therefore causes display 15a to display the numeral 0.03. Likewise, after switch 70 is closed, MPU 11 causes display 15a to display the numerals 0.30 and after switch 64 is closed it causes the display of numerals 3.05. That is, MPU 11 is responsive to a series of switch key actuations to cause display 15a to simultaneously, i.e., at the same time as far as the human eye can tell, display the series of numerals associated with the particular series of switch keys that were actuated. More generally, MPU 11 is responsive to mode-setting switch 98 being in the price-setting position and to a potential new price input signal, i.e., 3.05, to supply a coded signal (0011 0000 0101) to display circuit 15. And display circuit 15 is responsive to the BCD coded potential new price signal to display that potential new price on display 15a.

The serviceman can change the price of any particular item 3 to the potential new price shown on display 15a simply by pressing switch 69 and then pressing the appropriate selection switch 13. Switch 69 constitutes means for putting control circuit 7 in a price loading mode. In the interrupt sequence generated by the pressing of switch 69, MPU 11 identifies the switch as the load-price switch and sets status flag FLG5=80 to put MPU 11 in the price-loading mode. The serviceman then pushes the selection switch, e.g., switch 13g, corresponding to the item he wants to have a price of $3.05. This generates an interrupt as before, but this time, because status flag FLG5=80, MPU 11 does not retrieve the price of item 3g from chip EAROM1 but rather writes the potential new price ($3.05) into location 07 in chip EAROM1. Specifically, MPU 11 identifies the closed switch as a selection switch and then, in subroutine LDPR06, checks status flag FLG5. If this flag equals 80, MPU 11 branches to the price-setting branch of the program; if not, it branches to the price-retrieving branch. Since FLG5=80, MPU 11 branches to the price-setting part of the program. The first step in price-setting after checking status flag FLG5 is to clear that status flag, i.e., remove the data 80. This is to ensure that the potential new price displayed by display 15a is loaded into the memory location associated with only one item. Otherwise, the serviceman could accidentally load the potential new price into several memory locations in an attempt merely to check the prices of the items associated with those memory locations.

After resetting status flag FLG5, MPU 11 jumps to subroutine LDPR07 where it erases the old price stored in address 07 in chip EAROM1 and writes the potential new price therein. This erasing and writing step proceeds exactly in the same way as in the erasing and writing of the total accumulated sales figure in chip EAROM1, described above. MPU 11 then reads the location in chip EAROM1 where it stored the new price, i.e., location 07, and stores this information in buffers KEYBD1 and KEYBD1+1. This information is then displayed the next time MPU 11 goes through the display subroutine DISPLY. To ensure that he has set the price of item 3g to $3.05, the serviceman either presses switch 71, to clear display 15a, and then presses switch 13g, to retrieve the price of item 3g from chip EAROM1, or he presses a different item switch 13 and then comes back to press switch 13g. It is desirable to perform this check since after pressing the load-price switch, switch 69, the serviceman may have inadvertently pressed the wrong selection switch, e.g., switch 13h. With the interrogation feature of the present invention, the serviceman can easily detect such incorrect price settings.

Typically, the serviceman goes down the rows of selection switches 13 checking the prices of items 3 and changing, by means of switches 60-71, those prices that need to be changed. Suppose the price for item 3b were set to $F.35. Since MPU 11 supplies the data "F" to decoder 47 to blank displays 15a and 15b one would expect that when selection switch 13b was pushed display 15a would display "0.35". However, display subroutine DISPLY checks for literals, i.e., characters A-F, and if one is detected, changes the contents of that digit to "A". Displays 15a and 15b display a signal "A" as a "[", so when the serviceman checks the price of item 3b display 15a will display "[0.35". When he sees the character "[" displayed, the serviceman knows he must reset the price for that item.

Of course, the serviceman can use module 351 or 355 instead of module 337 to have display 15a display a potential new price. Using module 355, for example, the serviceman merely turns control knob 359 until pointer 361 points to the desired price on dial 357, presses load switch 69 and the selection switch of the desired item.

The method of displaying potential new prices with module 351 (FIG. 3) is somewhat different from that set out above. Instead of switches 60-68 and 70, module 351 uses rocker switch 353 to set prices. Briefly, the serviceman opens and closes switches 73, 74 and 75 by moving rocker switch 353. Switches 73, 74 and 75 constitute means for supplying a price incrementing control input to MPU 11 to which MPU 11 is responsive to increment the price shown on display 15a. Specifically, switch 73 constitutes means for incrementing the displayed price up, switch 74 constitutes means for incrementing the displayed price down (i.e., decrementing the displayed price), and switch 75 constitutes rapid incrementing enabling means for supplying a control input signal to MPU 11 to cause it to increment the price displayed on display 15a at a rapid rate. For example, if the serviceman wants to change the price of item 3g from $2.90 to $3.05, as in the previous example, he need only press selection switch 3g, causing the old price of $2.90 to be displayed, and then move rocker switch 353 one position toward the word "UP", thereby closing switch 73. Closing switch 73 generates an interrupt and MPU 11 in response jumps to subroutine INTERP where it identifies the interrupt as a price interrupt and jumps to subroutine PRIDIS. There, it stores the row and column information of the closed switch in buffers SELINF and SELINF+1, i.e., SELINF=80 and SELINF+1=10, and jumps to subroutine LDPRI. MPU 11's first step in subroutine LDPRI is to see if buffer SELINF=80 and buffer SELINF+1=10. Since they do, MPU 11 immediately begins to increment display 15a by a nickel. It does this by adding the data 05 to buffer KEYBD1+1, making KEYBD1+1=95, and then branching to a delay subroutine DELA2. In subroutine DELA2, MPU 11 branches to subroutine DISPLY to display the incremented price, i.e., $2.95, and then returns to subroutine DELA2. MPU 11 loops through subroutine DELA2 sixty-four times, which gives the serviceman enough time to open switch 73 if the desired potential price is displayed on display 15a. After the sixty-fourth loop through subroutine DELA2, MPU 11 returns from that subroutine. It then strobes PIA4A and reads PIA4B to see if switch 73 is still closed. If it is, MPU 11 adds 05 to KEYBD1+1 again and branches back to subroutine DELA2. It should be noted that adding the data 05 to buffer KEYBD1+1 causes the contents of buffer KEYBD1 to become 03 and the contents of buffer KEYBD1+1 to become 00, since the addition is being done in BCD form and KEYBD1 and KEYBD1+1 are treated in the program as one sixteen bit-long buffer. In subroutine DELA2, MPU 11 then causes 3.00 to be displayed on display 15a. After another sixty-four times through subroutine DELA2, MPU 11 again checks to see if switch 73 is still closed. It is, so it updates the display by another nickel. At this point, the serviceman sees the desired price displayed so he moves rocker switch 353 back to its off position, opening switch 73. When MPU 11 returns from subroutine DELA2, it finds that switch 73 is open and stops incrementing display 15a. Thus, MPU 11 is responsive to switch 73 being in its activated state, i.e., closed, to continuously increment the price on display 15a and is responsive to switch 73 being in its deactivated state, i.e., closed, to cease incrementing the displayed price. To load the potential new price shown on display 15a, the serviceman merely presses load button 69 and the desired selection switch 13g, as before.

Moving rocker switch 353 one position "DOWN" causes switch 74 to close and the price displayed on display 15a to be decremented. MPU 11, in response to the interrupt generated by the closure of switch 74, stores the row information, i.e., 80, and the column information, i.e., 20, of switch 74 in buffers SELINF and SELINF+1 and jumps to subroutine LDPRI. The second step in subroutine LDPRI is to check for these contents of buffers SELINF and SELINF+1. When MPU 11 determines that the contents of SELINF and SELINF+1 are 8020, it decrements the price displayed on display 15a by a nickel by subtracting the data 05 from the contents of buffer KEYBD1+1. After this subtraction, MPU 11 proceeds to subroutine DELA2 where it displays the new potential price during sixty-four executions of the subroutine. MPU 11 then returns from subroutine DELA2 and checks to see if switch 74 is still closed. If it is, it again decrements the contents of buffer KEYBD1+1 and returns to subroutine DELA2. Only when switch 74 is opened does MPU 11 stop decrementing display 15a. That is, as long as switch 74 is closed MPU 11 continuously decrements the price displayed on display 15a. When the desired price is reached, the serviceman moves rocker switch 353 to its off position and loads the price as above.

Sometimes the serviceman may wish to increment or decrement the displayed price at a faster rate than that resulting from the closure of switches 73 and 74 above. To increment at this faster rate, he presses rocker switch 353 to its full "UP" position (to increment up) or its full "DOWN" position (to decrement) which in either case closes switch 75. Switch 75 is connected through pin 41 of plug P1 to line PB6 of chip PIA2, so when it is closed line PB6 goes High. MPU 11 checks line PB6 of chip PIA2 in subroutine LDPRI. If that line is High, MPU 11 changes the number of times it executes subroutine DELA2 at each price from sixty-four to ten. As a result display 15a is incremented about six times faster when switch 75 is closed than when it is open.

After checking and setting the prices of items 3, the serviceman returns the price-setting module (module 337, 351 and 355) to holder 339 which switches switch 98 to its vend position. Up until this point, switch 98 had been in the price-setting mode and display 15a had been displaying the contents of buffers KEYBD1 and KEYBD1+1. In response to switch 98 being put in the vend position, MPU 11 erases (in subroutine DISP72) the contents of buffers KEYBD1 and KEYBD1+1. As a result display 15a goes blank. Thus switch 98 also constitutes means for causing MPU 11 to cease supplying a coded potential new price signal to display circuit 47 when control circuit 7 is set from the price-setting mode to the vending mode.

The pin assignments for the major integrated circuit chips used in control circuit 7 are as follows:

| PIAs PIA1-PIA6 | | | | | |
|---|---|---|---|---|---|
| Pin No. | Pin | Pin No. | Pin | Pin No. | Pin |
| 1 | $V_{ss}$ | 15 | PB5 | 28 | D5 |
| 2 | PA0 | 16 | PB6 | 29 | D4 |
| 3 | PA1 | 17 | PB7 | 30 | D3 |
| 4 | PA2 | 18 | CB1 | 31 | D2 |
| 5 | PA3 | 19 | CB2 | 32 | D1 |
| 6 | PA4 | 20 | $V_{cc}$ | 33 | D0 |
| 7 | PA5 | 21 | R/W | 34 | $\overline{Reset}$ |
| 8 | PA6 | 22 | CS0 | 35 | RS1 |
| 9 | PA7 | 23 | $\overline{CS2}$ | 36 | RS0 |
| 10 | PB0 | 24 | CS1 | 37 | $\overline{IRQB}$ |
| 11 | PB1 | 25 | E | 38 | $\overline{IRQA}$ |
| 12 | PB2 | 26 | D7 | 39 | CA2 |
| 13 | PB3 | 27 | D6 | 40 | CA1 |
| 14 | PB4 | | | | |

| EAROMs | | | | | |
|---|---|---|---|---|---|
| Pin No. | Pin | Pin No. | Pin | Pin No. | Pin |
| 1 | D1 | 11 | D10 | 20 | A1 |
| 2 | D2 | 12 | D11 | 21 | A2 |
| 3 | D3 | 13 | D12 | 22 | A3 |
| 4 | D4 | 14 | D13 | 23 | A4 |
| 5 | D5 | 15 | D14 | 24 | $V_{GG}(-28V)$ |
| 6 | D6 | 16 | D15 | 25 | C1 |
| 7 | Gnd | 17 | $V_{ss}(+5V)$ | 26 | C2 |
| 8 | D7 | 18 | Clock | 27 | CS |
| 9 | D8 | 19 | A0 | 28 | D0 |
| 10 | D9 | | | | |

| ROMs | | | | | |
|---|---|---|---|---|---|
| Pin No. | Pin | Pin No. | Pin | Pin No. | Pin |
| 1 | A7 | 9 | D0 | 17 | D7 |
| 2 | A6 | 10 | D1 | 18 | Progr. |
| 3 | A5 | 11 | D2 | 19 | $V_{DD}$ |
| 4 | A4 | 12 | $V_{ss}$ | 20 | CS/WE |
| 5 | A3 | 13 | D3 | 21 | $V_{BB}$ |
| 6 | A2 | 14 | D4 | 22 | A9 |
| 7 | A1 | 15 | D5 | 23 | A8 |
| 8 | A0 | 16 | D6 | 24 | $V_{cc}$ |

| RAMs | | | | | |
|---|---|---|---|---|---|
| Pin No. | Pin | Pin No. | Pin | Pin No. | Pin |
| 1 | Gnd | 9 | D7 | 17 | A6 |
| 2 | D0 | 10 | CS0 | 18 | A5 |
| 3 | D1 | 11 | $\overline{CS1}$ | 19 | A4 |
| 4 | D2 | 12 | $\overline{CS2}$ | 20 | A3 |
| 5 | D3 | 13 | $\overline{CS3}$ | 21 | A2 |
| 6 | D4 | 14 | $\overline{CS4}$ | 22 | A1 |
| 7 | D5 | 15 | $\overline{CS5}$ | 23 | A0 |
| 8 | D6 | 16 | R/W | 24 | $V_{cc}$ |

| MPU 11 | | | | | |
|---|---|---|---|---|---|
| Pin No. | Pin | Pin No. | Pin | Pin No. | Pin |
| 1 | $V_{ss}$(Gnd) | 15 | A6 | 28 | D5 |
| 2 | $\overline{Halt}$ | 16 | A7 | 29 | D4 |
| 3 | φ1 | 17 | A8 | 30 | D3 |
| 4 | $\overline{IRQ}$ | 18 | A9 | 31 | D2 |
| 5 | VMA | 19 | A10 | 32 | D1 |
| 6 | $\overline{NMI}$ | 20 | A11 | 33 | D0 |
| 7 | BA | 21 | $V_{ss}$(Gnd) | 34 | R/W |
| 8 | $V_{cc}$ | 22 | A12 | 35 | N.C.(no connection) |
| 9 | A0 | 23 | A13 | 36 | DBE |
| 10 | A1 | 24 | A14 | 37 | φ2 |
| 11 | A2 | 25 | A15 | 38 | N.C. |
| 12 | A3 | 26 | D7 | 39 | TSC |
| 13 | A4 | 27 | D6 | 40 | $\overline{Reset}$ |
| 14 | A5 | | | | |

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

```
00001                     NAM    START
00002           * USE THIS PROGRAM BEFORE YOU USE ANY OTHER FILES
00003           * THIS PROGRAM CONTAINS THE OPTIONS AND ORG STATE
00004           * THAT ARE REQUIRED BEFORE THE FILES THAT ARE RUN
00005           * THE RASM COMMAND.
00006                     OPT    REL
00007A 2FFE               ORG    $2FFE
00008A 2FFE   2400   A    FDB    BOOT
00009A 2FF8               ORG    $2FF8
00010A 2FF8   2BCA   A    FDB    INTERP
00011
00012                     TTL    HMCF58 *MVC SYSTEM.
00013           *THIS LIST INCORPORATES ELEVATOR CONTROL SUBROUTI
00014           *STORING OF TOTAL SALES INVENTORY IN EAROMS.
00015           *CONTAINS SUBROUTINES TO HANDLE ROLLING PRICES.
00016           *INITIALIZATION OF PRODUCT SENSORS.
00017           *VALIDATOR INITIALIZATION DURING THE BOOT SUBROUT
00018           *
00019           *PIA'S ADDRESS DEFINITION.
00020A 1008               ORG    $1008
00021A 1008   0001   A    PIA1AD RMB    1
00022A 1009   0001   A    PIA1AC RMB    1
00023A 100A   0001   A    PIA1BD RMB    1
00024A 100B   0001   A    PIA1BC RMB    1
00025A 1010               ORG    $1010
00026A 1010   0001   A    PIA2AD RMB    1
00027A 1011   0001   A    PIA2AC RMB    1
00028A 1012   0001   A    PIA2BD RMB    1
00029A 1013   0001   A    PIA2BC RMB    1
00030A 1020               ORG    $1020
00031A 1020   0001   A    PIA3AD RMB    1
00032A 1021   0001   A    PIA3AC RMB    1
00033A 1022   0001   A    PIA3BD RMB    1
00034A 1023   0001   A    PIA3BC RMB    1
00035A 1040               ORG    $1040
00036A 1040   0001   A    PIA4AD RMB    1
00037A 1041   0001   A    PIA4AC RMB    1
```

```
00038A 1042    0001   A PIA4BD  RMB   1
00039A 1043    0001   A PIA4BC  RMB   1
00040A 1080                       ORG   $1080
00041A 1080    0001   A PIA5AD  RMB   1
00042A 1081    0001   A PIA5AC  RMB   1
00043A 1082    0001   A PIA5BD  RMB   1
00044A 1083    0001   A PIA5BC  RMB   1
00045A 1100                       ORG   $1100
00046A 1100    0001   A PIA6AD  RMB   1
00047A 1101    0001   A PIA6AC  RMB   1
00048A 1102    0001   A PIA6BD  RMB   1
00049A 1103    0001   A PIA6BC  RMB   1
00050A 0030                       ORG   $0030
00051                  *BEGINNING OF STACK AND SCRATCHPAD.
00052                  *FLAG 5 IS STATUS FLAG
00053                  *01=CREM DISABLED,02=LEADING 0'S FLAG
00054                  *04=FULL ESCROW PAYBACK,08=LONG DELAY
00055                  *10=DISPLAY NEXT DIGIT,20=LEAST COIN PAYBACK
00056                  *40=DISP TWO MSD'S,80=LOAD PRICE
00057A 0030    0001   A FLG5    RMB   1
00058                  *ELEVATOR CONTROL FLAGS
00059                  *FLAG 6
00060                  *01=PYBK PULSE OFF,02=PYBK PULSE ON,04=IN PYBK MO
00061                  *08=DOWN MODE,10=RUN RELAY DE-ENERGIZED,20=RUN RE
00062                  *40=UP MODE,80=PAYBACK COMPLETE
00063A 0031    0001   A FLG6    RMB   1
00064                  *FLAG 7
00065                  *01=(UNUSED),02=ENTER PAYBACK,04=END OF PAYBACK P
00066                  *08=IN PAYOUT,10=ELEVATOR CONTROL COMPLETE,20=$1
00067                  *40=M/C NOGO,80=ALL ANTI-JACKPOT DELAYS EMPTY
00068A 0032    0001   A FLG7    RMB   1
00069                  *TIME BASE CLOCK (TBC)BUFFER
00070A 0033    0001   A TBC     RMB   1
00071                  *SPEED SENSOR CLOCK (SSC) BUFFER
00072A 0034    0001   A SPEED1  RMB   1
00073                  *PAYBACK PULSE ON/OFF DURATION BUFFER
00074A 0035    0001   A PAYBK1  RMB   1
00075                  *COINS/CURRENCY BUFFER
00076A 0036    0001   A COIREG  RMB   1
00077                  *TOTAL SALES INVENTORY BUFFER
00078A 0037    0004   A INVO4   RMB   4
00079                  *TEMPORARY DISPLAY FLAG
00080A 003B    0004   A DISP2   RMB   4
00081                  *CREDIT BUFFER
00082A 003F    0004   A CREDH   RMB   4
00083                  *CLEARING OF SELECTED STORAGE LOCATIONS BEGIN HER
00084A 0043    0004   A INCRH   RMB   4
00085A 0047    0004   A DIFFH   RMB   4
00086                  *NUMBER OF COINS BUFFERS USED FOR FULL ESCROW PAY
00087A 004B    0001   A FENIC   RMB   1
00088A 004C    0001   A FEDI    RMB   1
00089A 004D    0001   A FEQUAR  RMB   1
00090A 004E    0001   A FEONEC  RMB   1
00091A 004F    0001   A FEONEB  RMB   1
00092A 0050    0001   A FETWO   RMB   1
00093                  *COST BUFFER
00094A 0051    0002   A COSTH   RMB   2
00095                  *COIN TYPE BUFFER
00096A 0053    0001   A CONTYP  RMB   1
00097A 0054    0002   A TEMP1   RMB   2
00098A 0056    0002   A TEMP2   RMB   2
00099A 0058    0002   A TEMP3   RMB   2
00100A 005A    0002   A TEMP4   RMB   2
00101A 005C    0002   A TEMP5   RMB   2
00102                  *COINS/CURRENCY BUFFER
00103                  *SELECTIONS COLUMN BUFFER
00104A 005E    0001   A HORSOL  RMB   1
```

```
00105                           *SELECTIONS NUMBER BUFFER
00106A 005F    0001    A SELECT RMB     1
00107                           *PRICE-KEYBOARD BUFFERS
00108A 0060    0003    A KEYBD1 RMB     3
00109A 0063    0001    A KEYBD2 RMB     1
00110                           *SELECTIONS ROW BUFFER
00111A 0064    0002    A SELINF RMB     2
00112A 0066    0001    A DELAY1 RMB     1
00113A 0067    0001    A DELAY2 RMB     1
00114A 0068    0001    A DELAY3 RMB     1
00115A 0069    0001    A DELAY4 RMB     1
00116A 006A    0001    A DELAY5 RMB     1
00117A 006B    0001    A DELAY6 RMB     1
00118A 006C    0001    A JACKP1 RMB     1
00119A 006D    0001    A JACKP2 RMB     1
00120A 006E    0001    A JACKP3 RMB     1
00121A 006F    0001    A JACKP4 RMB     1
00122A 0070    0002    A JACKP5 RMB     2
00123A 0072    0002    A JACKP6 RMB     2
00124A 0074    0002    A JACKP7 RMB     2
00125A 0076    0001    A JACKP8 RMB     1
00126A 0084                       ORG   $0084
00127A 0084    0060    A PRICE  RMB     96
00128A 2400                       ORG   $2400
00129                           *POWER-ON SUBROUTINE
00130A 2400 0F         BOOT     SEI
00131                           *CLEAR SCRATCHPAD LOCATIONS.
00132A 2401 CE 0030  A          LDX    #$0030
00133A 2404 6F 00    A BOOT01   CLR    0,X
00134A 2406 08                  INX
00135                           *CHECK FOR BEGINNING OF PRICE STORAGE
00136A 2407 8C 006C  A          CPX    #DELAY6+1
00137A 240A 26 F8 2404          BNE    BOOT01
00138                           *DESIGNATE BEGINNING OF STACK
00139A 240C 8E 002F  A          LDS    #$2F
00140                           *CONFIGURE I/O & DDR'S
00141A 240F 86 3F    A          LDAA   #$3F
00142A 2411 B7 1010  A          STAA   PIA2AD
00143A 2414 B7 1012  A          STAA   PIA2BD
00144A 2417 86 0F    A          LDAA   #$0F
00145A 2419 B7 1100  A          STAA   PIA6AD
00146A 241C 86 C0    A          LDAA   #$C0
00147A 241E B7 1082  A          STAA   PIA5BD
00148A 2421 86 7F    A          LDAA   #$7F
00149A 2423 B7 1022  A          STAA   PIA3BD
00150                           *CONFIGURE OUTPUT DDR'S
00151A 2426 73 1008  A          COM    PIA1AD
00152A 2429 73 1080  A          COM    PIA5AD
00153A 242C 73 1040  A          COM    PIA4AD
00154                           *CONFIGURE NON-INTERRUPTING PIA'S
00155A 242F 86 04    A          LDAA   #$04
00156A 2431 B7 1021  A          STAA   PIA3AC
00157A 2434 B7 1081  A          STAA   PIA5AC
00158A 2437 B7 1041  A          STAA   PIA4AC
00159A 243A B7 1011  A          STAA   PIA2AC
00160                           *ENABLE COIN INTERRUPTS
00161A 243D BD 2498  A          JSR    BOOT72
00162                           *CHECK M/C STATUS
00163A 2440 8D 33 2475 BOOT04   BSR    MACSTA
00164A 2442 24 FC 2440          BCC    BOOT04
00165                           *M/C STATUS IS GO
00166                           *GET TOTAL SALES INFORMATION
00167A 2444 BD 2A4C  A          JSR    RDTOSL
00168                           *ENERGIZE DOOR LOCK SOLENOID
00169A 2447 86 20    A          LDAA   #$20
00170A 2449 B7 1010  A          STAA   PIA2AD
00171                           *ENABLE SOME INTERRUPTING PIA'S
```

```
00172A 244C 8D 7E 24CC        BSR     BOOT22
00173                  *INITIALIZE $1-COIN ESCROW
00174A 244E 86 04    A        LDAA    #$04
00175A 2450 B7 1100  A        STAA    PIA6AD
00176                  *INITIALIZE PRODUCT SENSOR
00177A 2453 86 40    A        LDAA    #$40
00178A 2455 B7 1082  A        STAA    PIA5BD
00179                  *CLEAR INTERRUPTS
00180A 2458 BD 24A7  A        JSR     CLRINT
00181                  *PULSE VALIDATOR ACCEPT
00182A 245B B6 1100  A        LDAA    PIA6AD
00183A 245E 8A 08    A        ORAA    #$08
00184A 2460 B7 1100  A        STAA    PIA6AD
00185                  *DELAY
00186A 2463 CE 0010  A        LDX     #$0010
00187A 2466 BD 2ED7  A        JSR     DELA2
00188                  *CLEAR VALIDATOR PULSE
00189A 2469 B6 1100  A        LDAA    PIA6AD
00190A 246C 84 F7    A        ANDA    #$F7
00191A 246E B7 1100  A        STAA    PIA6AD
00192A 2471 0E                CLI
00193                  *END OF POWER-ON SUBROUTINE.
00194A 2472 7E 209B  A        JMP     FIRTS1
00195                  *CHECKING M/C STATUS
00196                  *CHECK FOR ELEVATOR HOME
00197A 2475 8D 15 248C MACSTA BSR    ELHOME
00198A 2477 26 11 248A        BNE     MACST3
00199                  *ELEVATOR MOTOR NOT AT HOME.
00200                  *TEST FOR TRAY MOTOR (TM) AT 180-DEGREES
00201                  *OFF HOME POSITION.
00202A 2479 BD 2492  A        JSR     TM180D
00203A 247C 26 02 2480        BNE     MACST1    TO ENERGIZE RUN RELAY.
00204                  *EXIT
00205A 247E 20 05 2485        BRA     MACST2
00206                  *ENERGIZE RUN RELAY.
00207A 2480 86 10    A MACST1 LDAA    #$10
00208A 2482 BD 2AD9  A        JSR     RUNR01
00209                  *DELAY
00210A 2485 BD 2ED4  A MACST2 JSR    DELA1
00211A 2488 0C                CLC
00212A 2489 39                RTS
00213                  *M/C IS GO.
00214A 248A 0D        MACST3  SEC
00215A 248B 39                RTS
00216                  *TESTING FOR ELEVATOR AT HOME.
00217A 248C B6 1082  A ELHOME LDAA   PIA5BD
00218A 248F 84 10    A        ANDA    #$10
00219A 2491 39                RTS
00220                  *TESTING FOR TRAY MOTOR (TM) 180-DEGREES.
00221                  *OFF HOME POSITION.
00222A 2492 B6 1012  A TM180D LDAA   PIA2BD
00223A 2495 84 80    A        ANDA    #$80
00224A 2497 39                RTS
00225                  *INITIALIZE COIN INTERRUPTS.
00226A 2498 86 07    A BOOT72 LDAA   #$07
00227                  *$1-COIN.
00228A 249A B7 1013  A BOOT73 STAA   PIA2BC
00229                  *25-CENTS
00230A 249D B7 1023  A        STAA    PIA3BC
00231                  *10-CENTS
00232A 24A0 B7 1083  A        STAA    PIA5BC
00233                  *5-CENTS
00234A 24A3 B7 1003  A        STAA    PIA1AC
00235A 24A6 39                RTS
00236                  *CLEAR PRESENT INTERRUPTS.
```

```
00237                         *COINS
00238A 24A7 B6 1008   A CLRINT LDAA    PIA1AD
00239A 24AA B6 1010   A        LDAA    PIA2AD
00240A 24AD B6 1012   A        LDAA    PIA2BD
00241A 24B0 B6 1022   A        LDAA    PIA3BD
00242A 24B3 B6 1032   A        LDAA    PIA5BD
00243                         *OTHER INTERRUPTS.
00244A 24B6 B6 1042   A CLRINI LDAA    PIA4BD
00245A 24B9 B6 1100   A        LDAA    PIA6AD
00246A 24BC B6 1102   A        LDAA    PIA6BD
00247A 24BF B6 100A   A        LDAA    PIA1BD
00248A 24C2 B6 1040   A        LDAA    PIA4AD
00249A 24C5 B6 1020   A        LDAA    PIA3AD
00250A 24C8 B6 1030   A        LDAA    PIA5AD
00251A 24CB 39                 RTS
00252                         *CONFIGURE INTERRUPTING PIA'S (LEADING EDGE).
00253                         *ENABLE CREDIT RECALL/PAYOUT REQUEST
00254                         *AND CLEARING OF TOTAL SALES INVENTORY.
00255A 24CC 86 07     A BOOT22 LDAA    #$07
00256A 24CE B7 1103   A        STAA    PIA6BC
00257A 24D1 B7 1101   A        STAA    PIA6AC
00258A 24D4 B7 100B   A        STAA    PIA1BC
00259A 24D7 01          BOOT24 NOP
00260                         *ENABLE SELECTION/PRICE INTERRUPTS.
00261A 24D8 86 1F     A        LDAA    #$1F
00262A 24DA B7 1043   A        STAA    PIA4BC
00263A 24DD 39                 RTS
00264                         *LOADING OR DISPLAYING PRICE SUBROUTINE.
00265                         *
00266                         *WE ARRIVE AT "LDPRI" FROM "PRIDIS",WHERE DATA FR
00267                         *SELECTION OR PRICE K.B.SWITCHES WAS OBTAINED.
00268                         *IN "LDPRI",WE IDENTIFY WHICH "Y" KEY WAS
00269                         *DEPRESSED. THIS IS DONE AT SUBROUTINE "SEL10".
00270                         *THERE,IF A SELECTION SWITCH WAS
00271                         *IDENTIFIED,IT'S COST WAS OBTAINED FROM THE
00272                         *EAROM AND STORED IN "COSTH" BUFFERS.
00273                         *THEN,IN "LDPRI","ACCB" IS TESTED.
00274                         *ACCB=0 MEANS THAT THE PRICE K.B. BUFFERS
00275                         *"KEYBD1" AND "KEYBD1+1",ARE DISPLAYED.
00276                         *(THESE BUFFERS ARE NORMALLY UPDATED AT "SEL10").
00277                         *ALSO, IF "ACCB"=0, TESTING OF THE LOAD-PRICE
00278                         *FLAG IS BYPASSED TO AVOID LOADING A PRICE
00279                         *BEFORE A SELECTION SWITCH IS DEPRESSED.
00280                         *PRICE LOADING FOLLOWS THE SEQUENCE OF THE
00281                         *LOAD PRICE SHIFTING OF PRICE DIGITS IS DONE
00282                         *IN THE KEYBOARD SUBROUTINE WHILE
00283                         *FLAG(*=$0A) BEING CLOSED FIRST AND THE SELECTION
00284                         *SWITCH WHOSE PRICE IS TO BE CHANGED IS DEPRESSED
00285                         *NEXT,IF "ACCB"IS NOT =0, IT'S CONTENTS ARE TESTE
00286                         *FOR THE PRESENTS OF THE DISPLAY-TOTAL-SALES
00287                         *FLAG(*=$0C). IF THIS FLAG IS PRESENT,DISPLAY OF
00288                         *TOTAL SALES SUBROUTINE IS FOLLOWED. IF THE FLAG
00289                         *IS NOT PRESENT,"ACCB" IS ASSUMED TO CONTAIN THE
00290                         *ADDRESS OF A VALID SELECTION. HENCE, THE LOAD-PR
00291                         *(*=$0A) FLAG IS CHECKED. IF THIS FLAG IS PRESENT
00292                         *CONTENTS OF "ACCB" ARE USED TO ADDRESS A LOCATIO
00293                         *IN "EAROM" WHOSE PRICE IS TO BE CHANGED.
00294                         *THIS IS DONE FOLLOWING LOAD-PRICE SUBROUTINE.
00295                         *IF LOAD-PRICE FLAG IS NOT PRESENT,WE DISPLAY PRI
00296                         *OF SELECTION REQUESTED. BUFFERS OF "COSTH" CONTA
00297                         *SELECTION'S PRICE INFO.
00298A 24DE 01          LDPRI NOP
00299                         *I.D. KEY
00300A 24DF BD 26E1   A        JSR     SEL10
00301                         *TEST "ACCB" FOR VALID KEY.
00302                         *CHECK FOR VALID SELECTION.
00303A 24E2 C1 00     A        CMPB    #$00
00304A 24E4 26 04 24EA        BNE     LDPR06
```

```
00305                           *SELECTION INVALID, DISPLAY PRICE-K.B. BUFFERS.
00306A 24E6 DE 60     A             LDX     KEYBD1
00307A 24E8 20 13 24FD              BRA     LDPROC
00308A 24EA 96 30     A LDPR06 LDAA FLG5
00309                           *TEST FOR LOAD PRICE FLAG($80).
00310A 24EC 84 80     A             ANDA    #$80
00311A 24EE 27 0D 24FD              BEQ     LDPROC
00312                           *LOAD NEW PRICE.
00313                           *RESET FLAG.
00314A 24F0 86 7F     A             LDAA    #$7F
00315A 24F2 BD 2502   A             JSR     REFLG5
00316                           *LOADING NEW PRICE.
00317                           *"ACCB" HAS ADDRESS OF SELECTION.
00318A 24F5 BD 252A   A             JSR     LDPR07
00319                           *PERFORM READ CYCLE TO ASSURE CORRECT
00320                           *DATA HAS BEEN WRITTEN IN EAROM.
00321A 24F8 D6 54     A             LDAB    TEMP1
00322A 24FA BD 273C   A             JSR     READ02
00323                           *COSTH BUFFER HAS PRICE INFO.
00324A 24FD DF 60     A LDPROC STX  KEYBD1
00325A 24FF 20 13 2514              BRA     LDPR46
00326                           *EXIT
00327A 2501 BD 2DA0   A LDPRIC JSR  DISPLY
00328                           *CHECK FOR ELEVATOR AT HOME.
00329A 2504 BD 248C   A             JSR     ELHOME
00330A 2507 27 F8 2501              BEQ     LDPRIC
00331                           *ELEVATOR IS AT HOME.
00332                           *CHECK FOR TRAY MOTOR NOT AT HOME.
00333A 2509 BD 2492   A             JSR     TM180D
00334A 250C 26 F3 2501              BNE     LDPRIC
00335                           *RESET CREM-ENABLED FLAG.
00336A 250E 96 30     A             LDAA    FLG5
00337A 2510 84 FE     A             ANDA    #$FE
00338A 2512 97 30     A             STAA    FLG5
00339                           *TEST FOR ANTI-JACKPOT-DELAY FLAG(FLG7=$80).
00340A 2514 96 32     A LDPR46 LDAA FLG7
00341A 2516 84 80     A             ANDA    #$80
00342A 2518 27 05 251F              BEQ     LDPR47    TO ENABLE COIN INTERRUPTS
00343                           *ANTI-JACKPOT-DELAY FLAG IS SET.
00344                           *DO NOT ENABLE COIN INTERRUPTS.
00345                           *ENABLE TBC INTERRUPTS.
00346A 251A BD 2863   A             JSR     VEND0B
00347A 251D 20 03 2522             BRA      LDPR43    TO ENABLE OTHER INTERRUPTS
00348                           *ENABLE COIN INTERRUPTS.
00349A 251F BD 2498   A LDPR47 JSR  BOOT72
00350                           *ENABLE OTHER INTERRUPTS.
00351A 2522 BD 24CC   A LDPR43 JSR  BOOT22
00352                           *CLEAR EXISTING INTERRUPTS.
00353A 2525 BD 24E6   A LDPR45 JSR  CLRINI
00354A 2528 0E                      CLI
00355A 2529 3B                      RTI
00356                           *EAROM ERASE/WRITE SUBROUTINE.
00357                           *INITIALIZE PIA'S.
00358A 252A 4F            LDPR07 CLRA
00359A 252B BD 2763   A             JSR     READ04
00360                           *BEGIN ERASE CYCLE.
00361                           *"ACCB"HAS PRICE'S ADDRESS.
00362A 252E F7 1008   A             STAB    PIA1AD    ADDRESS OUT
00363                           *SAVE ADDRESS INFO.
00364A 2531 97 54     A             STAA    TEMP1
00365                           *MASK ERASE MODE (101X XXXX)
00366A 2533 CA A0     A             ORAB    #$A0
00367A 2535 F7 1008   A             STAB    PIA1AD
00368                           *DELAY TO ERASE (100MSEC. MAX.)
00369A 2538 CE 0001   A             LDX     #$0001
00370A 253B BD 2ED7   A             JSR     DELA2
00371                           *BEGIN WRITE CYCLE.
```

```
00372                  *INITIALIZE PIA1B AND PIA6B AS OUTPUTS.
00373A 253E 86 FF    A         LDAA    #$FF
00374A 2540 BD 27B3  A         JSR     READ04
00375                  *DATA OUT FIRST.
00376A 2543 96 60    A         LDAA    KEYBD1
00377A 2545 B7 1102  A         STAA    PIA6BD     MSD OF PRICE
00378A 2548 96 61    A         LDAA    KEYBD1+1
00379A 254A B7 100A  A         STAA    PIA1BD     LSD OF PRICE.
00380                  *MASK WRITE MODE CONTROL (100X XXXX).
00381A 254D F6 1008  A         LDAB    PIA1AD
00382A 2550 C8 20    A         EORB    #$20
00383A 2552 F7 1008  A         STAB    PIA1AD
00384                  *DELAY FOR WRITE CYCLE (100 MSEC. MAX.)
00385A 2555 CE 0005  A         LDX     #$0005
00386A 2558 BD 2ED7  A         JSR     DELA2
00387A 255B 39                 RTS
00388                  *THIS SUBROUTINE IDENTIFIES COINS/CURRENCY.
00389A 255C    0200  A CURREN  FDB     $0200,$0100
     A 255E    0100  A
00390A 2560    0100  A COINS   FDB     $0100,$0025,$0010,0005
     A 2562    0025  A
     A 2564    0010  A
     A 2566    0005  A
00391                  *PRESENT COIN INTERRUPT IS DISABLED FOR
00392                  *A TIME EQUIVALENT TO THE TRANSIT-TIME OF THE COI
00393                  *PASSING THRU THE OPTICAL-COUPLER BEAM.
00394                  *PRESENT INTERRUPT REMAINS DISABLED UNTIL THE
00395                  *ANTI-JACKPOT DELAY BUFFERS CLEAR FLAG IS SET.(FL
00396A 2568 96 36    A CONTSK  LDAA    COIREG
00397A 256A 27 15 2581         BEQ     CONT04
00398A 256C CE 255C  A         LDX     #CURREN
00399A 256F DF 54    A         STX     TEMP1
00400A 2571 CE 0050  A         LDX     #FETWO
00401A 2574 C6 04    A         LDAB    #$04
00402A 2576 17              CONT02 TBA
00403A 2577 0C                 CLC
00404A 2578 94 36    A         ANDA    COIREG
00405A 257A 26 08 2584         BNE     CONT06
00406                  *COIN/CURRENCY NOT FOUND. CHECK REMAINING CHANNEL
00407A 257C 59                 ROLB
00408A 257D 8D 65 25E4         BSR     CONT0C
00409A 257F 26 F5 2576         BNE     CONT02
00410                  *EXIT
00411A 2581 7E 2514  A CONT04  JMP     LDPR46
00412                  *COIN FOUND.
00413A 2584 98 36    A CONT06  EORA    COIREG
00414A 2586 97 36    A         STAA    COIREG
00415                  *SAVE COIN BUFFER'S ADDRESS.
00416A 2588 DF 56    A         STX     TEMP2
00417                  *CHECK FOR $1 COIN.
00418A 258A 8C 004E  A         CPX     #FEONEC
00419A 258D 26 03 2592         BNE     CONT07     TO CHECK FOR $1 BILL.
00420                  *ENERGIZE $1 COIN ESCROW RELAY.
00421A 258F BD 2834  A         JSR     RELIC1
00422                  *CHECK FOR $1 BILL.
00423A 2592 8C 004F  A CONT07  CPX     #FEONEB
00424A 2595 26 05 259C         BNE     CONT08     TO CONTINUE.
00425                  *$1 BILL IS PRESENT.
00426                  *SET FLAG (FLG7=20).
00427A 2597 86 20    A         LDAA    #$20
00428A 2599 BD 2B14  A         JSR     SEFLG7
00429                  *GET COINS/CURRENCY VALUE.
00430A 259C DE 54    A CONT08  LDX     TEMP1
00431A 259E EE 00    A         LDX     0,X
00432A 25A0 DF 45    A         STX     INCRH+2
00433                  *ADD COIN/CURRENCY TO CREDIT.
00434A 25A2 8D 48 25EC        BSR     ADDTSK
00435                  *RECOVER COIN BUFFERS ADDRESS.
```

```
00436A 25A4 DE 56     A            LDX     TEMP2
00437                       *TEST FOR NUMBER OF COINS/BILLS>20.
00438A 25A6 6C 00     A            INC     0,X
00439A 25A8 C6 15     A            LDAB    #21
00440A 25AA E0 00     A            SUBB    0,X
00441A 25AC 26 0F 25BD            BNE     CONT09
00442                       *NUMBER OF COINS/BILLS>20.
00443                       *DELAY TO DISPLAY 21ST. COIN.
00444A 25AE CE 0050   A            LDX     #$0050
00445A 25B1 BD 0067   A            JSR     DELAY2
00446                       *RETURN CUSTOMER'S ORIGINAL CREDIT IN FULL ESCROW
00447                       *DISABLE CREM
00448A 25B4 BD 25DD   A            JSR     CONT0B
00449                       *SET CREM DISABLED FLAG.
00450A 25B7 BD 25CB   A            JSR     CONT0D
00451                       *EXIT
00452A 25BA 7E 2605   A            JMP     RECAL1
00453                       *TEST FOR CREDIT>$4.95
00454A 25BD CE 0495   A  CONT09 LDX  #$0495
00455A 25C0 BD 2658   A            JSR     SUBTSK
00456A 25C3 2D A3 2568            BLT     CONTSK
00457                       *CREDIT IS GREATER THAN $4.95
00458                       *DISABLE CREM AND ALLOW TO BUY PRODUCT.
00459A 25C5 8D 04 25CB            BSR     CONT0D
00460A 25C7 8D 14 25DD            BSR     CONT0B
00461                       *CONTINUE SEARCH FOR COINS/CURRENCY.
00462A 25C9 20 9D 2568            BRA     CONTSK
00463                       *SET CREM-DISABLED FLAG.
00464A 25CB 86 01     A  CONT0D LDAA #$01
00465                       *SUBROUTINE USED TO SET FLAG 5.
00466A 25CD 9A 30     A  SEFLG5 ORAA FLG5
00467A 25CF 97 30     A  SET5   STAA FLG5
00468A 25D1 39                   RTS
00469                       *SUBROUTINE USED TO RESET FLAG 5.
00470A 25D2 94 30     A  REFLG5 ANDA FLG5
00471A 25D4 20 F9 25CF            BRA     SET5
00472                       *ENABLE CREM
00473A 25D6 8A 1022   A  CONT0A ORAA PIA3BD
00474A 25D9 B7 1022   A  CONT1A STAA PIA3BD
00475A 25DC 39                   RTS
00476                       *DISABLE CREM.
00477A 25DD 86 EF     A  CONT0B LDAA #$EF
00478A 25DF B4 1022   A            ANDA    PIA3BD
00479A 25E2 20 F5 25D9            BRA     CONT1A
00480                       *UPDATE COIN/CURRENCY VALUE AND COIN BUFFERS ADDR
00481A 25E4 7C 0055   A  CONT0C INC  TEMP1+1
00482A 25E7 09                   DEX
00483A 25E8 8C 004A   A            CPX     #FENIC-1
00484A 25EB 39                   RTS
00485                       *THIS SUBROUTINE IS THE ADD ROUTINE.
00486A 25EC 0C              ADDTSK CLC
00487A 25ED CE 0042   A            LDX     #CREDH+3
00488A 25F0 A6 00     A  LOOP   LDAA 0,X
00489A 25F2 A9 04     A            ADCA    4,X             INCRH/INCRL
00490A 25F4 19                   DAA
00491A 25F5 A7 00     A            STAA    0,X             CREDH/CREDL
00492A 25F7 09                   DEX
00493A 25F8 8C 003E   A            CPX     #CREDH-1
00494A 25FB 26 F3 25F0            BNE     LOOP
00495A 25FD CE 0000   A  ADL1   LDX  #$00
00496A 2600 DF 43     A            STX     INCRH
00497A 2602 DF 45     A            STX     INCRH+2
00498A 2604 39                   RTS
00499                       *THIS IS THE CREDIT RECALL SUBROUTINE.
00500                       *TEST FOR COIN'S ANTI-JACKPOT DELAY FLAG (FLG7=$8
00501A 2605 96 32     A  RECAL1 LDAA FLG7
00502A 2607 84 80     A            ANDA    #$80
```

```
00503A 2609 27 06 2611        BEQ     RECAL2
00504                  *ANTI-JACKPOT DELAY FLAG IS SET.
00505                  *REFRESH DISPLAYS,CLEAR NON-INTERRUPT MASK TO ALL
00506                  *ANTI-JACKPOT DELAY TO EXPIRE.
00507A 260B 0E                CLI
00508A 260C BD 2DA0   A       JSR     DISPLY
00509A 260F 20 F4 2605        BRA     RECAL1   TO RETEST.
00510                  *CHECK FOR $1 BILL PRESENCE.
00511A 2611 96 32     A RECAL2 LDAA   FLG7
00512A 2613 84 20     A       ANDA    #$20
00513A 2615 26 04 261B        BNE     RECAL4
00514                  *$1 BILL NOT PRESENT.
00515                  *RETURN $1 COINS IN TRACK.
00516A 2617 86 06     A       LDAA    #$06
00517A 2619 20 02 261D        BRA     RECAL6
00518                  *$1 BILL PRESENT.
00519                  *RETURN BOTH $1 COINS IN TRACK AND BILL IN VALIDA
00520A 261B 86 06     A RECAL4 LDAA   #$06
00521A 261D BD 283B   A RECAL6 JSR    RELIC5
00522                  *DELAY
00523A 2620 CE 00FE   A       LDX     #$00FE
00524A 2623 BD 2ED7   A       JSR     DELA2
00525                  *CLEAR PULSE.
00526A 2626 86 FD     A       LDAA    #$FD
00527A 2628 BD 2834   A       JSR     RELIC1
00528                  *DISABLE ALL INTERRUPTS.
00529A 262B BD 2AE5   A RECAL8 JSR    DISINT
00530                  *CHECK FOR CREDIT.
00531A 262E DE 41     A       LDX     CREDH+2
00532A 2630 27 03 2635        BEQ     RECAL9
00533                  *EXIT CREDIT NOT =0.
00534A 2632 7E 2638   A       JMP     RECALB
00535                  *EXIT CREDIT =0
00536A 2635 7E 2655   A RECAL9 JMP    RECALA
00537                  *SET RUN RELAY DE-ENERGIZED AND DOWN MODE FLAGS (
00538A 2638 86 18     A RECALB LDAA   #$18
00539A 263A BD 2E0B   A       JSR     SEFLG6
00540                  *DISABLE CREM.
00541A 263D BD 25DD   A       JSR     CONT0B
00542                  *SET CREM DISABLED FLAG.
00543A 2640 BD 25CB   A       JSR     CONT0D
00544                  *SET FULL ESCROW PAYBACK FLAG (FLG5=$04)
00545A 2643 86 04     A       LDAA    #$04
00546A 2645 BD 25CD   A       JSR     SEFLG5
00547                  *RETURN CREDIT IN FULL ESCROW MODE.
00548A 2648 BD 292D   A       JSR     VENDI7
00549                  *CHECK FOR ADDITIONAL PAYOUT.
00550A 264B B6 1100   A       LDAA    PIA6AD
00551A 264E 84 F0     A       ANDA    #$F0
00552A 2650 27 03 2655        BEQ     RECALA
00553                  *MORE PAYOUT
00554A 2652 7E 2C4C   A       JMP     PAYOU1
00555                  *EXIT
00556A 2655 7E 2501   A RECALA JMP    LDPRIC
00557                  *SUBTSK USES THE 100'S COMPLEMENT METHOD FOR DECI
00558                  *SUBTRACTION. THE 100'S COMPLEMENT OF THE SUBTRAH
00559                  *(INCRL/INCRH) IS FOUND, WHICH IS ADDED TO THE
00560                  *MINUEND
00561                  *
00562                  *THIS IS THE SUBTRACT SUBROUTINE.
00563A 2658 DF 45     A SUBTSK STX    INCRH+2   (COST)
00564A 265A 0D                SEC
00565A 265B CE 0042   A       LDX     #CREDH+3
00566A 265E 86 99     A SUBTS1 LDAA   #$99
00567A 2660 89 00     A       ADCA    #00
00568A 2662 A0 04     A       SUBA    4,X       INCRL/INCRH
00569A 2664 AB 00     A       ADDA    0,X       CREDL/CREDH
```

```
00570A 2666 19                      DAA
00571A 2667 A7 08      A            STAA    8,X        DIFFL/DIFFH
00572A 2669 09                      DEX
00573A 266A 8C 003E    A            CPX     #CREDH-1
00574A 266D 26 EF 265E              BNE     SUBTS1
00575A 266F 4F                      CLRA
00576A 2670 BD 25FD    A            JSR     ADL1
00577A 2673 DE 49      A            LDX     DIFFH+2
00578A 2675 39                      RTS
00579                        *UTILITY SUBROUTINES.*
00580                        *
00581                        *INITIALIZE/CLEAR COIN BUFFERS.
00582A 2676 CE 004B    A    ACLR1   LDX     #FENIC
00583A 2679 A7 00      A    ACLR2   STAA    0,X
00584A 267B 08                      INX
00585A 267C 8C 0051    A            CPX     #FENIC+6
00586A 267F 26 F8 2679              BNE     ACLR2
00587A 2681 39                      RTS
00588                        *CLEAR SELECTED STORAGE LOCATIONS.
00589A 2682 CE 0051    A    ACLR3   LDX     #COSTH
00590A 2685 20 03 268A              BRA     ACLR5
00591A 2687 CE 004B    A    ACLR4   LDX     #FENIC
00592A 268A 6F 00      A    ACLR5   CLR     0,X
00593A 268C 08                      INX
00594A 268D 8C 0066    A            CPX     #DELAY1
00595A 2690 26 F8 268A              BNE     ACLR5
00596A 2692 39              ACLR6   RTS
00597                        *DETERMINE ITEM SELECTED.
00598                        *THIS SUBROUTINE WILL SEARCH FOR A MATCH FOR "LSB
00599                        *OF SELECTION. FIRST, "AND",FOR "MSB" (ROWS) OF S
00600                        *THEN. SELECTION LEVEL IS STORED IN "SELECT" BUFF
00601                        *SOLENOIDS INFORMATION RESIDES IN "HORSOL" BUFFER
00602                        *WILL BE MANIPULATED LATER DURING VENTSK SUBROUTI
00603                        *COUPLING OF SELECTIONS. BUFFER "SELINF" HAS INIT
00604                        *OF SELECTION. "SELINF+1"HAS INITIAL COLUMN INFOR
00605                        *"COSTH" CONTAINS SELECTION COST.
00606A 2693 BD 26B1    A    SEL06   JSR     SEL10
00607                        *CHECK FOR FALSE SELECTION (IX=0)
00608A 2696 26 03 269B              BNE     SEL08     TO SELECTION FOUND.*EXIT
00609A 2698 7E 2522    A            JMP     LDPR43
00610                        *SELECTION FOUND.
00611A 269B 01                SEL08 NOP
00612A 269C 7E 27CA    A            JMP     NEGTSK
00613                        *HMC57
00614                        *IDENTIFY SELECTION,IF ANY. IN THIS SUBROUTINE,WE
00615                        *VALID SELECTION OR PRICE K.B. SW. CLOSURE. IF A
00616                        *SW. IS IDENTIFIED, IT'S PRICE (COST) IS DETERMIN
00617                        *"ACCB" HAS ADDRESS OF SWITCH. IF A PRICE-K.B. SW
00618                        *IDENTIFIED, WE TEST FOR PRICE-LOAD FLAG (*=0A).
00619                        *IF THIS FLAG IS PRESENT, "FLGS" IS SET TO $80,TO
00620                        *INDICATE TO "LDFRI" SUBROUTINE THAT PRICE FOR NE
00621                        *SELECTION SW. CLOSURE HAS TO BE LOADED. IF THIS
00622                        *IS NOT PRESENT, THEN WE CHECK FOR THE "0" KEY (0
00623                        *DUE TO THE FACT THAT THIS KEY IN THE PRICE-K.B.
00624                        * IS OUT"OF SEQUEFCE WAT@ RESPECT TO THE OTHER NU
00625                        *IF "0" KEQ AS DETECTED A RERG AS BAEEED IN PRICE
00626                        *BUFFERS. IF NO FLAGS ARE PRESENT, THESE BUFFERS
00627                        *ARE UPDATED BY SHIFTING DATA FROM "ACCB"
00628                        *
00629                        *INITIALIZE SELECTION'S LEVEL (SELECT)
00630                        *AND COLUMN (HORSOL) VECTORS.
00631A 269F      01     A    SEL01   FCB    $01,$02,$04,$08,$10,$20,$40,$80
       A 26A0    02     A
       A 26A1    04     A
       A 26A2    08     A
       A 26A3    10     A
       A 26A4    20     A
       A 26A5    40     A
```

```
                A 26A6      80      A
00632                               *SUBROUTINE USED TO INITIALIZE ROLL VECTORS.
00633A 26A7 DE 60      A ROLL1 LDX     KEYBD1
00634A 26A9 DF 41      A       STX     CREDH+2
00635A 26AB CE 0005    A       LDX     #$0005
00636A 26AE DF 45      A       STX     INCRH+2
00637A 26B0 39                 RTS
00638                          *CHECK FOR ROLLING PRICE DISPLAY
00639A 26B1 DE 64      A SEL10 LDX     SELINF
00640A 26B3 8C 8010    A       CPX     #$8010
00641A 26B6 27 07 26BF         BEQ     SEL12       TO ROLL UP
00642                          *CHECK FOR ROLL DOWN
00643A 26B8 8C 8020    A       CPX     #$8020
00644A 26BB 27 38 26F5         BEQ     SEL22       TO ROLL DOWN
00645A 26BD 20 4B 270A         BRA     SEL26       TO CONTINUE SEARCH
00646                          *UP ROLL
00647A 26BF BD 26A7    A SEL12 JSR     ROLL1
00648A 26C2 BD 25EC    A       JSR     ADDTSK
00649                          *MASK NUMBERS >$9.95
00650A 26C5 96 41      A SEL14 LDAA    CREDH+2
00651A 26C7 84 0F      A       ANDA    #$0F
00652A 26C9 97 60      A       STAA    KEYBD1
00653A 26CB 96 42      A       LDAA    CREDH+3
00654A 26CD 97 61      A       STAA    KEYBD1+1
00655                          *CHECK FOR FAST/SLOW ROLL
00656A 26CF B6 1012    A       LDAA    PIA2BD
00657A 26D2 84 40      A       ANDA    #$40
00658A 26D4 26 DB 26B1         BNE     SEL10       TO FAST ROLL
00659                          *SLOW ROLL DISPLAYS
00660A 26D6 CE 0040    A       LDX     #$0040
00661A 26D9 BD 2ED7    A SEL16 JSR     DELA2
00662                          *CHECK FOR SW. CLOSURE
00663A 26DC 86 80      A       LDAA    #$80
00664A 26DE B7 1040    A       STAA    PIA4AD
00665                          *SENSE UP-ROLL CLOSURE
00666A 26E1 B6 1042    A       LDAA    PIA4BD
00667A 26E4 16                 TAB
00668A 26E5 84 10      A       ANDA    #$10
00669A 26E7 27 07 26F0         BEQ     SEL20       TO SENSE DOWN ROLL
00670                          *KEEP PRICE DISPLAY ROLLING UP
00671A 26E9 20 D4 26BF         BRA     SEL12
00672                          *FAST ROLL
00673A 26EB CE 000A    A SEL18 LDX     #$000A
00674A 26EE 20 E9 26D9         BRA     SEL16
00675                          *SENSE DOWN ROLL CLOSURE
00676A 26F0 17               SEL20 TBA
00677A 26F1 84 20      A       ANDA    #$20
00678A 26F3 27 0A 26FF         BEQ     SEL24       TO EXIT
00679                          *DOWN ROLL PRICE DISPLAY
00680A 26F5 BD 26A7    A SEL22 JSR     ROLL1
00681A 26F8 BD 2658    A       JSR     SUBTSK
00682A 26FB DF 41      A       STX     CREDH+2
00683A 26FD 20 C6 26C5         BRA     SEL14       TO CONTINUE
00684A 26FF 7F 1040    A SEL24 CLR     PIA4AD
00685A 2702 CE 0000    A       LDX     #$00
00686A 2705 DF 41      A       STX     CREDH+2
00687A 2707 7E 2755    A       JMP     SEL40
00688                          *BEGIN SELECTION SEARCH
00689A 270A 86 01      A SEL26 LDAA    #$01
00690A 270C 16                 TAB
00691                          *INITIALIZE COLUMN VECTOR
00692A 270D 97 5E      A       STAA    HORSOL
00693                          *LEVEL VECTOR
00694A 270F 97 5F      A       STAA    SELECT
00695                          *GET SELECTION'S COLUMN
00696A 2711 96 65      A       LDAA    SELINF+1
00697                          *GET LOOK-UP TABLE'S ADDRESS
00698A 2713 CE 269F    A       LDX     #SEL01
```

```
00699                              *FIND SELECTION'S COLUMN MATCH
00700A 2716 A1 00       A  SEL28   CMPA    0,X
00701A 2718 27 0C 2726     BEQ     SEL30    TO MATCH ROW
00702                              *UPDATE COLUMN VECTOR
00703A 271A 08                     INX
00704A 271B 8C 26A5     A          CPX     #SEL01+6
00705A 271E 27 35 2755             BEQ     SEL40    TO EXIT
00706A 2720 78 005E     A          ASL     HORSOL
00707                              *UPDATE SELECTIONS NO. COUNTER.
00708A 2723 5C                     INCB
00709A 2724 20 F0 2716             BRA     SEL28    TO SEARCH FOR COLUMN MATCH
00710                              *COLUMN MATCH FOUND. "HORSOL" HAS COLUMN INFO. FI
00711                              *MATCH.
00712A 2726 96 64       A  SEL30   LDAA    SELINF   GET ROW'S INFO
00713A 2728 CE 269F     A          LDX     #SEL01
00714A 272B A1 00       A  SEL32   CMPA    0,X
00715                              *CHECK FOR MATCH
00716A 272D 27 0D 273C             BEQ     SEL34    TO SELECTION FOUND
00717                              *NO ROW MATCH FOUND YET
00718                              *UPDATE ROW (LEVEL) NUMBER, JUMP SIX SELECTIONS (
00719                              *UPDATE POINTER.
00720A 272F 08                     INX
00721                              *CHECK FOR END OF SELECTION SW'S ADDRESSES.
00722A 2730 8C 26A3     A          CPX     #SEL01+4
00723A 2733 27 12 2747             BEQ     SEL36    TO CHECK PRICE K.B.'S SW.
00724                              *UPDATE SELECTION NUMBER COUNTER.
00725A 2735 CB 06       A          ADDB    #$06
00726                              *JUMP SIX LOCATIONS (ONE LEVEL)
00727A 2737 78 005F     A          ASL     SELECT
00728A 273A 20 EF 272B             BRA     SEL32    TO CONTINUE SEARCH.
00729                              *SELECTION FOUND.DETERMINE PRICE.
00730                              *
00731                              *PRICE INFORMATION IS OBTAINED FROM EAROM BY MEAN
00732                              *OF PIA1 AND PIA6. THE A-SIDE OF PIA1 IS USED TO
00733                              *ADDRESS AND CONTROL THE EAROM.WHILE THE B-SIDE
00734                              *BUFFERS THE 8-LEAST-SIGNIFICANT DIGITS OF THE
00735                              *PRICE DATA. "CB2" OF PIA1 IS USED TO CLOCK EAROM
00736                              *DURING A READ CYCLE. ALGORYTHM USED TO READ MEMO
00737                              *IS AS FOLLOWS: BOTH PIA1B AND PIA6B ARE INITIALI
00738                              *AS INPUTS,AND PIA1A AS OUTPUT.THEN,ADDRESS
00739                              *READ-MODE CONTROL (110X XXXX),AND CLOCK,RESPECTI
00740                              *ARE SENT TO EAROM.CLOCK PULSE-WIDTH IS 100 NANO-
00741                              *MAX. THEN, CLOCK IS CLEARED,AND WE WAIT THE ACCE
00742                              *TIME (10 USEC. MAX.)BEFORE LOADING DATA
00743                              *ACCB AND IX ARE SAVED FOR USE ELSEWHERE IN THE P
00744                              *
00745                              *SELECTION FOUND, FIND PRICE.
00746A 273C BD 278C     A  SEL34   JSR     READ02
00747                              *"ACCB" HAS ADDRESSES OF SELECTION.
00748                              *CLEAR SELECTION BUFFERS.
00749A 273F CE 0000     A          LDX     #$00
00750A 2742 8D 17 275B             BSR     SEL42
00751A 2744 DE 51       A          LDX     COSTH
00752                              *DUMMY VALUE
00753A 2746 39                     RTS
00754                              *IN PRICE-K.B. AREA, SUBTRACT 18 (DEC) FROM
00755                              *SELECTION SW'S COUNTER TO ACCOUNT FOR SELECTION
00756                              *LOCATIONS MINUS ONE ROW. THIS COMPENSATES AND
00757                              *ADJUSTS FOR PROPER WEIGHT OF NUMERIC KEYS.
00758A 2747 C0 12       A  SEL36   SUBB    #$12
00759                              *CHECK FOR MATCH
00760A 2749 A1 00       A  SEL38   CMPA    0,X
00761A 274B 27 11 275E             BEQ     SEL44    TO PRICE-K.B. MATCH.
00762                              *UPDATE K.B. NUMBER COUNTER
00763A 274D CB 03       A          ADDB    #$03
00764                              *UPDATE ADDRESS VECTOR
```

```
00765A 274F 08                          INX
00766A 2750 8C 26A7  A                  CPX     #SEL01+8
00767A 2753 26 F4 2749                  BNE     SEL38      TO CONTINUE SEARCH
00768                           *NO MATCH FOUND.FALSE INTERRUPT.
00769A 2755 5F                  SEL40   CLRB
00770A 2756 CE 0000  A                  LDX     #$00
00771A 2759 DF 5E    A                  STX     HORSOL     CLEARS HORSOL AND SELECT.
00772                           *EXIT
00773A 275B DF 64    A  SEL42   STX     SELINF
00774A 275D 39                          RTS
00775                           *DETERMINE IF LOAD-PRICE FLAG IS PRESENT (*=0A)
00776A 275E C1 0A    A  SEL44   CMPB    #$0A
00777A 2760 26 07 2769                  BNE     SEL46      TO CHECK FOR CLEARING DISP
00778                           *SET LOAD-PRICE FLAG
00779A 2762 86 80    A                  LDAA    #$80
00780A 2764 BD 25CD  A                  JSR     SEFLG5
00781A 2767 20 EC 2755                  BRA     SEL40      TO EXIT
00782                           *CHECK FOR CLEAR:DASPLAYS KEY.
00783A 2769 C1 0C    A  SEL46   CMPB    #$0C
00784A 276B 26 07 2774                  BNE     SEL48      TO CHECK FOR ZERO KEY.
00785                           *CLEAR PRICE-DISPLAY BUFFERS
00786A 276D CE 0000  A                  LDX     #$00
00787A 2770 DF 60    A                  STX     KEYBD1
00788A 2772 20 E1 2755                  BRA     SEL40      TO EXIT
00789                           *CHECK FOR ZERO KEY.
00790A 2774 C1 0B    A  SEL48   CMPB    #$0B
00791A 2776 26 01 2779                  BNE     SEL50      TP SHIFT DIGIT.
00792A 2778 5F                          CLRB               SET ZERO FOUND.
00793                           *UPDATE PRICE-KEYBOARD BUFFERS.
00794                           *SHIFT DIGIT IN "ACCB" LEFT.
00795A 2779 58                  SEL50   ASLB
00796A 277A 58                          ASLB
00797A 277B 58                          ASLB
00798A 277C 58                          ASLB
00799                           *SHIFT DIGIT INTO PRICE-K.B. BUFFERS
00800A 277D 86 04    A                  LDAA    #$04
00801A 277F 0C               SEL52   CLC
00802A 2780 59                          ROLB
00803A 2781 79 0061  A                  ROL     KEYBD1+1
00804A 2784 79 0060  A                  ROL     KEYBD1
00805A 2787 4A                          DECA
00806A 2788 26 F5 277F                  BNE     SEL52      TO CONTINUE SHIFTING.
00807                           *EXIT
00808A 278A 20 C9 2755                  BRA     SEL40      TO EXIT
00809                           *READING EAROMS
00810                           *INITIALIZATION OF PIA'S
00811A 278C 4F                  READ02  CLRA
00812A 278D 8D 24 27B3                  BSR     READ04
00813                           *BEGIN READ CYCLE
00814                           *"ACCB" HAS PRICE'S ADDRESS.
00815A 278F F7 1008  A                  STAB    PIA1AD     ADDRESS OUT TO MEMORY.
00816                           *SET READ MODE CONTROL (110X XXXX)
00817A 2792 17                          TBA
00818A 2793 8A C0    A                  ORAA    #$C0
00819A 2795 B7 1008  A                  STAA    PIA1AD
00820                           *CLOCK UP
00821A 2798 86 3C    A                  LDAA    #$3C
00822A 279A B7 100B  A                  STAA    PIA1BC
00823                           *CLOCK DOWN
00824A 279D 88 08    A                  EORA    #$08
00825A 279F B7 100B  A                  STAA    PIA1BC
00826                           *DELAY FOR ACCESS TIME (10 USEC. MAX.)
00827A 27A2 AC 00    A                  CPX     0,X
00828A 27A4 AC 00    A                  CPX     0,X
00829                           *GET MSD OF PRICE
00830A 27A6 B6 1102  A                  LDAA    PIA6BD
00831A 27A9 97 51    A                  STAA    COSTH
00832                           *GET LSD OF PRICE
```

```
00833A 27AB B6 100A   A           LDAA     PIA1BD
00834A 27AE 97 52     A           STAA     COSTH+1
00835                     *GET DATA
00836A 27B0 DE 51     A           LDX      COSTH
00837A 27B2 39                    RTS
00838                     *INITIALIZE PIA'S
00839                     *DATA SELECTION REG INIT.
00840A 27B3 7F 100B   A READ04    CLR      PIA1BC
00841A 27B6 7F 1103   A READ06    CLR      PIA6BC
00842A 27B9 B7 100A   A           STAA     PIA1BD
00843A 27BC B7 1102   A           STAA     PIA6BD
00844                     *CONTROL REG. INIT.
00845A 27BF 86 04     A           LDAA     #$04
00846A 27C1 B7 1103   A           STAA     PIA6BC
00847A 27C4 86 34     A           LDAA     #$34
00848A 27C6 B7 100B   A           STAA     PIA1BC
00849A 27C9 39                    RTS
00850                     *THIS IS THE NEGOTIATE SUBROUTINE.
00851                     *
00852                     *THIS SUBROUTINE DETERMINES IF CREDIT>,=,< COST O
00853                     *ITEM SELECTED. IT ALSO CHECKS FOR EMPTY COIN TUB
00854A 27CA DE 41     A NEGTSK    LDX      CREDH+2
00855                     *SAVE CREDIT INFO.
00856A 27CC DF 5A     A           STX      TEMP4
00857                     *CHECK FOR FREE VEND SW.
00858                     *
00859                     *CHECK FOR FREE VEND IS MADE BY SENSING FREE VEND
00860                     *SWITCH POSITION. IF IT IS NOT IN FREE VEND POSIT
00861                     *COST OF SELECTED ITEM IS INTERROGATED TO AVOID
00862                     *FREE VENDING ON THOSE LOCATIONS WHICH HAVE NOT
00863                     *BEEN SET TO A PRICE.IF COST =0 AND FREE VEND SWI
00864                     *SET FOR A FREE VEND. PRODUCT IS NOT DELIVERED.
00865                     *SYSTEM THEN GOES TO STANDBY.WAITING FOR THE CUST
00866                     *NEXT DECISION.
00867                     *
00868                     *CHECK FREE VEND SW.
00869A 27CE B6 1082   A           LDAA     PIA5BD
00870A 27D1 84 01     A           ANDA     #$01
00871A 27D3 26 0D 27E2          BNE      NEGT01
00872                     *FREE VEND-CLEAR "COSTH"BUFFER
00873A 27D5 CE 0000   A           LDX      #$00
00874A 27D8 DF 51     A           STX      COSTH
00875                     *SET FULL ESCROW PAYBACK FLAG (FLG5=$04)
00876A 27DA 86 04     A           LDAA     #$04
00877A 27DC BD 25CD   A           JSR      SEFLG5
00878A 27DF 7E 2876   A           JMP      VENTSK
00879                     *NOT A FREE VEND
00880A 27E2 DE 51     A NEGT01    LDX      COSTH
00881A 27E4 DF 43     A           STX      INCRH
00882A 27E6 27 12 27FA          BEQ      NEGT03   TO EXIT
00883                     *PRICE IS SET
00884                     *COST IS NOT EQUAL TO 0.COMPUTE (CREDIT-COST)
00885                     *CHECK 4TH DIGIT OF COSTH.
00886A 27E8 96 51     A           LDAA     COSTH
00887A 27EA 84 F0     A           ANDA     #$F0
00888A 27EC 26 0C 27FA          BNE      NEGT03   TO EXIT
00889                     *4TH DIGIT OF COSTH =0
00890                     *COST IS NOT = 0. COMPUTE CREDIT-COST.
00891A 27EE BD 2658   A           JSR      SUBTSK
00892                     *CHECK FOR CREDIT=COST.
00893A 27F1 26 05 27F8 NEGT42    BNE      NEGT02
00894                     *CREDIT=COST.
00895A 27F3 DF 41     A           STX      CREDH+2
00896A 27F5 7E 2876   A           JMP      VENTSK
00897                     *CHECK FOR CREDIT < COST.
00898A 27F8 20 0A 2804 NEGT02    BGE      NEGT04
00899                     *CREDIT <COST.
```

```
00900A 27FA DE 5A    A  NEGT03 LDX     TEMP4
00901A 27FC DF 41    A         STX     CREDH+2
00902                        *EXIT
00903A 27FE BD 2682  A  NEGT33 JSR     ACLR3
00904A 2801 7E 2514  A         JMP     LDPR46
00905                        *CREDIT > COST.
00906A 2804 DF 41    A  NEGT04 STX     CREDH+2
00907                        *CHECK FOR 5/25 CENT EMPTY TUBE(S)
00908A 2806 B6 1022  A         LDAA    PIA3BD
00909A 2809 84 80    A         ANDA    #$80
00910A 280B 26 07 2814         BNE     NEGT0E
00911                        *5/25 CENT TUBE(S) EMPTY, OR (CREDIT-COST)> $5 OR
00912A 280D DE 5A    A  NEGT0A LDX     TEMP4
00913A 280F DF 41    A         STX     CREDH+2
00914                        *EXIT
00915A 2811 7E 2605  A         JMP     RECAL1
00916                        *CHECK FOR $1 COIN TUBE
00917A 2814 B6 1020  A  NEGT0E LDAA    PIA3AD
00918A 2817 84 02    A         ANDA    #$02
00919A 2819 26 02 281D         BNE     NEGT0F
00920                        *$1 COIN TUBE IS EMPTY. LIMIT PURCHASE TO $2.
00921A 281B 20 05 2822         BRA     NEGT11
00922                        *5/25 CENT TUBE AND $1 COIN TUBE FULL
00923                        *TEST FOR (CREDIT-COST) > $5
00924A 281D CE 0501  A  NEGT0F LDX     #$0501
00925A 2820 20 03 2825         BRA     NEGT12
00926                        *TEST FOR (CREDIT-COST) > $2
00927A 2822 CE 0201  A  NEGT11 LDX     #$0201
00928A 2825 BD 2658  A  NEGT12 JSR     SUBTSK
00929A 2828 2D 02 282C         BLT     NEGT13
00930                        *CREDIT-COST > EITHER $5 OR $2. EXIT
00931A 282A 20 E1 280D         BRA     NEGT0A
00932                        *CREDIT-COST IS CORRECT. VEND
00933                        *INITIALIZE FLAG FOR LEAST-COINS PAYBACK.
00934A 282C 86 20    A  NEGT13 LDAA    #$20
00935A 282E BD 25CD  A         JSR     SEFLG5
00936A 2831 7E 2876  A         JMP     VENTSK
00937                        *
00938                        *THIS SUBROUTINE DELIVERS ITEM.
00939                        *
00940                        *WE ENTER THIS SUBROUTINE FROM NEGTSK. IN THERE,WE
00941                        *IF COST OF SELECTED ITEM < OR= TO 0. IF COST WAS
00942                        *THE LEAST COINS PAYBACK FLAG (FLG5=$20) WAS INIT
00943                        *RETURN REMAINING CREDIT,IF ANY,TO CUSTOMER. IF C
00944                        *WE RETURN CUSTOMER'S CREDIT,IF ANY,IN FULL ESCRO
00945                        *COST > 0, WE NEVER REACH THIS POINT,BUT EXIT AND
00946                        *NEXT DECISION ON THE PART OF THE CUSTOMER.
00947                        *HERE IN VENTSK,WE FIRST CHECK FOR STATUS OF VEND
00948                        *"HORSOL" BUFFER CONTAINS INFORMATION IN RING-COU
00949                        *ABOUT HORIZONTAL SOLENOID THAT HAS TO BE ENERGIZ
00950                        *FOR THE SEL. REQUESTED. "SELECT" BUFFER ALSO CON
00951                        *INFO. IN RING-COUNTER FORMAT, AND IS USED TO DET
00952                        *ELEVATOR REACHES CORRECT LEVEL (D,C,B,OR A) DURI
00953                        *OF VERTICAL-LEVEL SUBROUTINE USED TO ENERGIZE $1
00954A 2834 B4 1100  A  RELIC1 ANDA    PIA6AD
00955A 2837 B7 1100  A  RELIC3 STAA    PIA6AD
00956A 283A 39       A         RTS
00957                        *SUBROUTINE USED TO DE-ENERGIZE $1 COIN ESCROW RE
00958A 283B BA 1100  A  RELIC5 ORAA    PIA6AD
00959A 283E 20 F7 2837         BRA     RELIC3
00960                        *ACCEPT $1 COINS AND CURRENCY INTO CASHBOX.
00961A 2840 86 0C    A  RELIC7 LDAA    #$0C
00962A 2842 BD 283B  A         JSR     RELIC5
00963A 2845 39               RTS
00964                        *SUBROUTINES USED BY VENTSK.
00965                        *
00966                        *INITIALIZE "TBC"AND "SSC"
```

```
00967A 2846 86 10      A VEND06 LDAA    #$10
00968A 2848 97 33      A        STAA    TBC
00969A 284A 7F 0034    A        CLR     SPEED1
00970A 284D 39                  RTS
00971                         *CLEAR CONTROL FLAGS.
00972A 284E 7F 0032    A VEND08 CLR     FLG7
00973A 2851 7F 0031    A VEND09 CLR     FLG6
00974A 2854 7F 0033    A        CLR     TBC
00975A 2857 7F 0034    A        CLR     SPEED1
00976A 285A 7F 0035    A        CLR     PAYBK1
00977A 285D 39                  RTS
00978                         *ENABLE "TBC" AND "SSC" INT'S.
00979A 285E 86 1C      A VEND0A LDAA    #$1C
00980A 2860 B7 1009    A        STAA    PIA1AC
00981A 2863 86 07      A VEND0B LDAA    #$07
00982A 2865 B7 1041    A        STAA    PIA4AC
00983                         *CLEAR EXISTING INTERRUPTS.
00984A 2868 BD 24A7    A        JSR     CLRINT
00985A 286B 39                  RTS
00986                         *DEBOUNCE SUBROUTINE.
00987A 286C CE 0060    A VEND0C LDX     #$0060
00988A 286F BD 2ED7    A        JSR     DELA2
00989                         *CLEAR EXISTING INT'S.
00990A 2872 BD 24A7    A        JSR     CLRINT
00991A 2875 39                  RTS
00992A 2876 0F                  VENTSK  SEI
00993                         *CHECK MACHINE STATUS.
00994A 2877 BD 2475    A        JSR     MACSTA
00995A 287A 25 0F 288B          BCS     VEND03    M/C IS GO
00996                         *M/C IS NO GO
00997                         *CLEAR PRESET INTERRUPTS.
00998A 287C BD 24A7    A VEND01 JSR    CLRINT
00999                         *CLEAR ELEVATOR CONTROL FLAGS.
01000A 287F BD 284E    A        JSR     VEND08
01001                         *CLEAR "CREM" DISABLED FLAG.
01002A 2882 86 FE      A        LDAA    #$FE
01003A 2884 BD 25D2    A        JSR     REFLG5
01004A 2887 0E                  CLI
01005A 2888 7E 27FA    A VEND02 JMP    NEGT03
01006                         *M/C STATUS IS GO.CHECK FOR ANTI-JACKPOT DELAY. F
01007A 288B 96 32      A VEND03 LDAA   FLG7
01008A 288D 84 80      A        ANDA    #$80
01009A 288F 26 F7 2888          BNE     VEND02    TO EXIT
01010                         *FLAG NOT SET. VEND.
01011                         *CHECK ROWS INFORMATION.
01012A 2891 96 5F      A        LDAA    SELECT
01013A 2893 27 F3 2888          BEQ     VEND02    TO EXIT.
01014                         *CHECK COLUMNS INFO.
01015A 2895 D6 5E      A        LDAB    HORSOL
01016A 2897 27 EF 2888          BEQ     VEND02
01017A 2899 CE 1010    A        LDX     #PIA2AD
01018                         *DE-ENERGIZE DOOR LOCK SOL.
01019A 289C 86 DF      A        LDAA    #$DF
01020A 289E A4 00      A        ANDA    0,X
01021A 28A0 CE 0060    A        LDX     #$0060
01022                         *CHECK FOR ELE.DD3,DD6
01023A 28A3 BD 2ED7    A        JSR     DELA2
01024A 28A6 A6 00      A        LDAA    0,X
01025A 28A8 84 40      A        ANDA    #$40
01026A 28AA 26 05 28B1          BNE     VENDV
01027                         *DISABLE CREM.
01028A 28AC BD 25DD    A        JSR     CONT0B
01029A 28AF 20 06 28B7          BRA     SECDFL
01030A 28B1 7E 287C    A VENDV  JMP    VEND01
01031A 28B4 BD 25DD    A        JSR     CONT0B
01032                         *SET CREM-DISABLED FLAG.
01033A 28B7 BD 25C6    A SECDFL JSR    CONT0D
```

```
01034                         *VEND IS GO.DISABLE AND CLEAR ALL INTERRUPTS.
01035A 28BA BD 2AE5    A           JSR     DISINT
01036                         *GET VERTICAL SW'S INFO.
01037                         *ALL CONDITIONS ARE GO.
01038                         *CHECK FOR $1 BILL.
01039A 28BD 96 32      A           LDAA    FLG7
01040A 28BF 84 20      A           ANDA    #$20
01041A 28C1 27 09 28CC             BEQ     VEND04   TO CONTINUE.
01042                         *$1 BILL PRESENT.ACCEPT $1 COINS AND CURRENCY.
01043A 28C3 BD 2840    A           JSR     RELIC7
01044                         *DELAY
01045A 28C6 CE 00FE    A           LDX     #$00FE
01046A 28C9 BD 2ED7    A           JSR     DELA2
01047                         *$1 BILL NOT PRESENT.ACCEPT $1 COINS.
01048A 28CC 86 04      A    VEND04 LDAA    #$04
01049A 28CE BD 283B    A           JSR     RELIC5
01050                         *DELAY
01051A 28D1 CE 00FE    A           LDX     #$00FE
01052A 28D4 BD 2ED7    A           JSR     DELA2
01053                         *CLEAR PULSE.
01054A 28D7 86 F7      A           LDAA    #$F7
01055A 28D9 BD 2834    A           JSR     RELIC1
01056A 28DC 96 5F      A           LDAA    SELECT
01057                         *GET COLUMNS INFO.
01058A 28DE D6 5E      A           LDAB    HORSOL
01059                         *ENABLE VERTICAL SW'S.
01060A 28E0 B7 1010    A           STAA    PIA2AD
01061                         *ENERGIZE HORIZONTAL SOLENOIDS.
01062A 28E3 F7 1012    A           STAB    PIA2BD
01063A 28E6 BD 286C    A           JSR     VEND0C
01064                         *CLEAR ELEVATOR CONTROL FLAGS.
01065A 28E9 BD 284E    A           JSR     VEND03
01066                         *SET UP-MODE FLAG (FLG6=$40).
01067A 28EC 86 40      A           LDAA    #$40
01068A 28EE BD 2B0B    A           JSR     SEFLG6
01069                         *ENABLE "TBC"AND "SSC" INTERRUPTS AND CLEAR EXIST
01070A 28F1 BD 285E    A           JSR     VEND0A
01071                         *CLEAR NON-INTERRUPT MASK.
01072A 28F4 01                     NOP
01073A 28F5 0E                     CLI
01074                         *CHECK FOR M/C NO-GO FLAG (FLG7=$40).
01075A 28F6 96 32      A           LDAA    FLG7
01076A 28F8 84 40      A           ANDA    #$40
01077A 28FA 27 03 28FF             BEQ     VEND12
01078A 28FC 7E 287C    A           JMP     VEND01   TO EXIT
01079                         *M/C IS GO.
01080                         *TEST FOR RUN-RELAY-DE-ENERGIZED FLAG.(FLG6=$10)
01081A 28FF 96 31      A    VEND12 LDAA    FLG6
01082A 2901 16                     TAB
01083A 2902 84 10      A           ANDA    #$10
01084A 2904 26 05 290B             BNE     VEND14   TO CONTINUE
01085                         *REFRESH DISPLAYS
01086A 2906 BD 2DA0    A           JSR     DISPLY
01087A 2909 20 F4 28FF             BRA     VEND12
01088                         *RUN-RELAY-DE-ENERGIZED FLAG IS SET.
01089                         *SET NON-INTERRUPT MASK.
01090A 290B 0F              VEND14 SEI
01091                         *RESET RUN-RELAY-DE-ENERGIZED FLAG.(FLG6=$10)
01092                         *AND UP-MODE FLAG(FLG6=$08)
01093A 290C 86 E7      A           LDAA    #$E7
01094A 290E BD 2B10    A           JSR     REFLG6
01095                         *ELEVATOR IS UP,STOPPED.WAIT FOR TRAY MOTOR TO
01096                         *GET TO 180 DEGREE POSITION.
01097A 2911 BD 2DA0    A    VEND16 JSR     DISPLY
01098                         *TEST BIT
01099A 2914 BD 2492    A           JSR     TM180D
01100A 2917 27 F8 2911             BEQ     VEND16   TM AS AT 180 DEGREE OFF HO
01101                         *INITIALIZE DOWN-MODE SEQUENCE.(FLG6=$08) AND PAY
```

```
01102                            *
01103                            *CLEAR HORIZONTAL SOLENOIDS.
01104A 2919 7F 1012   A                CLR     PIA2BD
01105                            *DOWN MODE.
01106A 291C 86 08     A                LDAA    #$08
01107A 291E BD 2B0B   A                JSR     SEFLG6
01108                            *DISABLE AND CLEAR ALL INTERRUPTS.
01109A 2321 BD 2AE5   A                JSR     DISINT
01110                            *INITIALIZE "TBC" AND "SSC" COUNTER/TIMER.
01111A 2924 BD 2846   A                JSR     VEND06
01112                            *PAYBACK AND DOWN-MODE.
01113A 2927 BD 292D   A                JSR     VEND17
01114                            *EXIT
01115A 292A 7E 2501   A                JMP     LDPRIC
01116                            *INITIALIZE PAYBACK.
01117                            *TEST FOR CREDIT.
01118A 292D DE 41     A  VEND17 LDX     CREDH+2
01119A 292F 26 07 2938           BNE    VEND18   TO CONTINUE.
01120                            *CREDIT IS =0. SET PAYBACK COMPLETED FLAG.(FLG6=$
01121A 2931 86 80     A                LDAA    #$80
01122A 2933 BD 2B0B   A                JSR     SEFLG6
01123A 2936 20 4C 2984           BRA    VEND28   TO CONTINUE.
01124                            *CREDIT NOT =0. TEST FOR FULL-ESCROW PAYBACK.
01125A 2938 96 30     A  VEND18 LDAA    FLG5
01126A 293A 84 04     A                ANDA    #$04
01127A 293C 27 0C 294A           BEQ    VEND22   LEAST COINS PAYBACK.
01128                            *INITIALIZE FULL-ESCROW PAYBACK.
01129A 293E 86 20     A  VEND20 LDAA    #$20
01130A 2940 CE 255C   A                LDX     #CURREN
01131                            *SAVE COINS/CURRENCY VALUE ADDRESS.
01132A 2943 DF 54     A                STX     TEMP1
01133                            *GET STARTING ADDRESS OF NUMBER-OF-COINS/CURRENCY
01134A 2945 CE 0050   A                LDX     #FETWO
01135A 2948 20 0F 2959           BRA    VEND24   TO CONTINUE.
01136                            *INITIALIZE FOR LEAST-COINS PAYBACK.
01137A 294A CE 2560   A  VEND22 LDX     #COINS
01138                            *SAVE ADDRESS.
01139A 294D DF 54     A                STX     TEMP1
01140                            *DISABLE NUMBER-OF-COINS BUFFERS.
01141A 294F 86 A0     A                LDAA    #$A0
01142A 2951 BD 2676   A                JSR     ACLR1
01143                            *GET NUMBER-OF-COINS/CURRENCY BUFFER ADDRESS.
01144A 2954 CE 004E   A                LDX     #FEONEC
01145A 2957 86 08     A                LDAA    #$08
01146                            *SAVE NUMBER-OF-COINS/CURR. BUFFER ADDRESS.
01147A 2959 DF 56     A  VEND24 STX     TEMP2
01148                            *INITIALIZE PAYBACK VECTOR.
01149A 295B 97 53     A                STAA    CONTYP
01150                            *SAVE NUMBER-OF-COINS/CURR.ADDRESS.
01151A 295D DF 56     A                STX     TEMP2
01152                            *GET PAYBACK INFO.
01153A 295F DE 56     A  VEND26 LDX     TEMP2
01154A 2961 BD 2A5B   A                JSR     MONTSK
01155                            *TEST FOR PAYBACK COMPLETED FLAG.(FLG6=$80)
01156A 2964 96 31     A                LDAA    FLG6
01157A 2966 16                          TAB
01158A 2967 84 80     A                ANDA    #$80
01159A 2969 26 19 2984            BNE   VEND28   TO CONTINUE.
01160                            *TEST FOR IN-PAYBACK MODE FLAG.(FLG6=$04)
01161A 296B 17                          TBA
01162A 296C 84 04     A                ANDA    #$04
01163A 296E 27 14 2984            BEQ   VEND28   TO CONTINUE.
01164                            *TEST FOR PAYBACK PULSE ON-OFF FLAG.(FLG6=$03).
01165A 2970 96 31     A                LDAA    FLG6
01166A 2972 84 03     A                ANDA    #$03
01167A 2974 26 0E 2984            BNE   VEND28
01168                            *SET PAYBACK PULSE ON-OFF FLAG.(FLG6=$02)
```

```
01169A 2976 86 02      A           LDAA    #$02
01170A 2978 BD 2B0B    A           JSR     SEFLG6
01171                              *GET PAYBACK INFO.
01172A 297B 96 33      A           LDAA    CONTYP
01173                              *ENERGIZE PAYBACK SOLENOID.
01174A 297D B7 1022    A           STAA    PIA3BD
01175                              *INITIALIZE PAYBACK BUFFER.
01176A 2980 86 0F      A           LDAA    #$0F
01177A 2982 97 35      A           STAA    PAYBK1
01178                              *ENABLE "TBC" AND "SSC" INTERRUPTS.
01179A 2984 BD 285E    A  VEND28   JSR     VEND0A
01180                              *CLEAR NON-INTERRUPT MASK.
01181A 2987 01            VEND30   NOP
01182A 2988 0E                     CLI
01183                              *REFRESH DISPLAYS.
01184A 2989 BD 20A0    A  VEND31   JSR     DISPLY
01185                              *TEST FOR IN PAYBACK MODE.(FLG6=$04)
01186A 298C 96 31      A  VEND32   LDAA    FLG6
01187A 298E 16                     TAB
01188A 298F 84 04      A           ANDA    #$04
01189A 2991 26 1A 29AD            BNE     VEND40   TO TEST END-OF-PAYBACK FLA
01190                              *IN-PAYBACK-MODE FLAG NOT SET. TEST FOR RUN RELAY
01191                              *DE-ENERGIZED FLAG.(FLG6=$10)
01192A 2993 96 31      A  VEND34   LDAA    FLG6
01193A 2995 16                     TAB
01194A 2996 84 10      A           ANDA    #$10
01195A 2998 27 05 299F            BEQ     VEND37   TO TEST FOR PAYBACK-IN-PRO
01196                              *TEST FOR PAYBACK-COMPLETED FLAG(FLG6=$80).
01197                              *
01198A 299A 17            VEND36   TBA
01199A 299B 84 80      A           ANDA    #$80
01200A 299D 26 15 29B4            BNE     VEND42   TO END ELEVATOR CONTROL.
01201                              *PAYBACK-COMPLETED FLAG NOT SET.
01202                              *TEST FOR IN-PAYBACK-MODE FLAG.(FLG6=$04)
01203A 299F 17            VEND37   TBA
01204A 29A0 84 04      A           ANDA    #$04
01205A 29A2 27 02 29A6            BEQ     VEND38   TO TEST FOR PAYBACK-COMPLE
01206                              *CONTINUE.
01207A 29A4 20 E3 2989            BRA     VEND31   TO CONTINUE.
01208                              *TEST FOR PAYBACK-COMPLETED FLG.(FLG6=$80).
01209A 29A6 17            VEND38   TBA
01210A 29A7 84 80      A           ANDA    #$80
01211A 29A9 27 B4 295F            BEQ     VEND26   TO MONTSK.
01212                              *PAYBACK-COMPLETED FLAG IS SET.
01213                              *RECHECK ELEVATOR CONTROL STATUS
01214A 29AB 20 DC 2989            BRA     VEND31
01215                              *IN-PAYBACK-MODE FLAG IS SET. TEST FOR END-OF-PAY
01216                              *FLG.(FLG7=$04)
01217A 29AD 96 32      A  VEND40   LDAA    FLG7
01218A 29AF 84 04      A           ANDA    #$04
01219A 29B1 27 E0 2993            BEQ     VEND34   TO TEST FOR RUN-RELAY-DE-E
01220                              *SET NON-INTERRUPT MASK.
01221A 29B3 0F                     SEI
01222                              *CHECK FOR TYPE(ON/OFF)OF PAYBACK PULSE.
01223A 29B4 96 31      A  VEND42   LDAA    FLG6
01224A 29B6 16                     TAB
01225A 29B7 84 02      A           ANDA    #$02
01226A 29B9 27 19 29D4            BEQ     VEND44   TO TEST FOR PAYBACK-PULSE-
01227                              *PAYBACK-PUSLE-ON FLAG IS SET. CLEAR PAYBACK SOL.
01228A 29BB 7F 1022    A           CLR     PIA3BD
01229                              *RESET END-OF-PAYBACK-PULSE FLG(FLG7=$04).AND
01230                              *PAYBACK-PULSE-ON FLG(FLG6=$02).
01231A 29BE 43                     COMA
01232A 29BF BD 2B10    A           JSR     REFLG6
01233                              *SET FLAG
01234A 29C2 86 FB      A           LDAA    #$FB
01235A 29C4 BD 2B19    A           JSR     REFLG7
01236                              *RE-INITIALIZE PAYBACK-PULSE COUNTER(PAYBK1)
```

```
01237A 29C7 86 0F      A         LDAA    #$0F
01238A 29C9 97 35      A         STAA    PAYBK1
01239                       *SET PAYBACK-PULSE-OFF FLAG(FLG6=$01)
01240A 29CB 86 01      A         LDAA    #$01
01241A 29CD BD 2B0B    A         JSR     SEFLG6
01242                       *CLEAR NON-INTERRUPT MASK
01243A 29D0 01                VEND43 NOP
01244A 29D1 0E                   CLI
01245A 29D2 20 BF 2993           BRA     VEND34    TO TEST RUN-RELAY-DE-ENERG
01246                       *PAYBACK-ON FLAG NOT SET. TEST FOR PAYBACK-PULSE-
01247A 29D4 17                VEND44 TBA
01248A 29D5 84 01      A         ANDA    #$01
01249A 29D7 27 F7 29D0           BEQ     VEND43
01250                       *PAYBACK-PULSE-OFF FLAG IS SET.
01251                       *RESET PAYBACK-PULSE-OFF(FLG6=$01) AND IN-PAYBACK
01252                       *(FLG6=$04) FLAGS.
01253A 29D9 86 FA      A         LDAA    #$FA
01254A 29DB BD 2B10    A         JSR     REFLG6
01255                       *RESET END-OF-PAYBACK-PULSE FLAG (FLG7=$04).
01256A 29DE 86 FB      A         LDAA    #$FB
01257A 29E0 BD 2B19    A         JSR     REFLG7
01258                       *UPDATE COIN BUFFER BEING ADDRESSED.
01259A 29E3 DE 56      A         LDX     TEMP2
01260A 29E5 6A 00      A         DEC     0,X
01261A 29E7 DF 56      A         STX     TEMP2
01262A 29E9 20 E5 29D0           BRA     VEND43    TO TEST FOR RUN-RELAY-DE-E
01263                       *END OF ELEVATOR CONTROL.
01264                       *SET NON-INTERRUPT MASK.
01265A 29EB 0F                VEND48 SEI
01266                       *CLEAR ELEVATOR CONTROLFLAGS,TIMERS,BUFFERS.
01267A 29EC BD 284E    A         JSR     VEND03
01268                       *SET ELEVATOR-CONTROL-COMPLETED FLAG(FLG7=$10)
01269A 29EF 86 10      A         LDAA    #$10
01270A 29F1 BD 2B14    A         JSR     SEFLG7
01271                       *SENSE ELEVATOR HOME.
01272A 29F4 BD 2DA0    A     VEND50 JSR  DISPLY
01273                       *EXIT
01274A 29F7 BD 248C    A         JSR     ELHOME
01275A 29FA 27 F8 29F4           BEQ     VEND50
01276                       *ELEVATOR IS AT HOME
01277                       *DISABLE AND CLEAR ALL PRESENT INTERRUPTS.
01278A 29FC BD 2AE5    A         JSR     DISINT
01279                       *HM57
01280                       *TOTAL SALES INVENTORY.
01281A 29FF DE 41      A     SALINV LDX  CREDH+2
01282                       *SAVE EXISTING CREDIT.
01283A 2A01 DF 5A      A         STX     TEMP4
01284                       *GET COST DATA.
01285A 2A03 DE 51      A         LDX     COSTH
01286A 2A05 DF 45      A         STX     INCRH+2
01287                       *READ TWO-MOST-SIGNIFICANT BYTES OF TOT. SALES.
01288A 2A07 C6 1D      A         LDAB    #$1D      EAROM'S ADDRESS
01289A 2A09 BD 278C    A         JSR     READ02
01290                       *INDEX REGISTER HAS DATA.
01291A 2A0C DF 3F      A         STX     CREDH
01292                       *READ TWO-LEAST-SIGNIFICANT BYTES OF TOT. SALES.
01293A 2A0E C6 1E      A         LDAB    #$1E      EAROM'S ADDRESS
01294A 2A10 BD 278C    A         JSR     READ02
01295A 2A13 DF 41      A         STX     CREDH+2
01296                       *UPDATE TOTAL SALES.
01297A 2A15 BD 25EC    A         JSR     ADDTSK
01298                       *SAVE TOTAL SALES IN EAROM'S.
01299A 2A18 DE 3F      A         LDX     CREDH
01300A 2A1A DF 37      A         STX     INV04      DISPLAY BUFFER.
01301A 2A1C DF 60      A         STX     KEYBD1
01302A 2A1E C6 1D      A         LDAB    #$1D
01303A 2A20 BD 252A    A         JSR     LDPR07
```

```
01304                          *DISPLAY BUFFER "INV04" IS USED DURING REFRESHING
01305                          *TOTAL SALES DISPLAY TO AVOID ACCESSING EAROMS TO
01306                          *MANY TIMES WHICH WOULD DEGRADE THE LIFETIME OF T
01307                          *THIS BUFFER IS UPDATED AFTER EVERY VEND AND DURI
01308                          *WRITE TWO MOST-SIGNIFICANT BYTES OF TOT.SALES IN
01309A 2A23 DE 41      A              LDX     CREDH+2
01310A 2A25 DF 39      A              STX     INV04+2
01311A 2A27 DF 60      A              STX     KEYBD1
01312A 2A29 C6 1E      A              LDAB    #$1E
01313A 2A2B BD 252A    A              JSR     LDPR07
01314                          *CLEAR PRICE-KEYBOARD BUFFERS.
01315A 2A2E CE 0000    A              LDX     #$00
01316A 2A31 DF 60      A              STX     KEYBD1
01317                          *RESTORE EXISTING CREDIT INFORMATION.
01318A 2A33 DE 5A      A              LDX     TEMP4
01319A 2A35 DF 41      A              STX     CREDH+2
01320                          *EXIT
01321A 2A37 39                 SALIN2  RTS
01322                          *
01323                          *CLEARING TOTAL SALE INVENTORY.
01324                          *
01325                          *CLEAR TWO-MOST-SIGNIFICANT BYTES.
01326A 2A38 C6 1D      A CLRINV LDAB   #$1D
01327A 2A3A CE 0000    A              LDX     #$00
01328A 2A3D DF 60      A              STX     KEYBD1
01329A 2A3F BD 252A    A              JSR     LDPR07
01330                          *CLEAR TWO-LEAST-SIGNIFICANT BYTES.
01331A 2A42 C6 1E      A              LDAB    #$1E
01332A 2A44 BD 252A    A              JSR     LDPR07
01333                          *PERFORM READ CYCLE ON TOTAL SALE.
01334A 2A47 8D 03 2A4C        BSR     RDTOSL
01335                          *EXIT.
01336A 2A49 7E 2501    A              JMP     LDPRIC
01337                          *
01338                          *READING TOTAL SALE INVENTORY.
01339                          *
01340A 2A4C C6 1D      A RDTOSL LDAB   #$1D
01341A 2A4E BD 278C    A              JSR     READ02
01342A 2A51 DF 37      A              STX     INV04
01343A 2A53 C6 1E      A              LDAB    #$1E
01344A 2A55 BD 278C    A              JSR     READ02
01345A 2A58 DF 39      A              STX     INV04+2
01346A 2A5A 39                        RTS
01347                          *
01348                          *
01349A 2A5B 96 31      A MONTSK LDAA   FLG6
01350                          *TEST FOR PAYBACK-COMPLETED FLAG(FLG6=$(80)).
01351A 2A5D 96 31      A              LDAA    FLG6
01352A 2A5F 16                        TAB
01353A 2A60 84 80      A              ANDA    #$80
01354A 2A62 26 6F 2AD3               BNE     MONT08  TO EXIT.
01355                          *PAYBACK NOT COMPLETED.
01356                          *TEST FOR IN-PAYBACK-MODE FLAG(FLG6=$04).
01357A 2A64 17                 MONT02 TBA
01358A 2A65 84 04      A              ANDA    #$04
01359A 2A67 26 6A 2AD3               BNE     MONT08  TO EXIT.
01360                          *NOT PAYING A COIN OUT.
01361                          *CHECK FOR EMPTY COIN BUFFERS.
01362                          *
01363A 2A69 A6 00      A MONT03 LDAA   0,X
01364A 2A6B 26 0B 2A78               BNE     MONT05  TO DETERMINE COIN.
01365                          *UPDATE COIN-TYPE VECTOR.
01366A 2A6D 0C                        CLC
01367A 2A6E 74 0053    A MONT04 LSR    CONTYP
01368                          *UPDATE COIN-VALUE/COIN-BUFFER ADDRESS.
01369A 2A71 BD 25E4    A              JSR     CONTOC
01370                          *CHECK FOR END-OF-COIN BUFFER.
01371A 2A74 26 F3 2A69               BNE     MONT03  TO CONTINUE.
```

```
01372                             *EXIT
01373                             *
01374A 2A76 20 42 2ABA                  BRA     MONT07   TO EXIT.
01375                             *NEW COIN FOUND. SAVE COIN-BUFFER ADDRESS.
01376A 2A78 DF 56      A  MONT05  STX     TEMP2
01377                             *GET COIN VALUE
01378A 2A7A DE 54      A          LDX     TEMP1
01379                             *DETERMINE IF CREDIT>COIN.
01380A 2A7C EE 00      A          LDX     0,X
01381A 2A7E BD 2658    A          JSR     SUBTSK
01382A 2A81 2B 24 2AA7            BMI     MONT06
01383                             *CREDIT>COIN VALUE. SAVE CREDIT.
01384A 2A83 DF 58      A          STX     TEMP3
01385                             *CHECK FOR FULL-ESCROW-PAYBACK FLAG(FLG5=$04).
01386A 2A85 96 30      A          LDAA    FLG5
01387A 2A87 84 04      A          ANDA    #$04
01388A 2A89 26 21 2AAC            BNE     MONT58   TO CONTINUE
01389                             *NOT IN FULL-ESCROW.
01390                             *COMPARE PRESENT COIN-VALUE ADDRESS WITH
01391                             *THAT OF $1 COIN'S.
01392A 2A8B B6 1012    A          LDAA    PIA2BD
01393A 2A8E DE 54      A          LDX     TEMP1
01394A 2A90 7E 23FF    A          JMP     SALINV
01395A 2A93 26 06 2A9B            BNE     MONT55   TO CHECK 10-CENTS.
01396                             *COIN PRESENT IS $1 COIN.
01397                             *CHECK FOR EMPTY TUBE.
01398A 2A95 84 02      A          ANDA    #$02
01399A 2A97 26 13 2AAC            BNE     MONT58   TO CONTINUE.
01400                             *$1-COIN TUBE IS EMPTY. GET NEXT COIN-VALUE.
01401A 2A99 20 0C 2AA7            BRA     MONT06
01402                             *COMPARE PRESENT COIN-VALUE ADDRESS WITH
01403                             *THAT OF 10-CENT'S.
01404A 2A9B 8C 2564    A  MONT55  CPX     #COINS+4
01405A 2A9E 26 0C 2AAC            BNE     MONT58   TO CONTINUE.
01406                             *COIN IS 10-CENT. CHECK FOR EMPTY TUBE.
01407A 2AA0 B6 1020    A          LDAA    PIA3AD
01408A 2AA3 84 01      A          ANDA    #$01
01409A 2AA5 26 05 2AAC            BNE     MONT58   TO CONTINUE.
01410                             *10-CENT COIN TUBE IS EMPTY.
01411                             *
01412                             *GET NEW COIN VALUE.
01413A 2AA7 DE 56      A  MONT06  LDX     TEMP2
01414A 2AA9 7E 2A6E    A          JMP     MONT04
01415                             *CREDIT>COIN-VALUE. GO INTO DELAY, THEN PAY COIN.
01416A 2AAC DE 58      A  MONT58  LDX     TEMP3
01417A 2AAE DF 41      A          STX     CREDH+2
01418                             *DELAY
01419A 2AB0 BD 20A0    A          JSR     DISPLY
01420                             *PAY COIN.
01421                             *SET IN-PAYBACK-MODE FLAG(FLG6=$04).
01422A 2AB3 86 04      A  PAYCOI  LDAA    #$04
01423A 2AB5 BD 2B0B    A          JSR     SEFLG6
01424                             *(COIN IS PAID OUT IN VENTSK).
01425                             *EXIT.
01426A 2AB8 20 1E 2AD8            BRA     MONT09   TO EXIT.
01427                             *EXIT
01428                             *END OF PAYBACK.
01429A 2ABA BD 2637    A  MONT07  JSR     ACLR4
01430                             *RESET IN-PAYBACK-MODE FLAG.
01431A 2ABD 86 FB      A          LDAA    #$FB
01432A 2ABF BD 2B10    A          JSR     REFLG6
01433                             *SET PAYBACK-COMPLETED FLAG (FLG6=$80).
01434A 2AC2 86 80      A          LDAA    #$80
01435A 2AC4 BD 2B0B    A          JSR     SEFLG6
01436                             *CLEAR BUFFERS.
01437A 2AC7 CE 0000    A          LDX     #$00
01438A 2ACA DF 54      A          STX     TEMP1
01439A 2ACC DF 56      A          STX     TEMP2
```

```
01440A 2ACE DF 53      A          STX       TEMP3
01441                         *CLEAR COIN PAYBACK VECTOR.
01442A 2AD0 7F 0053    A          CLR       CONTYP
01443                         *RESET FULL-ESCROW-PAYBACK MODE FLAG.
01444A 2AD3 86 FB      A MONT08   LDAA      #$FB
01445A 2AD5 BD 25D2    A          JSR       REFLG5
01446A 2AD8 39           MONT09   RTS
01447                         *SUBROUTINE USED TO ENERGIZE RUN RELAY.
01448                         *
01449A 2AD9 BA 1010    A RUNR01   ORAA      PIA2AD
01450A 2ADC B7 1010    A RUNR02   STAA      PIA2AD
01451A 2ADF 39                    RTS
01452                         *
01453                         *SUBROUTINE USED TO DE-ENERGIZE RUN RELAY.
01454                         *
01455A 2AE0 84 1010    A RUNR04   ANDA      PIA2AD
01456A 2AE3 20 F7 2ADC            BRA       RUNR02
01457                         *
01458                         *SUBROUTINE USED TO DISABLE AND CLEARING PRESENT
01459                         *INTERRUPTS.
01460                         *
01461A 2AE5 86 04      A DISINT   LDAA      #$04
01462A 2AE7 B7 1009    A          STAA      PIA1AC
01463A 2AEA B7 1011    A          STAA      PIA2AC
01464A 2AED B7 1013    A          STAA      PIA2BC
01465A 2AF0 B7 1021    A          STAA      PIA3AC
01466A 2AF3 B7 1023    A          STAA      PIA3BC
01467A 2AF6 B7 1083    A          STAA      PIA5BC
01468                         *CLEAR PRESENT INTERRUPTS.
01469A 2AF9 BD 24A7    A          JSR       CLRINT
01470                         *DISABLING OF VEND REQUEST, PRICE/LOAD DISPLAY,
01471                         *CREDIT RECALL, AND CLEAR-TOTAL-SALES INTERRUPTS.
01472                         *
01473A 2AFC 86 04      A DISINI   LDAA      #$04
01474A 2AFE B7 1043    A          STAA      PIA4BC
01475A 2B01 B7 1103    A          STAA      PIA6BC
01476A 2B04 B7 100B    A          STAA      PIA1BC
01477A 2B07 B7 1101    A          STAA      PIA6AC
01478A 2B0A 39                    RTS
01479                         *
01480                         *SUBROUTINE USED TO SET FLG6.
01481                         *
01482A 2B0B 9A 31      A SEFLG6   ORAA      FLG6
01483A 2B0D 97 31      A SET6     STAA      FLG6
01484A 2B0F 39                    RTS
01485                         *
01486                         *SUBROUTINE USED TO RESET FLG6.
01487                         *
01488A 2B10 94 31      A REFLG6   ANDA      FLG6
01489A 2B12 20 F9 2B0D            BRA       SET6
01490                         *SUBROUTINE USED TO SET FLG7.
01491                         *
01492A 2B14 9A 32      A SEFLG7   ORAA      FLG7
01493A 2B16 97 32      A SET7     STAA      FLG7
01494A 2B18 39                    RTS
01495                         *
01496                         *SUBROUTINE USED TO RESET FLG7.
01497A 2B19 94 32      A REFLG7   ANDA      FLG7
01498A 2B1B 20 F9 2B16            BRA       SET7
01499                         *
01500                         *
01501                         *TIME-BASE-CLOCK (TBC) SERVICING--ELEVATOR CONTRO
01502                         *
01503                         *CHECK FOR UP-MODE FLAG(FLG6=$40)/
01504A 2B1D 96 31      A TBC10    LDAA      FLG6
01505A 2B1F 16                    TAB
01506A 2B20 84 40      A          ANDA      #$40
```

```
01507A 2B22 27 11 2B35          BEQ     TBC15   TO TEST DOWN-MODE FLAG.
01508                    *UP-MODE FLAG IS SET.
01509                    *
01510                    *CHECK RUN-RELAY-ENERGIZED FLAG.
01511                    *(FLG6=$20)
01512                    *
01513A 2B24 17           TBC12   TBA
01514A 2B25 84 20     A          ANDA    #$20
01515A 2B27 26 49 2B72           BNE     TBC21   TO TEST FOR TBC BUFFER.
01516                    *
01517                    *TEST FOR RUN-RELAY-DE-ENERGIZED FLAG(FLG6=$10).
01518A 2B29 17           TBC14   TBA
01519A 2B2A 84 10     A          ANDA    #$10
01520A 2B2C 26 44 2B72           BNE     TBC21   TO TEST FOR TBC BUFFER.
01521                    *RUN-RELAY-DE-ENERGIZED FLAG NOT SET.
01522                    *
01523                    *CHECK FOR DOWN-MODE FLAG(FLG6=$08).
01524                    *
01525A 2B2E 17                   TBA
01526A 2B2F 84 08     A          ANDA    #$08
01527A 2B31 26 2D 2B60           BNE     TBC20   TO ENERGIZE RUN RELAY.
01528A 2B33 20 07 2B3C           BRA     TBC16   TO TEST M/C STATUS.
01529                    *RUN-RELAY-DE-ENERGIZED FLAG IS SET.
01530                    *
01531                    *TEST FOR DOWN-MODE FLAG.
01532                    *(FLG6=$08).
01533A 2B35 17           TBC15   TBA
01534A 2B36 84 08     A          ANDA    #$08
01535A 2B38 27 3C 2B76           BEQ     TBC22   TO TEST FOR PAYBACK-PULSE-
01536A 2B3A 20 E8 2B24           BRA     TBC12   TO TEST FOR RUN-RELAY.
01537                    *
01538                    *TEST M/C STATUS.
01539A 2B3C BD 2475   A  TBC16   JSR     MACSTA
01540A 2B3F 25 0A 2B4B           BCS     TBC18   TO CONTINUE
01541                    *
01542                    *M/C STATUS IS NO-GO
01543                    *
01544                    *CLEAR ELEVATOR-CONTROL FLAGS.
01545A 2B41 BD 284E   A  TBC17   JSR     VEND08
01546                    *CONTINUE
01547                    *SET M/C-NO-G- FLAG(FLG7=$40)
01548A 2B44 86 40     A          LDAA    #$40
01549A 2B46 BD 2B14   A          JSR     SEFLG7
01550                    *EXIT.
01551A 2B49 20 44 2B8F           BRA     TBC28
01552                    *M/C STATUS IS GO.
01553                    *CHECK FOR (ELEVATOR.DD3).
01554A 2B4B CE 1010   A  TBC18   LDX     #FIA2AD
01555A 2B4E A6 00     A          LDAA    0,X
01556A 2B50 84 80     A          ANDA    #$80
01557A 2B52 27 ED 2B41           BEQ     TBC17   TO M/C STATUS NO GO.
01558                    *
01559                    *DE-ENERGIZE DOOR-LOCK SOLENOID.
01560A 2B54 86 DF     A  TBC19   LDAA    #$DF
01561A 2B56 A4 00     A          ANDA    0,X
01562A 2B58 A7 00     A          STAA    0,X
01563                    *
01564                    *CHECK FOR (ELEVATOR.DD3.DD6).
01565A 2B5A A6 00     A          LDAA    0,X
01566A 2B5C 84 40     A          ANDA    #$40
01567A 2B5E 27 E1 2B41           BEQ     TBC17   TO EXIT.
01568                    *
01569                    *M/C IS GO.
01570                    *
01571                    *SET RUN-RELAY-ENERGIZED FLAG(FLG6=20).
01572A 2B60 86 20     A  TBC20   LDAA    #$20
01573                    *
```

```
01574A 2662 BD 2B0B  A          JSR     SEFLG6
01575                   *
01576                   *ENERGIZE RUN RELAY.
01577A 2665 86 10    A          LDAA    #$10
01578A 2667 BD 2AD9  A          JSR     RUNR01
01579                   *DE-BOUNCING RELAY.
01580A 266A BD 2ED4  A          JSR     DELA1
01581                   *
01582                   *RE-INITIALIZE "TBC" AND "SSC" BUFFERS.
01583A 266D BD 2846  A          JSR     VEND06
01584A 2670 20 04 2B76         BRA     TBC22   TO TEST FOR PAYBACK-PULSE-
01585                   *
01586                   *RUN RELAY IS ENERGIZED.
01587                   *UPDATE "TBC" BUFFER.
01588A 2672 96 33    A  TBC21   LDAA    TBC
01589A 2674 26 1D 2693          BNE     TBC30   TO UPDATE "TBC" BUFFER.
01590                   *"TBC" BUFFER IS ZERO. TEST FOR
01591                   *PAYBACK-PULSE-ON FLAG(FLG6=$02).
01592                   *
01593A 2676 96 31    A  TBC22   LDAA    FLG6
01594A 2678 84 02    A          ANDA    #$02
01595A 267A 26 05 2681         BNE     TBC26   TO UPDATE PAYBK1
01596                   *PAYBACK-PULSE-ON FLAG IS NOT SET.
01597                   *TEST FOR PAYBACK-PULSE-OFF FLAG(FLG6=$01).
01598A 267C 17       A          TBA
01599A 267D 84 01    A          ANDA    #$01
01600A 267F 27 0E 2B8F         BEQ     TBC28   TO EXIT.
01601                   *PAYBACK-PULSE-OFF FLAG IS SET.
01602                   *UPDATE PAYBACK TIMER.
01603                   *
01604A 2681 96 35    A  TBC26   LDAA    PAYBK1
01605A 2683 27 0A 2B8F         BEQ     TBC28   TO EXIT.
01606                   *
01607                   *PAYBACK TIMER NOT EMPTY.
01608                   *UPDATE TIMER.
01609A 2685 4A       A          DECA
01610A 2686 97 35    A          STAA    PAYBK1
01611                   *TEST FOR TIMER=0.
01612A 2688 26 05 2B8F         BNE     TBC28   TO EXIT
01613                   *PAYBACK TIMER=0
01614                   *SET END-OF-PAYBACK PULSE FLAG(FLG7=$04).
01615A 268A 86 04    A          LDAA    #$04
01616A 268C BD 2B14  A          JSR     SEFLG7
01617                   *CLEAR PRESENT INTERRUPT.
01618                   *EXIT
01619A 268F B6 1040  A  TBC28   LDAA    PIA4AD
01620A 2692 3B       A          RTI
01621                   *UPDATE "TBC" BUFFER.
01622A 2693 4A       A  TBC30   DECA
01623A 2694 97 33    A          STAA    TBC
01624                   *TEST FOR TBC=0.
01625A 2696 26 DE 2B76         BNE     TBC22   TO TEST FOR PAYBACK-PULSE-
01626                   *TIME-BASE-CLOCK BUFFER =0.
01627                   *CHECK ELEVATOR MOTOR SPEED (SSC).
01628A 2698 96 34    A  TBC32   LDAA    SPEED1
01629A 269A 81 4D    A          CMPA    #$4D
01630A 269C 23 0A 2BA8         BLS     TBC36   TO DE-ENERGIZE RUN RELAY.
01631                   *MOTOR SPEED > 77 PULSES/SEC.
01632                   *CHECK FOR MOTOR SPEED < 100 PULSES/SEC.
01633A 269E 81 64    A  TBC34   CMPA    #$64
01634A 26A0 2E 06 2BA8         BGT     TBC36   TO DE-ENERGIZE RUN RELAY.
01635                   *ELEVATOR SPEED IS WITHIN LIMITS, RE-INITIALIZE COU
01636                   *AND CONTINUE.
01637A 26A2 BD 2846  A          JSR     VEND06
01638A 26A5 7E 2B76  A          JMP     TBC22   TO TEST FOR PAYBACK-PULSE-
01639                   *DE-ENERGIZE RUN RELAY.
01640A 26A8 86 EF    A  TBC36   LDAA    #$EF
01641A 26AA BD 2AE0  A          JSR     RUNR04
```

```
01642                            *DEBOUNCING DELAY.
01643A 2BAD BD 286C    A            JSR    VEND0C
01644                            *DISABLE LEVEL SW'S.
01645A 2BB0 7F 1010    A            CLR    PIA2AD
01646                            *CLEAR HORIZONTAL SOLENOIDS.
01647A 2BB3 7F 005E    A            CLR    HORSOL
01648                            *DISABLE AND CLEAR ALL INTERRUPTS.
01649A 2BB6 BD 2AE5    A            JSR    DISINT
01650                            *RESET RUN-RELAY-DE-ENERGIZED FLAG.(FLG6=$20)
01651                            *SET RUN-RELAY-DE-ENERGIZED FLAG.(FLG6=$10)
01652A 2BB9 86 DF      A            LDAA   #$DF
01653A 2BBB BD 2B10    A            JSR    REFLG6
01654A 2BBE 86 10      A            LDAA   #$10
01655A 2BC0 BD 2B0B    A            JSR    SEFLG6
01656A 2BC3 7E 2B76    A            JMP    TBC22      TO TEST FOR PAYBACK-PULSE-
01657                            *
01658                            *INTERRUPTS SERVICING.
01659
01660                            *
01661                            *COINS ANTI-JACKPOT DELAYS.
01662A 2BC6    07      A         INTERS FCB    $07,$04,$07,$03
     A 2BC7    04      A
     A 2BC8    07      A
     A 2BC9    03      A
01663                            *BEGIN POLLING INTERRUPTS.
01664A 2BCA 0C                   INTERP CLC
01665                            *TEST FOR "TBC" INTERRUPT
01666A 2BCB B6 1041    A            LDAA   PIA4AC
01667A 2BCE 49                      ROLA
01668A 2BCF 25 6C 2C3D             BCS    TBCI       TP SERVICE INT.
01669                            *TEST FOR SPEED-SENSOR-CLOCK (SSC)
01670A 2BD1 B6 1003    A            LDAA   PIA1AC
01671A 2BD4 49                      ROLA
01672A 2BD5 49                      ROLA
01673A 2BD6 25 5F 2C37             BCS    SSC01
01674                            *CHECK FOR CURRENCY/COINS.
01675A 2BD8 86 FE      A            LDAA   #$FE
01676                            *DELAY
01677A 2BDA BD 2EF3    A            JSR    DELA20
01678                            *GET COINS VECTOR.
01679A 2BDD F6 1020    A            LDAB   PIA3AD
01680                            *CHECK FOR COINS/CURRENCY.
01681                            *INITIALIZE ANTI-JACKPOT-DELAY BUFFERS ADDRESS.
01682A 2BE0 CE 006B    A            LDX    #JACKP1-1
01683A 2BE3 DF 70      A            STX    JACKP5
01684                            *INITIALIZE DELAY-CONSTANTS VECTOR.
01685A 2BE5 CE 2BC5    A            LDX    #INTERS-1
01686A 2BE8 DF 74      A            STX    JACKP7
01687                            *INITIALIZE COINS/CURRENCY MASKING VECTOR.
01688A 2BEA 86 08      A            LDAA   #$08
01689A 2BEC 97 76      A            STAA   JACKP8
01690                            *CHECK FOR $1 COIN INTERRUPT.
01691A 2BEE CE 1013    A            LDX    #PIA2BC
01692A 2BF1 8D 7B 2C6E             BSR    COI05
01693A 2BF3 25 36 2C2B             BCS    COI1
01694                            *CHECK FOR 25 CENT INTERRUPT.
01695A 2BF5 CE 1023    A            LDX    #PIA3BC
01696A 2BF8 8D 74 2C6E             BSR    COI05
01697A 2BFA 25 2F 2C2B             BCS    COI1
01698                            *CHECK FOR 10 CENT INT.
01699A 2BFC CE 1083    A            LDX    #PIA5BC
01700A 2BFF 8D 6D 2C6E             BSR    COI05
01701A 2C01 25 28 2C2B             BCS    COI1
01702                            *CHECK FOR 5 CENT INT.
01703A 2C03 CE 1009    A            LDX    #PIA1AC
```

```
01704A 2C06 8D 66 2C6E        BSR     COI05
01705A 2C08 25 21 2C2B        BCS     COII
01706                         *CHECK FOR VALIDATOR INT.
01707A 2C0A B6 1011  A        LDAA    PIA2AC
01708A 2C0D 49                ROLA
01709A 2C0E 25 33 2C43        BCS     VALID1
01710                         *NO COIN/CURRENCY INTS. FOUND.
01711A 2C10 B6 1043  A        LDAA    PIA4BC
01712A 2C13 49                ROLA
01713                         *CHECK FOR A SELECTION.
01714A 2C14 25 18 2C2E        BCS     SEL
01715A 2C16 49                ROLA
01716                         *CHECK FOR DISPLAY PRICE.
01717A 2C17 25 18 2C31        BCS     PRID
01718A 2C19 B6 1103  A        LDAA    PIA6BC
01719A 2C1C 49                ROLA
01720                         *CHECK FOR CREDIT RECALL.
01721A 2C1D 25 15 2C34        BCS     RECC
01722                         *CHECK FOR CLEARING TOTAL SALES INTERRUPT.
01723A 2C1F B6 100B  A        LDAA    PIA1BC   ROL A
01724A 2C22 25 16 2C3A        BCS     INTER5
01725A 2C24 B6 1101  A        LDAA    PIA6AC
01726A 2C27 49                ROLA
01727                         *CHECK FOR AUTOMATIC PAYOUT.
01728A 2C28 25 1F 2C49        BCS     PAYOUT
01729                         *FALSE INTERRUPT.
01730A 2C2A 3B                INTER2 RTI
01731                         *
01732                         *
01733                         *PATCH
01734A 2C2B 7E 2CF3  A COII   JMP     COI03
01735A 2C2E 7E 2D21  A SEL    JMP     SEL1
01736A 2C31 7E 2D2B  A PRID   JMP     PRIDIS
01737A 2C34 7E 2CED  A RECC   JMP     RECAL
01738A 2C37 7E 2CDC  A SSC01  JMP     SSC02
01739A 2C3A 7E 2A38  A INTER5 JMP     CLRINV
01740A 2C3D 7E 2C83  A TBCI   JMP     TBC01
01741A 2C40 01                NOP
01742A 2C41 01                NOP
01743A 2C42 01                NOP
01744                         *VALIDATOR INTERRUPT SERVICING.
01745                         *DISABLE INTERRUPTS AND DEBOUNCE-DELAY.
01746A 2C43 BD 2CE3  A VALID1 JSR     INDI2
01747A 2C46 7E 2568  A        JMP     CONTSK
01748                         *PAYOUT SERVICING.
01749A 2C49 BD 2CE3  A PAYOUT JSR     INDI2
01750                         *SENSE COIN TYPE FOR PAYOUT.
01751A 2C4C CE 2560  A PAYOU1 LDX     #COINS
01752A 2C4F DF 54    A        STX     TEMP1
01753A 2C51 CE 004E  A        LDX     #FEONEC
01754A 2C54 B6 1100  A        LDAA    PIA6AD
01755A 2C57 0C                CLC
01756A 2C58 48                PAYOU2 ASLA
01757A 2C59 25 08 2C63        BCS     PAYOU3
01758                         *UPDATE VECTORS
01759A 2C5B BD 25E4  A        JSR     CONT0C
01760A 2C5E 26 F8 2C58        BNE     PAYOU2
01761                         *EXIT
01762A 2C60 7E 2501  A        JMP     LDPRIC
01763                         *PAYOUT COIN.
01764A 2C63 6C 00    A PAYOU3 INC     0,X
01765A 2C65 DE 54    A        LDX     TEMP1
01766A 2C67 EE 00    A        LDX     0,X
01767A 2C69 DF 41    A        STX     CREDH+2
01768A 2C6B 7E 262B  A        JMP     RECAL8
01769A 2C6E 09              COI05 DEX
```

```
01770A 2C6F A6 01      A          LDAA    1,X
01771A 2C71 DF 72      A          STX     JACKP6
01772A 2C73 7C 0071    A          INC     JACKP5+1
01773A 2C76 78 0076    A          ASL     JACKP8
01774A 2C79 DE 74      A          LDX     JACKP7
01775A 2C7B 08                    INX
01776A 2C7C DF 74      A          STX     JACKP7
01777A 2C7E DE 72      A          LDX     JACKP6
01778A 2C80 0C                    CLC
01779A 2C81 49                    ROLA
01780A 2C82 39                    RTS
01781                  * *
01782                  *SERVICING INTERRUPTS
01783                  *
01784                  *SERVICE "TBC" INTERRUPTS.
01785                  *
01786                  *TEST FOR UP-DOWN MODE FLAGS(FLG6=$48).
01787                  *
01788A 2C83 96 31      A  TBC01   LDAA    FLG6
01789A 2C85 84 48      A          ANDA    #$48
01790A 2C87 27 03 2C8C            BEQ     TBC02    TO HANDLE ANTI-JACKPOT DEL
01791                  *IN ELEVATOR CONTROL.
01792A 2C89 7E 2B1D    A          JMP     TBC10
01793                  *UPDATE COIN'S ANTI-JACKPOT DELAYS.
01794A 2C8C C6 04      A  TBC02   LDAB    #$04
01795                  *CHECK $1-COINS DELAY.
01796A 2C8E CE 006C    A          LDX     #JACKP1
01797                  *
01798                  *UPDATE DELAY BUFFER.
01799A 2C91 8D 41 2CD4            BSR     TBC07
01800                  *CHECK FOR BUFFER EMPTY.
01801                  *
01802A 2C93 26 06 2C9B            BNE     TBC03    TO CONTINUE.
01803                  *
01804                  *ENABLE $1-COINS INTERRUPT.
01805A 2C95 86 07      A          LDAA    #$07
01806A 2C97 B7 1013    A          STAA    PIA2BC
01807A 2C9A 5A                    DECB
01808                  *
01809                  *TEST 25-CENTS DELAY.
01810                  *
01811A 2C9B 08            TBC03   INX
01812A 2C9C 8D 36 2CD4            BSR     TBC07
01813                  *
01814                  *CHECK FOR BUFFER EMPTY.
01815                  *
01816A 2C9E 26 06 2CA6            BNE     TBC04    TO CONTINUE TEST.
01817                  *
01818                  *BUFFER IS EMPTY.
01819                  *ENABLE 25-CENTS INTERRUPT.
01820                  *
01821A 2CA0 86 07      A          LDAA    #$07
01822A 2CA2 B7 1023    A          STAA    PIA3BC
01823A 2CA5 5A                    DECB
01824                  *
01825                  *CHECK FOR 10-CENTS DELAY.
01826                  *
01827A 2CA6 08            TBC04   INX
01828A 2CA7 8D 2B 2CD4            BSR     TBC07
01829                  *
01830                  *TEST FOR EMPTY BUFFER.
01831                  *
01832A 2CA9 26 06 2CB1            BNE     TBC05
01833                  *BUFFER IS EMPTY.
01834                  *ENABLE 10-CENTS INTERRUPT.
01835A 2CAB 86 07      A          LDAA    #$07
```

```
01836A 2CAD B7 1023  A           STAA    PIA5BC
01837A 2CB0 5A                   DECB
01838                   *TEST 5-CENTS DELAY.
01839A 2CB1 08          TBC05    INX
01840A 2CB2 8D 20 2CD4           BSR     TBC07
01841                   *TEST FOR EMPTY BUFFER.
01842                   *
01843A 2CB4 26 18 2CCE           BNE     TBC06    TO EXIT.
01844                   *
01845                   *BUFFER IS EMPTY.
01846                   *
01847                   *ENABLE 5-CENTS INTERRUPT.
01848                   *
01849A 2CB6 86 1C    A           LDAA    #$1C
01850A 2CB8 B7 1009  A           STAA    PIA1AC
01851A 2CBB 5A                   DECB
01852A 2CBC 26 10 2CCE           BNE     TBC06    TO EXIT.
01853                   *
01854                   *ALL ANTI-JACKPOT DELAYS ARE EMPTY.
01855                   *RESET ANTI-JACKPOT DELAY FLAG.
01856                   *
01857A 2CBE 86 7F    A           LDAA    #$7F
01858A 2CC0 BD 2B19  A           JSR     REFLG7
01859                   *
01860                   *DISABLE "TBC" INTERRUPTS.
01861                   *
01862A 2CC3 86 04    A           LDAA    #$04
01863A 2CC5 B7 1041  A           STAA    PIA4AC
01864                   *
01865                   *ENABLE ALL INTERRUPTS.
01866                   *COINS.
01867A 2CC8 BD 2498  A           JSR     BOOT72
01868                   *OTHER INTERRUPTS.
01869A 2CCB BD 24CC  A           JSR     BOOT22
01870                   *CLEAR PRESENT INTERRUPT.
01871A 2CCE B6 1040  A  TBC06    LDAA    PIA4AD
01872                   *EXIT.
01873                   *
01874A 2CD1 7E 2C2A  A           JMP     INTER2
01875                   *HMCF5
01876                   *SUBROUTINE USED TO UPDATE ANTI-JACKPOT.
01877                   *DELAY BUFFERS.
01878                   *
01879A 2CD4 A6 00    A  TBC07    LDAA    0,X
01880A 2CD6 27 03 2CDB           BEQ     TBC08
01881A 2CD8 4A                   DECA
01882A 2CD9 A7 00    A           STAA    0,X
01883A 2CDB 39          TBC08    RTS
01884                   *
01885                   *SPEED-SENSOR COUNT UPDATE.
01886                   *
01887A 2CDC 7C 0034  A  SSC02    INC     SPEED1
01888                   *
01889                   *CLEAR INTERRUPT.
01890                   *
01891A 2CDF B6 1008  A           LDAA    PIA1AD
01892                   *EXIT.
01893A 2CE2 3B                   RTI
01894                   *DISABLE INTERRUPTING PIA'S.
01895                   *
01896A 2CE3 BD 2AFC  A  IND12    JSR     DISIN1
01897                   *
01898                   *DELAY.
01899                   *
01900A 2CE6 CE 0035  A  IND13    LDX     #$0035
```

```
01901A 2CE9 BD 2ED7  A           JSR     DELA2
01902A 2CEC 39                   RTS
01903                   *
01904                   *DISABLE OTHER INTERRUPTING PIA'S AND DEBOUNCE SW
01905                   *
01906A 2CED BD 2AE5  A  RECAL   JSR     DISINT
01907A 2CF0 7E 2605  A           JMP     RECAL1
01908                   *
01909                   *COINS/CURRENCY INTERRUPT SERVICING.
01910                   *
01911                   *DISABLE INTERRUPT FOUND.
01912                   *
01913A 2CF3 86 04    A  COI03   LDAA    #$04
01914A 2CF5 A7 01    A           STAA    1,X
01915                   *
01916                   *CLEAR INTERRUPT.
01917A 2CF7 A6 00    A           LDAA    0,X
01918                   *
01919                   *TEST ANTI-JACKPOT DELAY.
01920                   *
01921A 2CF9 DE 70    A           LDX     JACKP5
01922A 2CFB A6 00    A           LDAA    0,X
01923A 2CFD 26 1F 2D1E           BNE     COI8
01924                   *
01925                   *ANTI-JACKPOT BUFFER IS EMPTY.
01926                   *SAVE COIN-CURRENCY DATA.
01927                   *
01928A 2CFF D4 76    A           ANDB    JACKP8
01929A 2D01 DA 36    A           ORAB    COIREG
01930A 2D03 D7 36    A           STAB    COIREG
01931A 2D05 5F                   CLRB
01932                   *
01933                   *INITIALIZE ANTI-JACKPOT DELAY.
01934                   *
01935A 2D06 DF 70    A           STX     JACKP5
01936A 2D08 DE 74    A           LDX     JACKP7
01937A 2D0A A6 00    A           LDAA    0,X
01938A 2D0C DE 70    A           LDX     JACKP5
01939A 2D0E A7 00    A           STAA    0,X
01940                   *
01941                   *DISABLE OTHER NON-COINS/CURRENCY INTERRUPTS.
01942                   *
01943A 2D10 BD 2AFC  A           JSR     DISINI
01944                   *
01945                   *SET ANTI-JACKPOT-DELAY-ON FLAG(FLG7=$80).
01946                   *
01947A 2D13 86 80    A           LDAA    #$80
01948A 2D15 BD 2B14  A           JSR     SEFLG7
01949                   *
01950                   *ENABLE "TBC" AND CLEAR EXISTING INTERRUPTS.
01951                   *
01952A 2D18 BD 2863  A           JSR     VEND0B
01953A 2D1B 7E 2568  A           JMP     CONTSK
01954A 2D1E 7E 2C2A  A  COI8    JMP     INTER2
01955                   *
01956                   *VEND REQUEST INTERRUPT SERVICING.
01957                   *
01958                   *STORE SELECTION INFO.DISABLE OTHER PIA'S.
01959A 2D21 BD 2CE3  A  SEL1    JSR     INDI2
01960                   *LOAD SELECTION-SWITCHES INFORMATION AND REMOVE I
01961A 2D24 BD 2D3A  A           JSR     SEL13
01962A 2D27 7E 2693  A           JMP     SEL06
01963                   *
01964                   *
01965                   *PRICE DISPLAY INTERRUPT MAY BE FROM EITHER
01966                   * SELECTION/PRICE K.B.'S
```

```
01967A 202A 01                         NOP
01968A 202B BD 2AFC    A PRIDIS JSR    DISINI
01969A 202E CE 0010    A PRID2  LDX    #$0010
01970A 2031 BD 2ED7    A        JSR    DELA2
01971                           *EXIT
01972                           *GET INTERRUPT INFO.
01973A 2034 BD 203A    A        JSR    SEL13
01974A 2037 7E 24DE    A        JMP    LDPRI
01975                           *
01976                           *THIS SUBROUTINE GETS SELECTION/PRICE SWITCHES DA
01977A 203A 86 01      A SEL13  LDAA   #$01
01978A 203C 97 63      A SEL53  STAA   KEYBD2
01979                           *STROBE OUT
01980A 203E B7 1040    A        STAA   PIA4AD
01981                           *CHECK RECEIVING PIA.
01982A 2041 B6 1042    A        LDAA   PIA4BD
01983A 2044 84 3F      A        ANDA   #$3F
01984A 2046 26 0B 2053          BNE    SEL33
01985                           *UPDATE STROBE.
01986A 2048 96 63      A        LDAA   KEYBD2
01987A 204A 27 11 205D          BEQ    SEL43   TO EXIT.
01988A 204C 0C                  CLC
01989A 204D 49                  ROLA
01990A 204E 25 0D 205D          BCS    SEL43   TO EXIT.
01991A 2050 7E 203C    A        JMP    SEL53   TO CONTINUE
01992                           *LOAD SELECTION INFO.
01993                           *"LSB" OF SELECTION.
01994A 2053 97 65      A SEL33  STAA   SELINF+1
01995                           *"MSB" OF SELECTION.
01996A 2055 B6 1040    A        LDAA   PIA4AD
01997A 2058 97 64      A SEL54  STAA   SELINF
01998                           *CLEAR STROBE.
01999A 205A 7F 1040    A        CLR    PIA4AD
02000A 205D 39           SEL43  RTS
02001                           *PRODUCT SENSING.
02002                           *CHECK FOR PRODUCT IN TRAY.
02003                           *CHECK FOR ELEVATOR-CONTROL COMPLETED.
02004                           *  FLAG.
02005A 205E 96 32      A PROSEN LDAA   FLG7
02006A 2060 16                  TAB
02007A 2061 84 10      A        ANDA   #$10
02008A 2063 27 35 209A          BEQ    PROSE2  TO EXIT
02009                           *CHECK FOR ELEVATOR AT HOME.
02010A 2065 CE 1082    A        LDX    #PIA5BD
02011A 2068 A6 00      A        LDAA   0,X
02012A 206A 16                  TAB
02013A 206B 84 10      A        ANDA   #$10
02014A 206D 27 2B 209A          BEQ    PROSE2  TO EXIT.
02015                           *ELEVATOR IS AT HOME.
02016                           *CHECK FOR RECEIVERS OFF.
02017A 206F 17                  TBA
02018A 2070 84 04      A        ANDA   #$04
02019A 2072 27 26 209A          BEQ    PROSE2  SENSORS FAILING.
02020A 2074 84 08      A        ANDA   #$08
02021A 2076 27 22 209A          BEQ    PROSE2  SENSOR FAILING.
02022                           *SENSORS ARE OFF.
02023                           *CHECK FOR ELEVATOR HOME,DD3,DD6
02024A 2078 B6 1010    A        LDAA   PIA2AD
02025A 207B 84 40      A        ANDA   #$40
02026A 207D 27 1B 209A          BEQ    PROSE2  TO EXIT
02027                           *PULSE TRANSMITTERS.
02028A 207F 86 BF      A        LDAA   #$BF
02029A 2081 A4 00      A        ANDA   0,X
02030A 2083 A7 00      A        STAA   0,X     TRANSMITTERS ON.
02031                           *DELAY
02032A 2085 86 02      A        LDAA   #$02
```

```
02033A 2087 BD 2EF3  A            JSR     DELA20
02034                       *SENSE PRODUCT IN TRAY.
02035A 208A A6 00    A            LDAA    0,X
02036A 208C 16                    TAB
02037A 208D 84 4C    A            ANDA    #$4C
02038A 208F 27 05 2096            BEQ     PROSE1    PRODUCT NOT IN TRAY.
02039                       *PRODUCT IS IN TRAY.
02040                       *ENERGIZE PRODUCT SENSE RELAY AND CLEAR
02041A 2091 17                    TBA
02042A 2092 8A 80    A            ORAA    #$80
02043A 2094 A7 00    A            STAA    0,X
02044                       *CLEAR TRANSMITTER PULSE.
02045A 2096 8A 40    A     PROSE1 ORAA    #$40
02046A 2098 A7 00    A            STAA    0,X
02047A 209A 39              PROSE2 RTS
02048                       *
02049                       *
02050                       *STANDBY LOOP.
02051                       *
02052A 209B BD 2DA0  A     FIRTS1 JSR    DISPLY
02053A 209E 20 FB 209B              BRA    FIRTS1
02054                       *
02055                       *DISPLAY SUBROUTINE.
02056                       *
02057                       *IN THIS SUBROUTINE, DISPLAY OF TOTAL SALES,
02058                       *CREDIT OR PRICE IS MADE BY MULTIPLEXING
02059                       *DIGITS, ONE AT A TIME, IN CREDIT
02060                       *AND TOTAL SALES DISPLAYS. HERE, IF THE
02061                       *POSITION, TOTAL SALES, AND CREDIT ARE
02062                       *DISPLAYED CONSECUTIVELY. TOTAL SALES
02063                       *DISPLAY IS ACTIVATED ONLY BY MEANS OF
02064                       *A KEY-SW., WHICH ;ENABLE READF-OUTS.
02065                       *CREDIT IS DISPLAYED ONLY IF MONEY
02066                       *HAS BEEN DETECTED AS INSERTED IN
02067                       *MACHINE. WHENEVER FUNCTION SW. IS
02068                       *IN "PRICE" POSITION, PRICE INFORMATION
02069                       *IS DISPLAYED ON THE CREDIT READ-OUT.
02070                       *A DISPLAY SEQUENCE BEGINS BY INITIALIZING
02071                       *THE ;KEYBOARD'S AND DIGITS' STROBE VECOTRS.
02072                       *(KEYBD2)., WITH A VALUE CORRESPONDING
02073                       *TO THE "MSD" OF TOTAL SALES (INV04+1)
02074                       *BUFFER. ALSO, BY INITIALIZING THE
02075                       *LEADING-ZEROS FLAG (FLG5=$02). THEN,
02076                       *THE SOFTWARE EXECUTION TRIGGER IS
02077                       *RE-TRIGGERED. THEN, THE FUNCTION SW. IS
02078                       *IF A DISPLAY IS REQUIRED, LEADING
02079                       *ZEROES AND LITERALS($0A,$0B,$0C,$0D,$0E
02080                       *$0F) ARE CHECKED. LEADING ZEROES ARE
02081                       *BLANKED. LITERALS ARE DISPLAYED AS
02082                       *$0A TO INDICATE ERRORS IN PRICE SETTINGS.
02083                       *BUFFER DISP2+3 CONTAINS NEXT-DIGIT INFORMATION.
02084                       *WHICH IS THE"LSD" OF A WORD(BYTE).
02085                       *A BYTE IS DISPLAYED "MSD" FIRST, "LSD"
02086                       *LAST. BUFFERS "DISP2" AND "DISP2+1"
02087                       *ARE USED TO STORE CREDIT OR PRICE
02088                       *INFORMATION. IN ADDITION, PRODUCT-IN-TRAY
02089                       *SENSING AND RETRIGGERING OF WATCH-DOG
02090                       *CIRCUIT IS PERFORMED HERE, TOO.
02091                       *CHECK FOR PRODUCT IN TRAY.
02092                       *INCLUDE A "JSR PROSEN" INSTRUCTION HERE WHEN PRO
02093                       *IS USED WITH M/C.
02094A 2DA0 BD 205E  A     DISPLY JSR    PROSEN
02095A 2DA3 86 02    A            LDAA   #$02
02096                       *SET LEADING 0'S FLAG (FLG5=$02).
02097A 2DA5 BD 25CD  A            JSR    SEFLG5
02098                       *INITIALIZE K.B.'S STROBE VECTOR TO DISPLAY TWO M
```

```
02099A 2DA8 86 40      A         LDAA    #$40
02100A 2DAA 97 63      A         STAA    KEYBD2
02101                        *CHECK FOR CREDIT/TOT. SALES OR PRICE DISPLAYS.
02102A 2DAC BD 2ECE    A         JSR     DISP61
02103A 2DAF 27 03 2DB4           BEQ     DISP72
02104                        *DISPLAY PRICES.
02105A 2DB1 7E 2DC6    A         JMP     DISP76
02106                        *CLEAR K.B. BUFFER.
02107A 2DB4 CE 0000    A DISP72  LDX     #$00
02108A 2DB7 DF 60      A         STX     KEYBD1
02109                        *CHECK FOR CREM-DISABLED FLAG.
02110A 2DB9 96 30      A         LDAA    FLG5
02111A 2DBB 84 01      A         ANDA    #$01
02112A 2DBD 26 10 2DCF           BNE     DISP92
02113                        *ENABLE CREM.
02114A 2DBF 86 40      A         LDAA    #$40
02115A 2DC1 BD 25D6    A         JSR     CONTOA
02116A 2DC4 20 09 2DCF           BRA     DISP92
02117                        *DISPLAY PRICE. DISABLE CREM.
02118A 2DC6 BD 25DD    A DISP76  JSR     CONTOB
02119A 2DC9 DE 60      A         LDX     KEYBD1
02120A 2DCB DF 3B      A         STX     DISP2
02121A 2DCD 20 04 2DD3           BRA     DISP02
02122A 2DCF DE 41      A DISP92  LDX     CREDH+2
02123A 2DD1 DF 3B      A         STX     DISP2
02124                        *GET DIGITS' STARTING ADDRESS.
02125A 2DD3 CE 003B    A DISP02  LDX     #INV04+1
02126                        *SET NEXT-DIGIT FLAG.
02127A 2DD6 86 10      A DISP03  LDAA    #$10
02128A 2DD8 BD 25CD    A         JSR     SEFLG5
02129                        *RE-TRIGGER THE SOFTWARE EXECUTION CONTROLLER.
02130A 2DDB B6 1080    A         LDAA    PIA5AD
02131A 2DDE 8A 10      A         ORAA    #$10
02132A 2DE0 B7 1080    A         STAA    PIA5AD
02133                        *CLEAR PULSE.
02134A 2DE3 88 10      A         EORA    #$10
02135A 2DE5 B7 1080    A         STAA    PIA5AD
02136                        *LOAD DIGIT.
02137A 2DE8 A6 00      A         LDAA    0,X
02138                        *SHIFT DIGIT.
02139A 2DEA 7F 003E    A DISP07  CLR     DISP2+3
02140A 2DED BD 2EAD    A         JSR     DISP26
02141                        *SAVE NEXT DIGIT.
02142A 2DF0 97 3D      A         STAA    DISP2+2
02143                        *CHECK FOR 0'S
02144A 2DF2 96 3E      A         LDAA    DISP2+3
02145A 2DF4 26 14 2E0A           BNE     DISP08
02146                        *ZERO IS PRESENT. CHECK FOR LEADING 0.
02147                        *CHECK FOR LEADING 0 FLG.(FLG5=$02)
02148A 2DF6 96 30      A         LDAA    FLG5
02149A 2DF8 84 02      A         ANDA    #$02
02150A 2DFA 27 1E 2E1A           BEQ     DISP0A    TO DISPLAY DIGITS.
02151                        *LEADING ZERO PRESENT- BLANK IT.
02152A 2DFC B6 1080    A         LDAA    PIA5AD
02153A 2DFF 8A 0F      A         ORAA    #$0F
02154A 2E01 B7 1080    A         STAA    PIA5AD
02155                        *UPDATE DISPLAY BUFFER.
02156A 2E04 C6 0F      A         LDAB    #$0F
02157A 2E06 D7 3E      A         STAB    DISP2+3
02158A 2E08 20 10 2E1A           BRA     DISP0A    TO DISPLAY DIGITS.
02159                        *END OF LEADING 0'S CHECK.
02160                        *CLEAR LEADING 0'S FLAG.($02).
02161A 2E0A 96 30      A DISP08  LDAA    FLG5
02162A 2E0C 84 FD      A         ANDA    #$FD
02163A 2E0E 97 30      A         STAA    FLG5
02164                        *CHECK FOR LITERALS.
```

```
02165A 2E10 BD 2EB9   A          JSR     DISP30
02166                       *CHECK FOR CREDIT=0
02167A 2E13 96 41     A          LDAA    CREDH+2
02168A 2E15 27 03 2E1A           BEQ     DISP0A
02169                       *REFRESH DECIMAL POINT.
02170A 2E17 BD 2F06   A          JSR     DISP80
02171                       *BEGIN DISPLAY.
02172                       *TEST FOR EIGHT "LSD'S"
02173A 2E1A 96 30     A  DISP0A  LDAA    FLG5
02174A 2E1C 84 40     A          ANDA    #$40
02175A 2E1E 26 08 2E28          BNE     DISPAB
02176                       *EXIT
02177                       *DISPLAY TWO "MSD'S". CLEAR PREVIOUS STROBE.
02178A 2E20 7F 1040   A          CLR     PIA4AD
02179A 2E23 96 63     A          LDAA    KEYBD2
02180A 2E25 7E 2E2E   A          JMP     DISP0D
02181                       *DISPLAY EIGHT "LSD'S".
02182                       *STROBE OUT.
02183A 2E28 96 63     A  DISPAB  LDAA    KEYBD2
02184A 2E2A B7 1040   A          STAA    PIA4AD
02185A 2E2D 4F                   CLRA
02186                       *GET STROBE AND DATA.
02187A 2E2E 9A 3E     A  DISP0D  ORAA    DISP2+3
02188                       *DATA AND/OR STROBE OUT.
02189A 2E30 B7 1080   A          STAA    PIA5AD
02190                       *DELAY DIGIT BEING DISPLAYED.
02191A 2E33 86 45     A          LDAA    #$45
02192A 2E35 BD 2EF3   A          JSR     DELA20
02193                       *CLEAR DATA.
02194A 2E38 B6 1080   A          LDAA    PIA5AD
02195A 2E3B 8A 0F     A          ORAA    #$0F
02196A 2E3D B7 1080   A          STAA    PIA5AD
02197                       *CLEAR STROBE
02198A 2E40 7F 1040   A          CLR     PIA4AD
02199                       *UPDATE STROBE VECTOR.
02200A 2E43 96 63     A          LDAA    KEYBD2
02201A 2E45 27 1A 2E61          BEQ     DISP10
02202                       *CHECK FOR DIRECTION OF ROTATION.
02203                       *CHECK FOR DISPLAYING OF EIGHT "LSD'S".
02204A 2E47 D6 30     A          LDAB    FLG5
02205A 2E49 C4 40     A          ANDB    #$40
02206A 2E4B 26 04 2E51          BNE     DISP4B  TO ROTATE RIGHT.
02207                       *IN TWO "MSD'S". ROTATE STROBE LEFT.
02208A 2E4D 0C                   CLC
02209A 2E4E 49                   ROLA
02210                       *SAVE VECTOR INFO.
02211A 2E4F 20 02 2E53          BRA     DISP80
02212A 2E51 0C           DISP4B  CLC
02213A 2E52 46                   RORA
02214                       *SAVE VECTOR INFO.
02215A 2E53 97 63     A  DISP80  STAA    KEYBD2
02216                       *TEST FOR LAST DIGIT DISPLAYED.
02217A 2E55 24 19 2E70          BCC     DISP4E  TO CONTINUE DISPLAY.
02218                       *CHECK FOR SETTING EIGHT "LSD'S" FLAG (FLG5=$40)
02219A 2E57 96 30     A          LDAA    FLG5
02220A 2E59 84 40     A          ANDA    #$40
02221A 2E5B 27 0A 2E67          BEQ     DISP81
02222                       *EXIT. CLEAR FLAG.
02223A 2E5D 43                   COMA
02224A 2E5E BD 25D2   A          JSR     REFLG5
02225                       *CLEAR DISPLAY-NEXT-DIGIT FLAG(FLG5=$10) AND DISP
02226                       *(FLG5=$40) FLAG.
02227A 2E61 86 AF     A  DISP10  LDAA    #$AF
02228A 2E63 BD 25D2   A          JSR     REFLG5
02229                       *EXIT
02230A 2E66 39                   RTS
```

```
02231                    *SET EIGHT "LSD'S" STROBE VECTOR.
02232A 2E67 86 80     A  DISP31 LDAA   #$80
02233A 2E69 97 63     A         STAA   KEYBD2
02234                    *SET EIGHT "LSD'S" DISPLAY FLAG.(FLG5=$40)
02235A 2E6B 86 40     A  DISP82 LDAA   #$40
02236A 2E6D BD 25CD   A         JSR    SEFLG5
02237                    *CHECK FOR NEXT-DIGIT FLAG($10).
02238A 2E70 96 30     A  DISP4E LDAA   FLG5
02239A 2E72 84 10     A         ANDA   #$10
02240A 2E74 27 09 2E7F          BEQ    DISP0E   TO UPDATE POINTERS.
02241                    *DISPLAY NEXT DIGIT.
02242                    *RESET FLAG.
02243A 2E76 43                  COMA
02244A 2E77 BD 2502   A         JSR    REFLG5
02245                    *GET NEXT DIGIT.
02246A 2E7A 96 3D     A         LDAA   DISP2+2
02247A 2E7C 7E 2DEA   A         JMP    DISP07   TO DISPLAY DIGIT.
02248                    *UPDATE POINTERS.
02249A 2E7F 08           DISP0E INX
02250A 2E80 8C 003B   A         CPX    #INV04+4 TO CHECK BEGINNING OF DISP
02251A 2E83 26 09 2E8E          BNE    DISP7E   TO CHECK LAST TWO DIGITS.
02252                    *SET LEADING 0'S FLAG(FLG5=$02)
02253A 2E85 96 30     A         LDAA   FLG5
02254A 2E87 8A 02     A         ORAA   #$02
02255A 2E89 97 30     A         STAA   FLG5
02256A 2E8B 7E 2DQ6   A         JMP    DISP03
02257                    *CHECK FOR LAST TWO DIGITS.
02258A 2E8E 8C 003C   A  DISP7E CPX    #DISP2+1
02259A 2E91 26 12 2EA5          BNE    DISP8E
02260                    *DETERMINE IF CREDIT OR PRICE DISPLAY.
02261A 2E93 BD 2ECE   A         JSR    DISP61
02262A 2E96 26 04 2E9C          BNE    DISP9E
02263                    *CREDIT DISPLAY. CHECK FOR CREDIT =0.
02264A 2E98 A6 00     A         LDAA   0,X
02265A 2E9A 27 09 2EA5          BEQ    DISP8E
02266                    *CLEAR LEADING 0'S FLAG.
02267A 2E9C 96 30     A  DISP9E LDAA   FLG5
02268A 2E9E 84 FD     A         ANDA   #$FD
02269A 2EA0 97 30     A         STAA   FLG5
02270                    *REFRESH DECIMAL PT.
02271A 2EA2 BD 2F06   A         JSR    DISPB0
02272                    *CHECK FOR END OF DISPLAY.
02273A 2EA5 8C 003D   A  DISP8E CPX    #DISP2+2
02274A 2EA8 27 B7 2E61          BEQ    DISP10   TO EXIT.
02275A 2EAA 7E 2DD6   A         JMP    DISP03   TO CONTINUE.
02276                    *
02277                    *SUBROUTINES USED IN DISPLAY.
02278                    *
02279                    *SHIFT DIGIT
02280A 2EAD 01           DISP26 NOP
02281                    *SET 4-BIT COUNTER.
02282A 2EAE C6 04     A         LDAB   #$04
02283A 2EB0 0C           DISP28 CLC
02284A 2EB1 48                  ASLA
02285A 2EB2 79 003E   A         ROL    DISP2+3
02286A 2EB5 5A                  DECB
02287A 2EB6 26 F8 2EB0          BNE    DISP28
02288A 2EB8 39                  RTS
02289                    *CHECKING FOR LITERALS.
02290A 2EB9 86 06     A  DISP30 LDAA   #$06
02291A 2EBB C6 0A     A         LDAB   #$0A
02292A 2EBD D1 3E     A  DISP32 CMPB   DISP2+3
02293A 2EBF 27 05 2EC6          BEQ    DISP41
02294A 2EC1 5C                  INCB
02295A 2EC2 4A                  DECA
```

```
02296A 2EC3 26 F8 2EBD            BNE     DISP32
02297A 2EC5 39              DISP36 RTS
02298                       *SET LITERAL "A" FOR ERROR.
****ERROR    247 0A 01
02299A 2EC6 B6 ----    A    DISP41 LDA A  #0A  =#$0A
02300A 2EC9 97 3E      A           STAA   DISP2+3  NOP
02301A 2ECB 20 F8 2EC5              BRA   DISP36
02302A 2ECD 01                      NOP
02303                       *IN TWO "MSD'S".TEST FOR CREDIT OR PRICE DISPLAY
02304A 2ECE B6 1082    A    DISP61 LDAA   PIA5BD
02305A 2ED1 84 02      A           ANDA   #$02
02306A 2ED3 39                     RTS
02307                       *DELAY
02308                       *
02309A 2ED4 CE 0005    A    DELA1  LDX    #$0005
02310A 2ED7 DF 68      A    DELA2  STX    DELAY3
02311A 2ED9 BD 2DA0    A    DELA6  JSR    DISPLY
02312A 2EDC DE 68      A           LDX    DELAY3
02313A 2EDE 27 05 2EE5             BEQ    DELA8
02314A 2EE0 09                     DEX
02315A 2EE1 DF 68      A           STX    DELAY3
02316A 2EE3 26 F4 2ED9             BNE    DELA6
02317A 2EE5 39              DELA8  RTS
02318A 2EE6 DF 68      A    DELA10 STX    DELAY3
02319A 2EE8 BD 2DA0    A    DELA11 JSR    DISPLY
02320A 2EEB DE 68      A           LDX    DELAY3
02321A 2EED 27 03 2EF2             BEQ    DELA12
02322A 2EEF 09                     DEX
02323A 2EF0 DF 68      A           STX    DELAY3
02324A 2EF2 39              DELA12 RTS
02325A 2EF3 4A              DELA20 DECA
02326A 2EF4 26 FD 2EF3             BNE    DELA20
02327A 2EF6 39                     RTS
02328                       *DELAY NEEDED WHENEVER TWO TIMERS ARE USED CONCUR
02329A 2EF7 DF 6B      A    DELA30 STX    DELAY6
02330A 2EF9 BD 2DA0    A    DELA32 JSR    DISPLY
02331A 2EFC DE 6B      A           LDX    DELAY6
02332A 2EFE 27 05 2F05             BEQ    DELA34
02333A 2F00 09                     DEX
02334A 2F01 DF 6B      A           STX    DELAY6
02335A 2F03 26 F4 2EF9             BNE    DELA32
02336A 2F05 39              DELA34 RTS
02337                       *REFRESH DECIMAL POINT.
02338A 2F06 B6 1080    A    DISP60 LDAA   PIA5AD
02339A 2F09 8A 2F      A           ORAA   #$2F     TO BLANK DIGIT(DATA)
02340A 2F0B B7 1080    A           STAA   PIA5AD
02341                       *STROBE OUT.
02342A 2F0E 86 04      A           LDAA   #$04
02343A 2F10 B7 1040    A           STAA   PIA4AD
02344                       *CLEAR DATA.
02345A 2F13 86 2F      A           LDAA   #$2F
02346A 2F15 B7 1080    A           STAA   PIA5AD
02347A 2F18 39                     RTS
02348                       *INTERRUPT VECTORS.
02349                              NAM    END
02350                       *  USE THIS PROGRAM AT THE END OF ALL THE OTHER P
02351                              END
TOTAL ERRORS 00001
```

```
2676 ACLR1    00582*01142
2679 ACLR2    00583*00586
2682 ACLR3    00589*00903
2687 ACLR4    00591*01429
268A ACLR5    00590 00592*00595
2692 ACLR6    00596*
25EC ADDTSK   00434 00486*00648 01297
25FD ADLI     00495*00576
2400 BOOT     00008 00130*
2404 BOOT01   00133*00137
2440 BOOT04   00163*00164
24CC BOOT22   00172 00255*00351 01869
24D7 BOOT24   00259*
2498 BOOT72   00161 00226*00349 01867
249A BOOT73   00228*
24B6 CLRINI   00244*00353
24A7 CLRINT   00180 00238*00984 00990 00998 01469
2A38 CLRINV   01326*01739
2CF3 COI03    01734 01913*
2C6E COI05    01692 01696 01700 01704 01769*
2C2B COI1     01693 01697 01701 01705 01734*
2D1E COI8     01923 01954*
2560 COINS    00390*01137 01404 01751
0036 COIREG   00076*00396 00404 00413 00414 01929 01930
2576 CONT02   00402*00409
2581 CONT04   00397 00411*
2584 CONT06   00405 00413*
2592 CONT07   00419 00423*
259C CONT08   00424 00430*
25BD CONT09   00441 00454*
25D6 CONT0A   00473*02115
25DD CONT0B   00448 00460 00477*00541 01028 01031 02118
25E4 CONT0C   00408 00431*01369 01759
25CB CONT0D   00450 00459 00464*00543 01033
25D9 CONT1A   00474*00479
2568 CONTSK   00396*00456 00462 01747 01953
0053 CONTYP   00096*01149 01172 01367 01442
0051 COSTH    00094*00589 00751 00831 00834 00836 00874 00880 00886
              01285
003F CREDH    00082*00487 00493 00531 00565 00573 00634 00650 00653
              00682 00686 00854 00895 00901 00906 00913 01118 01281
              01291 01295 01299 01309 01319 01417 01767 02122 02167
255C CURREN   00389*00398 01130
2ED4 DELA1    00210 01580 02309*
2EE6 DELA10   02318*
2EE8 DELA11   02319*
2EF2 DELA12   02321 02324*
2ED7 DELA2    00187 00370 00386 00524 00661 00988 01023 01046 01052
              01901 01970 02310*
2EF3 DELA20   01677 02033 02192 02325*02326
2EF7 DELA30   02329*
2EF9 DELA32   02330*02335
2F05 DELA34   02332 02336*
2ED9 DELA6    02311*02316
2EE5 DELA8    02313 02317*
0066 DELAY1   00112*00594
0067 DELAY2   00113*00445
0068 DELAY3   00114*02310 02312 02315 02318 02320 02323
0069 DELAY4   00115*
```

```
006A DELAY5  00116*
006B DELAY6  00117*00136 02329 02331 02334
0047 DIFFH   00085*00577
2AFC DISIN1  01473*01896 01943 01968
2AE5 DISINT  00529 01035 01109 01278 01461*01649 01906
2DD3 DISP02  02121 02125*
2DD6 DISP03  02127*02256 02275
2DEA DISP07  02139*02247
2E0A DISP08  02145 02161*
2E1A DISP0A  02150 02158 02168 02173*
2E2E DISP0D  02180 02187*
2E7F DISP0E  02240 02249*
2E61 DISP10  02201 02227*02274
003B DISP2   00060*02120 02123 02139 02142 02144 02157 02187 02246
             02258 02273 02285 02292 02300
2EAD DISP26  02140 02280*
2EE0 DISP28  02283*02287
2EB9 DISP30  02165 02290*
2EBD DISP32  02292*02296
2EC5 DISP36  02297*02301
2EC6 DISP41  02293 02299*
2E51 DISP46  02206 02212*
2E70 DISP4E  02217 02238*
2ECE DISP61  02102 02261 02304*
2DB4 DISP72  02103 02107*
2DC6 DISP76  02105 02118*
2E8E DISP7E  02251 02258*
2E53 DISP80  02211 02215*
2E67 DISP81  02221 02232*
2E6B DISP82  02235*
2EA5 DISP8E  02259 02265 02273*
2DCF DISP92  02112 02116 02122*
2E9C DISP9E  02262 02267*
2E28 DISPA8  02175 02183*
2F06 DISPE0  02170 02271 02338*
2DA0 DISPLY  00327 00508 01086 01097 01184 01272 01419 02052 02094*
             02311 02319 02330
248C ELHOME  00197 00217*00329 01274
004C FED1    00088*
004B FENIC   00087*00423 00582 00585 00591
004F FEONEB  00091*00423
004E FEONEC  00090*00418 01144 01753
004D FEQUAR  00089*
0050 FETWO   00092*00400 01134
2D9B FIRTS1  00194 02052*02053
0030 FLG5    00057*00308 00336 00338 00466 00467 00470 01125 01386
             02110 02148 02161 02163 02173 02204 02219 02238 02253
             02255 02267 02269
0031 FLG6    00063*00973 01081 01156 01165 01186 01192 01223 01349
             01351 01482 01483 01488 01504 01593 01788
0032 FLG7    00068*00340 00501 00511 00972 01007 01039 01075 01217
             01492 01493 01497 02005
005E HORSOL  00104*00692 00706 00771 01015 01058 01647
0043 INCRH   00094*00432 00496 00497 00563 00636 00881 01286
2CE3 INDI2   01746 01749 01896*01959
2CE6 INDI3   01900*
2C2A INTER2  01730*01874 01954
2C3A INTER5  01724 01739*
2BC6 INTER8  01662*01685
2BCA INTERP  00010 01664*
0037 INV04   00078*01300 01310 01342 01345 02125 02250
006C JACKP1  00118*01682 01796
006D JACKP2  00119*
```

```
006E JACKP3 00120*
006F JACKP4 00121*
0070 JACKP5 00122*01683 01772 01921 01935 01938
0072 JACKP6 00123*01771 01777
0074 JACKP7 00124*01686 01774 01776 01936
0076 JACKP8 00125*01689 01773 01928
0059 KEYBD1 00108*00306 00324 00376 00378 00633 00652 00654 00787
               00803 00804 01301 01311 01316 01328 02108 02119
0063 KEYBD2 00109*01978 01986 02100 02179 02183 02200 02215 02233
24EA LDPR06 00304 00308*
252A LDPR07 00318 00338*01303 01313 01329 01332
24FD LDPR0C 00307 00311 00324*
2501 LDPR1C 00327*00330 00334 00556 01115 01336 01762
2522 LDPR43 00347 00351*00609
2525 LDPR45 00353*
2514 LDPR46 00325 00340*00411 00904
251F LDPR47 00342 00349*
24DE LDPRI  00298*01974
25F8 LOOP   00488*00494
2490 MACST1 00203 00207*
2485 MACST2 00205 00210*
248A MACST3 00198 00214*
2475 MACSTA 00163 00197*00994 01539
2A64 MONT02 01357*
2A69 MONT03 01363*01371
2A6E MONT04 01367*01414
2A78 MONT05 01364 01376*
2AA7 MONT06 01382 01401 01413*
2ABA MONT07 01374 01429*
2AD3 MONT08 01354 01359 01444*
2AD8 MONT09 01426 01446*
2A9B MONT55 01395 01404*
2AAC MONT58 01388 01399 01405 01409 01416*
2A5B MONTSK 01154 01349*
27E2 NEGT01 00871 00880*
27F8 NEGT02 00893 00898*
27FA NEGT03 00882 00888 00900*01005
2804 NEGT04 00898 00906*
280D NEGTOA 00912*00931
2814 NEGTOE 00910 00917*
281D NEGTOF 00919 00924*
2822 NEGT11 00921 00927*
2825 NEGT12 00925 00928*
282C NEGT13 00929 00934*
27FE NEGT33 00903*
27F1 NEGT42 00893*
27CA NEGTSK 00612 00854*
0035 PAYBK1 00074*00976 01177 01238 01604 01610
2AB3 PAYCOI 01422*
2C4C PAYOU1 00554 01751*
2C58 PAYOU2 01756*01760
2C63 PAYOU3 01757 01764*
2C49 PAYOUT 01728 01749*
1009 PIA1AC 00022*00234 00980 01462 01670 01703 01850
1008 PIA1AD 00021*00151 00238 00362 00367 00381 00383 00315 00319
               01891
100B PIA1BC 00024*00258 00822 00825 00840 00848 01476 01723
100A PIA1BD 00023*00247 00379 00833 00942
1011 PIA2AC 00027*00153 01463 01707
1010 PIA2AD 00026*00142 00170 00239 01017 01060 01449 01450 01455
               01554 01645 02024
1013 PIA2BC 00029*00228 01464 01691 01806
1012 PIA2BD 00028*00143 00222 00240 00656 01062 01104 01392
```

```
1021 PIA3AC 00032*00156 01465
1020 PIA3AD 00031*00249 00917 01407 01679
1023 PIA3BC 00034*00230 01466 01695 01822
1022 PIA3BD 00033*00149 00241 00473 00474 00478 00908 01174 01228
1041 PIA4AC 00037*00153 00982 01666 01863
1040 PIA4AD 00036*00152 00243 00664 00684 01613 01871 01980 01996
               01999 02178 02184 02198 02343
1043 PIA4BC 00039*00262 01474 01711
1042 PIA4BD 00038*00244 00666 01982
1061 PIA5AC 00042*00157
1060 PIA5AD 00041*00152 00250 02130 02132 02135 02152 02154 02189
               02194 02196 02338 02340 02346
1063 PIA5BC 00044*00232 01467 01699 01836
1062 PIA5BD 00043*00147 00178 00217 00242 00869 02010 02304
1101 PIA6AC 00047*00257 01477 01725
1100 PIA6AD 00046*00145 00175 00182 00184 00189 00191 00245 00550
               00954 00955 00958 01754
1103 PIA6BC 00049*00256 00841 00846 01475 01718
1102 PIA6BD 00048*00246 00377 00830 00843
0334 PRICE  00127*
2031 PRID   01717 01736*
202E PRID2  01969*
202B PRIDIS 01736 01968*
2096 PROSE1 02038 02045*
209A PROSE2 02008 02014 02019 02021 02026 02047*
205E PROSEN 02005*02094
2A4C PUTOSL 00167 01334 01340*
2780 READ02 00322 00746 00811*01289 01294 01341 01344
2783 READ04 00359 00374 00812 00840*
2786 READ06 00841*
2CED RECAL  01737 01906*
2605 RECAL1 00452 00501*00509 00915 01907
2611 RECAL2 00503 00511*
2618 RECAL4 00513 00520*
261D RECAL6 00517 00521*
262B RECAL8 00529*01768
2635 RECAL9 00532 00536*
2655 RECALA 00536 00552 00556*
263B RECALB 00534 00538*
2C34 RECC   01721 01737*
2502 REFLG5 00315 00470*01003 01445 02224 02228 02244
2B10 REFLG6 01034 01232 01254 01432 01488*01653
2B19 REFLG7 01235 01257 01497*01858
2834 RELIC1 00421 00527 00954*01055
2837 RELIC3 00955*00959
283B RELIC5 00521 00958*00962 01049
2840 RELIC7 00961*01043
26A7 ROLL1  00633*00647 00680
2AD5 RUNR01 00208 01449*01578
2ADC RUNR02 01450*01456
2AE0 RUNR04 01455*01641
2A37 SALIN2 01321*
29FF SALINV 01281*01394
2867 SECDFL 01029 01033*
25CD SEFLG5 00466*00546 00780 00877 00935 02097 02128 02236
2B06 SEFLG6 00539 01068 01107 01122 01170 01241 01423 01435 01482*
               01574 01655
2B14 SEFLG7 00428 01270 01492*01549 01616 01948
2C2E SEL    01714 01735*
265F SEL01  00631*00698 00704 00713 00722 00766
2693 SEL06  00606*01962
2695 SEL08  00609 00611*
2C21 SEL1   01735 01959*
```

```
2681 SEL10    00300 00606 00639*00658
26BF SEL12    00641 00647*00671
2D3A SEL13    01961 01973 01977*
26C5 SEL14    00650*00683
26D9 SEL16    00661*00674
26EB SEL18    00673*
26F0 SEL20    00669 00676*
26F5 SEL22    00644 00680*
26FF SEL24    00678 00684*
270A SEL26    00645 00689*
2716 SEL28    00700*00709
2726 SEL30    00701 00712*
272B SEL32    00714*00728
2D53 SEL33    01984 01994*
273C SEL34    00716 00746*
2747 SEL36    00723 00758*
2749 SEL38    00760*00767
2755 SEL40    00687 00705 00769*00781 00788 00808
275B SEL42    00750 00773*
2D5C SEL43    01987 01990 02000*
275E SEL44    00761 00776*
2769 SEL46    00777 00783*
2774 SEL48    00784 00790*
2779 SEL50    00791 00795*
277F SEL52    00801*00806
2D3C SEL53    01978*01991
2D58 SEL54    01997*
005F SELECT   00106*00694 00727 01012 01056
0064 SELINF   00111*00639 00696 00712 00773 01994 01997
25CF SET5     00457*00471
2B0D SET6     01483*01489
2B16 SET7     01493*01498
0034 SPEED1   00072*00969 00975 01628 01887
2C37 SSC01    01673 01738*
2C0C SSC02    01738 01887*
2E5E SUBTS1   00566*00574
2659 SUBTSK   00455 00563*00681 00891 00928 01381
0033 TBC      00070*00968 00974 01538 01623
2C83 TBC01    01740 01788*
2C3C TBC02    01790 01794*
2C9B TBC03    01802 01811*
2CA6 TBC04    01816 01827*
2CB1 TBC05    01832 01839*
2CCE TBC06    01843 01852 01871*
2CD4 TBC07    01799 01812 01828 01840 01879*
2CDE TBC08    01880 01883*
2B1D TBC10    01504*01792
2B24 TBC12    01513*01536
2B29 TBC14    01518*
2B33 TBC15    01507 01533*
2B3C TBC16    01528 01539*
2B41 TBC17    01545*01557 01567
2B49 TBC18    01540 01554*
2B54 TBC19    01560*
2B60 TBC20    01527 01572*
2B72 TBC21    01515 01520 01588*
2B76 TBC22    01535 01584 01593*01625 01638 01656
2B81 TBC26    01595 01604*
2B8F TBC28    01551 01600 01605 01612 01619*
2B93 TBC30    01589 01622*
2B98 TBC32    01628*
2B9E TBC34    01633*
2BA8 TBC36    01630 01634 01640*
```

```
2C30  TBCI   01668 01740*
0054  TEMP1  00097*00321 00364 00399 00430 00481 01132 01139 01378
             01393 01438 01752 01765
0056  TEMP2  00098*00416 00436 01147 01151 01153 01259 01261 01376
             01413 01439
0058  TEMP3  00099*01384 01416 01440
005A  TEMP4  00100*00856 00900 00912 01283 01318
005C  TEMP5  00101*
2492  THISOD 00202 00222*00333 01099
2C43  VALID1 01703 01746*
287C  VEND01 00998*01030 01078
2886  VEND02 01005*01009 01013 01016
288B  VEND03 00995 01007*
28CC  VEND04 01041 01048*
2846  VEND06 00967*01111 01583 01637
284E  VEND08 00972*01000 01065 01267 01545
2851  VEND09 00973*
2856  VEND0A 00979*01070 01179
2863  VEND0B 00346 00981*01952
286C  VEND0C 00987*01063 01643
28FF  VEND12 01077 01081*01087
2908  VEND14 01084 01090*
2911  VEND16 01097*01100
2920  VEND17 00548 01113 01118*
2938  VEND18 01119 01125*
293E  VEND20 01129*
294A  VEND22 01127 01137*
2959  VEND24 01135 01147*
295F  VEND26 01157*01211
2984  VEND28 01123 01159 01163 01167 01179*
2987  VEND30 01181*
2989  VEND31 01184*01207 01214
298C  VEND32 01186*
2993  VEND34 01192*01219 01245
299A  VEND36 01198*
299F  VEND37 01195 01203*
29A6  VEND38 01205 01209*
29AD  VEND40 01189 01217*
29B4  VEND42 01200 01223*
29D0  VEND43 01243*01249 01262
29D4  VEND44 01226 01247*
29EB  VEND48 01265*
29F4  VEND50 01272*01275
28B1  VENDV  01026 01030*
287E  VENTSK 00878 00896 00936 00992*
```

What is claimed is:

1. Apparatus for controlling the functioning of a vendor for vending a plurality of items, each item having at least one parameter associated therewith, comprising:

a memory having a plurality of addresses for storing values of at least some of the parameters in predetermined memory addresses, the parameter values stored in the predetermined memory addresses being electrically alterable;

processing means responsive to a plurality of vendor status inputs, a plurality of inputs from the memory, and a plurality of control inputs, for performing arithmetic and logic operations with those inputs and with the values of the parameters associated with the items in a sequence controlled by a preselected set of instructions which constitute a program and for supplying output signals based upon results obtained from said operations to control functioning of the vendor, the predetermined memory addresses being accessible by the processing means and the parameter values stored therein being alterable by said processing means;

interrogation means operable by authorized personnel for retrieving from memory the values of at least some of the parameters stored therein; and display means for visually displaying a parameter value retrieved from memory by the interrogation means independently of any other input of said processing means being equal in value to the value of the parameter retrieved from the memory, whereby authorized personnel may utilize the interrogation means to retrieve the value of a desired parameter from the memory.

2. Apparatus as set forth in claim 1 including means for supplying at least one input representative of a deposit of money in the vendor to the processing means, said processing means being responsive to said money deposit input to determine the amount of credit accumulated as a result of said deposit and to display said amount of accumulated credit by means of the display means.

3. Apparatus as set forth in claim 2 wherein one of the parameters associated with each item is price and further including means for supplying a vendor status input indicating the selection of an item to the processing means, the processing means being responsive to said selection input signal to recall the value of the price parameter associated with that particular item from memory and, if there is a non-zero price associated with that item, and if the amount of credit accumulated is sufficient for purchase of the item selected, to generate a vend signal.

4. Apparatus as set forth in claim 3 further including means for initiating vending of the selected item, said initiating means being responsive to the vend signal from the processing means.

5. Apparatus as set forth in claim 4 further including interlocking means for supplying vendor status inputs to the processing means which indicate that the vendor is not ready to vend the desired item.

6. Apparatus as set forth in claim 4 wherein the memory has a predetermined address for storing a total accumulated sales figure for the vendor and including means for supplying a control input signal indicating the vending of the selected item to the processing means, said processing means being responsive to said signal to update the total sales figure in the memory.

7. Apparatus as set forth in claim 6 including second display means for displaying said total sales figure.

8. Apparatus as set forth in claim 7 wherein the second display means is normally inactivated and further including means operable by authorized personnel for activating said second display means.

9. Apparatus as set forth in claim 6 including means for supplying a reset control input signal to the processing means, said processing means being responsive to said reset signal to change the total sales figure stored in memory to zero.

10. Apparatus as set forth in claim 1 including means operable by authorized personnel for setting the values of at least some of the parameters stored in the memory.

11. Apparatus as set forth in claim 10 wherein one of the parameters associated with each different item is price, wherein the apparatus has at least two mutually exclusive modes of operation, one of said operation modes being a vending mode and one of said operation modes being a price-setting mode, wherein the interrogation means includes a plurality of selection switches corresponding to the items in the vendor, and further including means for setting the mode of operation of the apparatus, the processing means being responsive to the actuation of a selection switch and to the apparatus being in the price setting mode to retrieve from the memory the price of the item corresponding to that selection switch and to supply a coded signal corresponding to said price to the display means, the display means being responsive to the coded price signal from the processing means to display the price of the item corresponding to the actuated selection switch.

12. Apparatus as set forth in claim 11 including means for supplying at least one vendor status input to the processing means respresentative of a deposit of money in the vendor, said processing means being responsive to the apparatus being in the vending mode and to said money deposit input to determine the amount of credit accumulated as a result of said deposit and to supply to said display means a signal corresponding to said accumulated credit, whereby said display means displays said accumulated credit when the apparatus is in the vending mode and displays the price corresponding to an item whose selection switch is actuated when the apparatus is in the price-setting mode.

13. Apparatus as set forth in claim 11 wherein the serviceman-operable parameter setting means is a price-setting means for setting the prices of the items to be vended, said price setting means including means for supplying to the processing means a control input signal representing a potential new price, said processing means being responsive to the apparatus being in the price-setting mode and to said potential new price input signal to supply a coded signal corresponding to said potential new price to the display means, the display means being responsive to the coded potential new price signal to display the potential new price.

14. Apparatus as set forth in claim 13 wherein the price-setting means includes means for putting the apparatus in a price loading mode, the processing means being responsive to the apparatus being in the price loading mode and to the actuation of a selection switch to erase the price in the memory address corresponding to the actuated selection switch and to write the potential new price into said corresponding memory address thereby to change the price of the item corresponding to the actuated selection switch from the value stored in the corresponding memory address before the apparatus was put into the price loading mode to the potential new price value, whereby a serviceman can use the price-setting means to cause the display of a potential new price, activate the price loading mode means and actuate a selection switch and thereby change the price of the item selected to the potential new price.

15. Apparatus as set forth in claim 14 wherein the potential new price supplying means includes a numeric keyboard having a plurality of keys, the processing means being responsive to the actuation of a key to cause the display means to display the numeral associated with that key.

16. Apparatus as set forth in claim 13 wherein the operation mode setting means includes means for causing the processing means to cease supplying a coded potential new price signal to the display means upon the apparatus being set from the price setting mode to the vending mode thereby erasing the last price setting appearing in the display means.

17. Apparatus as set forth in claim 1 including incrementing means for supplying a parameter incrementing control input to the processing means, the processing means being responsive to the parameter incrementing control input to increment the parameter shown on the display means.

18. Apparatus as set forth in claim 17 wherein the incrementing means includes means for incrementing the displayed parameter up and means for incrementing the displayed parameter down.

19. Apparatus as set forth in claim 17 wherein the incrementing means has at least one state wherein it is activated and at least one state wherein it is deactivated, said processing means being responsive to the incrementing means being in an activated state to continuously increment the displayed parameter and being responsive to the incrementing means being put in a deactivated state to cease incrementing the displayed parameter.

20. Apparatus as set forth in claim 19 wherein the incrementing means further includes rapid incrementing enabling means for supplying a control input signal to the processing means to cause the processing means to increment the parameter displayed by the display means at a rapid rate, the processing means being responsive to the presence of the rapid incrementing control signal to continuously increment the displayed parameter at a faster rate than in the absence of said signal.

21. Apparatus for controlling the functioning of a vendor for vending a plurality of items, each item having a price associated therewith, comprising:
- a memory having a plurality of addresses for storing values of the prices of the items in predetermined memory addresses, the price values stored in the predetermined memory addresses being electrically alterable;
- processing means responsive to a plurality of vendor status inputs, a plurality of inputs from the memory, and a plurality of control inputs, for performing arithmetic and logic operations with those inputs and with the values of the prices associated with the items in a sequence controlled by a preselected set of instructions which constitute a program and for supplying output signals based upon results obtained from said operations to control functioning of the vendor, the predetermined memory addresses being accessible by the processing means and the price values stored therein being alterable by said processing means; interrogation means for retrieving from memory the values of at least some of the prices stored therein;
- display means for visually displaying a price value retrieved from memory by the interrogation means independently of any other input of said processing means being equal in value to the price value retrieved from the memory;
- means for supplying at least one input representative of a deposit of money in the vendor to the processing means, said processing means being responsive to said money deposit input to determine the amount of credit accumulated as a result of said deposit;
- means for supplying an input indicating the selection of an item to the processing means, the processing means being responsive to said selection input signal to recall the value of the price associated with that particular item from memory and, if there is a non-zero price associated with that item, and if the amount of credit accumulated is sufficient for purchase of the item selected, to generate a vend signal;
- means for initiating vending of the selected item, said initiating means being responsive to the vend signal from the processing means; and
- a customer inaccessible free vend switch and means for connecting the free vend switch with the processing means, said free vend switch having a first and a second position, the processing means being responsive to said free vend switch being in the first position to generate a vend signal even if the amount of credit accumulated is insufficient for purchase of the item selected.

22. Apparatus for controlling the functioning of a vendor for vending a plurality of items, each item having a price associated therewith, comprising:
- a memory having a plurality of addresses for storing values of the prices of the items in predetermined memory addresses, the price values stored in the predetermined memory addresses being electrically alterable;
- processing means responsive to a plurality of vendor status inputs, a plurality of inputs from the memory, and a plurality of control inputs, for performing arithmetic and logic operations with those inputs and with the values of the prices associated with the items in a sequence controlled by a preselected set of instructions which constitute a program and for supplying output signals based upon results obtained from said operations to control functioning of the vendor, the predetermined memory addresses being accessible by the processing means and the price values stored therein being alterable by said processing means;
- interrogation means for retrieving from memory the values of at least some of the prices stored therein;
- display means for visually displaying a price value retrieved from memory by the interrogation means independently of any other input of said processing means being equal in value to the price value retrieved from the memory;
- means for supplying at least one input representative of a deposit of money in the vendor to the processing means, said processing means being responsive to said money deposit input to determine the amount of credit accumulated as a result of said deposit;
- means for supplying an input indicating the selection of an item to the processing means, the processing means being responsive to said selection input signal to recall the value of the price associated with that particular item from memory and, if there is a non-zero price associated with that item, and if the amount of credit accumulated is sufficient for purchase of the item selected, to generate a vend signal;
- means for initiating vending of the selected item, said initiating means being responsive to the vend signal from the processing means; and sensing means for supplying a vendor status input comprising a series of pulses indicating the speed of rotation of a motor in the vendor to the processing means and further including clock means for supplying interrupts to the processing means, said processing means being responsive to the number of pulses supplied by the sensing means during a predetermined number of clock interrupts not falling within a predetermined range of values to remove the vend signal.

23. Apparatus for controlling the functioning of a vendor for vending a plurality of items, each item having a price associated therewith, comprising:
- a memory having a plurality of addresses for storing values of the prices of the items in predetermined memory addresses, the price values stores in the predetermined memory addresses being electrically alterable;
- processing means responsive to a plurality of vendor status inputs, a plurality of inputs from the memory, and a plurality of control inputs, for performing arithmetic and logic operations with those inputs and with the values of the prices associated with the items in a sequence controlled by a preselected set of instructions which constitute a program and for supplying output signals based upon results obtained from said operations to control functioning of the vendor, the predetermined memory addresses being accessible by the processing means and the price values stored therein being alterable by said processing means;

interrogation means for retrieving from memory the values of at least some of the prices stored therein;

display means for visually displaying a price value retrieved from memory by the interrogation means independently of any other input of said processing means being equal in value to the value retrieved from the memory;

means operable by authorized personnel for setting the values of at least some of the prices stored in the memory, said apparatus having at least two mutually exclusive operation modes, one of said operation modes being a vending mode and one of said operation modes being a price-setting mode, said price-setting means being customer inaccessible;

authorized personnel access means having an open and a closed position for providing authorized personnel access to said customer inaccessible price-setting means when said access means is in its open position and for preventing access to said price-setting means when said access means is in its closed position; and mode-setting means for setting the mode of operation of the apparatus, said mode-setting means being operable to set said apparatus in the price-setting mode only when the access means is open.

24. Apparatus as set forth in claim 23 wherein the customer inaccessible price-setting means includes a price-setting module detachably mounted in a holder, said mode-setting means being responsive to the price-setting module being in its holder to set the apparatus in its vending mode and being responsive to the price-setting module being out of its holder to set the apparatus in its price-setting mode.

25. Apparatus as set forth in claim 23 wherein the mode-setting means includes means for ensuring that the apparatus is set in its vending mode when the access means is closed.

26. Apparatus as set in forth in claim 23 wherein the customer inaccessible price-setting means includes an authorized personnel-removable price-setting module and plug means for connecting the price-setting module to the apparatus, said plug means being authorized personnel accessible by way of the authorized personnel-operable access means and being customer inaccessible.

27. Apparatus as set forth in claim 26 wherein the removable price-setting module is of such a size that the an authorized person can hold it in one hand, thereby leaving the authorized persons's other hand free to operate said price-setting module.

28. Apparatus as set forth in claim 27 wherein the price-setting module includes the display means.

29. Apparatus for controlling the functioning of a vendor for vending a plurality of items, each item having a price associated therewith, comprising:

a memory having a plurality of addresses for storing values of the prices in predetermined memory addresses, the price values stored in the predetermined memory addresses being electrically alterable;

processing means responsive to a plurality of vendor status inputs, a plurality of inputs from the memory, and a plurality of control inputs, for performing arithmetic and logic operations with those inputs and with the values of the prices associated with the items in a sequence controlled by a preselected set of instructions which constitute a program and for supplying output signals based upon results obtained from said operations to control functioning of the vendor, the predetermined memory addresses being accessible by the processing means and the price values stored therein being alterable by said processing means;

interrogation means for retrieving from memory the values of the prices stored therein, said interrogation means including a plurality of selection switches corresponding to the items in the vendor;

display means for visually displaying a price value retrieved from memory by the interrogation means independently of any other input of said processing means being equal in value to the price value retrieved from the memory;

means operable by authorized personnel for setting the values of the prices stored in the memory, said apparatus having at least two mutually exclusive modes of operation, one of said operation modes being a vending mode and one of said operation modes being a price-setting mode; and means for setting the mode of operation of the apparatus, the processing means being responsive to the actuation of a selection switch and to the apparatus being in the price-setting mode to retrieve from the memory the price of the item corresponding to that selection switch and to supply a coded signal corresponding to said price to the display means, the display means being responsive to the coded price signal from the processing means to display the price of the item corresponding to the actuated selection switch;

said price-setting means including means for supplying to the processing means a control input signal representing a potential new price, said processing means being responsive to the apparatus being in the price-setting mode and to said potential new price input signal to supply a coded signal corresponding to said potential new price to the display means, the display means being responsive to the coded potential new price signal to display the potential new price;

said price-setting means including means for putting the apparatus in a price-loading mode, the processing means being responsive to the apparatus being in the price-loading mode and to the actuation of a selection switch to erase the price in the memory address corresponding to the actuated selection switch and to write the potential new price into said corresponding memory address thereby to change the price of the item corresponding to the actuated selection switch from the value stored in the corresponding memory address before the apparatus was put into the price-loading mode to the potential new price value, whereby authorized personnel can use the price-setting means to cause the display of a potential new price, activate the price-loading mode means and actuate a selection switch and thereby change the price of the item selected to the potential new price;

said potential new price supplying means including authorized personnel-operable dial means for selecting the potential new price, said dial means including a dial having a plurality of prices indicated thereon and a control knob having a pointer for indicating a given one of the prices on the dial, whereby authorized personnel may select a potential new price by turning the control knob to point to that price on the dial.

30. Apparatus for controlling the functioning of a vendor for vending a plurality of items, each item having a price associated therewith, comprising:

a memory having a plurality of addresses for storing values of the prices in predetermined memory addresses, the price values stored in the predetermined memory addresses being electrically alterable;

processing means responsive to a plurality of vendor status inputs, a plurality of inputs from the memory, and a plurality of control inputs, for performing arithmetic and logic operations with those inputs and with the values of the prices associated with the items in a sequence controlled by a preselected set of instructions which constitute a program and for supplying output signal based upon results obtained from said operations to control functioning of the vendor, the predetermined memory addresses being accessible by the processing means and the price values stored therein being alterable by said processing means;

interrogation means for retrieving from memory the values of at least some of the prices stored therein, said interrogation means including a plurality of selection switches corresponding to the items in the vendor;

display means for visually displaying a price value retrieved from memory by the interrogation means independently of any other input of said processing means being equal in value to the price value retrieved from the memory;

means operable by authorized personnel for setting the values of the prices stored in the memory, said apparatus having at least two mutually exclusive modes of operation, one of said operation modes being a vending mode and one of said operation modes being a price-setting mode;

means for setting the mode of operation of the apparatus, the processing means being responsive to the actuation of a selection switch and to the apparatus being in the price-setting mode to retrieve from the memory the price of the item corresponding to that selection switch and to supply a coded signal corresponding to said price to the display means, the display means being responsive to the coded price signal from the processing means to display the price of the item corresponding to the actuated selection switch; and incrementing means for supplying a price incrementing control input to the processing means, the processing means being responsive to the price incrementing control input to increment the price shown on the display means;

31. Apparatus as set forth in claim 30 wherein the incrementing means includes means for incrementing the displayed price up and means for incrementing the displayed price down.

32. Apparatus as set forth in claim 30 wherein the incrementing means has at least one state wherein it is activated and at least one state wherein it is deactivated, said processing means being responsive to the incrementing means being in an activated state to continuously increment the displayed price and being responsive to the incrementing means being put in a deactivated state to cease incrementing the displayed price.

33. Apparatus as set forth in claim 32 wherein the incrementing means further includes rapid incrementing enabling means for supplying a control input signal to the processing means to cause the processing means to increment the price displayed by the display means at a rapid rate, the processing means being responsive to the presence of the rapid incrementing control signal to continuously increment the displayed price at a faster rate than in the absence of said signal.

34. Apparatus for controlling the functioning of a vendor for vending a plurality of items, each item having at least one parameter associated therewith, comprising:

a memory having a plurality of addresses for storing values of at least some of the parameters in predetermined memory addresses, the parameter values stored in the predetermined memory addresses being electrically alterable;

processing means responsive to a plurality of vendor status inputs, a plurality of inputs from the memory, and a plurality of control inputs, for performing arithmetic and logic operations with those inputs and with the values of the parameters associated with the items in a sequence controlled by a preselected set of instructions which constitute a program and for supplying output signals based upon results obtained from said operations to control functioning of the vendor, the predetermined memory addresses being accessible by the processing means and the parameter values stored therein being alterable by said processing means;

interrogation means operable by authorized personnel for retrieving from memory the values of at least some of the parameters stored therein;

display means for visually displaying to authorized personnel a parameter value retrieved from memory by the interrogation means independently of any other input of said processing means being equal in value to the value of the parameter retrieved from the memory, whereby authorized personnel may utilize the interrogation means to retrieve the value of a desired parameter from the memory;

customer inacessible means operable by authorized personnel for setting the values of at least some of the parameters stored in the memory, said apparatus having a least two mutually exclusive operation modes, one of said operation modes being a vending mode and one of said operation modes being a parameter-setting mode;

authorized personnel-operable access means having an open and a closed position for providing authorized personnel access to said customer inaccessible parameter-setting means when said access means is in its open position and for preventing access to said price-setting means when said access means is in its closed position; and mode-setting means for setting the mode of operation of the apparatus, said mode-setting means being operable to set said apparatus in the price-setting mode only when the access means is open.

35. Apparatus as set forth in claim 34 wherein the customer inaccessible parameter-setting means includes a parameter-setting module detachably mounted in a holder, said mode-setting means being responsive to the parameter-setting module being in its holder to set the apparatus in its vending mode and being responsive to the parameter-setting module being out of its holder to set the apparatus in its parameter-setting mode.

36. Apparatus as set forth in claim 34 wherein the mode-setting means includes means for ensuring that the apparatus is set in its vending mode when the access means is closed.

37. Apparatus as set forth in claim 34 wherein the customer inaccessible price-setting means includes an authorized personnel-removable parameter-setting module and plug means for connecting the price-setting module to the apparatus, said plug means being authorized personnel accessible by way of the access means and being customer inaccessible.

38. Apparatus as set forth in claim 34 wherein the parameter-setting means includes means for putting the apparatus in a parameter-loading mode, and means for selecting an item having a parameter which is to be changed, the processing means being responsive to the apparatus being in the parameter-loading mode and to the selecting means to erase a parameter value in the memory address corresponding to the selected item and to write a new parameter value into said corresponding memory address thereby to change a parameter of the item from the value stored in the corresponding memory address before the apparatus was put into the parameter-loading mode to a new parameter value, whereby authorized personnel can use the parameter-setting means to change the value of a parameter of a selected item to a new parameter value.

* * * * *

REEXAMINATION CERTIFICATE (448th)
United States Patent [19]
Schuller et al.

[11] B1 4,231,105
[45] Certificate Issued Jan. 28, 1986

[54] VENDOR CONTROL CIRCUIT

[75] Inventors: James T. Schuller, St. Louis County; Paul N. Albrecht, Ballwin; Hugo M. Canizares, Bridgeton, all of Mo.

[73] Assignee: UMC Industries, Inc., Stamford, Conn.

Reexamination Request:
No. 90/000,754, Apr. 11, 1985

Reexamination Certificate for:
Patent No.: 4,231,105
Issued: Oct. 28, 1980
Appl. No.: 921,960
Filed: Jul. 5, 1978

[51] Int. Cl.$^4$ .................. G07F 11/62; G06F 15/21
[52] U.S. Cl. ................................. 364/900; 194/10; 364/479
[58] Field of Search ............. 364/404, 405, 478, 479, 364/200 MS File, 900 MS File; 194/1 N, 2, 10; 340/825.35; 377/1, 13, 14

[56] References Cited

U.S. PATENT DOCUMENTS

| | | | |
|---|---|---|---|
| 2,980,224 | 4/1961 | Bookout et al. | 194/13 |
| 3,269,505 | 8/1966 | Abe et al. | 364/479 X |
| 3,330,947 | 7/1967 | Alpert et al. | 364/405 |
| 3,687,255 | 8/1972 | Johnson | 194/1 N |
| 3,732,544 | 5/1973 | Obland | 364/900 |
| 3,828,317 | 8/1974 | Mette | 364/900 |
| 3,848,718 | 11/1974 | Bookout | 194/10 |
| 3,891,075 | 6/1975 | House | 194/9 R |
| 3,894,220 | 7/1975 | Levasseur | 364/479 |
| 3,927,800 | 12/1975 | Zinzmeyer et al. | 222/26 |
| 3,982,620 | 9/1976 | Kortenhaus | 194/1 N |
| 4,001,568 | 1/1977 | Iizuka et al. | 364/900 X |
| 4,008,792 | 2/1977 | Levasseur et al. | 194/1 N |
| 4,028,538 | 6/1977 | Olander, Jr., et al. | 364/900 |
| 4,056,181 | 11/1977 | Ikeguchi et al. | 194/10 |
| 4,093,999 | 6/1978 | Fuller et al. | 364/900 |
| 4,094,398 | 6/1978 | Camp et al. | 194/10 |
| 4,096,933 | 6/1978 | Massa | 364/479 X |
| 4,107,777 | 8/1978 | Pearson et al. | 364/479 X |
| 4,124,775 | 11/1978 | Zarouni | 179/6.3 R |
| 4,216,529 | 9/1980 | Krystek et al. | 364/510 |

FOREIGN PATENT DOCUMENTS

53-29197 3/1978 Japan.

OTHER PUBLICATIONS

"Imperial Crown Hot/Cold Food Merchandiser FM-72", National Vendors brochure.
Barnes–"A Smart Vending Machine"–Motorola Semiconductor Products–1975.

*Primary Examiner*—Joseph Ruggiero

[57] ABSTRACT

A control circuit for a vendor for vending a plurality of items comprising a microprocessor, an electrically alterable memory, a display circuit and an interrogation circuit. Values of parameters, typically prices, associated with the items to be vended are stored in the memory. The interrogation circuit can be activated to retrieve from memory the value of the parameter (e.g., price) associated with any given item. The parameter value is thereupon displayed by the display circuit. The display circuit displays the parameter value retrieved from memory independently of whether the microprocessor has another input equal in value to the value of that parameter. The parameter value stored in the memory for any given item can be altered by the microprocessor.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–38 is confirmed.

* * * * *